United States Patent [19]

Kupiec

[11] Patent Number: 5,519,608
[45] Date of Patent: May 21, 1996

[54] METHOD FOR EXTRACTING FROM A TEXT CORPUS ANSWERS TO QUESTIONS STATED IN NATURAL LANGUAGE BY USING LINGUISTIC ANALYSIS AND HYPOTHESIS GENERATION

[75] Inventor: Julian M. Kupiec, Cupertino, Calif.

[73] Assignee: Xerox Corporation, Stamford, Conn.

[21] Appl. No.: 82,938

[22] Filed: Jun. 24, 1993

[51] Int. Cl.[6] .............................. G06F 17/27; G06F 17/20; G06F 7/00; G06F 7/06
[52] U.S. Cl. ......................... 364/419.08; 395/12; 395/600
[58] Field of Search ........................ 364/419.08, 419.07, 364/419.13, 419.19; 395/12, 600

[56] References Cited

U.S. PATENT DOCUMENTS

| | | | |
|---|---|---|---|
| 4,823,306 | 4/1989 | Barbic et al. | |
| 4,931,935 | 6/1990 | Ohira et al. | 364/419.08 |
| 4,972,349 | 11/1990 | Kleinberger . | |
| 4,994,967 | 2/1991 | Asakawa | 364/419.08 |
| 5,263,159 | 11/1993 | Mitsui | 395/600 |
| 5,265,014 | 11/1993 | Haddock et al. | 364/419.08 |
| 5,265,065 | 11/1993 | Turtle | 395/600 |
| 5,278,980 | 1/1994 | Pedersen et al. | 395/600 |

FOREIGN PATENT DOCUMENTS

| | | | |
|---|---|---|---|
| 0157539 | 10/1985 | European Pat. Off. | G06F 15/40 |
| 0304191 | 2/1989 | European Pat. Off. | G06F 15/40 |

OTHER PUBLICATIONS

Communication: European Search Report for D/93184 dated 11 Jan. 1995.
Jacobs, Paul S., et al. "Lexico–Semantic Pattern Matching as a Companison to Parsing in Text Understanding," Abstract—Artificial Intelligence Lab., GE R & D, Schenectady, NY pp. 337–341.
Cutting, Doug, et al. "A Practical Part–of–Speech Tagger," Xerox Palo Alto Research Center, Palo Alto, California, USA.
WESTLAW® User Guide pp. 1–24.
Hopcroft, John E., et al. "Introduction to Automata Theory, Languages, and Computation," Copyright ©1979 by Addision–Wesley Publicating Co. Inc.
Francis, W. Nelson, et al. "Frequency Analysis of English Usage," Houghton Mifflin Company—Boston, excerpts pp. 1–21 & 457–561.
Salton, G. et al. "Automatic Query Formulations in Information Retrieval," Journal of the American Society for Information Science. 34(4): pp. 262–280; 1983.
Miller, George A., et al. "Five Papers on WordNet™," CSL Report 43, Jul. 1990, Revised Mar. 1993.
Cutting, Doug, et al. "An Object–Oriented Architecture for Text Retrieval," Proc. of a Conf. on Intelligent Text and Image Handling 'RIAO 91,' Barcelona, Spain 2–5 Apr. 1991 pp. 285–298.
Galbiati, Giulia "A Phrase–Based Matching Function," Jour. of the Amer. Soc. for Information Scie. 42(1):36–48, Jan. 1991.
Frants, Valery I., et al. "Algorithm for Automatic Construction of Query Formulations in Boolean Form," Journal of the Ameri. Society for Information Science. 42(1):16–26, Jan. 1991.

(List continued on next page.)

*Primary Examiner*—Gail O. Hayes
*Assistant Examiner*—Stephen R. Tkacs

[57] ABSTRACT

A computerized method for organizing information retrieval based on the content of a set of primary documents. The method generates answer hypotheses based on text found in the primary documents and, typically, a natural-language input string such as a question. The answer hypotheses can include phrases or words not present in the input string. Answer hypotheses are verified and ranked based on their verification evidence. A text corpus can be queried to provide verification evidence not present in the primary documents. In another aspect the method is implemented in the context of a larger two-phase method, of which the first phase comprises the method of the invention and the second phase of the method comprises answer extraction.

52 Claims, 3 Drawing Sheets

OTHER PUBLICATIONS

Gauch, Susan, et al. "Search Improvement via Automatic Query Reformation," AMC Translations on Information Systems, vol. 9, No. 3, Jul. 1991, pp. 249–280.

Salton, Gerard, et al. "Automatic Text Structuring and Retrieval—Experiments in Automatic Encyclopedia Searching," 14th Intl. ACM SIGIR Conf. Res. & Der. in Info. Retrival. Oct. 1991.

Wendlandt, Edgar B., et al. "Incorporating a Semantic Analysis into a Document Retrieval Strategy," 14th Intl. ACM SIGIR Conf. Res. & Der. of Info. Retrieval. Oct. 1991, pp. 270–279.

Kupiec, Julian "Robust part-of-speech tagging using a hidden Markov model," Computer Speech & Language, 1992:6.

Kupiec, Julian "Hidden Markov Estimation for Unrestricted Stochastic Context–Free Grammers," IEEE International Conf. on Acoustics, Speech & Signal Proc. Mar. 23–26, 1992 pp. I–177–I–180.

Hearst, Marti A. "Automatic Acquisition of Hyponyms from Large Text Corpora," Proc. of Coling–92, Nantes, Aug. 23–28, 1992 pp. 539–545.

Broglio, J. et al. "Query Processing for Retrieval from Large Text Bases," ARPA Human Lang. Tech. Workshop, Mar. 1993 Plainboro, N.J.

METHOD FOR EXTRACTING FROM A TEXT CORPUS ANSWERS TO QUESTIONS STATED IN NATURAL LANGUAGE BY USING LINGUISTIC ANALYSIS AND HYPOTHESIS GENERATION

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

SOFTWARE APPENDIX

An appendix comprising 168 pages is included as part of this application. The appendix provides thirteen files of a source code software program for implementation of an embodiment of the method of the invention on a digital computer. The files include seven source code files that provide the principal functionality of the embodiment plus six additional support files. The software program is written in the Lisp language (Franz Allegro Lisp version 4.0), well known to those of skill in the art. The program has been demonstrated on a Sun Workstation, although it will be apparent to those of skill in the art that a wide variety of programming languages and hardware configurations can readily be used based on this disclosure without departing from the scope of the invention.

The files reproduced in the appendix represent unpublished work that is Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

BACKGROUND OF THE INVENTION

The present invention relates to computerized information-retrieval (IR) systems and methods, and more particularly to computerized information-retrieval systems and methods used with textual databases.

In prior art IR systems and methods the user often has to proceed iteratively, usually using a special query language, by beginning with an initial query, scanning the results of that query (that is, the documents that were retrieved in response to that query), modifying the query if the results were unsatisfactory, and repeating these steps until satisfactory results are obtained. The user is responsible for modifying or refining the query and typically receives little or no help from the system in query construction or refinement.

Prior art systems cannot locate or highlight phrases within documents if the phrases are not found in the input query. For example, in response to a user query regarding what film pits Humphrey Bogart against gangsters in the Florida Keys, prior art IR systems would accept from the user a query containing words such as "film," "Bogart," "gangster," and "Florida Keys," and would search for the co-occurrence of these words within single documents. It would be left to the user to piece together the various documents thus retrieved to determine the correct answer.

Attempts have been made in the prior art to allow users to formulate queries in natural language. One such attempt is found in systems called question-answering systems. A question-answering system can respond to certain natural-language queries, but only because the data in its database are heavily preprocessed to accommodate such queries. For example, a question-answering system designed to respond to user queries about moon rocks will typically employ a database configured as a two-dimensional array, with moon-rock sample numbers arrayed along one dimension and fact categories, such as ore content of the rocks, arrayed along the other axis. The system responds to user queries simply by accessing the appropriate cell of the array.

Prior art IR systems and methods do not automatically perform a sequence of queries designed to include the optimal query or queries needed to answer a user's natural-language question. Furthermore, prior art IR systems and methods neither guess at the answer to the user's question nor attempt to manipulate or process queries based on such a guess. They simply match text.

SUMMARY OF THE INVENTION

The present invention provides a method for organizing information retrieval based on the content of a set of documents. The method generates answer hypotheses based on text found in the documents of the set and, typically, a natural-language input string such as a question. The answer hypotheses can include phrases or words not present in the input string. In some embodiments, such as those described up to this point, the answer hypotheses are verified and can be ranked based on their verification evidence. If verification is performed, a text corpus can be used to provide verification evidence not present in the set of documents. The documents can be present in the text corpus, but need not be. In some embodiments certain steps of the method, such as verification, can be omitted. In some embodiments the input string can be omitted.

In another aspect the present invention is used in the context of a larger, two-phase method for information retrieval in response to a user-supplied natural-language input string such as a question. The first phase comprises primary query construction, in which a set of documents likely to be relevant is retrieved from a text corpus. The second phase comprises the method of the present invention, which is used to analyze documents retrieved in the first phase to generate answer hypotheses that are likely to be the answer to the question and to select and point out to the user the document or documents most likely to contain the answer to the user's question.

A further understanding of the nature and advantages of the present invention may be realized by reference to the remaining portions of the specification and the drawings.

DESCRIPTION OF SPECIFIC EMBODIMENTS

Figure 1:
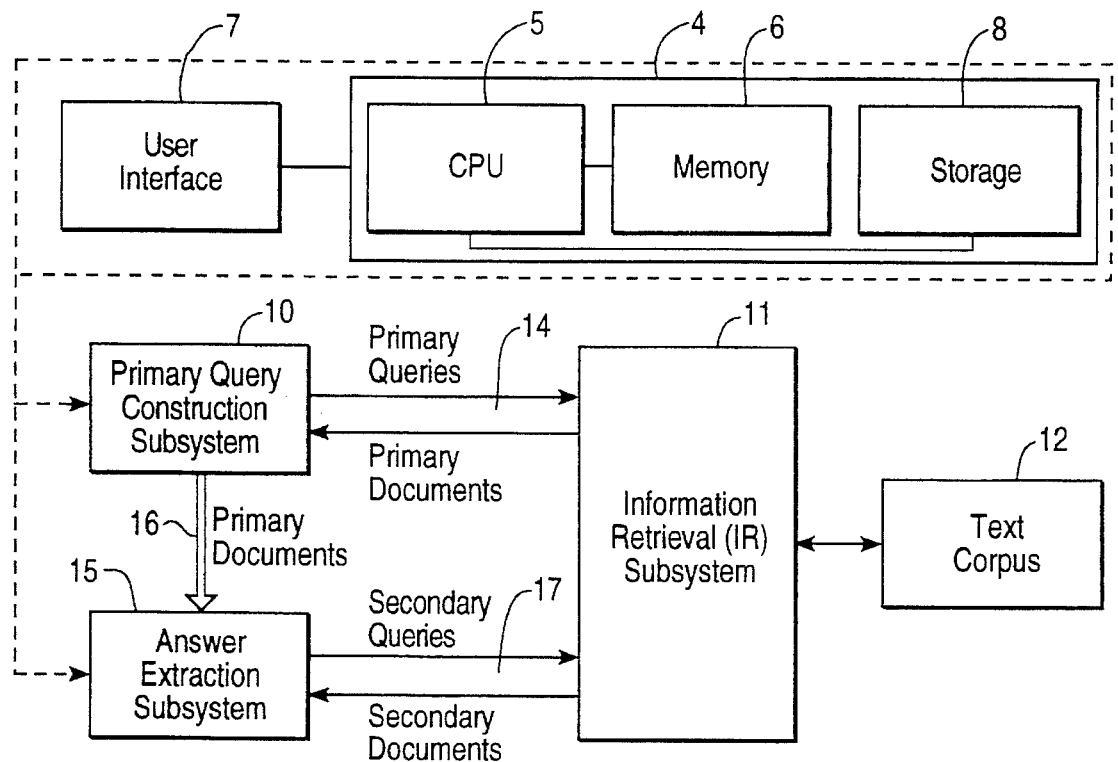
FIG. 1 illustrates a system suitable for an embodiment of the present invention.

The disclosures in this application of all articles and references, including patent documents, are incorporated herein by reference.

The description that follows is in four parts. Part I is an introduction that includes an overview of the invention, an example of how it works, and a glossary of terms. Part II describes the method of the present invention in one embodiment. Part III describes MURAX, a system designed to embody the method of the present invention in the context of a larger two-phase method of which the method of the present invention is used to carry out the second phase. Part IV concludes the description.

PART I. INTRODUCTION

1. Overview of the Invention

The present invention provides a method for answer extraction. A system operating according to this method accepts a natural-language input string such as a user-supplied question and a set of relevant documents that are assumed to contain the answer to the question. In response, it generates answer hypotheses and finds these hypotheses within the documents. In the Humphrey Bogart example above, the method of the present invention would generate the answer hypothesis "Key Largo" and find that hypothesized term in one or more documents previously retrieved from an IR system or subsystem.

The present invention can, in the context of a question that asks for a specific answer, provide an answer that is nowhere to be found in the question. This greatly facilitates the user's finding the desired answer. The user does not have to piece together the answer by hunting through the documents. Instead, the invention highlights the answer hypothesis, in this case "Key Largo," in the retrieved documents for the user's convenience. The invention can draw on and combine information from multiple retrieved documents in order to answer the user's question.

In the present invention, the answer hypotheses generated are used in new queries that the system constructs without user aid. These secondary queries are based on guesses-words that in the vast majority of cases are not present in the user's original question.

The method of the present invention can be used by itself or in a larger context. In particular, it can be used in a two-phase method that accepts a user's question in natural-language form and responds by not only producing relevant documents, but by also generating answer hypotheses and finding these hypotheses within the documents. Such a two-phase method comprises a first phase of primary query construction to retrieve documents likely to contain the answer to the question, and a second phase of answer extraction according to the method of the present invention. In a preferred embodiment the first phase is performed according to the method of the copending application entitled METHOD FOR COMPUTERIZED INFORMATION RETRIEVAL USING SHALLOW LINGUISTIC ANALYSIS, U.S. patent application Ser. No. 08/085,446, Xerox Docket No. D93183, which is by the same inventor as the subject application, is filed concurrently with the subject application, and is incorporated herein by reference as if set out in full.

2. Illustrative Example

It is helpful to present an illustrative example of answer extraction as performed according to the method of the invention in one embodiment. In this example, which will be called Example 1, the user's question is, "What Pulitzer Prize-winning novelist ran for mayor of New York City?"

The method begins by accepting as input the user's question and a set of documents that are assumed to contain the answer to the question. Typically the documents are retrieved from a database in response to IR queries that are carried out ahead of time. The documents of the set are called the primary documents.

The method then analyzes the question to detect the noun phrases that it contains. In this example, the noun phrases are "Pulitzer Prize," "novelist," "mayor," and "New York City." The method assumes that the documents contain some or all these noun phrases. This will be the case if the IR queries used to retrieve the primary documents are constructed based on the noun phrases.

Once the noun phrases are determined, the method looks at the sentences in which these noun phrases appear in the retrieved documents. These sentences are analyzed to detect additional noun phrases that appear in conjunction with the noun phrases of the original question. The method treats the additional noun phrases as preliminary answer hypotheses, and assumes that one of these preliminary hypotheses will eventually turn out to be the best answer to the user's question. Continuing with Example 1, suppose that the retrieved documents contain the following additional noun phrases in proximity to the noun phrase "New York City":

"Edith Wharton" (who was born in New York City)

"William Faulkner" (who visited New York City)

"Norman Mailer" (who lived in New York City)

Then "Edith Wharton," "William Faulkner," and "Norman Mailer" become the preliminary hypotheses for Example 1.

The preliminary hypotheses are scored and then ranked according to their scores. The scoring and ranking can be done using a simple criterion such as how many noun phrase words from the question appear within each document, with extra weight being given to the most important nouns (head nouns) in each noun phrase. Suppose that the documents containing the names "Edith Wharton" and "William Faulkner" refer to these persons as "novelists," but that the document containing the name "Norman Mailer" refers to Mr. Mailer as a "writer." Suppose also that all the retrieved documents include the noun phrases "New York City" and "Pulitzer Prize" and that the Mailer document includes the noun phrase "mayor." According to the simple scoring criterion, the documents are scored and ranked equally because the Wharton and Faulkner documents contain three of the noun phrases of the original question ("New York City," "Pulitzer Prize," and "novelist") as does the Mailer document ("New York City," Pulitzer Prize," and "mayor").

After scoring and ranking the preliminary hypotheses, the method selects the top-ranked preliminary hypotheses and attempts to verify them. For each selected hypothesis, the method attempts to gather additional evidence to support the conclusion that the hypothesis is the correct answer. In effect the method asks, What does this hypothesis have in common with the original question? Verification is accomplished by lexico-syntactic analysis which looks for certain patterns in the user's question and attempts to find corresponding or related patterns in documents. If the corresponding or related patterns are found in conjunction with a hypothesis, this is considered evidence in favor of the hypothesis.

Often, verification cannot be accomplished using the primary documents alone. When the primary documents do not provide sufficient evidence to verify a hypothesis, the method attempts to find such evidence elsewhere in the database. Specifically, the method constructs additional IR queries called secondary queries and executes the secondary queries to retrieve additional documents called secondary documents. Several secondary queries can be run for each hypothesis, as needed.

Suppose that in Example 1 all three hypotheses are selected for verification. The primary documents indicate that Norman Mailer was from New York City, won a Pulitzer Prize, and ran for mayor, but do not indicate that he was a novelist. However, a secondary queries that seeks "Norman Mailer" in conjunction with "novelist" successfully retrieve secondary documents. Lexico-syntactic analysis of these documents verifies that Norman Mailer is a "novelist" as well as a "writer."

After all verification attempts are complete, the method rescores the hypotheses according to the degree to which they were successfully verified. In Example 1, Norman Mailer emerges as the winning answer hypothesis. Finally, the winning answer hypothesis can be presented to the user in conjunction with the documents and sentences in which it was found and the noun phrases that were used to verify it. In this way, the method shows not only what the answer is but why it was chosen.

It will be observed in Example 1 that the method is capable of piecing together information from multiple documents to develop and verify answer hypotheses and come up with a best answer. It will further be observed in Example 1 that the answer hypotheses developed according to the method typically appear nowhere in the user's question.

3. Glossary

The following terms are intended to have the following general meanings:

Answer: The actual, correct answer to a given question.

Answer hypothesis: A guess at the correct answer to a question, produced by the invention.

Apposition: A grammatical construction in which two (usually adjacent) noun phrases refer to the same thing.

Co-occurrence queries: A secondary query that contains phrases, other than the type phrase, from a user's question.

Corpus, corpora: A body of natural language text to be searched, used by the invention.

Degree of mismatch: A quantified measure of similarity between two phrases.

Document match: The situation where a document satisfies a query.

Domain: A broad area that characterizes an information retrieval task, e.g., general knowledge, medicine, etc.

FSM, finite-state recognizers: A device that receives a string of symbols as input, computes for a finite number of steps, and halts in some configuration signifying that the input has been accepted or else that it has been rejected.

Head noun: The main noun in a noun phrase which may be modified by other words in the phrase. In English, the head noun is usually the rightmost word in the noun phrase.

Indexing: The association of a word with all the different places the word exists in a corpus.

Information retrieval, IR: The accessing and retrieval of stored information, typically from a computer database.

IS-A: The name of a particular lexico-syntactic pattern and linguistic relation. The IS-A relation uses forms of the verb "to be" to denote or assert the identity of or a characteristic of an object. An example of the IS-A relation is seen in the sentence "Brooklyn is a borough of New York City."

Language modeling: Computational modeling of natural language.

Lexico-syntactic: Having to do with words, syntactic patterns, or both. Lexico-syntactic analysis is used in the invention to verify linguistic relations.

List inclusion: The name of a particular lexico-syntactic pattern in which a noun is included in a list of related nouns. Each member of the list has the same relationship as other members of the list to a (primary) noun outside the list. Typically the nouns of the list indicate objects of the same type, and are separated within the list by commas or semicolons.

Match sentences: Sentences in a document that cause or help cause the document to be retrieved in response to a query. Match sentences contain phrases that conform to the search terms and constraints specified in the query.

Noun phrase: A phrase consisting of a noun, its modifiers (e.g., adjectives and other nouns) and possibly an article.

Noun phrase inclusion: The name of a particular lexico-syntactic pattern.

Operators: kleene-plus, sequence, optionality, union: Functions in the finite-state calculus, used in finite-state recognizers. Optionality means 0 or more instances.

Phrase matching: Finding phrases that satisfy a lexico-syntactic pattern or other linguistic pattern.

Predicate/argument match: Matching a particular lexico-syntactic pattern that represents argument structure. The pattern relates a verb and one or more associated nouns.

Primary documents: Documents from a text corpus that are retrieved in response to a primary query.

Primary query: A query that is based only on phrases from the user's question.

Query: An expression involving words, Boolean operators and proximity constraints that is used by an information retrieval system to search a corpus and return text that matches the expression.

Question: A user's information need, presented to the invention as a natural language question.

Regular expression: A specification of functions in the finitestate calculus.

Relation; phrase relation: A linguistic relation between words or phrases, or between a word or phrase and a certain property (e.g., the property of being a person's name). Put another way, a relation is the way that words work together to create meaning in a phrase or that phrases work together to create meaning in a sentence. A relation has syntactic, semantic, contextual and other aspects. For example, in the sentence, "George Washington was the first president," a relation exists between the phrases "first president" and "George Washington." The syntactic aspects of a relation are used to approximate the relation in some embodiments of the invention.

Scoring: The assignment of values to answer hypotheses, reflecting their likelihood as being the correct answer.

Secondary documents: Documents from a text corpus that are retrieved in response to a secondary query.

Secondary query: A query that is based on an answer hypothesis and that additionally may be based on other phrases.

Shallow syntactic analysis: A syntactic analysis of a phrase that represents gross grammatical structure and not necessarily all the details of the linguistic relationships in the phrase.

Simple noun phrase: A noun phrase that does not contain prepositional phrases or conjunctions.

Tagging: The assignment of part-of-speech categories to words.

Title phrase: A phrase that represents a title (e.g., of a book, film, etc.), which may or may not be a noun phrase, and which typically is indicated typographically (e.g., by enclosing quotes, capital letters, italics, etc.), Type phrase: A phrase in a question that indicates the nature of the answer, e.g., "What river . . . " A type phrase can be used to help develop answer hypotheses, because it provides an indication of what the answer should look like. For example, in the question, "Who was the first President of the United States?", the phrase "the first President of the United States" is the type phrase. As another example, in the question, "What river does the Hoover Dam dam?" the type phrase is "river."

Verify, verification: The process of determining whether a relation exists. When a phrase match is verified, this is evidence that the relation holds; that is, text has been found in the corpus that supports the existence of the relation.

PART II. AN EMBODIMENT OF THE METHOD

1. Organization of Part II

Part II of the description sets forth the method of the present invention in one embodiment. Section 2 provides an overview of a system suitable to implement the method. Section 3 outlines the major, high-level steps of the method. Sections 4, 5, 6, and 7 provide detailed breakdowns of four of these top-level steps: question processing, preliminary hypothesis generation, hypothesis verification, and hypothesis ranking. Section 8 describes some variations of the method.

2. System Overview

FIG. 1 illustrates a system suitable to implement the method of the present invention. A user's question and a set of relevant documents is fed to answer extraction subsystem 15 whose software operates on supporting hardware comprising a computing node 4 further comprising a processor 5 and memory 6 coupled to the processor 5. In some embodiments computing node 4 additionally comprises a storage device 8 coupled to processor 5. Answer extraction subsystem 15 is coupled via channel 17 to an information retrieval subsystem 11 that operates on a text corpus 12. In response to questions input by the user at a user interface 7 and a set of relevant documents known to be present in text corpus 12 that is received via channel 16, answer extraction subsystem 15 generates and verifies answer hypotheses. In so doing, answer extraction subsystem 15 can send queries to information retrieval subsystem 11. In response to these queries information retrieval subsystem 11 retrieves documents from text corpus 12 and sends these back to answer extraction subsystem 15. The output of answer extraction subsystem 15 is presented to the user via user interface 7.

Optionally, as further illustrated in FIG. 1, the method of the current invention can be embodied in a system suitable to the two-phase method for answering a natural-language question. Answer extraction subsystem 15 is coupled with primary query construction subsystem 10 via channel 16 and with information retrieval subsystem 11 via channel 17. Answer extraction subsystem 15 receives the output of primary query construction subsystem 10 as its input. This input includes a set of relevant documents and questions input to user interface 7, which are routed to answer extraction subsystem 15 from user interface 7 via primary query construction subsystem 10. Primary query construction subsystem 10 sends queries via channel 14 to information retrieval subsystem 11, which sends back documents or document identifiers retrieved from text corpus 12. Primary query construction subsystem 10 runs on supporting hardware that can comprise node 4 further comprising processor 5 and memory 6 or, alternatively, a separate node comprising its own processor and memory (not shown).

In embodiments that do not include a primary query construction subsystem, the input question and set of documents for answer extraction can be supplied by the user via user interface 7, or, alternatively, retrieved from optional storage device 8.

Certain elements of the system of FIG. 1 will now be described in greater detail.

Answer extraction subsystem (15). The answer extraction subsystem is a process that executes on one or more computing nodes. By "process" is meant a software entity that comprises one or more threads of execution and possibly one or more input/output streams. By "node" is meant a computer comprising memory and one or more processors. In FIG. 1, answer extraction subsystem 15 executes on a computing node 4 that comprises processor 5 and memory 6.

Computing node, processor, memory, user interface, and optional storage device (4, 5, 6, 7, 8). The processor 5 and the memory 6 to which it is coupled form the core of a computing node 4 that executes the process that is answer extraction subsystem 15. The computing node 4 can in some embodiments further comprise a storage device 8, such as a hard disk, coupled to the processor 5. The user interface 7 comprises hardware, such as an input keyboard and display screen, and associated software to permit a user to communicate with the answer extraction subsystem. In some embodiments, for example if computing node 4 is a workstation, processor 5, memory 6, user interface 7, and (if present) storage device 8 are integrated into a single computer. In other embodiments, the user interface can run on a processor other than processor 5, or can be implemented on hardware that is at a location remote from processor 5 and memory 6. Persons of skill in the art will appreciate that a vast range of hardware and software can be used to implement node 4, processor 5, memory 6, user interface 7, and optional storage device 8 within the scope of the present invention.

Information retrieval subsystem (11). The IR subsystem is a process that executes on one or more computing nodes (not shown). Typically the IR subsystem executes on a node or nodes distinct from the node or nodes on which the answer extraction subsystem executes, but this need not be the case. As described more fully below, the IR subsystem is capable of responding to certain primitive queries including Boolean queries with proximity and order constraints, as well as to compound queries formed of these primitives. The IR subsystem 11 is coupled to the text corpus 12 in such a way that the IR subsystem 11, acting in response to an input query, can search the text corpus 12 for documents that match the query.

Text Corpus (12). The method of the present invention is to be used in conjunction with a text corpus, which is a corpus (body) of information stored in the form of natural language text. Typically the corpus is a collection of articles or documents. Without limitation, kinds of corpora suitable to the invention include, for example, an encyclopedia, a collection of newspaper articles, a set of office correspondence, a set of files containing facts about clients or companies, or a collections of abstracts or articles from scientific or technical journals.

Typically the corpus 12 is stored as a computerized database. The computerized database can be implemented on any suitable hardware; typically such hardware comprises one or more mass storage devices such as hard disks or CD-ROMs.

Channels (14, 16, 17). In a system suitable to the method of the present invention the various processes communicate with one another through communications channels. For example, in FIG. 1, answer extraction subsystem 15 communicates with IR subsystem 11 through channel 17. Where two communicating processes execute on a single node, the communications channels comprise interprocess communication links that also execute on the node. Where two communicating processes execute on different nodes, the communications channel comprises hardware links and software protocols through which the processes can communicate with one another. The communications channels can, for example, be implemented in a local area network or a wide area network and can, for example, incorporate wire, coaxial cable, fiber optic, or wireless hardware links. In one embodiment answer extraction subsystem 15 executes on a workstation at a user's location, IR subsystem 11 executes on a mainframe or server at a remote location (where text corpus 12 is also located), and communications channel 17 comprises a modem link across a wide area network.

It will be appreciated that in some embodiments two or more of the processes described above can be integrated into a single process as modules of that process. For example, the primary query construction subsystem and IR subsystem can be implemented as modules of a single process in some embodiments, or the primary query construction subsystem and an answer extraction subsystem can be implemented as modules of a single process in some embodiments. In such cases the communications channels between the modules can be, for example, shared variables or function or subroutine parameters.

3. Major Steps of the Method

Figure 2:
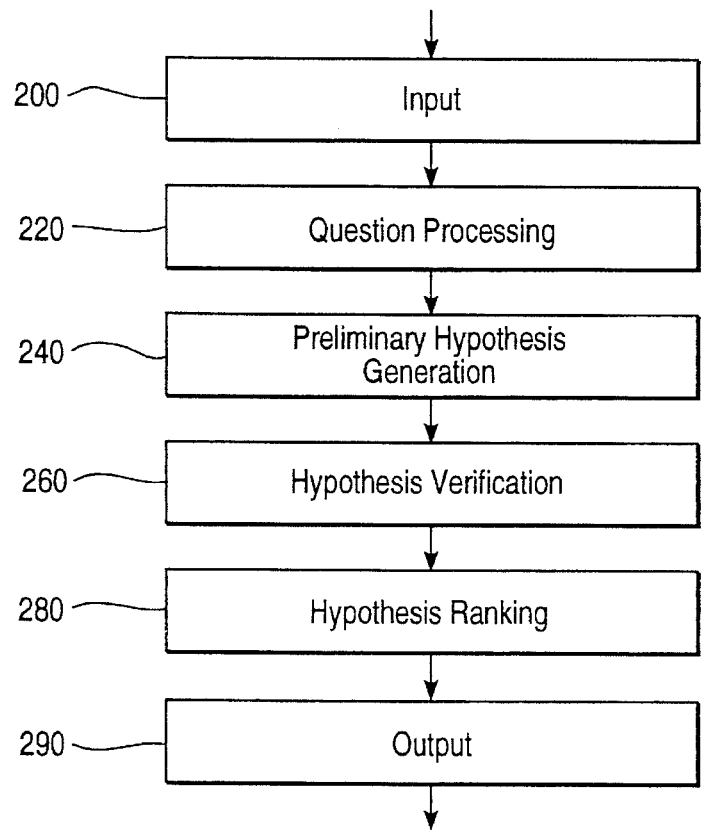
FIG. 2 is a high-level flow chart diagramming the method of the present invention.

Considered at a high level of abstraction, the method of the present invention proceeds in one embodiment in six major steps, as shown in the flowchart of FIG. 2: (1) input (step 200); (2) question processing (step 220); (3) preliminary hypothesis generation (step 240); (4) hypothesis verification (step 260); (5) hypothesis ranking (step 280); and (6) output (step 290). This section of the description explains how these steps work together in the context of the method as a whole. Subsequent sections examine the steps of question processing, hypothesis generation, hypothesis verification, and hypothesis ranking in greater detail. Still further details of these steps as embodied in the MURAX system are presented in Part III.

In step 200 the answer extraction subsystem accepts as input a natural-language input string (e.g., a question) and a set of documents assumed to contain an appropriate response to the input string (e.g., the answer to the question). The input string is a character string that is input by a user through the user interface and made available to the answer extraction subsystem, either directly or by way of the primary query construction subsystem if such a subsystem is present. The input character string represents a sequence of one or more natural language words. Although the input string is typically in the form of a natural language question, this is not always the case; for example, an input string can be a statement, a paragraph, or even an entire article or other document.

The documents accepted as input in step 200, which will be called the primary documents, are assumed to be present in the text corpus and to contain among them the appropriate response to the input string, e.g., the answer to the question. Typically the primary documents are documents that are retrieved from the text corpus in response to IR queries executed in advance of step 200. The primary documents can also be supplied from other sources. They can be, for example, documents provided by a clipping service, documents produced during litigation in response to a document production request, or documents obtained during a previous information retrieval session using a different corpus.

In step 220 the input string is linguistically analyzed to detect noun phrases in the string. Additional kinds of phrases can be detected as well. Step 220 is analyzed in more detail in section 4 below. The result of step 220 is an analysis of the input string.

Step 220 can be performed by the answer extraction subsystem after receiving the input string. Alternatively, it can be performed in advance of step 200 by another process. In this case a completed analysis of the input string is supplied to the answer extraction subsystem as additional input along with the input string and primary documents in step 200.

In step 240 the answer extraction subsystem generates preliminary hypotheses from the analyzed input string and the primary documents. In one embodiment preliminary hypothesis generation comprises locating match sentences in the documents, scoring these match sentences, extracting noun phrases from the match sentences and from adjacent sentences in the primary documents, and scoring these noun phrases to generate a ranked list of preliminary hypotheses. Step 240 is analyzed in more detail in section 5 below. The result of step 240 is a set of selected hypotheses.

In step 260 the answer extraction subsystem verifies hypotheses from the set of selected hypotheses produced in step 240. In one embodiment hypothesis verification comprises lexico-syntactic analysis, template matching, and optional linking of equivalent hypotheses. The template matching procedure can incorporate the construction and execution of secondary queries. Step 260 is described in more detail in section 5 below. The result of step 260 is a set of verification evidence and optional linking information for each hypothesis.

In step 280 the answer extraction subsystem performs hypothesis ranking according to a scoring scheme. The goal of this step is to rank highest the answer hypothesis or hypotheses most likely to be responsive to the input string. Step 280 is analyzed in more detail in section 5 below. The result of step 280 is an ordered list of answer hypotheses.

In step 290 the answer extraction subsystem outputs a subset of the ordered list of answer hypotheses produced in step 280. The subset can be output directly to the user via the user interface. Alternatively or additionally it can stored in a storage device for later use, or made available for further processing. In some embodiments one or more answer hypotheses can be highlighted in the documents in which they appear for ease of reference. In other words, the answer extraction subsystem tells the user what it thinks the answer is and why. In some embodiments output to the user can be done in an interactive fashion, for example, by permitting the user to issue commands to the system to display answer hypotheses only, to display answer hypotheses in the context of the documents in which they appear, etc.

4. Question Processing

This section examines step 220, question processing, in detail. In one embodiment question processing comprises shallow linguistic analysis of the natural language input string, which is typically (but not necessarily) in the form of a question.

Figure 3:
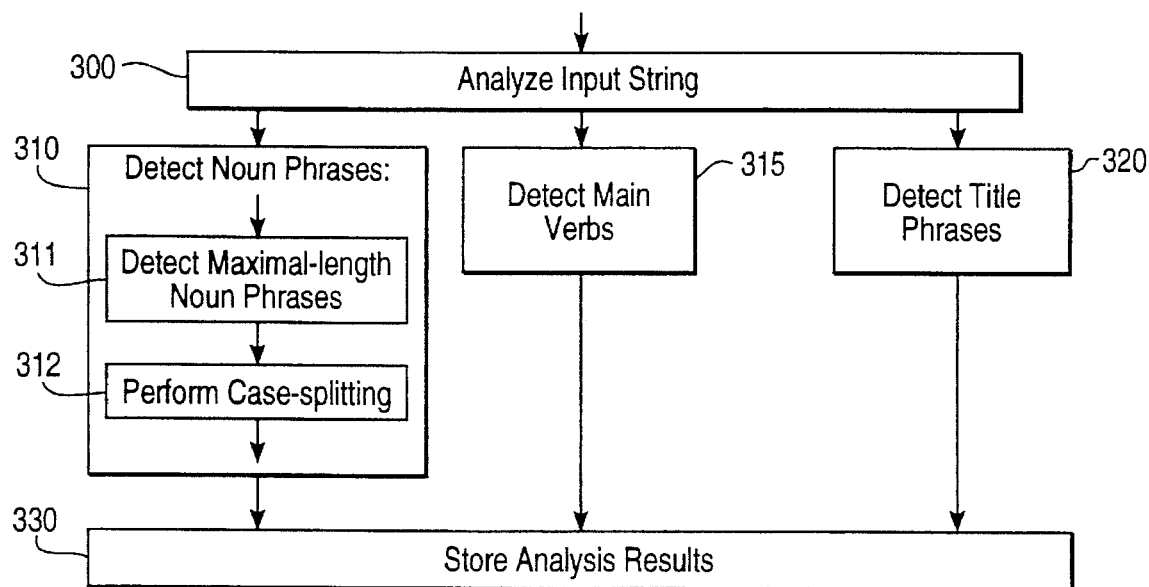
FIG. 3 flowcharts the component steps of question processing in one embodiment of the method.

FIG. 3 flowcharts the component steps of question processing in an embodiment of the method that uses shallow linguistic analysis. In step 300 the input string is analyzed to determine what part of speech each word of the string is. Each word of the string is tagged to indicate whether it is a noun, verb, adjective, etc. Tagging can be accomplished, for example, by a tagger that uses a hidden Markov model. The result produced by step 300 is a tagged input string.

After step 300 is complete, steps 310, 315, and 320 are performed either in series or, as illustrated in FIG. 3, in parallel. In step 310, which comprises component steps 311 and 312, the tagged input string is analyzed to detect noun phrases. In step 315 the tagged input string is further analyzed to detect main verbs. In step 320 the input string is analyzed to detect title phrases. Each of steps 310, 315, and 320 will now be further described.

In step 310 noun phrases are detected. A noun phrase is a word sequences that consists of a noun, its modifiers such as adjectives and other nouns, and possibly a definite or indefinite article. Step 310 comprises steps 311 and 312. In step 311 the tagged input string is analyzed to detect the maximal-length simple noun phrases that it contains. This can be done, for example, using a finite state machine (FSM) noun phrase recognizer. See J. E. Hopcroft and J. D. Ullman, Introduction to *Automata Theory, Languages, and Computation* (Addison-Wesley, 1979). In step 312 case-splitting is performed wherein maximal length noun phrases detected in step 311 can be split into short noun phrases according to initial word capitalization. In particular, a sequence of words within a noun phrase that is itself a noun phrase and whose words all have their first letters capitalized is split from other words in the noun phrase. For example, if in step 311 the noun phrase "New York City borough" is detected, then in step 312 it can be split as New York City ¦ borough because the initial letters of the words of "New York City" are capitalized while the initial letter of "borough" is not. Once this split is determined, for purposes of further processing the noun phrase "New York City borough" is discarded and is replaced by the two shorter noun phrases "New York City" and "borough." As another example, if in step 311 the noun phrase "last Apache warrior chief" is detected, then in step 312 this phrase is split according to its initial capitalization as last ¦ Apache ¦ warrior chief and the noun phrases "Apache" and "warrior chief" are used in further processing while the original noun phrase "last Apache warrior chief" is discarded. The adjective "last," which after the splitting is no longer part of a noun phrase, is likewise discarded.

In step 315 main verbs are detected. Main verbs are any words that are tagged in step 300 as verbs and that are not auxiliary verbs. Typically there is one main verb in the input string, but there can also be none, or two or more.

In step 320 title phrases are found in the input string. Title phrases are word sequences that represent titles of books, motion pictures, or other works. They can in some cases include or even be the same as noun phrases detected in step 310. In other cases they can include verbs or other parts of speech that are not noun phrase components. Title phrases can be recognized, for example, according to typographical indications such as being enclosed in quotation marks or typeset in italics. Thus the following input string fragments would be recognized as title phrases:

"Gone With the Wind"

*Gone With the Wind*

Typically the input string contains zero or one title phrases, but it is also possible for it to contain two or more.

In step 330 the results of steps 310, 315, and 320 are stored. The stored results represent the completed analysis of the input string. The results can be stored, for example, in a list of 3-tuples, one 3-tuple for each noun phrase, main verb, and title phrase detected during steps 310, 315, and 320. Each 3-tuple is an ordered list of the form (i, phrase-type, text), where i is a unique index number associated with the phrase, such as its position (first, second, third . . . ) in the list; phrase-type indicates the type of phrase (noun phrase, main verb, or title phrase); and text is a string that contains the text of the phrase itself. Thus for example if the noun phrases "Abraham Lincoln" and "theater," the main verb "shoot," and the title phrase "Reconsidering the Civil War" are detected in the input string, the list of results, expressed here in Lisp syntax, can be of the form ((1 'NP "Abraham Lincoln") (2 'NP "theater") (3 'V "shoot") (4 'TP "Reconsidering the Civil War"))

The list can be stored in the processor's memory. Alternatively or additionally it can be stored in a storage device coupled to the processor. It will be appreciated that although step 330 is illustrated in FIG. 3 as a step that is performed separately from and subsequently to steps 310, 315, and 320, in some embodiments an empty list is created as part of step 330 at the outset, prior to the execution of steps 310, 315, and 320, and thereafter is filled in incrementally during the processing of the steps 310, 315, and 320, so that upon completion of steps 310, 315, and 320, step 330 is effectively completed as well.

5. Preliminary Hypothesis Generation

Figure 4:
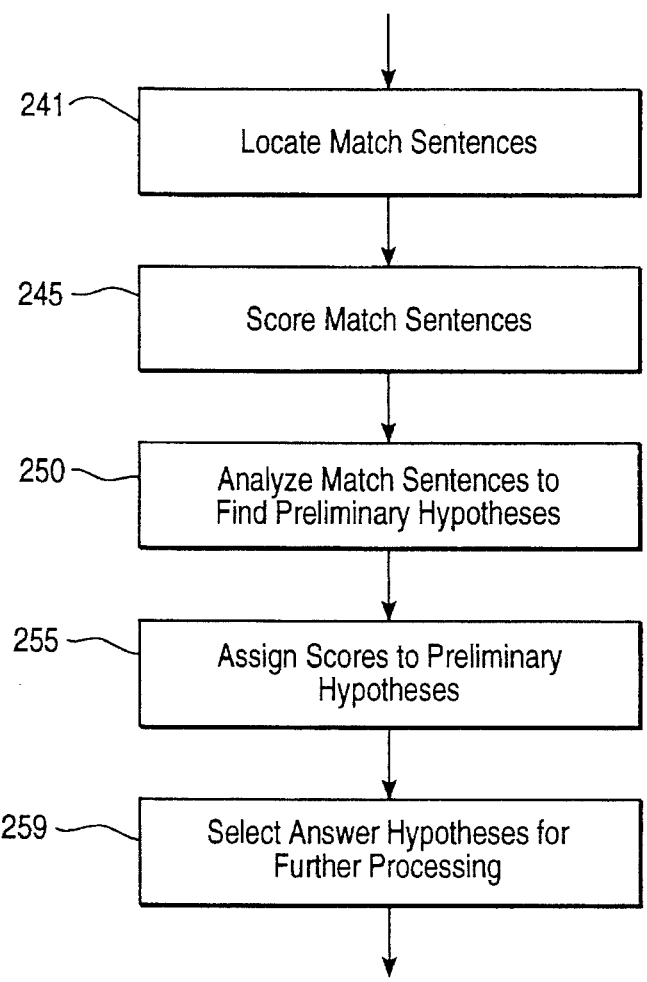
FIG. 4 flowcharts the component steps of preliminary hypothesis generation in one embodiment of the method.

This section examines step 240, preliminary hypothesis generation, in detail. FIG. 4 flowcharts the component steps of preliminary hypothesis generation in one embodiment of the method. In step 241 match sentences are located in the primary documents. Sentences are found in the primary documents that contain phrases from the input string or parts of such phrases. The sentences can be found by automatically constructing IR queries based on the phrases detected during question processing step 220 and executing these queries on the primary documents. (It is assumed that at least some of the primary documents match the queries.) Alternatively, if question processing is carried out ahead of time by a primary query construction process, match sentences can also be detected by the primary query construction process and made available to answer extraction subsystem as additional input in step 200.

In step 245 match sentences are heuristically scored. Match sentences having the highest scores are retained for further processing. The scores of the match sentences and their locations within their respective primary documents are recorded as well. The number of match sentences retained at this step is determined by a parameter set by default or in advance by the user.

The heuristic scoring of step 245 attempts to score each match sentence according to its degree of commonality with the input string. Points are awarded to each sentence based on criteria such as the number of phrases of the input string that the match sentence contains, the lengths of these phrases, and whether all or only some of the words of these phrases are found in the corresponding phrases of the match sentence. Other strategies can be used in other embodiments. For example, all sentences can be assigned the same score (e.g., 1) in some embodiments.

In step 250 the match sentences retained for further processing in step 245 are analyzed to detect phrases they contain. The match sentences are analyzed in substantially the same manner as the input string is analyzed in step 220 above. The detected phrases typically comprise noun phrases and can further comprise title phrases or other kinds of phrases. The phrases detected in the match sentences are called preliminary hypotheses.

Each preliminary hypothesis is associated with the document in which it was detected. For example, if the phrase "Robert Kennedy" is detected three times in document doc1 and twice in document doc2, then the answer extraction subsystem will develop two distinct preliminary hypotheses in step 250, which can be represented as:

("Robert Kennedy" doc1)
("Robert Kennedy" doc2)

In other embodiments, preliminary hypotheses that comprise the same phrase—that is, preliminary hypotheses that include the same exact sequences of words—can be distinguished based on subdivisions of documents, such as sections, paragraphs, or sentences. For example, in an embodiment where preliminary hypotheses that come from different paragraphs are considered to be distinct, then if in document doc1 "Robert Kennedy" appears twice in the first paragraph and once in the tenth paragraph, and in document doc2 "Robert Kennedy" appears once in the fourteenth paragraph, three preliminary hypotheses are generated, which can be represented as:

("Robert Kennedy" doc1 paragraph1)
("Robert Kennedy" doc1 paragraph10)
("Robert Kennedy" doc2 paragraph14)

In still other embodiments preliminary hypotheses can be treated as equivalent regardless of their textual source.

Each preliminary hypothesis is also associated with the particular match sentences that gave rise to it. If a hypothesis is a phrase of a match sentence it is associated with that match sentence. The association of hypotheses with match sentences implies a further association between hypotheses and the match sentence scores determined in step 245. Each preliminary hypothesis can be assigned a preliminary score based on the scores of the match sentences with which it is associated. The preliminary score can be, for example, the sum of the match sentence scores.

In step 255 the preliminary hypotheses developed in step 250 are heuristically scored and are ranked in order from highest score to lowest. The heuristic scoring of step 255 is based on the match sentence scores determined in step 245. In one embodiment the match sentence scores associated with each unique preliminary hypothesis-that is, each unique sequence of words that makes up one or more document-specific preliminary hypotheses-are summed to generate the score for step 255. For example, suppose that:

1) Document doc10 contains the phrase "Robert Kennedy" twice, in match sentences whose scores are 120 and 60 respectively.

2) Document doc30 contains the phrase "John Kennedy" four times, in match sentences whose scores are 10, 10, 40, and 50 respectively.

3) Document doc200 contains the phrase "Robert Kennedy" once, in a match sentence whose score is 50.

In this case, the scores assigned to the three preliminary hypotheses are as follows:

TABLE 1

Preliminary Scores Example

| Preliminary Hypothesis | | Score | |
| --- | --- | --- | --- |
| ("Robert Kennedy" | doc10) | 120+60+50 | = 230 |
| ("John Kennedy" | doc30) | 10+10+40+50 | = 110 |
| ("Robert Kennedy" | doc200) | 120+60+50 | = 230 |

In other words, the two preliminary hypotheses ("Robert Kennedy" doc10) and ("Robert Kennedy" doc200) receive identical scores based on the sum of the scores of all match sentences containing the unique phrase "Robert Kennedy" regardless of the textual source of such sentences. The preliminary hypothesis "John Kennedy" is treated likewise; however, since it appears only in sentences that received low match scores, it receives a lower overall score. It will be observed that in an embodiment in which all match sentences are assigned equal scores of 1 in step 245, the score assigned in step 255 is a simple frequency count. Thus in the example, the hypotheses ("Robert Kennedy" doc10) and ("Robert Kennedy doc200") receive scores of 3 and the hypothesis ("John Kennedy" doc30) receives a score of 4 in such an embodiment.

In step 259 the N highest-ranked preliminary hypotheses of the ranked list are selected for verification in step 260. N is a parameter determined, for example, by default or by the user in advance. For example, N can be set equal to a fixed, predetermined number, such as 30.

6. Hypothesis Verification

This section examines step 260, hypothesis verification, in detail. In one embodiment hypothesis verification comprises using lexicosyntactic analysis to verify linguistic relations for the selected hypotheses produced by step 240, and linking equivalent hypotheses to produce a set of linking information.

6.1 Lexico-Syntactic Analysis

Hypotheses are verified in step 260 through lexico-syntactic analysis. Lexico-syntactic analysis comprises analysis of linguistic relations implied by lexico-syntactic patterns in the input string, constructing or generating match templates based on these relations, instantiating the templates using particular hypotheses, and then attempting to match the instantiated templates, that is, to find primary or secondary documents that contain text in which a hypothesis occurs in the context of a template.

Lexico-syntactic analysis is illustrated by the following example. Suppose that the input string is the question, "Who succeeded Shastri as Indian prime minister?", and that there are numerous primary documents, most of which contain the term "prime minister." These documents concern various prime ministers throughout history and throughout the world, for example, Winston Churchill, Golda Meir, Brian Mulroney, etc. Included among the primary documents is an article that contains the sentence, "Indira Gandhi was prime minister . . ." Suppose further that also among the documents of the corpus, either among the primary documents or elsewhere, is an article that contains the sentence "Indira Gandhi succeeded Shastri . . ." but that does not refer to Indira Gandhi as "prime minister." The answer to the question can be constructed only by reference to both articles together.

In lexico-syntactic analysis for this example, the answer extraction subsystem constructs or generates one or more appropriate match templates based on word patterns in the input string. To do so it uses part-of-speech information about these words, such as that generated during question processing. In the question "Who succeeded Shastri . . . " the word "succeeded" is a verb. The answer extraction subsystem recognizes this and further recognizes that questions that begin with "who" often call for answers that are persons' names. Accordingly, the answer extraction subsystem constructs a template of the form "X succeeded Shastri" and tries to find a document containing a phrase that matches this template. Here, the template is matched by the phrase "Gandhi succeeded Shastri" in the article that contains the sentence "Indira Gandhi succeeded Shastri . . . " The answer extraction subsystem can also, for example, construct a template of the form "Shastri was succeeded by X," which would be matched by a document containing the phrase "Shastri was succeeded by Indira Gandhi . . . "

The use of the template technique gives the method of the present invention more robust performance that would be had if a simple co-occurrence approach were used for verification. In the example, the sentence "Indira Gandhi succeeded Shastri . . . " provides much stronger support for the answer hypothesis "Indira Gandhi" than the mere co-occurrence of the names "Shastri" and "Indira Gandhi" in a sentence or document. Furthermore, the template technique can be used in a domain-independent manner; that is, there is no need for humans to pre-analyze the primary documents or the text corpus. For example, in order to answer the question above the answer extraction subsystem does not need to refer to a table of prime ministers.

6.2 Component Steps of Hypothesis Verification

Figure 5:
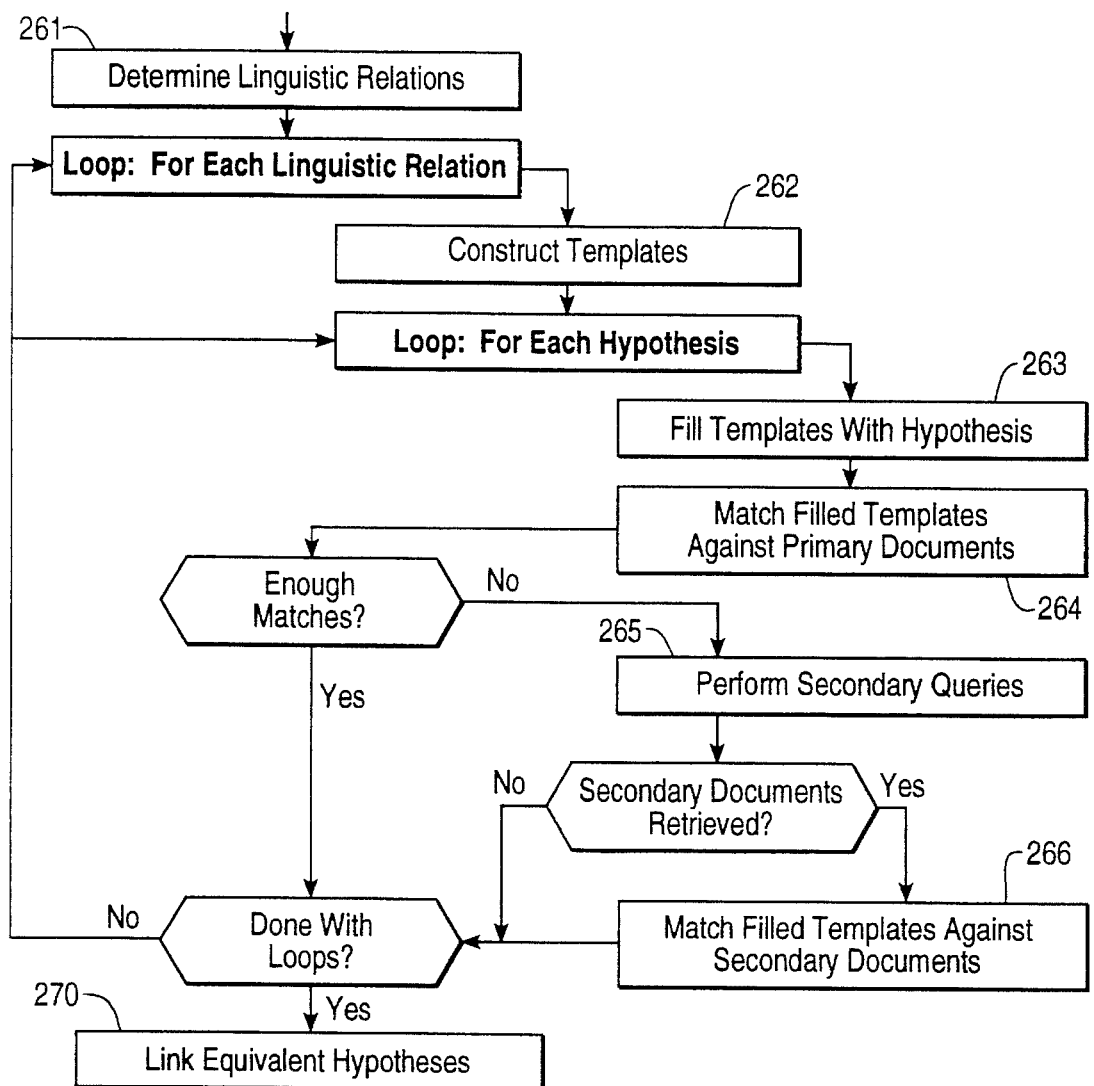
FIG. 5 flowcharts the steps of hypothesis verification in one embodiment of the method.

FIG. 5 flowcharts the component steps of hypothesis verification step 260 in one embodiment of the method. In step 261 linguistic relations to be verified are determined using lexico-syntactic analysis of the input string. A loop is executed for each such linguistic relation. In step 262 at least one template is constructed for the linguistic relation under consideration. At this point a loop is executed for each of the answer hypotheses. In step 263 templates are filled in using the hypothesis under consideration. In step 264 an attempt is made to verify the linguistic relation for the hypothesis under consideration by matching the filled-in templates in the primary documents. If sufficient matches are found, this attempt succeeds and processing continues with the next hypothesis. However, if no matches or only a few are found, the attempt fails and processing continues at step 265. In step 265 at least one secondary query is constructed and executed. If documents are retrieved by the IR subsystem in response to the secondary query or queries, then in step 266 an attempt is made to verify the linguistic relation for the hypothesis under consideration through template matching using the retrieved documents. After all linguistic relations and hypotheses have been processed, in step 270 equivalent hypotheses are optionally linked.

The procedure of step 260 can be expressed as pseudocode, for example as follows:

```
DETERMINE linguistic relations in the input string;
/* Outer loop over L linguistic relations LR_i in the input
string. */
FOR i = 1 to L
    {CONSTRUCT templates T_{i,j} based on LR_i;
/* Inner loops over M templates T_{i,j} and N hypo-
    theses H_k.
    The nesting order of these loops can be reversed,
    depending on the particular implementation. */
    FOR j = 1 to M
    FOR k = 1 to N
        {{FILL IN template T_{i,j} using hypothesis H_k;
        ATTEMPT TO VERIFY LR_i by seeking
            matches to the filled-in templates in the primary
            documents;
        IF (attempt does not succeed)
            {CONSTRUCT AND EXECUTE
            secondary queries;
            IF (secondary documents are retrieved
                from text corpus in response to
                secondary queries
                {ATTEMPT TO VERIFY LR_i by
                    seeking matches to the filled-in
                    templates in secondary documents
                }
            }
        }}
    }
LINK equivalent hypothesis H_k;
```

Each of the steps 261, 262, 263, 264, 265, 266, and 270 will now be more fully described.

6.3 Linguistic Relations

In step 261 the input string is analyzed to determine the linguistic relations that are to be verified in subsequent steps. The analysis is done by seeking certain lexico-syntactic patterns in the input string based on the analysis of the input string that was performed during question processing. The patterns are assumed to correspond to particular linguistic relations. For example, if the user's question begins, "Who was the Chief Justice who presided over . . . ", then the answer to the question can be in the form "The Chief Justice was . . . ". Thus the linguistic IS-A relation applies. A single lexico-syntactic pattern can imply multiple relations. In an embodiment of the invention in which the linguistic relations IS-A, list inclusion, apposition, and noun phrase inclusion are among the relations that can be verified, all these relations can be used to verify an answer hypothesis as an instance of a type phrase in the input string. A type phrase is a phrase in a question that indicates the nature of the appropriate answer to the question. In questions of the form, "What is X?", or, "Who is X?", the type phrase is X. To determine the type phrase for such a question, the answer extraction subsystem seeks one of the words "who" or "what," followed by the verb "to be," followed by a noun phrase. That noun phrase is taken to be the type phrase. Other lexico-syntactic patterns can also give rise to type phrases. For example, in the question, "What river does the Hoover Dam dam?" the type phrase is "river." The pattern here is the word "what" followed immediately by a noun phrase.

Some user questions have no type phrases associated with them. For example, the question, "Who won twenty Oscars?" has no type phrase associated with it. This is because the word "won" does not establish a type phrase relation. Also, even for questions having type phrases, it can be beneficial to seek additional kinds of relations. Some of the other relations that can be sought are transitive verb relations and identification as a proper names.

Lexico-syntactic patterns in the input string can be seen as clues used by the answer extraction subsystem to help it determine what kinds of answer hypotheses are likely to be the most appropriate responses to the input string. For example, if the input string is a question, the interrogative words and syntactic structure of the question provide clues about the kind of answer that is expected. A question that asks "Who . . . " or "Whose . . . " often calls for a person's name as an appropriate answer. A question that begins "What X . . . ", "Which X . . . ", "Who was the X . . . ", or "What is the X . . . ", where X is a type phrase, often calls for an answer that is an instance of X. A "Where . . . " question typically calls for a location or place name, and a "When . . . " question for a time or date. A "How many . . . " question calls for a number. Put another way, lexico-syntactic patterns inform the answer extraction subsystem about the kind of evidence that must be gathered in order to verify the hypotheses.

6.4 Templates

For each of the linguistic relations detected in step 261, step 262 is performed. In step 262 the answer extraction subsystem constructs or otherwise generates one or more templates for the linguistic relation under consideration. A template is a lexico-syntactic pattern, typically not one present in the input string, that when instantiated (filled in) can be searched for in the documents. When an instantiated template is matched by the text of a document, this is evidence that the linguistic relation is satisfied.

Templates are so called because they contain one or more placeholders that can be filled in with hypotheses. When a hypothesis appears with other words in a sentence or phrase of a document in such a way as to satisfy the lexico-syntactic pattern of a template, that hypothesis is assumed to relate to the other words according to the linguistic relation to which the template corresponds. In this case the template is said to be matched for the given hypothesis. Thus a linguistic relation can be verified by filling in the template with the hypothesis and matching the filled-in template to text in a document.

For a question that has a type phrase, the answer extraction subsystem generates templates that incorporate the head word of the type phrase. A head word is the most significant word of the type phrase. In English, the head word is generally the noun that appears rightmost in the type phrase. For example, in the type phrase, "Chief Justice," the head word is "Justice." Templates based on head words are constructed by substituting the head word from the type phrase and a placeholder for the hypothesis in a lexico-syntactic pattern corresponding to one of the linguistic relations IS-A, list inclusion, apposition, or noun phrase inclusion. For example, if the hypotheses about who might be the Chief Justice are "Oswald," "Warren," and "Kennedy," and the IS-A relation is being considered, then a template can be generated of the form "Justice was X." This template will match phrases such as, "Justice was Warren" or "Justice was Kennedy." If the list inclusion relation is considered, templates can be generated of the form "Justices X, Y, . . . " to match phrases such as "Chief Justices Warren, Burger, Rehnquist . . . ". If the apposition relation is considered, templates can be generated of the form "X, NP(Justice)" to match phrases such as "Earl Warren, Chief Justice . . . " Here, NP(Justice) means a noun phrase containing "Justice."

When a question has no type phrase associated with it, lexico-syntactic analysis is performed, although not of the type-phrase variety. For example, the template "X (won, wins) twenty Oscars" can be generated and matched for the input string "Who won twenty Oscars?" The linguistic relation is the transitive verb relation implied by the verb "win" and the direct object "twenty Oscars."

In step 263, which is executed for each hypothesis, the templates are filled in with the hypothesis under consideration. That is, the hypothesis under consideration is substituted for a placeholder or placeholders in the template.

6.5 Matching Templates Against Primary Documents

In step 264 an attempt is made to verify the linguistic relation under consideration for the hypothesis under consideration in the context of the primary documents. This is done by matching the filled-in templates generated in step 263 against the primary documents. In other words, sentences in which the hypothesis appears in the context of a template are sought in the primary documents. Any such sentences found are retained in association with the hypothesis as verification evidence for use in later processing steps.

For example, if the template is "NP(Justice) (is,was) X" and the hypothesis is "Earl Warren," the filled-in template is "NP(Justice) (is,was) Earl Warren," and documents containing sentences such as "At that time the Chief *Justice was Earl Warren* . . . " are potential matches. As another example, if the template is "X succeeded Shastri" and the hypothesis is "Indira Gandhi," the filled-in template is "Indira Gandhi succeeded Shastri." The answer extraction subsystem seeks one or more primary documents that contain sentences conforming to this filled-in template, for example, "*Indira Gandhi succeeded Shastri* . . . . "

The testing of step 264 is carried out using only the primary documents. If sufficient template matches are found among the primary documents, then the linguistic relation is considered verified. In this case it is unnecessary to run secondary queries and steps 265 and 266 are skipped for this linguistic relation and hypothesis.

6.6 Secondary Queries

If few or no template matches are found for in step 264, then in steps 265 and 266 an attempt is made to verify the linguistic relation under consideration for the hypothesis under consideration in the text corpus at large. In step 265 secondary queries are constructed and executed. Documents retrieved in response to secondary queries are called secondary documents. If secondary documents are successfully retrieved in step 265, then in step 266 the filled-in templates generated in step 263 are matched against the secondary documents in the same manner as they were matched against the primary documents in step 264.

Secondary queries are IR queries designed to find documents that potentially contain template matches—that is, documents in which the hypothesis under consideration appears in the context of the template, thus indicating that it satisfies the linguistic relation to which the template corresponds. Accordingly, a secondary query typically seeks the co-occurrence of an answer hypothesis and one or more phrases of the input string, such as the type phrase (if one is present), a main verb or verb phrase, or a title phrase. Portions of such phrases can be used as well, for example, the head word of the type phrase or the head word of the hypothesis. The documents retrieved in response to secondary queries contain sentences that include both the input string phrase or phrases and the hypothesis.

Secondary queries are formulated in a query language that expresses Boolean, proximity, and ordering or sequence relationships between search terms (individual words or other queries) in a form understandable by the IR subsystem. If a secondary query retrieves no documents or a number of documents below a predetermined threshold, it can be broadened and retried. Broadening can be accomplished, for example, by relaxing order or proximity constraints.

Secondary queries are performed in step 265 if in step 264 no template matches are found among the primary documents or only a few template matches are found. In the latter case, there is a possibility that the matches are false matches, so that additional supporting evidence is needed for the hypothesis under consideration. (It will be observed that secondary queries themselves can generate false matches.)

A single secondary query can sometimes serve to gather evidence for multiple relations. For example, a secondary query that seeks the co-occurrence of a hypothesis with the head noun of a type phrase can serve to retrieve documents from which any of the relations IS-A, apposition, list inclusion, or noun phrase inclusion can be satisfied. In some embodiments each secondary query is recorded after it is constructed or executed so that redundant secondary queries can be avoided.

If secondary documents are retrieved in response to the secondary queries in step 265, step 266 is performed. In step 266 the secondary documents retrieved in step 265 are analyzed to determine whether their match sentences do in fact satisfy the template. For example, if the template is of the form "X to be NP," where X is the hypothesis and NP is a noun phrase, then a secondary query that seeks the co-occurrence of the hypothesis and noun phrase can be performed in step 265. If this query is successful, then in step 266 it is determined whether the hypothesis and noun phrase are properly connected by the verb "to be" in one or more of the match sentences in which they appear. This is done by applying the template to the match sentences, that is, by seeking the filled-in template in the match sentences. Any match sentences determined in step 266 to satisfy the template are retained in association with the hypothesis as verification evidence for use in later processing steps.

Secondary queries can be of particular importance when the number of primary documents is limited. This can be the case, for example, in an embodiment in which primary documents are provided by a primary query construction subsystem that is designed to retain only a specified number of documents thought to be most relevant (e.g., the 15 top-ranked documents). In such an embodiment it is possible for a document that contains the answer to the user's question to be found by the primary query construction subsystem but then discarded because it is not considered sufficiently relevant. For example, suppose that in the example above concerning Indira Gandhi the document containing the sentence "Indira Gandhi succeeded Shastri . . ." was ranked by the primary query construction subsystem as being too insignificant to be retained. Therefore this document would not be supplied to the answer extraction subsystem as a primary document, and so in step 263 no primary documents would be found that contain matches to the template, "X succeeded Shastri." In other words, as of step 264, the only point in Mrs. Gandhi's favor would be the same as that for Mr. Churchill or Ms. Meir, namely, that all were "prime ministers." Accordingly, in step 265 secondary queries are generated for Churchill and Shastri, Gandhi and Shastri, etc. That is to say, the answer extraction subsystem looks specifically for the names of various prime ministers who are answer hypotheses in the same context as the name "Shastri." These secondary queries turn up the document that was previously discarded. In step 266 the answer extraction subsystem determines that this document contains the match sentence "Indira Gandhi succeeded Shastri . . . ," which supports Mrs. Gandhi as the best answer hypothesis.

6.7 Linking Equivalent Hypotheses

Once template matching is complete for all relations and hypotheses, different hypotheses that are likely to refer to the same answer can be linked in step 270. Hypotheses that differ from one another in wording or that come from different textual sources (in this embodiment, from different documents) but that probably refer to the same thing are caused to be treated as equivalents—in other words, they are linked together. Step 270 is optional and is omitted in some embodiments.

As an example, consider the hypotheses

| | |
|---|---|
| ("Robert Kennedy" | doc1) |
| ("Kennedy" | doc1) |
| ("Robert F. Kennedy" | doc2) |
| ("Robert Kennedy" | doc20) |
| ("Robert M. Kennedy" | doc37) |

The problem of linking is to determine whether these hypotheses refer to the same person, for example, the Robert F. Kennedy who was at one time attorney general of the United States under President John F. Kennedy. If document doc1 primarily concerns John F. Kennedy, it is not immediately apparent whether the "Kennedy" in doc1 refers to John or Robert. Similarly, it is not immediately apparent whether the "Robert Kennedy" in doc1 is the same as that in doc20, or whether either of these refers to the "Robert F. Kennedy" of doc2 or the "Robert M. Kennedy" of doc37.

Linking can be accomplished using a wide variety of heuristics and approaches. Some examples illustrate. One heuristic is to treat as equivalent hypotheses that are different forms of the same proper name if these hypotheses occur close to one another in a single document. For example, "Kennedy" is likely to refer to the same person as "Robert Kennedy" if both appear in the same paragraph or document, especially if "Robert Kennedy" appears first in the text and "Kennedy" appears thereafter. Another heuristic is to treat as equivalent all instances of a proper noun in all documents when the proper noun is a single word that is never modified by other words, for example, "Pythagoras" or "Stonehenge."

Linking strategies can be adapted to the text corpus used in a particular embodiment. For example, if the corpus comprises encyclopedia articles, a hypothesis that appears in an article title is likely to refer to the article's subject. In particular, an encyclopedia article that contains birth and death dates and numerous personal pronouns is likely to be a person's biography and to have as its title the person's name, and a hypothesis that is a form of the person's name is likely to refer to that person. For example, an encyclopedia article on John F. Kennedy is likely to be entitled "John F. Kennedy" and often to refer to its subject as "Kennedy."

The result of step 270 is a set of linking information for the hypotheses, or, viewed differently, a smaller set of hypotheses. The linking information tells which hypotheses are to be considered equivalent to which other hypotheses. For example, suppose once again that the unlinked hypotheses are

| | |
|---|---|
| ("Robert Kennedy" | doc1) |
| ("Kennedy" | doc1) |
| ("Robert F. Kennedy" | doc2) |
| ("Robert Kennedy" | doc20) |
| ("Robert M. Kennedy" | doc37) |

Suppose further that as a result of step 270 the first three of these hypotheses are linked to one another and the last two are linked to one another. Then the result of step 270 is linking information that can be expressed as

| | | |
|---|---|---|
| (link1 | ("Robert Kennedy" | doc1) |
| | ("Kennedy" | doc1) |
| | ("Robert F. Kennedy" | doc2)) |
| (link2 | ("Robert Kennedy" | doc20) |
| | ("Robert M. Kennedy" | doc37)) |

Alternatively it can be said that there are now two hypotheses, "Robert F. Kennedy" and "Robert M. Kennedy"

instead of the original five hypotheses listed above.

7. Hypothesis Ranking

This section describes step 280, hypothesis ranking, in detail. The goal of hypothesis ranking is to determine which answer hypotheses are most relevant or responsive to the input string. If the input string is a question, for example, the purpose of hypothesis ranking is to decide which hypothesis is likely to be the best answer to the question.

Hypothesis ranking can be done by assigning a score to each hypothesis and ordering the hypotheses according to the scores thus assigned. The highest-ranked hypotheses are considered the best answers. Any number of scoring methods can be used. Scoring can be based in whole or in part on the verification evidence collected in step 260.

Figure 6:
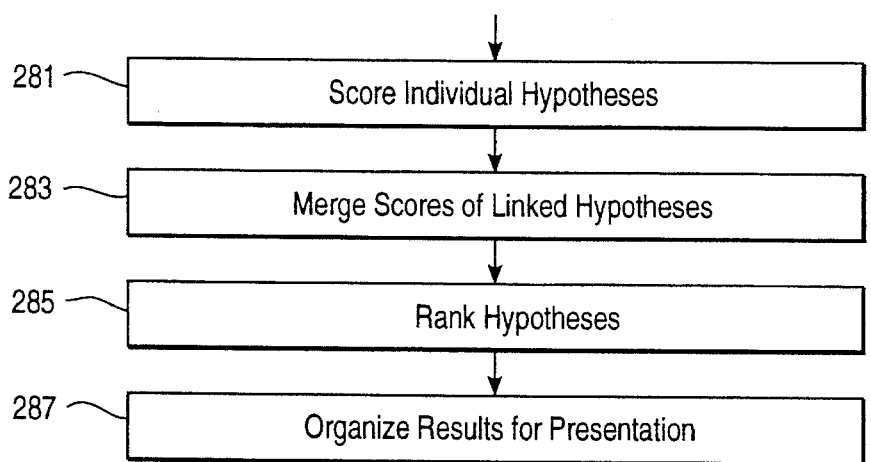
FIG. 6 flowcharts the component steps of hypothesis ranking in one embodiment of the method.

FIG. 6 illustrates the component steps of hypothesis ranking. In step 281 scores are computed for the hypotheses. In step 283 scores of linked hypotheses are merged. In step 285 the hypotheses are ranked based on their scores. In step 287 results are organized for presentation. Each of these steps will now be more fully described.

7.1 Scoring

In step 281 scores are assigned to the (unlinked) hypotheses. In one embodiment each hypothesis score is based on three criteria. The first criterion is verification evidence obtained through template matching in primary and secondary documents in step 260. The second criterion is co-occurrence of the hypothesis with phrases of the input string in primary and secondary documents, regardless of whether templates were matched. The third criterion is the preliminary hypothesis score developed in step 240, which is based on the scores of the primary document match sentences from which the hypothesis derives.

In one specific embodiment the scoring of an answer hypothesis can be performed as follows: The first criterion—that is, scoring based on verification evidence—is applied when the input string is a question having a type phrase. For each answer hypothesis, all sentences in primary or secondary documents in which a template based on the type phrase was matched for the hypothesis are taken into account, and the maximum number of type phrase words matched in any such sentence is determined. This number becomes the basis for scoring according to the first criterion. For instance, if the type phrase is "big blue truck," and one hypothesis is "truck" and another is "blue truck," then the latter hypothesis is to be preferred because it matches more type phrase words. Accordingly it is assigned a higher score.

Consider an example that will be called Example 2. Suppose that the input string is the question, "What Chief Justice led the commission that investigated the assassination of John F. Kennedy?" The type phrase here is "Chief Justice" and the head word is "Justice." Suppose further that there are four answer hypotheses, namely, "Oswald," "Earl Warren," "Kennedy," and "Warren Earl."

TABLE 2

| Scoring Measures for Example 2 | |
|---|---|
| Hypothesis | Type phrase words matches |
| Oswald | 0 |
| Earl Warren | 2 |
| Kennedy | 1 |
| Warren Earl | 2 |

Table 2 shows that the hypothesis "Oswald" (which turns out to refer to Lee Harvey Oswald) has no template matches associated with it. The hypothesis "Earl Warren" has associated with it sentences for which templates based on the type phrase were matched; the maximum number of type phrase words matched within any such sentence is 2. "Kennedy" appears in sentences for which a maximum of 1 word of the type phrase was matched. Finally, "Warren Earl" (which turns out to refer to Chief Justice Warren Earl Burger) gives rise to template matches in which the maximum number of words matched from the type phrase is 2.

The results in Table 2 can further be interpreted as follows: Although it is possible that sentences in the primary and secondary documents contain both of the words "Oswald" and "Justice" (that is, the hypothesis and the head word of the type phrase, respectively), none of these sentences satisfies a template for any of the desired linguistic relations (e.g., the template "X (is,was) NP(Justice)" for the IS-A relation). There are sentences that contain both "Earl Warren" and "Justice" and that match templates for the IS-A, apposition, list inclusion, or noun phrase inclusion relations; the maximum number of words of the type phrase "Chief Justice" matched in any of these is 2. For "Kennedy," there are sentences that includes both the word "Kennedy" and the word "Justice." Of these sentences, at least one gives rise to a template match, which in this example turns out to be a false match: The template "Kennedy (is,was) NP(Justice)" matches a sentence that contains the word sequence "A high priority for *Kennedy was* racial *justice*." Since the phrase "racial justice" shares only one word with the type phrase "Chief Justice," the maximum number of matching words for is 1 for this hypothesis. Finally, "Warren Earl" (Burger), who was Chief Justice after Earl Warren, appears in some sentences that match templates. The maximum number of words matched in any of these sentences is 2 (the two words "Chief Justice").

Thus in this example, the first scoring criterion leads to a tie. "Earl Warren" and "Warren Earl" tie for highest score with 2 type phrase words matched apiece. "Kennedy" is next with 1 type phrase word matched, and "Oswald" scores the lowest with 0 words matched.

Next, the second scoring criterion—that is, co-occurrence of the hypothesis with phrases of the input string—is applied to break the tie among hypotheses. (It can also be applied if there is no type phrase in the question.) The second criterion is an empirical one that is designed to increase the scores of hypotheses appearing in documents that are on the topic of the user's original question. The score for this criterion is based on the maximum number of noun phrases of the user's question that appear in any of the primary documents that contain the hypothesis. In Example 2, the hypotheses "Earl Warren" and "Warren Earl" can be distinguished based on the second criterion, because only the name "Earl Warren" appears frequently in conjunction with the other phrases of the question such as "John F. Kennedy," "commission," and "assassination." This is because Earl Warren figures prominently in the history of the investigation of the Kennedy assassination. The hypothesis "Warren Earl" scores lower, because the documents in which Chief Justice Warren Earl Burger's name appears are for the most part not related to the Kennedy assassination.

In this specific embodiment, information from multiple documents is pieced together at the time the second criterion is applied. An instance of this is seen in Example 1 above ("What Pulitzer Prize-winning novelist ran for mayor of New York City?"). In Example 1, not all the information needed to determine the best answer hypothesis appears in any one document. Information from two documents must be integrated. In particular, the information that "Norman Mailer" is a "novelist," which appears in a secondary document, must be integrated with the information that "Norman Mailer" was a mayoral candidate, which appears in a primary document.

The noun phrases of the original question of Example 1 are "Pulitzer Prize," " winning novelist," "mayor," and "New York City." The type phrase is "winning novelist" and its head noun is "novelist." The answer hypotheses are "Edith Wharton," "William Faulkner," and "Norman Mailer." Suppose that each of the hypotheses matches the type phrase "winning novelist" with a maximum of one word, "novelist," so that the first criterion does not distinguish among the hypotheses. Suppose further that the hypotheses co-occur with the noun phrases of the question as follows in the primary documents (X indicates a co-occurrence):

TABLE 3

Input phrase co-occurences for Example 1

| Hypothesis | "Pulitzer Prize" | "winning novelist" | "mayor" | "New York City" |
|---|---|---|---|---|
| Edith Wharton | X | X | | X |
| William Faulkner | X | X | | X |
| Norman Mailer | X | | X | X |

The hypothesis "Edith Wharton" appears in at least one primary document that also includes the phrases "Pulitzer Prize," "novelist," and "New York City." In other words, the maximum number of phrases from the question that appear in any one primary document along with the hypothesis "Edith Wharton" is three. Similarly, the hypothesis "William Faulkner" appears in at least one primary document with "Pulitzer Prize," "novelist," and "New York City." Again the maximum number of input string phrases that appear in conjunction with "William Faulkner" is three. "Norman Mailer," who according to the primary documents was a "writer" but not a "novelist," appears in at least one document that contains all three of the phrases "Pulitzer Prize," "mayor," and "New York City."

At this point information from secondary documents is integrated. In this embodiment, if a hypothesis is verified in a secondary document as being an instance of the type phrase, then the hypothesis is scored according to the second criterion as though the type phrase had appeared in a primary document that contains the hypothesis and a maximum number of input string phrases. Thus in Example 1, because the hypothesis "Norman Mailer" appears in a secondary document as an instance of the type phrase "novelist," the hypothesis "Norman Mailer" is scored according to the second criterion as though the type phrase "novelist" had appeared in one of the same primary documents that also contains "Norman Mailer," "Pulitzer Prize," "New York City," and "mayor." In other words, because the answer extraction subsystem knows from a secondary query phrase that "Norman Mailer" was indeed a "novelist," this information is read into Table 3, and the box that indicates a co-occurrence of "Norman Mailer" and "winning novelist" is filled in as in Table 4.

TABLE 4

Expanded input phrase co-occurences for Example 1

| Hypothesis | "Pulitzer Prize" | "winning novelist" | "mayor" | "New York City" |
|---|---|---|---|---|
| Edith Wharton | X | X | | X |
| William Faulkner | X | X | | X |

TABLE 4-continued

Expanded input phrase co-occurences for Example 1

| Hypothesis | "Pulitzer Prize" | "winning novelist" | "mayor" | "New York City" |
|---|---|---|---|---|
| Norman Mailer | X | X | X | X |

Then this augmented version of the table is used to apply the second scoring criterion. The hypothesis "Norman Mailer" is now treated as appearing in conjunction with four rather than three input string phrases, namely, "Pulitzer Prize," "winning novelist," "mayor," and "New York City." Accordingly this hypothesis scores higher on the second criterion than the other two hypotheses.

The third scoring criterion—the preliminary scores that were obtained during the step of generating hypotheses, that is, step 240—is applied in the specific embodiment as a tie-breaker if the first two criteria do not suffice to distinguish among the hypotheses. The hypothesis that was assigned the highest preliminary score is chosen over others that scored equally by the first two criteria.

The use of multiple criteria for the determination of the final score leads to more robust system performance than would be obtained with single criteria used in isolation. Through the use of multiple scoring criteria, the system can determine one or two best possible answer hypotheses in the context of articles that are most likely to be relevant.

7.2 Merging Scores

Step 283 is performed if linking was performed in step 270. In step 283 the linking information generated in step 270 is used to merge the scores of linked hypotheses. Each hypothesis in a set of linked hypotheses receives a merged score that is computed using the evidence gathered for all the hypotheses of the set. For example, the merged score can be based on the sum of the individual scores, or based on the number of unique templates (regardless of how instantiated) matched for the hypotheses of the set. More sophisticated schemes can be used.

As an example, suppose that there are six hypotheses and two links as follows:

```
(link1       ("Robert Kennedy" doc1)
             ("Kennedy" doc1)
             ("Robert F. Kennedy" doc2))
(link2       ("Robert Kennedy" doc20)
             ("Robert M. Kennedy" doc37))
("John Kennedy" doc30)
```

The first three hypotheses are linked together, and the fourth and fifth hypotheses are linked together. The last hypothesis, which is the phrase "John Kennedy" from document doc30, is not linked to any other hypothesis. Suppose further that the scores of the individual hypotheses are as follows:

| Hypothesis | Score |
|---|---|
| ("Robert Kennedy" doc1) | 50 |
| ("Kennedy" doc1) | 20 |
| ("Robert F. Kennedy" doc2) | 80 |
| ("Robert Kennedy" doc20) | 40 |
| ("Robert M. Kennedy" doc37) | 10 |
| ("John Kennedy" doc30) | 100 |

If the scores for linked hypotheses are merged through summation, the resulting scores are as follows:

| Hypothesis | Merged Score |
| --- | --- |
| ("Robert Kennedy" doc1) | 50 + 20 + 80 = 150 |
| ("Kennedy" doc1) | 50 + 20 + 80 = 150 |
| ("Robert F. Kennedy" doc2) | 50 + 20 + 80 = 150 |
| ("Robert Kennedy" doc20) | 40 + 10 = 50 |
| ("Robert M. Kennedy" doc37) | 40 +10 = 50 |
| ("John Kennedy" doc30) | 100 |

In this example each hypothesis receives a merged score based on its own individual score and the individual scores of all hypotheses to which it is linked. For instance, the first hypothesis, ("Robert Kennedy" doc1), receives a score that is the combined individual scores of the first three hypotheses. The last hypothesis, ("John Kennedy" doc30), is not linked to any other and so retains its previous score.

7.3 Ranking Hypotheses and Organizing Results

In step 285 the hypotheses are ranked according to their scores from highest to lowest. This step can be accomplished by a straightforward sorting procedure. If linking is performed in step 270 then equivalent linked hypotheses are eliminated prior to sorting. For each set of linked hypotheses, a representative member is selected, for example, the hypothesis containing the greatest number of words. Thus "Robert F. Kennedy" would be selected over "Robert Kennedy" or "Kennedy." The representative member is used in the ranking.

As an example, suppose once again that the linked hypotheses are

| (link1) | ("Robert Kennedy" doc1) |
| --- | --- |
| | ("Kennedy" doc1) |
| | ("Robert F. Kennedy" doc2)) |
| (link2) | ("Robert Kennedy" doc20) |
| | ("Robert M. Kennedy" doc37)) | and that the hypotheses

| ("Robert F. Kennedy" doc2) |
| --- |
| ("Robert M. Kennedy" doc20) | are selected to represent the hypotheses of link1 and link2 respectively. If the scores assigned to these hypotheses are, respectively, 150 and 50, and the score assigned to the unlinked hypothesis ("John Kennedy" doc30) is 100, then the ranked hypotheses produced by step 285 are

| 1. | ("Robert F. Kennedy" doc2) |
| --- | --- |
| 2. | ("John Kennedy" doc30) |
| 3. | ("Robert M. Kennedy" doc20) |

In step 287 the ranked hypotheses are organized into results suitable for output. In one embodiment in which results are to be presented to the user, the highest-ranked answer hypothesis is selected for presentation. This hypothesis is highlighted in the contexts in which it appears in primary and secondary documents, for example by displaying the document titles and the match sentences that confirm the linguistic relations implied by the user's question. The hypothesis can be emphasized through underlining or a distinctive font. Phrases of the input string that appear in context with the hypothesis can likewise be emphasized. Additionally, the answer extraction subsystem can provide further information about verification, linking, and scoring. In short, the answer extraction subsystem provides results that tell the user what the best answer hypothesis is, where it occurs in the documents, and why this answer was selected. The second and third-ranked hypotheses can be also presented, for example by themselves without the supporting information.

In some embodiments, step 287 incorporates selecting which documents to present from numerous documents containing the best answer hypothesis. For example, if many documents match the best answer hypothesis, the one or two documents having the shortest matching sentences containing the hypothesis can be selected for presentation.

8. Alternative Embodiments

The foregoing embodiment of the method is only one possible embodiment among many. Moreover, variations of the method fall within the scope of the invention. A few alternative embodiments will now be briefly described. Some of these involve alternative techniques for executing certain method steps. Others involve omitting certain method steps. Further alternatives will be apparent to those of skill in the art.

8.1 Alternative Techniques for Method Step

Alternative techniques can be used to carry out the input string analysis in question processing step 220. For example, a parser based on a context-free grammar can be used. Case-splitting of noun phrases need not be performed. Cues other than or in addition to text formatting can be used to detect title phrases. Most generally, any technique can be used that converts the natural language input string into phrases—that is, contiguous, relatively short sequences of words. The types of phrases detected need not be limited to noun phrases, title phrases, and verb phrases.

Step 240 can likewise be carried out using alternative techniques for analyzing match sentences. Also, different approaches to the scoring and ranking of preliminary hypotheses can be used. Sentences that appear nearby (e.g., adjacent to or in the same paragraph as) the match sentences in the primary documents can be analyzed in addition to the match sentences themselves in order to detect phrases to be used as preliminary hypotheses.

Step 260 can be carried out using alternative techniques for analyzing the input question, generating templates, analyzing match sentences, and generating secondary queries. Linguistic relations and corresponding lexico-syntactic patterns other than those described above can be used both to analyze the input string and to generate additional templates. For example, relative clauses such as "Who is the king who sat at the water's edge . . . ?" can be used to generate the templates "X is a king" and "X sat at the water's edge," which can each be used for hypothesis verification. Sentences nearby the match sentences can be used for verification, in addition to the match sentences themselves. Secondary queries can be used to generate additional hypotheses beyond those obtained from the primary documents. Secondary queries can be nested and run iteratively to generate still better answer hypotheses. Multiple nested secondary queries can be generated and executed to an arbitrary level of nesting. If a secondary query is generated to verify a linguistic relation and the secondary query itself leads to a new relation to be verified, a tertiary query can be run; if the tertiary query calls for additional verification, a fourth-level query can be run; and so forth. Techniques other than template matching can be used for detecting lexico-syntactic patterns; for example a rule set can be used. Sophisticated linking techniques, for example techniques involving heuristics and rule sets, can be used.

Also in step 260, non-lexico-syntactic approaches to hypothesis verification can be used in place of or in addition to lexico-syntactic hypothesis verification. Such approaches can include the construction and execution of secondary queries that are not based on templates. For example, if the input question calls for a person's name as an answer, and the text corpus comprises encyclopedia articles, the following is one possible non-lexico-syntactic technique to verify that a given hypothesis is in fact a person's name. A secondary query that comprises the hypothesis with no other search terms is constructed and executed. Among the retrieved secondary documents, the answer extraction seeks a document that has the hypothesis as its title. If such a document is found, its content is examined to see, for example, whether it mentions birth and death dates and whether it contains a large number of personal pronouns such as "he" or "she." If so, the document is most probably a biography of the person whose name is the document's title. Therefore the hypothesis is most probably a person's name.

Another example of a non-lexico-syntactic verification technique that can be used in step 260 involves queries that can be called secondary co-occurrence queries. Such queries are performed during verification to seek co-occurrences of an answer hypothesis with any input string phrases that do not appear in any recognized relations and are thus not incorporated into any templates. In the absence of template matches, the fact that the answer hypothesis co-occurs with an input string phrase provides at least weak evidence for the hypothesis.

More generally, instead of or in addition to lexico-syntactic pattern analysis, hypothesis verification in step 260 can incorporate more sophisticated or powerful linguistic analysis, such as can be provided by various natural language parsing techniques, including techniques that employ semantic information.

Steps 240 and 260 can incorporate the use of reference documents. For example, a thesaurus can be made available to the answer extraction subsystem, either as part of the subsystem itself or as an external resource connected to the subsystem by channels. The thesaurus can be used to generate synonyms and hyponyms (e.g., for type phrase word replacement) that can in turn be used for generating hypotheses, matching sentences during verification, or both. A table of given names and surnames can be used to help verify that hypotheses are persons' names. A gazetteer can be used to provide information about place names.

Step 280 can be performed using any number of different scoring techniques. For example, in embodiments where the three scoring criteria presented above (that is, verification evidence obtained through template matching, co-occurrence of the hypothesis with phrases of the input string regardless of whether templates were matched, and preliminary hypothesis score) are used, the first criterion can take into account matches of any kind of template used for verification, not just templates based on a type phrase. The fact that a particular template is matched against a document for a particular hypothesis is assigned importance and adds to the score of the hypothesis. The number of times that a template is matched for the hypothesis can contribute to the score, as can the number of times the hypothesis appears together with the head noun of the type phrases. Different templates can also be assigned different importances according to the linguistic relations to which they correspond. The second and third criteria can be folded in with the first criterion in a weighted sum, rather than being used only to break ties as in the specific embodiment above. For the second criterion, other sources of information can be used in lieu of or in addition to type phrase matching information when creating an augmented table such as Table 4. Still more sophisticated strategies, including strategies not limited to the three criteria described above, can be used. Such strategies can include the use of semantic information.

8.2 Omitting Certain Method Steps

The method of the present invention is a method for organizing information retrieval based on the content of a set of documents. The method generates answer hypotheses based on text found in the documents of the set. In some embodiments, such as those described up to this point, information retrieval is additionally based on an input string. If there is an input string, the answer hypotheses can include phrases or words not present in the input string. In some embodiments, such as those described up to this point, the answer hypotheses are verified and can be ranked based on their verification evidence. If verification is performed, a text corpus can be used to provide verification information not present in the set of documents. The documents can be present in the text corpus, but need not be.

In the alternative embodiments that will now be described, certain steps described for the embodiments described up to this point are omitted. In one such alternative embodiment the step of hypothesis verification is skipped entirely. The input, question processing, and preliminary hypothesis generation, and output steps are performed. The hypothesis ranking step collapses into the steps of ranking and selecting of preliminary hypotheses, and the hypotheses' preliminary scores become their final scores. Presented with an input string and a set of documents, this embodiment uses text of the documents to develop a set of hypotheses relevant to or responsive to the input string.

In another such alternative embodiment, no input string is supplied and the steps of question processing and hypothesis verification both are skipped. Presented with a set of documents, this embodiment attempts to develop a hypothesis about what the documents have in common. It can, for example, search for all the noun phrases in all the documents of the set and determine which noun phrase occurs most often.

In still other such alternative embodiments the step of hypothesis verification can be included but without secondary queries, or without linking of equivalent hypotheses.

PART III. MURAX

1. Organization of Part III

Part III of the description focuses on MURAX, a system that embodies the method of the present invention in the context of a larger two-phase method for answering a natural-language question. MURAX provides a robust linguistic approach for answering natural-language questions about specific facts. It derives its answers to questions from a database comprising an on-line encyclopedia. MURAX has been implemented and tested using a hardware configuration in which a Sun SparcStation workstation runs both the primary query construction and answer extraction subsystems, and the information retrieval subsystem and its associated corpus are located remotely from the Sun workstation and are accessed by the workstation via a network.

The rest of Part III is organized as follows: In Section 2 the motivation for MURAX's question-answering task is given, along with a description of the kind of questions that are its concern and their characteristics. Section 3 describes the system components. These include the encyclopedia and the IR system for accessing it. Shallow linguistic analysis is done using a part-of-speech tagger and finite-state recognizers for matching lexico-syntactic patterns.

Section 4 describes the analysis of a question by considering an example and illustrates the system output. Analysis proceeds in two phases. The first, primary query construction, finds articles that are relevant to the question. The second phase (called answer extraction) analyzes these articles to find noun phrases (called answer hypotheses) that are likely to be the answer.

Both phases require searching the encyclopedia. Queries made during the first phase are called primary queries, and only involve phrases from the question. The second phase creates secondary queries which MURAX generates to verify specific phrase relations. Secondary queries involve both answer hypotheses and phrases from the question.

Section 5 explains the primary query construction phase, which is carried out in MURAX according to the method of co-pending application entitled METHOD FOR COMPUTERIZED INFORMATION RETRIEVAL USING SHALLOW LINGUISTIC ANALYSIS as incorporated hereinabove by reference. Section 6 explains the answer extraction phase, which is carried out in MURAX according to the method of the present invention. Section 7 presents a performance evaluation of MURAX.

2. Task Selection

MURAX's task is to answer certain general-knowledge questions using a text corpus that comprises an encyclopedia. There are several reasons for choosing this task. Robust analysis is needed for the task because the encyclopedia is composed of a significant quantity of unrestricted text. General knowledge is a broad domain, which means that it is impractical to manually provide detailed lexical or semantic information for the words of the vocabulary (the encyclopedia contains over 100,000 word stems).

MURAX demonstrates that shallow syntactic analysis can be used to practical advantage in broad domains, where the types of relations and objects involved are not known in advance and may differ for each new question. Its analysis capitalizes on the information available in a question and profits from treating the encyclopedia as a lexical resource. MURAX also demonstrates that natural language analysis can add to the quality of the information retrieval process, providing text to the user that confirms phrase relations and not just word matches.

MURAX uses questions that have definite answers. This means that its performance can be evaluated in a straightforward way by using a set of questions and correct answers. Given a correct noun phrase answer, it is generally easy to judge whether a noun phrase hypothesized by the system is correct or not. Thus relevance judgements are simplified, and if one correct hypothesis is considered as good as any other, recall measurements are not required and performance can be considered simply as the percentage of correctly hypothesized answers.

2.1 Question Characteristics

MURAX operates on closed-class questions. A closed-class question is a direct question whose answer is assumed to lie in a set of objects and is expressible as a noun phrase. Put another way, a closed-class question is a question, stated in natural language, that assumes some definite answer typified by a noun phrase rather than by a procedural answer. Examples of closed-class questions are given below in Table 5.

TABLE 5

Example questions

1. What U.S. city is at the junction of the Allegheny and Monongahela rivers?
2. Who wrote "Across the River and into the Trees"?
3. Who married actress Nancy Davis?
4. What's the capital of the Netherlands?
5. Who was the last of the Apache warrior chiefs?
6. What chief justice headed the commission that declared: "Lee Harvey Oswald... acted alone."?
7. What famed falls are split in two by Goat Island?
8. What is November's birthstone
9. Who's won the most Oscars for costume design?
10. What is the state flower of Alaska?

(These Trivial Pursuit questions are Copyright Horn Abbott Ltd. Trivial Pursuit is a Registered Trademark of Horn Abbott Ltd.)

The questions in Table 5 appear in the general-knowledge "Trivial Pursuit" game and typify the form of question that is the concern of the MURAX task. These questions have the virtue of being created independently of the retrieval task (that is, they are unbiased) and have a consistent and simple stylized form. Yet they are flexible in their expressive power.

The interrogative words that introduce a question are an important source of information. They indicate particular expectations about the answer and some of these are illustrated below in Table 6.

TABLE 6

Question Words and Expectations

Who/Whose: Person
What/Which: Thing, Person, Location
Where: Location
When: Time
How Many: Number Notable omissions here are the words why and how. Questions that begin with "why" or "how" typically expect a procedural answer rather than a noun phrase answer (e.g., "How do you make a loaf of bread?").

The expectations established by the interrogative words can be used to filter various answer hypotheses. The answers to questions beginning with the word "who" are likely to be people's names. This fact can be used to advantage because various heuristics can be applied to verify whether a noun phrase is a person's name.

A question introduced by "what" may or may not refer to a person; however, other characteristics can be exploited. Consider the following sentence fragments, where NP symbolizes a noun phrase: "What is the NP..." and "What NP...". The noun phrase at the start of such questions is called the question's type phrase and it indicates what type of thing the answer is. The encyclopedia can be searched to try to find evidence that an answer hypothesis is an instance of the type phrase (details are presented in section 6.1.1 below). The verbs in a question are also a useful source of information as they express a relation that exists between the answer and other phrases in the question.

The answer hypotheses for "Where..." questions are likely to be locations, which often appear with locative prepositions or as arguments to verbs of motion. Questions of the form "When..." often expect answer hypotheses that are dates or times and the expectation of questions beginning "How many..." are numeric expressions.

3. Components

An on-line version of Grolier's Academic American Encyclopedia (*The Academic American Encyclopedias*, Danbury, Conn.: Grolier Electronic Publishing, 1990) serves as the text corpus for MURAX. The on-line encyclopedia contains approximately 27,000 articles, which are accessed via the Text Database (D. R. Cutting, J. Pedersen, and P.-K. Halvorsen, "An object-oriented architecture for text retrieval," in *Conference Proceedings of RIAO '91, Intelligent Text and Image Handling*, Barcelona, Spain, April 1991, pages 285–298), which is a flexible platform for the development of retrieval system prototypes and is structured so that additional functional components, e.g., search strategies and text taggers (see D. Cutting, J. Kupiec, J. Pedersen, and P. Sibun, "A practical part-of-speech tagger," in *Proceedings of the Third Conference on Applied Natural Language Processing*, Trento, Italy, April 1992, ACL) can be easily integrated.

The components responsible for linguistic analysis in MURAX are a part-of-speech tagger and a lexico-syntactic pattern matcher. The tagger is based on a hidden Markov model (HMM). HMM's are probabilistic and their parameters can be estimated by training on a sample of ordinary untagged text. Once trained, the Viterbi algorithm is used for tagging.

To assess performance, an HMM tagger (J. M. Kupiec, "Robust part-of-speech tagging using a hidden Markov model," *Computer Speech and Language*, 6:225–242, 1992) was trained on the untagged words of half of the Brown corpus (W. N. Francis and F. Kučera, *Frequency Analysis of English Usage*, Houghton Mifflin, 1982) and then tested against the manually assigned tags of the other half. This gave an overall error rate of 4% (corresponding to an error rate of 11.2% on words that can assume more than one part-of-speech category). The percentage of tagger errors that affect correct recognition of noun phrases is much lower than 4%. The tagger uses both suffix information and local context to predict the categories of words for which it has no lexicon entries.

The HMM used for tagging the encyclopedia text was also trained using the encyclopedia. A benefit of such training is that the tagger can adapt to certain characteristics of the domain. An observation in this regard was made with the word "I". The text of the encyclopedia is written in an impersonal style and the word is most often used in phrases like "King George I" and "World War I". The tagger trained on encyclopedia text assigned "I" appropriately (as a proper noun) whereas the tagger trained on the Brown corpus (a mixture of different kinds of text) assigned such instances as a pronoun.

Given a sentence of text, the tagger produces a sequence of pairs of words with associated part-of-speech categories. These enable phrase recognition to be done. Phrases are specified by regular expressions in the finite-state calculus (Hopcroft and Ullman, supra). Noun phrases are identified solely by part-of-speech categories, but more generally categories and words are used to define lexico-syntactic patterns against which text is matched.

Initially, only simple noun phrases are identified because they are recognized with the greatest reliability. Analysis involving prepositional phrases or other coordination is applied subsequently as part of more detailed matching procedures.

Word-initial capitalization turns out to be useful for splitting noun phrases appropriately. Thus "New York City borough" is split into "New York City" and "borough". Such case-splitting improves the efficiency of Boolean query construction, because queries based on case-split noun phrases tend to generate phrase matches directly. This reduces the need to drop several words successively from a noun phrase in order to produce a match.

3.1 Title Phrases

A title phrase is a multi-word phrase that is the title of a film, book, play, etc. It is usefully treated as a single unit in MURAX. A title phrase need not be a noun phrase. For example, the title "Play Misty for Me" contains the verb "play".

Title phrases are readily identified when marked typographically by enclosing quotes or italics. However, title phrases may be marked only by word-initial-capitalized letters. Furthermore, some title phrase words, such as short function words, need not be capitalized. Thus, the correct extent of the title phrase can be ambiguous and alternative possibilities must be accommodated. In MURAX the most likely alternative is chosen after phrase matching has been done and the alternatives compared, based on the matches and frequency of the alternative interpretations.

4. Operational Overview

This section presents an overview of the two-phase operation of the MURAX system, along with an example of the output of the system. The context is the example question presented Table 7 below.

TABLE 7

| Example Question and Component Noun Phrases |  |
|---|---|
| "Who was the Pulitzer Prize-<br>wining novelist that ran for<br>mayor of New York City?" | |
| Pulitzer Prize | winning novelist |
| mayor | New York City |

4.1 Primary Query Construction

In its first phase of processing MURAX embodies the method of co-pending application entitled METHOD FOR COMPUTERIZED INFORMATION RETRIEVAL USING SHALLOW LINGUISTIC ANALYSIS as incorporated hereinabove by reference. Simple noun phrases and main verbs are first extracted from the input question, as illustrated in Table 7. These phrases are used in a query construction/refinement procedure that forms Boolean queries with associated proximity and order constraints (section 5). The queries are used to search the encyclopedia to find a list of relevant articles. The relevant articles are heuristically scored according to the degree and number of matches with the phrases of the input question. Matching head words in a noun phrase receive double the score of other matching words in a phrase. Words with matching stems but incompatible part-of-speech categories are given minimal scores. After scoring, the relevant articles are ranked according to their scores. A subset of the ranked articles is made available for the second phrase of processing. MURAX assumes that these articles, which are called the primary documents, contain the answer to the user's question.

4.2 Answer Extraction

In its second phase of processing MURAX embodies the method of the present invention.

Answer extraction begins by finding all simple noun phrases contained in the match sentences of the primary documents, that is, in those sentences that caused or helped to cause the primary documents to be retrieved. The match sentences correspond to one or more phrases of the input question. Each noun phrase found becomes an answer hypothesis that is distinguished by its component words and the article and match sentence in which it occurs.

Answer hypotheses are scored on a per-article basis according to the sum of the scores of the articles in which they occur. The purpose of this is to minimize the probability of overlooking the correct answer hypothesis if a subsequent non-exhaustive search is performed using the hypotheses.

For each answer hypothesis the system tries to verify phrase relations implied by the question. For the question in Table 7, it will be observed that the answer is likely to be a person (indicated by "who"). The type phrase indicates that the answer is preferably a "Pulitzer Prize winning novelist", or at least a "novelist" as indicated by the head noun of the type phrase. The relative pronoun indicates that the answer also "ran for mayor of New York City". Phrase matching procedures (detailed in section 6) perform the verification using the answer hypotheses and the primary documents.

Verification is not limited to primary documents. It can happen that a pertinent phrase relation is not present in the primary documents although it can be confirmed elsewhere in the encyclopedia. This is because too few words are involved in the relation in comparison to other phrase matches, so the appropriate sentence does not rank high enough to be in the selected primary documents. It is also possible that appropriate verification information is not expressed in any primary document and depends only on the answer hypothesis. This is the case with one heuristic that MURAX uses to attempt to verify that a noun phrase represents a person's name. The heuristic involves looking for an article that has the noun phrase in its title; thus if the article does not share any phrases with the question, it would not be part of any primary document.

Secondary queries are used as an alternative means to confirm phrase relations. A secondary query may consist of solely an answer hypothesis (as for the heuristic just mentioned) or it may also include other phrases from the input question, such as the type phrase of the question. To find out whether an answer hypothesis is a "novelist", for example, a query comprising the answer hypothesis and the word "novelist" is constructed and executed to yield a list of relevant articles. Documents whose match sentences contain co-occurrences of an answer hypothesis and a question phrase are called secondary documents. MURAX analyzes secondary documents using lexico-syntactic patterns to see if answer hypotheses can be validated as instances of the type phrase.

4.3 System Output

For the question given in Table 7 MURAX produces the output shown in Table 8.

TABLE 8

The best matching phrase for this question is:
Mailer, Norman
The following documents were most relevant:
Document Title: Mailer, Norman
Relevant Text:
• "The Armies of the Night (1968), a personal narrative of the 1967 peace march on the Pentagon, won Mailer the Pulitzer Prize and the National Book Award."
• "In 1969 Mailer ran unsuccessfully as an independent candidate for mayor of New York City."
Document Title: novel
Relevant Text:
• "Among contemporary American novelists, Saul Bellow, John Dos Passos, John Hawkes, Joseph Heller, Norman Mailer, Bernard Malamud, Thomas Pynchon, and J. D. Salinger have reached wide audiences."
Next best: Edith Wharton, William Faulkner The presentation here is different from that of prior art IR systems. Answer hypotheses are shown to the user to focus his or her attention on likely answers and how they relate to other phrases in the question. The text presented is not necessarily from documents that have high similarity scores, but rather from documents that confirm phrase relations that lend evidence for an answer. This behavior is readily understood by users, even though they have not been involved in the tedious intermediate work done by the system.

In Table 8, the first two sentences are from primary documents. The last sentence confirming Norman Mailer as a novelist is a from a secondary document. The sentence was confirmed by a lexico-syntactic pattern which identifies the answer hypothesis as being in a list-inclusion relationship with the type phrase.

MURAX's approach contrasts with the alternative, prior art approach of vector-space search. Vector-space search using full-length documents is not as well suited as MURAX's approach to the task that MURAX performs. For the example question, a vector-space search was done using a typical similarity measure and the bag of content words of the question. The most relevant document (about Norman Mailer) was ranked 37th. Somewhat better results can be expected if sentence or paragraph level matching is done. However, the resulting text matches do not have the benefit of being correlated in terms of a particular answer, and they muddle information for different answer hypotheses.

5. Primary Query Construction

This section describes in further detail how MURAX performs primary query construction. In accordance with the method of the co-pending application entitled METHOD FOR COMPUTERIZED INFORMATION RETRIEVAL USING SHALLOW LINGUISTIC ANALYSIS as incorporated hereinabove by reference, MURAX translates phrases from a question into Boolean queries with proximity and order constraints. These queries are passed to an IR system which searches the encyclopedia and returns a list of matching documents (or hits). It is assumed that the IR system can process the following kinds of primitive queries, as well as compound queries constructed of these primitives:

1. The Boolean AND of terms, denoted here as:
   [$term_1$ $term_2$ . . . $term_n$]
2. Proximity of a strict sequence of terms, separated by up to p other terms denoted here as:
   <p $term_1$, $term_2$, . . . $term_n$>
3. Proximity of an unordered list of terms, separated by up to p other terms denoted here as:
   (p $term_1$, $term_2$, . . . $term_n$)

The overall process is illustrated with an example question, which will be called Example 3 below:

"Who shot President Lincoln?"

The question is first tagged and the noun phrases and main verbs are found. In Example 3 the only noun phrase is President Lincoln and the main verb is shot. Boolean terms are next constructed from the phrases. At the outset a strict ordering is imposed on the component words of phrases. For Example 3, the first query is:

<0 president lincoln>

The IR system receives this Boolean query and searches for documents that match. Depending on the number of hits, new Boolean queries may be generated with the purposes of:

1. Refining the ranking of the documents.
2. Reducing the number of hits (narrowing).
3. Increasing the number of hits (broadening).

5.1 Narrowing

Narrowing is performed to attempt to reduce the number of hits. It can also serve to refine the ranking of the documents. One way that MURAX accomplishes narrowing is by constructing and executing new queries that use title phrases rather than noun phrases or that include additional search terms such as main verbs. Including the main verb in the query for Example 3 gives:

[<0 president lincoln> shot]

Another way that MURAX achieves narrowing is by reducing the co-occurrence scope of terms in the query. This constrains phrases to be closer together, and thus indirectly increases the probability of the phrases' being in some syntactic relation with each other. A sequence of queries of increasingly narrow scope is made, the sequence being carried out until the number of hits falls below some predetermined threshold. A narrowed version of the main verb query for Example 3 is shown below:

(10 <0 president lincoln> shot)

5.2 Broadening

Broadening is performed to attempt to increase the number of hits. It is achieved in three ways in MURAX:

1. By increasing the co-occurrence scope of words within phrases, while at the same time dropping the requirement for strict ordering of the words. In Example 3, for instance, the broadened query (5 President Lincoln) would match the phrase "President Abraham Lincoln" whereas the first query <0 President Lincoln> would not. MURAX performs a sequence of queries of increasingly broad scope. The sequence continues until some threshold on either the proximity or the resulting number of hits is reached.

2. By dropping one or more whole phrases from the Boolean query. Query terms, each corresponding to a phrase, are dropped to get more hits. It is efficient to drop them in an order that corresponds to decreasing number of overall occurrences in the encyclopedia.

3. By dropping one or more words from within multiple-word phrases in a query to produce a query that is composed of sub-phrases of the original. To increase the number of hits in Example 3, president could be dropped, and so might Lincoln.

5.3 Control Strategy

An initial Boolean query that comprises all the noun phrases derived from the user's question is first constructed and executed. Broadening and narrowing are then performed. The following partial order can be used:

1. Co-occurrence scope is increased before terms are dropped.
2. Individual phrases are dropped from a query before two phrases are dropped.
3. Higher frequency phrases are dropped before lower frequency ones.
4. Title phrases are tried before any of their component noun phrases.
5. Complete phrases are used before their subphrases.

The iterative process of broadening and narrowing terminates when either a threshold on the number of hits has been reached, or no further useful queries can be made. Upon termination the hits are ranked. In practice it is not necessary to provide elaborate ranking criteria and documents are ranked simply by the number of terms they have in common with the user's question.

6. Answer Extraction

This section describes in further detail how MURAX performs answer extraction in accordance with the method of the present invention. MURAX finds the most likely answer hypotheses from the relevant sentences in the various hits found during the primary query construction phase. Phrase matching operations are conducted first, followed by a procedure for constructing secondary queries to get secondary documents. Generally, several hypotheses can represent the same answer, so they must be linked together and their various phrase matches combined. The hypotheses are then ranked in order of likelihood.

6.1 Phrase Matching

Phrase matching is done with lexico-syntactic patterns which are described using regular expressions. The expressions are translated into finite-state recognizers, which are determinized and minimized (Hopcroft and Ullman, supra) so that matching is done efficiently and without backtracking. Recognizers are applied to match sentences in primary and secondary documents, and the longest possible phrase match is recorded.

An example pattern and text match is shown in Table 9. For convenience, copies of expressions can be included by naming them in other expressions. In Table 9, the expression NP1 refers to a noun phrase whose pattern is defined elsewhere.

TABLE 9

Example Pattern and Text Match

Regular Expression Operators:

| | |
|---|---|
| + | One of more instances |
| ? | Zero or one instances |
| {...} | sequence of instances |
| (...) | inclusive-or of instances |

Lexico-Syntactic pattern:

| | |
|---|---|
| { | NP1 (are were include {such as}) |
| + | {NP2, } |
| ? | NP3 ? { and NP4}} |

Example match:

"Countries such as Egypt, Sudan, and Israel . . ."
   NP1        NP2    NP2        NP4

For robustness, MURAX layers phrase matching on top of co-occurrence matching. Accordingly, if the input is not a question (or is a question beginning with "how" or "why"), MURAX provides output that is typical of co-occurrence based search methods.

MURAX's large corpus mitigates some of the problems inherent in using simple language modelling. For example, in a document match, a relation may not be verified because such verification requires more sophisticated analysis than is feasible with a simple finite-state grammar. However, the relation may be expressed in several places in the encyclopedia and thus more simply in some places, which improves the chances that it can be verified. As another example, simple phrase matching can lead to spurious matches. Other things being equal, an answer hypothesis having more instances of a match is preferred. However, it is less likely that spurious matches for an answer hypothesis will occur for several different phrase relations that appear in different places in the encyclopedia. Thus the large corpus tends to prevent spurious-match errors from propagate far enough to cause an erroneous answer.

6.1.1 Verifying Type Phrases

The following relations are used by MURAX to try to verify answer hypotheses as instances of type phrases:

Apposition. This is exemplified by the match between the type phrase of the following question and the match sentence below it:

"Who was the last Anglo-Saxon king of England?"

1) "The last Anglo-Saxon king of England, Harold, b.c. 1022, was defeated and killed at . . . "

The IS-A Relation. This is demonstrated by the following match sentence:

2) "Saint Edward the Confessor, b. between 1002 and 1005, d. Jan. 5, 1066, was the next to last Anglo-Saxon king of England (1042–66)."

List Inclusion. Lists are often used to enumerate objects of the same type. Examples are seen in Tables 8 and 9.

Noun Phrase Inclusion. Type phrases are often related to answer hypotheses by being included in them. In the question and corresponding match sentence shown below, the type phrase river is in the same noun phrase as the answer hypothesis Colorado River:

"What river does the Hoover Dam dam?"

". . . the Hoover Dam, on the Colorado River. . . "

6.1.2 Predicate/Argument Match

This operation associates answer hypotheses and other noun phrases in a match sentence that satisfy a verb relation implied in a question. Verbs are simply assumed to be monotransitive and patterns accounting for active and passive alternation are applied. This is illustrated by the question and match sentence shown below:

"Who succeeded Shastri as prime minister?"

". . . Shastri was succeeded by Indira Gandhi as Indian prime minister . . . "

6.1.3 Minimum Mismatch

For reliable identification, simple noun phrases are extracted from match sentences of primary documents. For the question in Table 7, the phrase "mayor of New York City" is first considered as two simpler and independent noun phrases. Exact matching of the overall noun phrase is done after all match sentences are found.

When comparing type phrases with answer hypotheses, the minimum degree of mismatch is considered best. This is illustrated by considering the first question in section 6.1.1 above and the associated match sentences (1) and (2). Both answer hypotheses, "Harold" and "Saint Edward the Confessor," match equally well with the type phrase "last Anglo-Saxon king of England". However, "Harold" is (correctly) preferred because the match is exact, whereas a longer match is involved for "Saint Edward the Confessor" (namely, he was the "next to last Anglo-Saxon king of England").

6.1.4 Person Verification

Confirming an answer hypothesis as a person's name is important. In the encyclopedia, a reliable property of peoples' names is that they have word-initial capital letters. This simple consideration significantly reduces the number of answer hypotheses that require further consideration.

Many different multi-national names are present in the encyclopedia, and exhaustive manual enumeration is impractical. However, there are indirect clues that can be used to verify that an answer hypothesis is a name. Encyclopedia articles about a person generally have the person's name as the title and typically mention birth and/or death dates, which can easily be identified, at the beginning of the article. Usually in such articles there is also a higher percentage of words that are male or female pronouns than in other articles.

Accordingly, to try to confirm an answer hypothesis as a person's name, MURAX makes a secondary query to see if the answer hypothesis is present as an article title, and then decides whether the article is about a person. This heuristic is simple yet robust.

6.2 Secondary Queries

Match sentences in secondary documents are a supplementary means of confirming phrase relations. Secondary documents are found via secondary queries that are constructed by MURAX and passed to the IR system. Broadening is applied as necessary to secondary queries, but terms are never dropped because they are required in the resulting matches. For person verification, the secondary query contains only the answer hypothesis. However, verification of other relations requires other question phrases to be included in the secondary query, as will now be described more fully. In all these secondary queries, answer hypotheses are included verbatim.

6.2.1 Type Phrase Queries

When trying to verify a type phrase, MURAX includes only the head word of the type phrase in the secondary query. This provides the minimal necessary constraint on document matches. The detailed matching of all words in the type phrase is done by considering the degree of mismatch with the type phrase (as in section 6.1.3 above).

When the type phrase cannot be matched against an answer hypothesis using any lexico-syntactic pattern, the fact of their co-occurrence in a sentence is still recorded, as it may serve as a means of ranking alternative hypotheses in the absence of any better information (the relation can still be implied by the document match even if it cannot be inferred from the simple matching operations that MURAX uses for verification).

6.2.2 Co-Occurrence Queries

It is expedient to include other question phrases in secondary queries. As mentioned above in section 4.2, a relevant phrase match can be missed because the primary document in which it occurs has too low a score in comparison to other primary documents. Creating secondary queries with individual question phrases allows the relevant phrase match to be found by bringing documents excluded during primary query construction back into consideration.

Secondary queries are also used to find co-occurrences of answer hypotheses and question phrases that extend beyond the context of a single sentence. This can be useful for ranking alternative answer hypotheses in the absence of other differentiating phrase matches. It is illustrated in the following question and primary document match sentences:

"What film pits Humphrey Bogart against gangsters in the Florida Keys?"

". . . Bacall and Bogart became a famous romantic couple in films such as The Big Sleep (1946) and Key Large (1948)."

"Some of his most popular films were The Maltese Falcon (1941); Casablanca (1942), with Ingrid Bergman; The Big Sleep (1946) costarring his wife, Lauren Bacall; The Treasure of Sierra Madre (1948); . . . "

Secondary co-occurrence queries determine that the answer hypothesis Key Largo co-occurs with Florida Keys, but the other "film" hypotheses do not; thus in the absence of stronger evidence to the contrary, Key Largo receives a preference.

6.3 Equivalent Hypotheses

Answer hypotheses are identified by the article and match sentence in which they occur. Generally, the same answer is expressed by several hypotheses. This can happen, for example, when an answer hypothesis refers to a person, because often different word sequences are used to refer to the same person. For example, President Kennedy, John F. Kennedy, President John F. Kennedy all refer to the same person. In certain articles of the encyclopedia, so does Kennedy; the usage can be disambiguated in such articles by reference to the articles' titles. In the document titled Kennedy, John F., mention of Kennedy refers to the title, whereas other members of the family are named explicitly (e.g., Joseph P. Kennedy) so as not to confuse the reader.

After forming answer hypotheses, MURAX links together any equivalent answer hypotheses, and then rescores all hypotheses. The most general answer hypothesis in an equivalence class (usually the one that serves as a title) is assigned the cumulative score of all the members and used as the representative of the set. When a document title can be used as the representative, it usually provides the best description for the user. For example, for sentence (1) in section 6.1.1, "Harold" is a correct hypothesis, which is better represented by the more definitive title "Harold II."

Like surnames, the pronouns he and she often refer to the article's title (if the title is a person's name) or to an immediately preceding name. For the example output shown in Table 8, in the document displayed for Norman Mailer, the same answer hypothesis Mailer is used in both sentences; however, if he had been referred to instead as he, the result would be the same.

To verify whether an answer hypothesis refers to a person's name, MURAX first examines primary documents. If this attempt at verification fails, MURAX runs a secondary query. If a title in the resulting matches is equivalent to the hypothesis and the title can be verified as a person's name, then the hypothesis is linked to the title.

6.4 Combining Phrase Matches

MURAX uses the various phrase matching procedures in concert to provide a ranked list of answer hypotheses. It does this by providing several intermediate layers of scoring and preference criteria. A list of criteria for partially ordering hypotheses is given below, in order of precedence. Typically, not all of these criteria apply for a given question; however, the lowest level criterion (criterion 5) always applies, and usually several others do as well.

1. For an input question that includes a type phrase, the highest ranking answer hypotheses are those with minimum mismatch to the type phrase.
2. Answer hypotheses are ranked according to the number of question phrases with which they co-occur. This is qualified by the number of different articles needed to match the most question phrases.
3. Predicate/argument matches are used to produce preferences among different answer hypotheses.
4. For who questions, an answer hypothesis that is verified as a person takes precedence.
5. Answer hypotheses are ranked in terms of their co-occurrence with question phrases.

7. Performance Evaluation

This section presents an evaluation of MURAX's performance for questions beginning with "who" and "what" that have simple noun phrase answers. (Questions having conjoined noun phrases such as "Richard Nixon and Nikita Khrushchev" are not included.)

Seventy questions taken from the game "Trivial Pursuit," each of which was known to have a simple noun phrase answer, were used for the evaluation. Additionally, it was confirmed that the answers to these questions were present in the encyclopedia—that is, given a question and its answer, a person could find text in the encyclopedia from which the answer could be inferred using common sense.

The evaluation was based on an objective, system-dependent criterion: the rank of the correct answer hypothesis. The results are shown in Table 10 below.

TABLE 10

MURAX Evaluation Results

| Rank of Correct Hypothesis | Number of Questions |
|---|---|
| Top | 37 |
| Top 3 | 49 |
| Top 5 | 52 |
| Not in Top 5 | 18 |

Table 10 indicates that MURAX's best guess is the correct answer for 53 percent of the questions (37 out of 70) and that the correct answer lies in MURAX's top five guesses for 74 percent of the questions. Using a cutoff of five guesses, answers are thus considered to be found for 74 percent of the questions and the mean rank of the correct hypothesis is 1.44.

The examples given in Table 5 above are typical of the questions that were used for the evaluation. Correct answers were in the top five hypotheses for all these questions of except question 10. For question 10, the answer "forget-me-not" was not found because MURAX does not consider references involving impersonal pronouns. Such a reference is necessary to infer the answer from the sentence "It is the state flower of Alaska."

PART IV. CONCLUSION

The present invention provides a method for information retrieval based on the content of documents. In one embodiment of the invention, a natural-language input string and primary documents are accepted and analyzed by an answer extraction subsystem. Preliminary hypotheses are generated based on text contained in the primary documents. These hypotheses need not appear anywhere in the input string. Hypotheses are verified based on linguistic information from the input string, text from the primary documents, and text from secondary documents retrieved from a text corpus in response to secondary queries based on the hypotheses. Hypotheses are linked, scored, and ranked, and a best hypothesis is chosen. Scoring and ranking of hypotheses is based in part on verification evidence obtained for the hypotheses and can integrate information obtained from multiple documents. The method can be used either by itself or in the context of other, larger methods. In particular it can be used in conjunction with answer extraction in a two-phase IR method such as that embodied in MURAX.

Although the above is a complete description of certain embodiments and aspects of the invention, various alternatives, modifications, and equivalents can be used. For example, in the context of the MURAX system—which itself is but one of many possible embodiments of the method of the invention—enhancements can be made to improve performance within the scope of the present invention. One such addition is the incorporation of synonym and hyponym information. In particular the WordNet thesaurus (G. A. Miller, R. Beckwith, C. Fellbaum, D. Gross, and K.

Miller, "Five papers on WordNet," technical report, Princeton University Computer Science Laboratory, July 1990) appears well-suited to the MURAX task and could provide the system with useful synonym and hyponym information. For example, consider the question "What Pulitzer Prize-winning novelist ran for mayor of New York City?" WordNet indicates that novelist is a hyponym of writer, author and also person. This means that the answer to the question is likely to be a person's name even though the question starts with "what". Furthermore, any type phrase matches involving the words writer or author are also relevant.

Another contemplated addition to MURAX, again within the scope of the invention, involves using alternate grammar formalisms for linguistic analysis. The linguistic analysis in the version of MURAX described above is based on an underlying regular grammar formalism, both in the HMM tagger and the phrase recognizers. There can be benefits from the use of stochastic context-free grammars, which can also be trained from unlabelled text (see J. M. Kupiec, "Hidden Markov estimation for unrestricted stochastic context-free grammars," in *Proceeding of the 1992 International Conference on Acoustics, Speech and Signal Processing*, pages I-177–180, IEEE Signal Processing Society, IEEE, March 1992) and enable ambiguity to be quantified in probabilistic terms.

These additions to MURAX in no way exhaust the possibilities for extending MURAX within the scope of the present invention. For example, MURAX could be extended to include a comprehensive evaluation phase that takes account of not only the rank of correct hypotheses, but also the suitability of the match sentences that are presented to the user to verify phrase relations. Inasmuch as numerous extensions to MURAX are possible, and inasmuch as MURAX and its extensions represent only a small subset of the possible embodiments of the invention, the above description should not be taken as limiting the invention's scope. Rather, the scope of the invention is defined by the appended claims along with the full scope of equivalents to which such claims are entitled.

Attorney Docket No. 13188-65
Xerox Docket No. D93184

APPENDIX TO PATENT APPLICATION FOR:

METHOD FOR EXTRACTING FROM A TEXT CORPUS ANSWERS TO QUESTIONS STATED IN NATURAL LANGUAGE BY USING LINGUISTIC ANALYSIS AND HYPOTHESIS GENERATION

Inventor:  Julian Kupiec
          10079 Craft Drive
          Cupertino, California 95014
          British citizen Assignee: XEROX CORPORATION
          Xerox Square-020
          Rochester, New York 14644
          New York corporation TOWNSEND and TOWNSEND KHOURIE and CREW
Steuart Street Tower, 20th Floor
One Market Plaza
San Francisco, California  94105
(415) 326-24003

The source code files in this Appendix represent unpublished work. Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

The software runs in Franz Allegro Lisp version 4.0

The principal functionality of the system is provided by the enclosed LISP source code listings:

answer-extraction.LISP
basic-scoring.LISP
query-formulation.LISP
type-ranking.LISP
query-np-ranking.LISP
phrase-matching.LISP
root-hypos.LISP Required support files (listings included) are:
apply-fsm-to-array.lisp
concordance.lisp
load-qa.lisp
init-qa.lisp
tagger-support.LISP
text-tagger.LISP Other software support required (listings not included):
The Text Database, version 2.1
(Cutting and Pedersen, Xerox PARC)
Baum Welch Training Algorithm for HMM's
( HMM system version 2.58 Julian Kupiec, Xerox PARC)

Data Files (not included):
Grolier's on-line Electronic encyclopedia
Dictionary for the text tagger

Kupiec

Document name: {DSK}<project>markov>trivp>qtagger>franz4.1 patent–source>answer–extraction.LISP;1
Document date: Thu Jun 3 21:10:38 1993
Printing date/time: June 3, 1993 9:17:12 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
DSK\<project>markov>trivo>otagger>franz4.1>patent-source>answer-extraction.LISP:1   3-Jun-93 21:10
Page 1

;;;-*- Package: USER; Syntax: Common-Lisp; Base: 10 -*-
;;; File converted on 20-May-93 16:31:44 from source answer-extraction
;;;. Original source {dsk;<project>markov>trivo>otagger>franz4.1>answer-extraction.;65 created 12-May-
29:19
;;;. Copyright (c) 1989, 1990, 1991, 1992, 1993 by Xerox Corporation
(provide "ANSWER-EXTRACTION")
(in-package "USER")
;;; Shadow, Export, Require, Use-package, and Import forms should follow here
;;; File converted on 28-Nov-90 14:29:04 from source answer-extraction Original source
;;; {piglet/n}<piglet>speech>kupiec>hmm>tagger>release>v3>answer-extraction.;1 created 27-Nov-90
;;; 17:30:37 Copyright (c) 1989, 1990 by Xerox Corporation
(provide "ANSWER-EXTRACTION")
(in-package "USER")
;;; Shadow, Export, Require, Use-package, and Import forms should follow here
(defun vectorize-string (the-string)
    (let ((start 0)
          (non-space nil)
          (vec (make-array 0 :adjustable t :fill-pointer 0)))
;;; THIS IS A TEMPORARY HACK
        (dotimes (index (length the-string))
            (when (char/= #\Space (char the-string index))
                (when (null non-space)
                    (setq start index))
                (setq non-space t))
            (when (char= #\Space (char the-string index))
                (when non-space
                    (vector-push-extend (subseq the-string start index)
                                        vec)
                    (setq non-space nil))))
        (when non-space
            (vector-push-extend (subseq the-string start (length the-string))
                                vec))
        vec))
(defun add-final-hypo-score (the-hypo hypo-vector head-start end-of-head initial-score &key
                             (verbose nil))
    (let* ((hypo-wds (who-defn-hypo-name the-hypo))
           (nr-hypo-wds (length hypo-wds))
           (art-ref (who-defn-art-ref the-hypo))
           (title-str (article-defn-title (get-article art-ref)))
           (hypo-included-in-title nil)
           (score initial-score)
           best-q-np-score root-hypo current-score hypo-posn count delimited-ok match-pos)
        (when (hypo-phrase-not-in-question the-hypo head-start end-of-head)
            (when verbose (print-who-hypo-info the-hypo :show-rooted nil))
;;; Add the scaled Total Query NP score
            (setq best-q-np-score (find-best-query-np-score the-hypo :verbose verbose))
            (incf score best-q-np-score)
;;; Find the root hypo for this and add its root score NOTE THERE IS CURRENTLY  A BUG . Note there
;;; is find-root which
;;; For hypos related to a root, the root should have the highest scoring comination of query-np,
;;; type ranking etc., not just the individual best
            (setq root-hypo (or (get-root-hypo the-hypo :verbose verbose)
                                the-hypo))
            (incf score (max (who-defn-root-score root-hypo)
                             (who-defn-score root-hypo)))
            (when verbose
                (format t "BASE SCORE: ~a~%" (max (who-defn-root-score root-hypo)
                                                   (who-defn-score root-hypo))))
;;;
;;; If the words of thee answer are included in the title of the hypo's art ref, add 30 pts..
;;; (something just less than a word. This will tilt the ranking for otherwise equal Hypos.(eg.
;;; Topaz vs SILICATE MINERAL) . Don't use adjusted title, cos it's just for people hypos.
;;; 21 April string matching being done, so if I'm not careful a hypo wd may incorrectly match a
;;; substring of a word in the title. Add a little extra checking Prior space/first
;;; word/comma/hyphen
;;;
            (setq hypo-included-in-title t)
            (setq count 0)
            (setq delimited-ok nil)
            (dotimes (index nr-hypo-wds)
                (setq match-pos (search (aref hypo-wds index)
                                        title-str :test #'char-equal))
                (when match-pos
                    (setq delimited-ok (or (= 0 match-pos)
```

```
DSK:<project>markov>tmp>tagger>franz4.1>patent-source>answer-extraction.LISP:1   3-Jun-93 21:12
Page 2

(position (char title-str (1- match-pos))
;;; 11 May 93. Added partial title match -- For belladonna question, "belladonna plant" is in the
;;; top ranking hypos but is equal with others...Add a little for the partial title overlap...
                    (when (and match-pos delimited-ok)
                       (incf count))
                    (when (or (null match-pos)
                              (null delimited-ok))
                       (setq hypo-included-in-title nil)))
          (if hypo-included-in-title
              (progn (incf score 30)
                     (when verbose (format t "SCORE FOR HYPO IN TITLE: ~a~%" 30)))
              (when (> count 0)
                 (incf score (min 30 (* count 10)))
                 (when verbose
                    (format t "SCORE FOR PARTIAL HYPO IN TITLE: ~a~%"
                            (min 30 (* count 10))))))
;;; If the hypo has initial uppercase letter on first word, give it a little extra score (otherwise
;;; won't get "Lake Michigan" for "What lake is Sheboygan on?" (see notes 19 April 93) because there
;;; are a lot of equal lower case hypos...A score of 30 will just differentiate otherwise equally
;;; scored hypos. -- Not big enough to count as a word.
;;;
          (when (upper-case-p (char (aref hypo-wds 0)
                                    0))
             (incf score 30)
             (when verbose (format t "SCORE for word-initial upper case hypo: ~A~%" 30)))
          (when verbose (format t "~%"))
;;; Don't add this hypo if it is already present UNLESS IT HAS A BETTER SCORE 19 April 93. (for
;;; "geronimo" answer hypos)
          (setq hypo-posn (position root-hypo hypo-vector :key #'(lambda (x)
                                                                    (aref x 1))))
          (setq current-score 0)
          (when hypo-posn
             (setq current-score (aref (aref hypo-vector hypo-posn)
                                       0))
             (when (> score current-score)
                (setf (aref (aref hypo-vector hypo-posn)
                            0)
                      score)
                (setf (aref (aref hypo-vector hypo-posn)
                            1)
                      root-hypo)))
          (when (null hypo-posn)
             (vector-push-extend (vector score root-hypo)
                                 hypo-vector)))))
(defun add-root-to-match (match hypo)
    (let ((new nil))
       (matches (who-defn-root-template-matches hypo)))
;;;
;;; Add a template match to (who-defn-root-template-matches hypo), checking to see that a copy isn't
;;; already there. This often occurs e.g. for the same hypo name but in different art refs, thus
;;; different hypos...
       (when (null matches)
          (setf (who-defn-root-template-matches hypo)
                (make-array 0 :fill-pointer 0 :adjustable t)))
       (when (null (position match matches :test #'same-tp-defn))
          (setq new t)
          (vector-push-extend match (who-defn-root-template-matches hypo))
          new))
(defun add-to-match (match hypo)
    (let ((matches (who-defn-template-matches hypo)))
;;;
;;; Add a template match to (who-defn-template-matches hypo), checking to see that a copy isn't
;;; already there. This often occurs e.g. for the same hypo name but in different art refs, thus
;;; different hypos...
       (when (null matches)
          (setf (who-defn-template-matches hypo)
                (make-array 0 :fill-pointer 0 :adjustable t)))
       (when (null (position match matches :test #'same-tp-defn))
          (vector-push-extend match (who-defn-template-matches hypo)))))
(defun all-initial-caps (word-vec start end-inclusive)
    (let ((all-caps t))
       (do ((index start (1+ index)))
           ((> index end-inclusive))
```

```
[DSK\\<project>markov>trivia>qtagger>franz4.1>patent-source>answer-extraction.LISP:1    3-Jun-93 21:10
Page 3

(when (null (upper-case-p (char (aref word-vec index)
                                                        0)))
                          (setq all-caps nil)))
                    all-caps))
(defun any-word-initial-uppercase (word-vec)
    (let ((uppercase-found nil)
          word)
         (do ((index 0 (1+ index)))
             ((or uppercase-found (= index (length word-vec))))
             (setq word (aref word-vec index))
             (when (and (> (length word)
                           0)
                        (upper-case-p (aref word 0)))
                 (setq uppercase-found t)))
         uppercase-found))
(defun ask (str &key (analyze 6)
                     (norm nil)
                     (hmm-file nil)
                     (read-tokenizer nil)
                     (full-init (null *tagger-stable-p*))
                     (name *hmm-default-model-name*)
                     (remake-templates nil)
                     (test-min-matches 3)
                     (reset-tagged-arts t)
                     (terse t))
    (let (saved-articles saved-query-list primary-tokenizer secondary-tokenizer)
         (when reset-tagged-arts (setq *tagged-articles* nil))
         (setup-static-fsms **smvars* t)
         (when *gr-verbose* (format t "Entering template words into term hashtable:~%"))
         (dolist (template *templates*)
             (when *gr-verbose*
                  (format t "Template: ~a~%" (tp-defn-name template)))
;;; No stemming for template words
                (new-set-term-hashtable (tp-defn-fsm-matcher template)))
         (when *gr-verbose* (format t "Checking Template FSM's have been created...~%"))
         (setup-templates :make-and-dump remake-templates :verbose *gr-verbose*)
         (setq primary-tokenizer (read-tokenizer "query-tokenizer.rules" (null read-tokenizer)))
         (setq secondary-tokenizer (read-tokenizer "grolier-tokenizer.rules" (null read-tokenizer)
                                     ))
         (setq *article-tokenizer* secondary-tokenizer)
;;; 30 April 93 Tokenize question with appropriate rules...
         (setq *query-tokenizer* primary-tokenizer)
         (query str :norm norm :hmm-file hmm-file :read-tokenizer read-tokenizer :full-init
                full-init :name name :show-results (null terse))
;;; 30 April 93 All secondary queries come from grolier NP's...These may be things  like "1930s"
;;; which were getting split into "1930" and "s"
;;;
         (setq *query-tokenizer* secondary-tokenizer)
         (setq saved-articles (copy-seq *tagged-articles*))
         (setq saved-query-list (copy-seq *query-list*))
         (setq *original-query-words* *query-words*)
         (setq *original-query-np-starts* *query-np-starts*)
         (setq *original-query-np-ends* *query-np-ends*)
         (setq *original-query-tokens* *composed-query-tokens*)
         (setq *original-query-italic-phrases* (copy-seq *italic-phrases*))
         (setq *original-query-italic-refs* (copy-seq *italic-refs*))
         (setq *original-query-verbs* *query-verbs*)
         (route-question-type analyze :test-min-matches test-min-matches :terse terse)))
(defun debug-type (hypo-index)
    (let ((leftmost-start nil)
          (template-end nil)
          (head-start nil)
          (end-of-head nil)
          (rightmost-non-mixed-case-start nil)
          (hypo (aref *who-hypos* hypo-index))
          (invalid-pos-stems (map 'vector #'(lambda (x)
                                              (position x *ordered-state-list*))
                                  '(:prep :poss :det)))
          template-matches match type-head-np-template)
         (when (null (setq type-head-np-template (find "type-head-np" *templates* :key
                                                       #'tp-defn-name :test #'string=)))
             (error "Can't find template: ~A~%" "type-head-np"))
         (multiple-value-setq (leftmost-start template-end head-start end-of-head
                                rightmost-non-mixed-case-start)
```

```
DSK}<project>markov>trivo>tagger>franz4.1>patent-source>answer-extraction.LISP;1    1-Jun-93 21:10
Page 4

(find-wh-vb-type-np (if (position 'who' *original-query-words* :test
                                                    #'string-equal :end 1)
                                         "who"
                                         "what")
                                     'who-or-what-is-np'))
;;; Set the hash code for the type match in the np-pp-dummy-paren-1 fsmvar.
         (setup-type-head-template (get-stem (aref *original-query-words* end-of-head))
             type-head-np-template)
         (validate-who-type-np :n end-of-head :debug-index hypo-index)
         (format t "Type Match details:~%")
         (setq template-matches (who-defn-template-matches hypo))
         (dotimes (match-index (length template-matches))
             (setq match (aref template-matches match-index))
             (detailed-who-type-match match leftmost-start template-end end-of-head
                 invalid-pos-stems (tp-defn-fsm type-head-np-template)
                 :verbose t))
;;; Take this head word out of the hash table
         (reset-type-head-template (get-stem (aref *original-query-words* end-of-head))
             type-head-np-template)))
(defun debug-who-hypo-details (hypo-index)
    (let ((invalid-pos-stems (map 'vector #'(lambda (x)
                                                (position x *ordered-state-list*))
                                   '(:prep :poss :det)))
          (template-matches nil)
          type-head-np-template leftmost-start template-end head-start end-of-head
          rightmost-non-mixed-case-start hypo nr-unique-doc-sents nr-nil-matches match
          nr-stem-matches nr-exact-matches minimal-overlap)
        (multiple-value-setq (leftmost-start template-end head-start end-of-head
                                rightmost-non-mixed-case-start)
            (find-wh-vb-type-np "who" "who-or-what-is-np"))
        (when (null leftmost-start)
            (error "HYPO TYPE PHRASE NOT FOUND~%"))
        (setq hypo (aref *who-hypos* hypo-index))
        (setq template-matches (or (who-defn-root-template-matches hypo)
                                    (who-defn-template-matches hypo)))
        (if (who-defn-root-template-matches hypo)
            (format t "Root template matches:~%")
            (format t "Template matches:~%"))
        (print-who-hypo-info hypo)
        (setq nr-unique-doc-sents (length template-matches))
        (setq nr-nil-matches 0)
        (setq nr-exact-matches 0)
        (setq nr-stem-matches 0)
        (setq minimal-overlap nil)
        (when (null (setq type-head-np-template (find "type-head-np" *templates* :key
                                                       #'tp-defn-name :test #'string=)))
            (error "Can't find template: ~A~%" "type-head-np"))
;;; Set the hash code for the type match in the np-pp-dummy-paren-1 fsmvar.
         (setup-type-head-template (get-stem (aref *original-query-words* end-of-head))
             type-head-np-template)
         (dotimes (index (length template-matches))
             (setq match (aref template-matches index))
             (when (tp-match-defn-name match)
;;; Don't do detailed analysis when the template didn't match....
                 (multiple-value-setq (nr-exact-matches nr-stem-matches minimal-overlap)
                     (detailed-who-type-match match leftmost-start template-end end-of-head
                         invalid-pos-stems (tp-defn-fsm type-head-np-template)
                         :verbose t)))
             (when (and (< index (length template-matches))
                        (position match template-matches :start (1+ index)
                            :test
                            #'(lambda (y z)
                                (and (eql (tp-match-defn-doc-id y)
                                          (tp-match-defn-doc-id z))
                                     (eql (tp-match-defn-sent y)
                                          (tp-match-defn-sent z))))))
                 (decf nr-unique-doc-sents))
             (when (null (tp-match-defn-name match))
                 (incf nr-nil-matches)))
        (format t "~a Unique matches. ~a NIL matches~%" nr-unique-doc-sents nr-nil-matches)
;;; Take this head word out of the hash table
         (reset-type-head-template (get-stem (aref *original-query-words* end-of-head))
             type-head-np-template)))
(defun detailed-who-verb-match (&key hypo verb-index-in-question tp-match (verbose nil))
```

```
DSK)<project>markov>...>...>/otagger>/franz4.1>patent-source>answer-extraction.LISP:1    3-Jun-93 21:10
Page 5

(let* ((hypo-np-vec (tp-match-defn-hypo-np tp-match))
                (match-start (tp-match-defn-start tp-match))
                (match-end (tp-match-defn-end tp-match))
                (match-doc-id (tp-match-defn-doc-id tp-match))
                (match-sent (tp-match-defn-sent tp-match))
                (art (get-article match-doc-id))
                (sents (article-defn-words art))
                (sent (aref sents match-sent))
                verb-stem verb-after-hypo (hypo-np (who-defn-hypo-name hypo)))
    ;;;
    ;;; Find the details about a verb match for ranking purposes.
    ;;;
            (setq hypo-start (search hypo-np sent :test #'equalp))
            (setq verb-stem (get-stem (aref *original-query-verbs* verb-index-in-question)))
            (setq verb-after-hypo (position verb-stem sent :start (1+ hypo-start)
                                            :key
                                            #'get-stem))
            (setq hypo-after-verb (search hypo-np sent :test #'equalp)
                  :start2
                  (position verb-stem sent :key #'get-stem))
            (when verbose
              (format t "~%>> ")
              (print-tp-match tp-match))
    ;;;
    ;;; Next check to see if the inclusion is a minimum-mismatch. and get the number of words that
    ;;; mismatch.
    ;;;
            (when verbose)
            (values nr-exact-matches nr-stem-matches)))
    (defun do-adjusted-title (doc-id)
      (let ((adjusted-title-words nil)
            existing-doc-id who-np-hypo hypo-index term-id hypo-already-present (art (get-article
                                                                                     doc-id))
            (title-word-in-question nil))
    ;;; This would be better called "setup-title-hypo"
    ;;;
    ;;; If a document has a person's name as its title, then extract the possible NP's in the title that
    ;;; serve as an answer hypothesis
    ;;;
        (when (article-defn-person-name-p art)
          (setq doc-id (article-defn-article art))
          (setq adjusted-title-words (get-adjusted-title doc-id))
          (setf (article-defn-adjusted-who-title art)
                adjusted-title-words)
    ;;; If necessary, insert a hypo for this title. cos there may be pronomial refs in the scoring
    ;;; sentences. but the name may be missed out of them.. as in Von Sydow question
          (when *gr-verbose*
            (format t "~%a: ~a --Adjusted Title: ~a~%" doc-id (article-defn-title art)
                    adjusted-title-words))
    ;;; The hypo for an article about a person is assigned its doc-id.
          (setq who-np-hypo (make-who-defn :hypo-name adjusted-title-words :title-ref doc-id
                                           :score 0 :art-ref doc-id))
    ;;; To match an existing who-hypo this one must have the same title words and have the same art-ref
    ;;; (who-hypos are considered to be differentiated by the articles in which they appear)
          (setq hypo-index (is-hypo-present adjusted-title-words doc-id))
          (setq hypo-already-present hypo-index)
    ;;;
    ;;; If the exact same string Hypo is already present, It should have this title associated with it
    ;;; --- If not it means there were two articles about people with different titles -- print out a
    ;;; warning for now
    ;;;
          (when hypo-already-present
            (setq existing-doc-id (who-defn-title-ref (aref *who-hypos* hypo-index)))
            (when *gr-verbose*
              (format t "This hypo was already present: title-ref: ~a art-ref: ~a~%"
                      existing-doc-id (who-defn-art-ref (aref *who-hypos* hypo-index))))
            (when (null existing-doc-id)
              (format t "-----Title ref. being set to: ~a~%" doc-id)))
          (when existing-doc-id
            (when (/= existing-doc-id doc-id)
              (format t "WARNING: in do-adjusted-title~%")
              (format t "Who Hypo: ~a already allocated to doc id: ~a~%"
                      adjusted-title-words existing-doc-id)
              (format t "Re-allocating it to ~a~%" doc-id)))
```

```
/DSK/<project>markov>trivo>qtagger>franz4.1>patent-source>answer-extraction.LISP:1    2-Jun-93 21:10
Page 6

;;;
;;; If the hypo was setup previously, and corresponds (to within letter case differences only) to
;;; the title hypo for this article, assign this articles doc-id to it. Also assign the articles
;;; title string, so that case is reflected better.  E.g. a previous hypo for "John F. KENNEDY"
;;; matches a title for "John F. Kennedy", but we would prefer the case assignments for the title.
              (setf (who-defn-title-ref (aref *who-hypos* hypo-index))
                    doc-id)
              (setf (who-defn-hypo-name (aref *who-hypos* hypo-index))
                    adjusted-title-words))
;;;
;;; If any title word (A little Shaky....)  is included in the original question (by matching
;;; root form against *original-query-tokens* it is NOT CURRENTLY allowed to be an answer NP
;;;
              (dotimes (index (length adjusted-title-words))
;;; The words of the adjusted title don't correspond to the tokens any longer
                (setq term-id (gethash (get-stem (aref adjusted-title-words index))
                                       *term-hash-table*))
;;; 30 Oct. 92 inhibited discard..NOTE THE AND NIL
                (when (and nil (position term-id *original-query-tokens*))
                  (setq title-word-in-question (get-stem (aref adjusted-title-words index)))))
              (when (and title-word-in-question *gr-verbose*)
                (format t "Adjusted title word(s) overlaps question:(e.g. stem 'a)~%"
                        title-word-in-question)
                (format t "-------- Discarded as a Who Hypo~%"))
              (when (and (null title-word-in-question)
                         (null hypo-already-present))
                (vector-push-extend who-np-hypo *who-hypos*)
                (when *gr-verbose* (format t "This is a new Who Hypo for a TITLE~%"))))
          adjusted-title-words))
(defun do-what-question (nr-analyses &key (test-min-matches 1)
                                          (terse nil))
  (let ((leftmost-start nil)
        (template-end nil)
        (head-start nil)
        (end-of-head nil)
        (limit 30)
        (sorted-type-ranking nil)
        (rightmost-non-mixed-case-start nil))
    (multiple-value-setq (leftmost-start template-end head-start end-of-head
                                         rightmost-non-mixed-case-start)
                         (find-wh-vb-type-np "what" "who-or-what-is-np"))
    (when leftmost-start
      (when *gr-verbose* (format t "Question Type is: WHAT IS TYPE-NP~%"))
      (do-who-question nr-analyses end-of-head :what t :verbose (null terse))
      (validate-titles 50 :verbose (null terse))
      (assign-root-hypos :verbose (null terse))
      (make-who-root-scores)
      (when *gr-verbose*
        (format t "Cross-Referenced Who hypo Co-occurrence Scores...~%")
        (print-who-hypos :how-many 200))
      (when *gr-verbose*
        (format t "Validating ~A highest hypos for Type NP: ~A~%" limit
                (curr-word-str leftmost-start template-end *original-query-words*)))
;;; Take out TEST-MIN-MATCHES after testing has been done satisfactorily
      (validate-who-type-np :n end-of-head :test-min-matches test-min-matches :what t
                            :limit limit)
      (assign-root-tp-matches :verbose (null terse))
      (setq sorted-type-ranking (rank-hypos-by-type-match leftmost-start template-end
                                                          end-of-head :verbose (null terse)))
      (setq *sorted-type-ranking* sorted-type-ranking)
      (rank-hypos-by-query-np)
      (when *gr-verbose* (print-query-np-rank))
      (final-type-hypo-scoring sorted-type-ranking head-start end-of-head))))
(defun evaluate (&key (file "qa-4-4-93.txt"))
  (let ((file-ok (probe-file file))
        (saved-verbosity *gr-verbose*)
        (nr-questions 0)
        the-question)
    (if (null file-ok)
        (format t "Cannot find: ~A file" file)
        (with-open-file (stream file :direction :input :if-does-not-exist nil)
          (setq *gr-verbose* nil)
          (do ((the-line (read-line stream nil nil)
                         (read-line stream nil nil)))
```

```
DSK>>>project>markov>trm>o>qtagger>finzl4.l>catent-source>answer-extraction..LISP:1    1-Jun-93 21:10:
Page 7

(if (null the-line))
                       (when (eql 0 (search "N:" the-line :test #'char=))
                         (format t "Question nr: ~A~%" (subseq the-line 3)))
                       (when (eql 0 (search "Q:" the-line :test #'char=))
                         (setq the-question (subseq the-line 3))
                         (format t "Question: ~S~%" the-question)
                         (if (or (string-equal "what" (subseq the-question 0 4))
                                 (string-equal "who" (subseq the-question 0 3)))
                             (progn (ask the-question :terse t)
                                    (incf nr-questions))
                           (format t "-- Not a Who or What question...")))
                       (when (eql 0 (search "A:" the-line :test #'char=))
                         (format t "~%Correct Answer: ~A~%~%" (subseq the-line 3))))
                (setq *gr-verbose* saved-verbosity)
                (format t "Total questions attempted: ~A~%" nr-questions))))
(defun final-type-hypo-scoring (sorted-type-ranking head-start end-of-head &key (verbose nil))
        (let ((hypo-vector (make-array 0 :adjustable t :fill-pointer 0))
              the-hypo highest-nr-stems score element)
          (dotimes (index (length sorted-type-ranking))
            (setq score 0)
            (setq element (aref sorted-type-ranking index))
            (setq the-hypo (aref element 5))
;;; Minimum score for being in this verified category
            (when (hypo-phrase-not-in-question the-hypo head-start end-of-head)
;;; 10000 for verification of head type word
              (setq score 10000)
              (setq highest-nr-stems (aref element 2))
;;; If there is a longer match than 1 word. rank according to it...
              (when (> highest-nr-stems 0)
                (incf score (* 10000 (1- highest-nr-stems))))
              (when verbose
                (print-who-hypo-info the-hypo :show-rooted nil)
                (format t "TYPE SCORE: ~a~%" score))
              (add-final-hypo-score the-hypo hypo-vector head-start end-of-head score :verbose
                                    verbose)))
;;; Now do scoring for up to 40 who-hypos. If they were already included in the type ranking then
;;; they will be not be re-added
;;; Is a copy of the same code
          (do ((index 0 (1- index)))
              ((= index (min 40 (length *who-hypos*))))
            (add-final-hypo-score (aref *who-hypos* index)
                                  hypo-vector head-start end-of-head 0 :verbose verbose))
          (setq hypo-vector (stable-sort hypo-vector #'(lambda (x y)
                                                         (> (aref x 0)
                                                            (aref y 0)))))
          (print-answer-hypos hypo-vector)))
(defun find-best-query-np-score (the-hypo &key (verbose nil))
        (let ((nr-hypos (length *who-hypos*))
              score-vec hypo (best-q-np-score 0)
              (best-verified-type-score 0)
              other-score)
;;; 4 April, title ref hypos may not have an entry in *SORTED-Q-NP-SCORES*
          (setq score-vec (find the-hypo *sorted-q-np-scores* :key #'(lambda (x)
                                                                      (aref x 5))))
          (when score-vec
;;;
;;; The indirect type score not counted directly in BEST-Q-NP-SCORE is scaled by the same factor.
;;;
            (setq best-q-np-score (* 5 (aref score-vec 3)))
            (setq best-verified-type-score (* 5 (verify-extra-type-score score-vec :verbose
                                                                         verbose))))
          (dotimes (index nr-hypos)
            (setq hypo (aref *who-hypos* index))
            (when (and (null (eq hypo the-hypo))
                       (eq (get-root-hypo hypo)
                           the-hypo))
              (setq score-vec (find hypo *sorted-q-np-scores* :key
                                    #'(lambda (x)
                                        (aref x 5))))
              (when score-vec
                (setq other-score (* 5 (aref score-vec 3)))
                (when (> other-score best-q-np-score)
                  (setq best-q-np-score other-score))
                (setq other-score (verify-extra-type-score score-vec))
```

```
DSK)<project>markov>trivo>ataqqer>franz4.1>patent-source>answer-extraction.LISP.1    3-Jun-93 21:10
Page 4

(when () other-score best-verified-type-score)
                                  (setq best-verified-type-score other-score))))
                      (when verbose (format t "QUERY-NP SCORE: ~a~%" best-q-np-score))
                      (when verbose (format t "EXTRA TYPE VERIFICATION SCORE: ~a~%" best-verified-type-score))
                      (- best-q-np-score best-verified-type-score)))
(defun find-head-end (head-start template-end)
  (let ((end-index nil)
        (fsm (get-fsmvar "np-fsm-1")))
    ;;; Find the end of a simple NP starting at HEAD-START
    ;;; The np may start with an adverb e.g. "Who was west[adv] german chancellor", so cannot use simple
    ;;; np-grammar fsmvar. We should have already skipped over a leading determiner.. Note this will
    ;;; fail for things like "John the Baptist" or "Alfred the Great" --- as will many other routines
    (do ((index head-start (1- index)))
        ((> index template-end))
      ;;; np-match uses a non-inclusive end
      (when (np-match fsm head-start index *original-query-tokens*)
        (setq end-index index)))
    end-index))
(defun find-isa-type-extents (template-name template-start template-end)
  (let ((rightmost-non-mixed-case-start nil)
        (leftmost-start nil)
        (head-start nil)
        (leftmost-poss-position nil)
        (template-end-plus-one (1+ template-end))
        (end-of-head nil)
        (det-posn (position :det *ordered-state-list*))
        (fsm (get-fsmvar "np-np-1"))
        (is-a-det case-of-headword))
    (do ((index template-start (1+ index)))
        ((or leftmost-start (> index template-end)))
      ;;; Remember there may well be determiners included in these phrases
      (when (np-match fsm index template-end *original-query-tokens*)
        ;;; Don't start on a det
        (setq is-a-det (eql det-posn (aref *original-query-tokens* (- *composed-pos-offset*
                                                                       (*
                                                                        *nr-token-features*
                                                                        index)))))
        (when *debug* (format t "Matched np from: ~a to: ~a is-a-det: ~a~%" index
                              template-end is-a-det))
        (when (and (null is-a-det)
                   (null leftmost-start))
          (setq leftmost-start index)
          (setq leftmost-poss-position (position "'s" *original-query-words* :test
                                                 #'string-equal :start (1- index)
                                                 :end template-end-plus-one))
          ;;; If the form is X's Y then Y is the head (with probably no determiner starting Y), otherwise the
          ;;; start of the head NP is the start of the leftmost one. THIS IS ONLY THE CASE FOR wh-word =
          ;;; "who"
          ;;; 13 Jan 93 NO IT ISN'T. It is also true for what is X's Y. So add test for the who/what is-a
          ;;; template
          (setq head-start (if (and (string-equal template-name "who-or-what-is-np")
                                    leftmost-poss-position)
                               (1+ leftmost-poss-position)
                               index))
          (setq end-of-head (find-head-end head-start template-end))
          (when (null end-of-head)
            (error "End of head was null in FIND-ISA-TYPE-EXTENTS~%"))
          (setq case-of-headword (upper-case-p (char (aref *original-query-words*
                                                            end-of-head)
                                                      0)))
          (do ((index end-of-head (1- index)))
              ((or (< index head-start)
                   rightmost-non-mixed-case-start))
            (when (null (eq case-of-headword (upper-case-p (char (aref
                                                                   *original-query-words*
                                                                   index)
                                                                  0))))
              (setq rightmost-non-mixed-case-start (1- index)))))))
    (values leftmost-start head-start end-of-head rightmost-non-mixed-case-start)))
(defun find-question-type nil (let ((word (found 'verify))
                                    (nr-words (length *original-query-words*)))
                                (do ((index 0 (1+ index)))
                                    ((or found (= index nr-words)))
                                  (setq word (aref *original-query-words* index))
```

000012

```
:DSK:<project>markov>tr:vo>ctagger>franz4.1>patent-source>answer-extraction.LISP:1    1-Jun-93 21:10
Page 3

(when (or (string-equal word "which")
                                              (string-equal word "what"))
                                      (setq found 'what))
                                    (when (string-equal word "who")
                                      (setq found 'who))
                                    (when (string-equal word "when")
                                      (setq found 'when))
                                    (when (string-equal word "where")
                                      (setq found 'where))
                                    (when (and (string-equal word "how")
                                               (> nr-words (1+ index))
                                               (string-equal (aref *original-query-words*
                                                                   (1+ index))
                                                             "many"))
                                      (setq found 'how-many)))
                                  found))
(defun find-wh-vb-type-np (wh-word template-name)
   (let ((first-wh-index (position wh-word *original-query-words* :test #'string-equal :end 1))
         template
         (template-start nil)
         (template-end nil)
         leftmost-start head-start end-of-head rightmost-non-mixed-case-start)
     ;;; This can be called with wh-word = who or what, and with templates "who-or-what-is-np" or
     ;;; "who-vb-act-np" or 'who-vb-pass-np', to find overall np extent and head np extent and rightmost
     ;;; non-mixed case position.
     ;;; "who was the last Anglo Saxon King of England"
     ;;; "who succeeded Shastri as Indian Prime minister"
     (when (null :setq template (find template-name *templates* :key #'tp-defn-name :test
                                                                  #'string=)))
       (error "Cant find: ~a%" template-name))
     (when first-wh-index
       (multiple-value-setq (template-start template-end)
         (validate-template nil nil *original-query-words* *original-query-tokens*
                            (tp-defn-fsm template)
                            :start first-wh-index)))
     (when template-start
       (when *debug* (format t "TEMPLATE-START: ~a  TEMPLATE-END: ~a~%" template-start
                             template-end))
       (multiple-value-setq (leftmost-start head-start end-of-head
                                           rightmost-non-mixed-case-start)
         (find-isa-type-extents template-name template-start template-end))
       (when *gr-verbose* (format t
         "Overall/rightmost np indices: ~a/~a ~a/~a Rightmost-non-mixed-case index: ~a~%"
                                    leftmost-start template-end head-start end-of-head
                                    rightmost-non-mixed-case-start))
       (values leftmost-start template-end head-start end-of-head rightmost-non-mixed-case-start
               ))))
(defun find-what-nps (query-words composed-query-tokens)
   (let ((what-index (or (position "what" query-words :test #'string-equal)
                          (position "which" query-words :test #'string-equal)))
         query-np-fsm first-np-start (leftmost-np-start nil)
         (rightmost-np-start nil)
         (rightmost-np-end nil)
         start-index last-case found)
     (setq query-np-fsm (get-fsmvar 'np-grammar'))
     (when what-index
       (setq start-index (position (1+ what-index)
                                    *original-query-np-starts*))
       (when start-index
         (setq leftmost-np-start (aref *original-query-np-starts* start-index))
         (setq rightmost-np-start leftmost-np-start)
         (setq rightmost-np-end (aref *original-query-np-ends* start-index))
         (when (and (> (length *original-query-np-starts*)
                       (1+ start-index))
                    (= (1+ rightmost-np-end)
                       (aref *original-query-np-starts* (1+ start-index))))
           (setq rightmost-np-start (1- rightmost-np-end))
           (setq rightmost-np-end (aref *original-query-np-ends* (1+ start-index))))))
;;;
;;; To account for questions that start with an NP that has been split and missing a left hand side
;;; as a result:
;;; E.G. "What famed English site...." Case split causes only site to be registered. as the
;;; previous two words are adjectives. and thus not NPs in their own right.
;;;
```

```
DSK)<project>markov>tr-.d>tagger>franz4.1>patent-source>answer-extraction.LISP.1    3-Jun-93 21:10
Page 10

(when (and (null start-index)
                             (setq first-np-start (position (1- what-index)
                                                            *original-query-np-starts* :test #'<=))
                             (np-match query-np-fsm (1- what-index)
                                       aref *original-query-np-ends* first-np-start)
                                       composed-query-tokens))
                       (setq start-index first-np-start)
                       (setq leftmost-np-start (1- what-index))
                       (setq rightmost-np-start leftmost-np-start)
                       (setq rightmost-np-end (aref *original-query-np-ends* first-np-start))
    ;;; Assign the rightmost NP as the one after any case Capitalization
                       (setq last-case (upper-case-p (char (aref query-words rightmost-np-end)
                                                           0)))
                       (setq found nil)
                       (do ((index (1- rightmost-np-end)
                                   (1- index)))
                           ((or (< index 0)
                                found))
                         (when (null (eql last-case (upper-case-p (char (aref query-words index)
                                                                         0)))))
                            (setq found index)))
                       (when found
                           (setq rightmost-np-start (1- found))))
                  (when start-index
                       (when *gn-verbose* (format t "Overall/rightmost np indices: ~a/~a ~a/~a~%"
                                                   leftmost-np-start rightmost-np-end rightmost-np-start
                                                   rightmost-np-end))))
              (values leftmost-np-start rightmost-np-start rightmost-np-end)))
(defun get-adjusted-title (doc-id)
    (let* ((filtered-title-words (make-array 0 :adjustable t :fill-pointer 0))
           (adjusted-title-words (make-array 0 :adjustable t :fill-pointer 0))
           (index 0)
           (last-wd-was-of nil))
    ;;; Single Letter initials must NOT be included...JES 22nd Oct 92. If there are at least three
    ;;; words in the title. This means that 13500 Kennedy, John F. gets the title string John F.
    ;;; Kennedy, instead of John Kennedy preventing matches from his father Joseph P. Kennedy, due to
    ;;; the title being longer...is still somewhat cruddy.
    ;;;
        (valid-pos-list (mapcar #'(lambda (x)
                                    (position x *ordered-state-list*))
                                 '(:comma :n :npl :npr :adj :prespart :pastpart :abbrev :month)))
        (single-abbr-pos (position :single-abbr *ordered-state-list*))
        (art (get-article doc-id))
        (doc-title (article-defn-title art))
        (comma-pos word-vec composed-tokens)
        (tag-article nil :from-string doc-title)
        (setq word-vec (copy-seq *current-words*))
        (setq composed-tokens (copy-seq *composed-token-array*))
    ;;;
    ;;; Need to zap the France in Louis XVII, King of France.
    ;;; April June could be womens names
    ;;; allow matches against lowercase words in titles. E.g. brothers in the article about "The Bellamy
    ;;; brothers" is a valid match
    ;;; STILL TO DEAL WITH PARENS e.g. "Gall (Sioux Warrior)" don't allow Sioux or Warrior as a match.
    ;;;
        (do nil
            ((= index (length word-vec)))
          (when (and (null last-wd-was-of)
                     (or (position (aref composed-tokens (+ *composed-pos-offset*
                                                            (* *nr-token-features* index)))
                                   valid-pos-list)
                         (and (> (length word-vec)
                                 2)
                              (= single-abbr-pos (aref composed-tokens (+ *composed-pos-offset*
                                                                          (* *nr-token-features*
                                                                             index)))))))
                (vector-push-extend (aref word-vec index)
                                    filtered-title-words))
          (setq last-wd-was-of (string-equal "of" (aref word-vec index)))
          (incf index))
    ;;;
    ;;; SWITCH TITLE ELEMENTS. and get rid of commas. The rightmost Phrase goes to the left of the
    ;;; rebuilt one. Thus "Louis XVII, King of France" goes to "King Louis XVII"
    ;;;
```

```
DSK)<project>markov>trivo>dtagger>franz4.l>patent-source>answer-extraction.LISP:1    3-Jun-93 21:10
Page 11

;;; STUFF BEFORE FIRST COMMA TO AFTER IT Then get Mailer, Norman -- Norman Mailer more cleaner head
;;; matching...
;;;
                (setq comma-pos t)
                (do nil
                    ((null comma-pos))
                    (when (setq comma-pos (position "," filtered-title-words :test #'string-equal
                                                   :from-end t))
                      (do ((index2 (1+ comma-pos)
                                   (1- index2)))
                          ((= index2 (fill-pointer filtered-title-words)))
                        (vector-push-extend (aref filtered-title-words index2)
                                            adjusted-title-words))
                      (setf (fill-pointer filtered-title-words)
                            comma-pos)))
;;; What's left between the beginning of the string and the first comma, or end of it.
                (dotimes (index2 (fill-pointer filtered-title-words))
                  (vector-push-extend (aref filtered-title-words index2)
                                      adjusted-title-words))
                adjusted-title-words))
(defun get-article (doc-id &key (from-string nil)
                                (show nil)
                                (tagged t))
  (let (art)
    (setq art (find doc-id *tagged-articles* :key #'article-defn-article))
    (when (null art)
      (setq art (tag-article doc-id :from-string from-string :show show :tagged tagged)))
    (when (and tagged (= 0 (length (article-defn-composed-tokens art))))
;;; We want a tagged version of the document that was previously created without tags. So make them
      (setq art (tag-article doc-id :from-string from-string :show show :tagged tagged)))
    art))
(defun get-query-np-index (query-index)
  (let ((nr-nps (length *original-query-np-starts*))
        (np-index nil))
;;; Convert an index in the question to a query np index, or return nil if it isn't in one
    (do ((index 0 (1+ index)))
        ((or np-index (= index nr-nps)))
      (when (and (>= query-index (aref *original-query-np-starts* index))
                 (<= query-index (aref *original-query-np-ends* index)))
        (setq np-index index)))
    np-index))
(defun get-query-np-str (np-index)
  (let ((nr-nps (length *original-query-np-starts*))
        (str "")
        from to)
    (when (< np-index nr-nps)
      (setq from (aref *original-query-np-starts* np-index))
      (setq to (aref *original-query-np-ends* np-index))
      (setq str (curr-word-str from to *original-query-words*)))
    str))
(defun get-root-hypo (the-hypo &key (verbose nil))
  (let ((rooted-instances (who-defn-rooted-instances the-hypo))
        (first-root nil)
        subsuming-root)
;;;
;;; Check to see that root hypo instances of the-hypo all point to the same root, then return the
;;; root hypo. If they don't, I don't really know what to do!!!!!  (find-root uses a sentence index
;;; ...)
;;;
    (dotimes (index (length rooted-instances))
      (setq subsuming-root (root-defn-subsuming-root (aref rooted-instances index)))
      (when subsuming-root
        (if (null first-root)
            (setq first-root (list subsuming-root))
            (when (null (eq (car first-root)
                            subsuming-root))
              (when (null (position subsuming-root first-root))
                (when verbose
                  (when (= 1 (length first-root))
                    (format t "MULTIPLE ROOT for ~A Art Ref ~A~%" (
                                                                  who-defn-hypo-name
                                                                  the-hypo)
                            (who-defn-art-ref the-hypo)))
                  (print-who-hypo-info subsuming-root))
```

```
(DSK1<project>markov>t...vc>qtagger>franz4.1>patent-source>answer-extraction..LISP:1   3-Jun-93 21:10
Page 12

(setq first-root (pushnew subsuming-root first-root))))))
           (first first-root)))
(defun get-sing-and-plural (the-word)
       (let ((pos plural-list substart stem-list plural-form (word-len (length the-word))
                  (singular nil)
                  (plural nil)
                  (word (copy-seq the-word)))
             (setq pos (word-to-states word))
;;;
;;; Find the singular and plural forms of the word. If the word is not in the dictionary, just
;;; return it as the singular and construct the plural form from stupid rules.
;;; A word like "data" is both singular and plural. --lookdown will return nil for both
;;; alternatives..take account of this
             (when (position :n pos)
                 (setq singular word)
                 (setq plural-list (fsm::lookdown (concatenate 'string word "+{Npl}")))
                 (when plural-list
                     (setq plural (copy-seq (car plural-list)))))
             (when (position :npl pos)
                 (setq plural word)
;;; Singular may have already been assigned. e.g "cata" here we do not want "datum" when
;;; word-to-states assigns it as "data" (which is ok).
                 (when (null singular)
                     (setq stem-list (fsm::lookup word))
                     (setq plural-form (find "+{Npl}" stem-list :test #'search))
                     (when plural-form
                         (setq singular (subseq plural-form 0 (- (length plural-form)
                                                                  (length "+{Npl}")))))))
             (when (or (null singular)
                       (null plural))
;;; Not in dictionary, so apply simple rules: ies <> y : es <> e : other-s <> other
;;; Plural to singular
                 (if (and (> word-len 3)
                          (setq substart (search "ies" word :start2 (- word-len 3)
                                                              :end2 word-len)))
                     (progn (setq plural word)
                            (setq singular (concatenate 'string (subseq word 0 substart)
                                                                 "y")))
                   (if (and (> word-len 2)
                            (setq substart (search "es" word :start2 (- word-len 2)
                                                              :end2 word-len)))
                       (progn (setq plural word)
                              (setq singular (concatenate 'string (subseq word 0 substart)
                                                                   "e")))
                     (if (and (> word-len 1)
                              (setq substart (search "s" word :start2 (- word-len 1)
                                                              :end2 word-len)))
                         (progn (setq plural word)
                                (setq singular (subseq word 0 substart))))))
;;; Singular to plural
                 (if (and (> word-len 1)
                          (setq substart (search "y" word :start2 (- word-len 1)
                                                              :end2 word-len)))
                     (progn (setq singular word)
                            (setq plural (concatenate 'string (subseq word 0 substart)
                                                                "ies")))
                   (if (and (> word-len 1)
                            (setq substart (search "e" word :start2 (- word-len 1)
                                                              :end2 word-len)))
                       (progn (setq singular word)
                              (setq plural (concatenate 'string (subseq word 0 substart)
                                                                 "es")))
                     (progn
;;; otherwise just add s
                            (setq singular word)
                            (setq plural (concatenate 'string word "s")))))))
         (values singular plural)))
(defun head-in-nps (head-id composed-tokens np-ends)
    (let ((found nil)
          (nr-nps (length np-ends))
          np-head-term-id)
         (do ((np-index 0 (1+ np-index)))
             ((or found (= np-index nr-nps)))
           (setq np-head-term-id (aref composed-tokens (+ *composed-term-id-offset*
```

000016

```
DSK\<project>markov>tn-vo>dtagger>franz4.1>patent-source>answer-extraction.LISP.1    1-Jun-93 21:10
Page 13

(* *nr-token-features* (aref np-ends
                                                                                               np-index)))
                   ..
          (when (= head-id nc-head-term-id)
            (setq found t)
             (when (= -1 nc-head-term-id)
               (error "Shouldn't have -1 term id in HEAD-IN-NPS"%"))))
          found))
(defun hits-from-query-list (max-hits)
      (let ((hit-vec (make-array 0 :fill-pointer 0 :adjustable t))
            (hit-count 0)
            art-list)
           (do ((query-struc-tail *query-list* (cdr query-struc-tail)))
               ((or (null query-struc-tail)
                    (= hit-count max-hits)))
             (setq art-list (qr-defn-article-list (car query-struc-tail)))
             (dolist (doc-id art-list)
                (when (null (position doc-id hit-vec))
                    (vector-push-extend doc-id hit-vec)
                    (incf hit-count))))
           hit-vec))
(defun hypo-phrase-not-in-question (the-hypo head-start end-of-head)
      (let ((ok t)
            (nr-hypo-was-in-question 0)
            (nr-hypo-was-in-type-phrase 0)
            hypo-was nr-hypo-was posn)
;;;
;;; This function is hacky and filters out type verified hypos that have any word stem that is in
;;; a question phrase (stem is for - e.g. holiday/holidays).
;;;
;;; NOTE: Lower case hypos (except e.g. chocolate, rubber emerald?) are mostly not answers so these
;;; are zapped also. 19 April 93 Allowing them again. --see what the damage is...
;;;
;;; For "belladonna plant" we would like to allow plant, although it is in question -- hence the
;;; type head noun. --Hacky Should also allow possibility for Chief justice Earl Warren, where type
;;; phrase is longer.
;;; The uppercase is gonna cause the "belladonna plant" hypo to fail...also Colorado River will fail
;;; unless I exempt the type phrase..
          (setq hypo-was (who-defn-hypo-name the-hypo))
          (setq nr-hypo-was (length hypo-was))
;;;
;;; April 14, 93 Stem matching should be used here. (it is inflectional, so we are ok), the plural
;;; forms of wordss also aren t allowed..Thus, "birthstones" won't be a valid hypo when
;;; "birthstone" is used in the question
;;;
          (when ok
            (dotimes (index nr-hypo-was)
              (setq posn (position (aref hypo-was index)
                                    *original-query-words* :test #'stem-equal))
              (when posn (incf nr-hypo-was-in-question))
;;; If the word is contained in the head phrase of the type phrase, it may be ok. (See below) The
;;; type phrase may be nil.
              (when (and posn head-start end-of-head (or (< posn head-start)
                                                          (> posn end-of-head)))
                  (setq ok nil))
;;;
;;; HACK -- any lower case word that lies in the type phrase does not get zapped. Otherwise an hypo
;;; with a lowercase word fails..This is for the "belladonna plant" example
;;; 19 April 93 rescinded this....causing problems for "rubber" maybe "emerald" and in general is
;;; bad.. if it causes toom many false answers, put in some scoring hack.
              (when (and nil (lower-case-p (char (aref hypo-was index)
                                                  0)))
                (unless (and posn head-start end-of-head (>= posn head-start)
                                                           (<= posn end-of-head))
                  (setq ok nil)))
              (when (and posn head-start end-of-head (>= posn head-start)
                                                      (<= posn end-of-head))
                (incf nr-hypo-was-in-type-phrase)))
;;; Cannot be the type phrase just on its own e.g. river borough planet, chief justice
            (when (= nr-hypo-was nr-hypo-was-in-type-phrase)
              (setq ok nil))
;;; If all the words of the hypo were included in the question, then zap it anyway. e.g. for
;;; "November" and "Birthstone" in "What is November's birthstone?"
            (when (= nr-hypo-was nr-hypo-was-in-question)
```

```
[DSK]<project>markov>trivp>qtagger>franz4.1>patent-source>answer-extraction.LISP:1    3-Jun-93 21:10
Page 14

(setq ok nil))
;;; A Hack. For removing Richard E. Byrd, Admiral Richard Byrd, and Byrd, as answers to "What
;;; Antarctic base was established by Richard Byrd ?" -- If more than two nypo words are contained
;;; in the question (anywhere!) zap the hypo.
           (when () nr-hypo-was-in-question 1)
                 (setq ok nil))
            ok)))
(defun is-a-verb-template (index template-matches)
     (let ((match (aref template-matches index)))
         (position (tp-match-defn-name match)
                *verb-phrase-templates* :test #'string=)))
(defun is-nypo-present (np-wd-array doc-id)
     (let ((hypo-index nil)
           who-nypo)
;;; 3 Nov. 1992. A simple (setq hypo-index (position np-wd-array *who-nypos* :test #'equalp :key
;;; #'(lambda (x) (who-defn-nypo-name x)))) is not good enough here, because the hypo must also be
;;; matched against its art-ref. We might get a false string match for a string with different
;;; art-ref. This was happening when I stop discarding hypos that were included in the question
            (do ((index 0 (1+ index)))
                ((or hypo-index (= index (length *who-hypos*))))
                (setq who-nypo (aref *who-nypos* index))
;;; The #'string-equal  is so that Soyuz matches SOYUZ etc...
;;; 26 Oct 92 For a who-hypo to match, the doc-id in which it occurs must be the same too... Thus a
;;; "Gandhi" in the article: "Gandhi, Indira" would not match a "Gandhi" in the article "Gandhi,
;;; Mahatma".     ...LOOK OUT  cos although it permits more detailed analysis, this will cost a lot
;;; more computation...PUT BACK IN
                (when (and (equalp np-wd-array (who-defn-nypoo-name who-nypo))
                            (= doc-id (who-defn-art-ref who-nypo)))
                    (setq hypo-index index)))
            hypo-index))
(defun np-refers-to-title (start end word-vec adjusted-title-words)
     (let ((in-title t)
           (np-len (1+ (- end start)))
           (nr-common-words 0)
           (nr-common-words-in-order 0)
           (last-posn 0)
           posn word)
;;;
;;; Possible problem of string matching being done here vs word root matches
;;; Title words have not been inserted in term hashtable, so composed tokens is only good for pos
;;; assignments
;;;
          (when (null adjusted-title-words)
                (setq in-title nil))
          (when in-title
              (do ((index start (1- index)))
                  ((> index end))
                  (when (setq posn (position (aref word-vec index)
                                      adjusted-title-words :test #'string-equal))
                      (when (> posn last-posn)
                            (incf nr-common-words-in-order))
                      (setq last-posn posn)
                      (incf nr-common-words))))
;;;
;;; This is not a very safe matching criterion. If the word vector string is longer than the title,
;;; just compare the rightmost word (hopefully the surname).
;;;
             (when (< (length adjusted-title-words)
                      np-len)
                   (when (null (position (aref word-vec end)
                                    adjusted-title-words :test #'string-equal))
                         (setq in-title nil)))
;;;
;;; Otherwise all the words in the word vector should be present in the title.
;;; Thus For title John F. Kennedy, Joseph Kennedy will be rejected, as will "President Kennedy"
;;; (note nypo-name-subsumed function though, which would pick it up in
;;;
             (when (and in-title (>= (length adjusted-title-words)
                                     np-len))
                   (do ((index start (1+ index)))
                       ((> index end))
                       (when (null (position (aref word-vec index)
                                      adjusted-title-words :test #'string-equal))
                             (setq in-title nil))))
```

```
;DSK)<project>markov>thivo>qtagger>finan24.1>patent-source>answer-extraction.LISP:1    3-Jun-93 21:10
Page 15

;;; This needs to be tightened up so that single abbreviations like "b." and "d." don't get matched
;;; against middle initials in titles which are now allowed (22 Oct 92). Should also take care of
;;; possibilities that "Mr." and "Mrs." don't match  so look for anything with a period at the end---
;;; don't have pos info available here...
                    (setq word (aref word-vec start))
                      (when (and (= start end)
                                 (> (length word)
                                    0)
                                 (char= #\. (char word (1- (length word))))))
                            (setq in-title nil))))
;;; For a match return the number of common words
           (if (and in-title (> nr-common-words 0))
               (values nr-common-words nr-common-words-in-order)
               (values nil nil))))
(defun print-answer-hypos (hypo-vector &key (how-many 5))
   (let (hypo root-hypo hypo-already-given (nr-non-root-hypos 0))
;;; If a hypo has a root that is already mentioned, it shouldn't be printed out...
        (do ((index 0 (1+ index)))
            ((or (= index (length hypo-vector))
                 (= nr-non-root-hypos how-many)))
          (setq hypo (aref (aref hypo-vector index)
                           0))
          (setq root-hypo (get-root-hypo hypo))
          (setq hypo-already-given nil)
          (when root-hypo
            (setq hypo-already-given (find root-hypo hypo-vector :end index :key
                                           #'(lambda (x)
                                               (aref x 1)))))
          (when (null hypo-already-given)
            (format t "RANK: ~A --- SCORE: ~A~%" nr-non-root-hypos (aref (aref hypo-vector
                                                                               index)
                                                                         0))
            (incf nr-non-root-hypos)
            (print-who-hypo-info hypo :show-rooted nil)))))
(defun print-query-info (qr-struc)
   (let nil
     (when *qr-verbose*
       (format t "Italic terms: ~A~%" (qr-defn-italic-terms qr-struc))
       (format t "Initial Capital terms: ~A~%" (qr-defn-initial-cap-terms qr-struc))
       (format t "Word terms: ~A~%" (qr-defn-terms qr-struc)))))
(defun print-tp-match (match)
   (let ((hypo-np (tp-match-defn-hypo-np match)))
     (format t "~3T ~a ~20,10T Doc: ~5@A Sent: ~3@A Start/End: ~2@A/~2@A Hypo NP: ~A~%"
             (tp-match-defn-name match)
             (tp-match-defn-doc-id match)
             (tp-match-defn-sent match)
             (tp-match-defn-start match)
             (tp-match-defn-end match)
             (curr-word-str 0 (1- (length hypo-np))
                            hypo-np))))
(defun print-tp-text (match)
   (let* ((line-width 70)
          (doc-id (tp-match-defn-doc-id match))
          (art (get-article doc-id))
          (sents (article-defn-words art))
          (sent-nr (tp-match-defn-sent match))
          (sent-vec (aref sents sent-nr))
          col)
     (setq col 0)
     (format t "~%... ")
     (dotimes (index (length sent-vec))
       (format t "~A " (aref sent-vec index))
       (incf col (1+ (length (aref sent-vec index))))
       (when (>= col line-width)
         (format t "~%")
         (setq col 0)))
     (format t " ...~%~%")))
(defun print-type-preferences (who-hypo)
   (let ((prefs (who-defn-type-match-preferences who-hypo))
         pref match)
     (when (> (length prefs)
              0)
       (format t "Type Match Preferences:~%")
       (format t "Art.Ref/Sent/Start/End/Min. Mis/Nr.Exact/Nr.Stems/Name~%"))
```

```
[DSK]<project>markov>trivia>qtagger>franz4.1>patent-source>answer-extraction.LISP;1    3-Jun-93 21:11
Page 16

(dotimes (index (length prefs))
               (setq pref (aref prefs index))
               (setq match (aref pref 5))
               (format t "~6A~10,1T~3A  ~3A  ~3A~26,1T~4A    ~5A  ~5A ~A~%" (tp-match-defn-doc-id
                                                                                       match)
                         (tp-match-defn-sent match)
                         (tp-match-defn-start match)
                         (tp-match-defn-end match)
                         (aref pref 0)
                         (aref pref 1)
                         (aref pref 2)
                         (tp-match-defn-name match))))))
(defun print-who-hypo-info (who-hypo &key (show-rooted t)
                                          (full-roots nil)
                                          (show-instances nil))
   (let* ((art (get-article (who-defn-art-ref who-hypo)))
          (score-vec (article-defn-scores art))
          (instances-rooted-exist nil)
          instances pair wd-vector rooted-instances root-ref)
      (setq wd-vector (who-defn-hypo-name who-hypo))
      (format t "~4D ~4D/~4A  Art. Ref:~6@A ~A " (position who-hypo *who-hypos*)
                (who-defn-root-score who-hypo)
                (who-defn-score who-hypo)
                (who-defn-art-ref who-hypo)
                (curr-word-str 0 (1- (length wd-vector))
                      wd-vector))
      (when (who-defn-title-ref who-hypo)
         (format t "~45,5T(Title Ref:~5@A)" (who-defn-title-ref who-hypo)))
      (format t "~%")
      (setq rooted-instances (who-defn-rooted-instances who-hypo))
      (dotimes (index (length rooted-instances))
         (setq root-ref (aref rooted-instances index))
         (when (and (root-defn-subsuming-root root-ref))
            (setq instances-rooted-exist t)))
      (when (and show-rooted (or full-roots instances-rooted-exist))
         (format t "~7T Rooted instances:~%")
         (dotimes (index (length rooted-instances))
            (setq root-ref (aref rooted-instances index))
            (format t "~7T ->Sent: ~A (Score: ~A) " (root-defn-sent-ref root-ref)
                      (aref score-vec (root-defn-sent-ref root-ref)))
            (if (root-defn-subsuming-root root-ref)
               (progn (format t "~28,5T refers to Hypo: ~A  Art: ~A~%" (who-defn-hypo-name
                                                                            (
                                                                            root-defn-subsuming-root
                                                                            root-ref))
                                 (who-defn-art-ref (root-defn-subsuming-root root-ref)))
                       (when (>= (root-defn-subsuming-sent root-ref)
                                 0)
                          (format t "~25T Via sent: ~A/Hypo: ~A~%" (
                                                                    root-defn-subsuming-sent
                                                                    root-ref)
                                 (who-defn-hypo-name (root-defn-subsuming-hypo root-ref)))))
               (format t "~%"))))
      (setq instances (who-defn-instances who-hypo))
      (when (and show-instances (> (length instances)
                                    0))
         (format t "~7T Instances:~%")
         (dotimes (index (length instances))
            (setq pair (aref instances index))
            (setq root-ref (find-root who-hypo (car pair)
                                       (cdr pair)))
            (format t "~7T ->Doc: ~6D Sent: ~3D " (car pair)
                      (cdr pair)
                      (if root-ref
                         (who-defn-hypo-name root-ref)
                         nil))
            (when root-ref
               (format t "Root: ~A   Art. Ref: ~A" (who-defn-hypo-name root-ref)
                      (who-defn-art-ref root-ref)))
            (format t "~%")))))
(defun print-who-hypos (&key (nr nil)
                               (show-templates nil)
                               (show-instances nil))
```

```
:DSK><project>markov>:r-vo>qtagger>franz4 :)>patent-source>answer-extraction.LSP:1   3-Jun-93 21:10:
Page 17

(how-many 200)
                           (show-prefs n-l)
                           (show-rooted t))
        (let (hypo match template-matches)
            (when (null nr)
                (format t ""%BEST *20 HYPOTHESES:*%" how-many)
            (format t "Rank/Root Score/Sent. Score Art. Ref. Title*%")
            (do ((index 0 (1+ index)))
                ((or (= index how-many)
                     (= index (length *who-hypos*))))
              (when (or (null nr)
                        (= index nr))
                (setq hypo (aref *who-hypos* index))
                (print-who-hypo-info hypo :show-rooted show-rooted :show-instances show-instances)
                (setq template-matches (who-defn-template-matches hypo))
                (when (and show-templates template-matches)
                    (format t ""%Template matches:*%")
                    (dotimes (match-index (length template-matches))
                        (setq match (aref template-matches match-index))
                        (print-tp-match match)
                        (when (eq show-templates :text)
                            (print-to-text match)))
                    (unless (and show-templates (who-defn-root-template-matches hypo))
                        (format t ""%")))
                (when (and show-templates (null (eq show-templates :text))
                           (who-defn-root-template-matches hypo))
                    (format t ""% Root Template matches:*%")
                    (setq template-matches (who-defn-root-template-matches hypo))
                    (dotimes (match-index (length template-matches))
                        (setq match (aref template-matches match-index))
                        (print-tp-match match))
                    (format t ""%"))
                (when show-prefs (print-type-preferences hypo))))))
(defun rank-hypos-by-verb-match (&key (verbose nil))
    (let ((sort-vector (make-array 0 :adjustable t :fill-pointer 0))
          (template-matches nil)
          query-np-scores hypo nr-unique-doc-sents (nr-nil-matches 0)
          (nr-min-mismatches 0)
          match best-exact-match nr-exact-matches best-stem-match nr-stem-matches element
          verb-match-prefs minimum-mismatch)
;;;
;;; Assign a ranked list of template matches for a verb phrase / hypo correspondence, in the
;;; (who-defn-verb-match-preferences slot of a hypo)
;;;
        (when verbose (format t ""%Ranking Verb matches*%"))
        (dotimes (hypo-index (length *who-hypos*))
            (setq hypo (aref *who-hypos* hypo-index))
;;; If this hypo is a root who-hypo, use the combined list from its references.
            (setq template-matches (or (who-defn-root-template-matches hypo)
                                       (who-defn-template-matches hypo)))
;;; Modified 5 Feb 93 Just took out the(and TEMPLATE-MATCHES (null root-hypo)) from the following
;;; condition. * mar took out the (when (and template-matches)...) here and out in a test below.
;;; (> (length type-match-preferences) 0)  This will accommodate verb matches that will cause
;;; template matches to be non-nil and otherwise insert non-type matches.
;;;
;;; Make a vector to record the best type matches, so we can later choose the best one if they are
;;; needed as supporting evidence for this hypo. They can be sorted with the same sorting function
;;; as the overall best types.
            (setq verb-match-prefs (make-array 0 :adjustable t :fill-pointer 0))
;;;
;;; All who hypos that can be dealt with via their root hypo, don't get ranked.
;;; Multiple template matches in the same sentence are not counted more than once.
;;;
            (setq nr-unique-doc-sents 0)
            (setq nr-exact-matches 0)
            (setq nr-stem-matches 0)
            (setq best-exact-match 0)
            (setq best-stem-match 0)
            (when verbose
                (if (who-defn-root-template-matches hypo)
                    (format t ""%Root template matches:*%")
                    (format t ""%Template matches:*%"))
                (print-who-hypo-info hypo :show-rooted nil))
            (dotimes (index (length template-matches))
```

```
DSK\<project>markov>tr-vo>qtagger>franz4.1>patent-source>answer-extraction.LISP.1    3-Jun-93 21:10
Page 13

(setq match (aref template-matches index))
..: 5 March will be mixing verb and type match templates. need to count the latter differently. 8
::: March need to allow NIL template matches
                        (when (-s-a-verb-template index template-matches)
::: Don't do detailed analysis when the template didn't match....
                          (when (tp-match-defn-name match)
::: Count the quality and number of type matches
                            (multiple-value-setq (nr-exact-matches nr-stem-matches query-np-scores)
                              (detailed-who-verb-match hypo match :verbose verbose)))
                          (when (null (repeated-type-tp-match index template-matches))
:::
::: This means that the match being considered is not repeated later, i.e. we are counting all the
::: last such occurrences. They are differentiated by doc-id and sentence index
:::
                            (incf nr-unique-doc-sents)
::: Remember the longest nr of words in stem and exact matches for any of these template matches
                            (when (> nr-stem-matches best-stem-match)
                              (setq best-stem-match nr-stem-matches))
                            (when (> nr-exact-matches best-exact-match)
                              (setq best-exact-match nr-exact-matches))
::: Remember this match for this hypo
                            (vector-push-extend (vector (-f minimum-mismatch
                                                           1
                                                           0)
                                                         nr-exact-matches nr-stem-matches 1
                                                         (if (tp-match-defn-name match)
                                                             1
                                                             0)
                                                         match query-np-scores)
                                                 verb-match-prefs))))
                (when verbose (format t "~a total different (doc/sent) matches~%" nr-unique-doc-sents
                                      ))
                (when (> (length verb-match-prefs)
                         0)
::: Rank the type matches for this hypo
                  (setf (who-defn-verb-match-preferences hypo)
                        (sort-type-matches verb-match-prefs))
::: Remember the overall ranking info of type matching for this hypo.
                  (vector-push-extend (vector nr-min-mismatches best-exact-match best-stem-match
                                               nr-unique-doc-sents nr-nil-matches hypo)
                                       sort-vector)))
        (setq sort-vector (sort-type-matches sort-vector))
        (when verbose
          (format t "Ranked hypos by VERB~%")
          (format t
                  "Hypo/Art. Ref./Nr Min Mismatch/Highest Exact/Highest Stems/Nr Unique/Nr NIL~%"
                  )
          (dotimes (index (length sort-vector))
            (setq element (aref sort-vector index))
            (format t "~a  ~a ~30,5T ~30A ~30A ~30A ~30A ~30A~%" (who-defn-hypo-name
                                                                    (aref element 5))
                    (who-defn-art-ref (aref element 5))
                    (aref element 0)
                    (aref element 1)
                    (aref element 2)
                    (aref element 3)
                    (aref element 4))))
        sort-vector))
(defun route-question-type (nr-analyses &key (test-min-matches 1)
                                              (terse nil))
  (let ((leftmost-start nil)
        (template-end nil)
        (head-start nil)
        (end-of-head nil)
        (remake nil)
        (sorted-type-ranking nil)
        (rightmost-non-mixed-case-start nil))
    (setup-templates :make-and-dump remake)
    (when (string-equal "what" (aref *current-words* 0))
      (do-what-question nr-analyses :test-min-matches test-min-matches :terse terse))
    (when (string-equal "who" (aref *current-words* 0))
      (multiple-value-setq (leftmost-start template-end head-start end-of-head
                             rightmost-non-mixed-case-start)
        (find-wh-vo-type-np "who" "who-or-what-is-np")))
```

```
DSK><project>markov>trivo>dtagger>franz4.l>patent-source>answer-extraction.LISP:1    3-Jun-93 21:10
Page 13 when leftmost-start
                   (when *gr-verbose* (format t "Question Type is: WHO IS TYPE-NP~%"))
                   (do-who-question nr-analyses end-of-head :verbose (null terse))
                   (validate-titles 50 :verbose (null terse))
                   (assign-root-hypos :verbose (null terse))
                   (make-who-root-scores)
                   (when *gr-verbose*
                     (format t "Cross-Referenced Who hypo Co-occurrence Scores...~%")
                     (print-who-hypos :how-many 200))
                   (when *gr-verbose*
                     (format t "Validating Overall Who NP Type: ~A~%" (curr-word-str
                                                                      leftmost-start
                                                                      template-end
                                                                      *original-query-words*
                                                                      )))
;;; Take out TEST-MIN-MATCHES after testing has been done satisfactorily
                   (validate-who-type-np :n end-of-head :test-min-matches test-min-matches)
                   (assign-root-to-matches :verbose (null terse))
                   (setq sorted-type-ranking (rank-hypos-by-type-match leftmost-start template-end
                                                                       end-of-head :verbose (null terse)))
                   (setq *sorted-type-ranking* sorted-type-ranking)
                   (rank-hypos-by-query-np)
                   (when *gr-verbose* (print-query-np-rank))
                   (final-type-hypo-scoring sorted-type-ranking head-start end-of-head))
                 (when (null leftmost-start)
                   (multiple-value-setq (leftmost-start template-end head-start end-of-head
                                         rightmost-non-mixed-case-start)
                     (or (find-wn-vb-type-np "who" "who-vb-act-np")
                         (find-wn-vb-type-np "who" "who-vb-pass-np")))
                   (when leftmost-start
                     (when *gr-verbose* (format t "Question Type is: WHO VERB NP~%"))
                     (do-who-question nr-analyses nil :verbose (null terse))
                     (validate-titles 50 :verbose (null terse))
                     (assign-root-hypos :verbose (null terse))
                     (make-who-root-scores)
                     (when *gr-verbose*
                       (format t "Cross-Referenced Who hypo Co-occurrence Scores...~%")
                       (print-who-hypos :how-many 200))
                     (when (> (length *original-query-verbs*)
                              0)
                       (validate-who-type-np :v end-of-head :test-min-matches test-min-matches
                                             ))
                     (assign-root-to-matches :verbose (null terse))
                     (rank-hypos-by-query-np)
;;; Do this after RANK-HYPOS-BY-QUERY-NP, so that the scores of NP's following the verb can be
;;; utilized, for hypos that co-occur with query-nps
                     (rank-hypos-by-verb-match :verbose (null terse))
                     (when *gr-verbose* (print-query-np-rank))
                     (final-type-hypo-scoring nil head-start end-of-head)))
;;; 5 April Put in catch all for if nothing matches...
                 (when (null leftmost-start)
                   (multiple-value-setq (leftmost-start template-end head-start end-of-head
                                         rightmost-non-mixed-case-start)
                     (or (find-wn-vb-type-np "who" "who-vb-act-np")
                         (find-wn-vb-type-np "who" "who-vb-pass-np")))
                   (when t
                     (when *gr-verbose* (format t "Question Type is: ANY QUESTION~%"))
                     (do-who-question nr-analyses nil :verbose (null terse))
                     (validate-titles 50 :verbose (null terse))
                     (assign-root-hypos :verbose (null terse))
                     (make-who-root-scores)
                     (when *gr-verbose*
                       (format t "Cross-Referenced Who hypo Co-occurrence Scores...~%")
                       (print-who-hypos :how-many 200))
                     (assign-root-to-matches :verbose (null terse))
                     (rank-hypos-by-query-np)
                     (when *gr-verbose* (print-query-np-rank))
                     (final-type-hypo-scoring nil head-start end-of-head))))))
(defun same-extent-as-np (italic-refs italic-index)
  (let* ((italic-start (position italic-index italic-refs))
         (italic-end (position italic-index italic-refs :from-end t))
         (found nil)
         np-start np-end)
    (do ((np-index 0 (1+ np-index)))
```

```
DSK)<project>markov>trivp>qtagger>franz4.1>patent-source>answer-extraction.LISP:1    3-Jun-93 21:10
Page 20

((or found (= np-index (length *np-start-indices*))))
                   (setq np-start (aref *np-start-indices* np-index))
                   (setq np-end (aref *np-end-indices* np-index))
                   (when (and (= np-start italic-start)
                              (= np-end italic-end))
                     (setq found t)))
                 found))
(defun same-tp-defn (tp1 tp2)
    (and (equalp (tp-match-defn-name tp1)
                 (tp-match-defn-name tp2))
         (equalp (tp-match-defn-doc-id tp1)
                 (tp-match-defn-doc-id tp2))
         (equalp (tp-match-defn-sent tp1)
                 (tp-match-defn-sent tp2))
         (equalp (tp-match-defn-start tp1)
                 (tp-match-defn-start tp2))
         (equalp (tp-match-defn-end tp1)
                 (tp-match-defn-end tp2))
         (equalp (tp-match-defn-hypo-np tp1)
                 (tp-match-defn-hypo-np tp2))))
(defun same-word-vecs (wd-vec1 wd-vec2)
  ;;; Are the words in wd-vec1 (string=) to wd-vec2-- Useful for comparing equality of hypo names
    (let ((same t))
         (when (/= (length wd-vec1)
                   (length wd-vec2))
             (setq same nil))
         (do ((index 0 (1+ index)))
             ((or (null same)
                  (= index (length wd-vec1))))
             (when (null (string= (aref wd-vec1 index)
                                  (aref wd-vec2 index)))
                 (setq same nil)))
         same))
(defun setup-templates (&key (make-and-dump nil)
                             (verbose nil))
    (let (template-file-ok template-pathname)
        (dolist (template *templates*)
            (when (or make-and-dump (null (tp-defn-fsm template)))
                (setq template-pathname (merge-pathnames (make-pathname :name (tp-defn-name
                                                                                template)
                                                                         :type "fsm")
                                          *tagger-pathname*))
                (setq template-file-ok (probe-file template-pathname))
                (if (and template-file-ok (null (tp-defn-fsm template))
                         (null make-and-dump))
                    (progn (when verbose
                              (format t "Reading FSM for Template: ~a~%" (tp-defn-name template)
                                      ))
                           (setf (tp-defn-fsm template)
                                 (fsm:network-from-file template-pathname)))
                    (progn (when verbose
                              (format t "~%Creating FSM for Template: ~a..." (tp-defn-name
                                                                                template)))
                           (setf (tp-defn-fsm template)
                                 (new-expr-to-fsm (tp-defn-fsm-matcher template)))
                           (when verbose (format t "Done~%"))
                           (when verbose
                              (format t "Writing FSM for Template: ~a~%" (tp-defn-name template)
                                      ))
                           (fsm:network-to-file (tp-defn-fsm template)
                                                template-pathname)))))))
(defun stem-equal (word1 word2)
    (string-equal (get-stem word1)
                  (get-stem word2)))
(defun tag-article (article-id &key (read-tokenizer nil)
                                    (from-string nil)
                                    (show nil)
                                    (tagged t))
    (let (art-str (model (car rnmm:*models*))
          (sent-boundary-codeword (word-to-codeword "."))
          (art-in-list (find article-id *tagged-articles* :key #'article-defn-article))
          art tokenizer-stream unknown-states)
        (setq art (if from-string
                      nil
```

```
;DSK:<project>markov>th--.>>tagger>franz4.l>patent-source>answer-extraction.LISP:l   1-Jun-93 21:13.
Page 21

. or art-in-list (make-article-defn :article article-id)))
         (setq unknown-states (find-unknown-states model))
         (when (or read-tokenizer (null *article-tokenizer*))
            (setq *article-tokenizer* (read-tokenizer "grolier-tokenizer.rules" (null
                                                                                 read-tokenizer
         (when (null from-string)                                                  ))))
            (setf (article-defn-words art)
                  (make-array 0 :fill-pointer t :adjustable t))
            (setf (article-defn-composed-tokens art)
                  (make-array 0 :fill-pointer t :adjustable t))
            (setf (article-defn-title art)
                  (tdb::doc-title article-id concordance::*tdb*)))
         (setq art-str (or from-string (concordance::get-doc-str article-id concordance::*tdb*)))
         (with-input-from-string (file-stream art-str)
            (setq tokenizer-stream (make-instance 'fsm-tokenizer:symbolic-fsm-tokenizer
                                                  :char-stream file-stream :tokenizer-fsm
                                                  *article-tokenizer* :start 0))
            (loop (when (eof-p file-stream)
                    (return nil))
                  (fst-read-sentence file-stream tokenizer-stream nil sent-boundary-codeword
                                     :tokenize-only (null tagged))
                  (when (> (length *current-words*)
                           0)
                    (when tagged
                      (do-viterbi model unknown-states)
                      (compose-tokens model))
                    (when (null from-string)
                      (vector-push-extend (copy-seq *current-words*)
                                          (article-defn-words art))
                      (when tagged
                        (vector-push-extend (copy-seq *composed-token-array*)
                                            (article-defn-composed-tokens art))))
                    (when show (tag-sent model t nil nil))))
         (when (null from-string)
;;; TITLE-ABOUT-PERSON-P does not use tags....
            (setf (article-defn-person-name-p art)
                  (title-about-person-p art))
            (when (null art-in-list)
              (setq *tagged-articles* (push art *tagged-articles*))))
         art))
(defun test-art (article-list template-list &key (remake nil))
   (let ((articles (if (listp article-list)
                        article-list
                        (list article-list)))
         (templates (if (listp template-list)
                        template-list
                        (list template-list)))
         template art composed-tokens sents)
      (when remake
         (setup-static-fsms *fsmvars* t)
         (setq *tagged-articles* nil)
         (dolist (temp-name templates)
            (when (null (setq template (find temp-name *templates* :key #'tp-defn-name :test
                                              #'string=)))
               (format t "Cant find: ~a~%" temp-name))
            (when *gp-verbose*
               (format t "Template: ~a~%" (tp-defn-name template)))
            (new-set-term-hashtable (tp-defn-fsm-matcher template)))
         (setup-templates :make-and-dump t))
      (setq *tagged-articles* nil)
      (dolist (article articles)
         (setq art (get-article article))
         (setq composed-tokens (article-defn-composed-tokens art))
         (setq sents (article-defn-words art))
         (dotimes (sent-index (length sents))
            (dolist (temp-name templates)
               (if (null (setq template (find temp-name *templates* :key #'tp-defn-name
                                               :test #'string=)))
                  (format t "Cant find: ~a~%" temp-name)
                  (progn (test-template-match (aref sents sent-index)
                                               (aref composed-tokens sent-index)
                                               (tp-defn-fsm template)))))))))
;defun test-template-match (sent composed-tokens fsm)
```

```
[DSK]<project>markov>trivo>qtagger>franz4.1>patent-source>answer-extraction.LISP;1   1-Jun-93 21:10
Page 22

(let ((end-index-copy 0)
              (found nil)
              (start 0)
              (end (length sent)))
;;; Based on a copy of FIND-MAXIMAL-NPS
          (setq end-index-copy -1)
          (do ((start-index start (1+ start-index)))
              ((>= start-index end))
            (setq found nil)
            (when (> start-index end-index-copy)
              (when *debug* (format t "start: ~a " start-index))
              (do ((end-index start-index (1+ end-index)))
                  ((or (>= end-index end)))
                (when *debug* (format t " end: ~a~%" end-index))
                (when (np-match fsm start-index end-index composed-tokens)
                  (setq end-index-copy end-index)
                  (when *debug* (format t "found~%"))
                  (setq found t))))
            (when found
              (when *gr-verbose*
                (format t "~Template Match: ~a~%" (curr-word-str start-index end-index-copy sent
                                                  )))))
          (when *debug* (format t "~%")))))
(defun title-about-person-p (art &key (verbose nil))
  (let (sents this-sentence word found (nr-words 1)
        (nr-he 0)
        (nr-she 0)
        (nr-him-his 0)
        (nr-her-hers 0)
        (floruit-indicated nil)
        (birth-indicated nil)
        (death-indicated nil))
    (setq sents (article-defn-words art))
    (dotimes (sent-index (length sents))
      (setq this-sentence (aref sents sent-index))
      (dotimes (wd-index (length this-sentence))
        (setq word (aref this-sentence wd-index))
        (incf nr-words)
;;;
;;; Dont match b.. d. against uppercase B.. D. cos the latter might be an initial, as in the
;;; article WARREN COMMISSION, containing...one of the first acts of Lyndon B. Johnson.....
;;;
        (when (< sent-index 2)
          (when (or (string-equal word "born")
                    (string= word "b."))
            (setq birth-indicated t))
          (when (string= word "d.")
            (setq death-indicated t))
          (when (string= word "fl.")
;;; Lower case match or will get confused with Florida
            (setq floruit-indicated t)))
        (when (string-equal word "he")
          (incf nr-he))
        (when (string-equal word "she")
          (incf nr-she))
        (when (or (string-equal word "him")
                  (string-equal word "his"))
          (incf nr-him-his))
        (when (or (string-equal word "her")
                  (string-equal word "hers"))
          (incf nr-her-hers))))
;;;
;;; 12 Oct 92. Took out pronoun ratio > 0.02. 14 Oct put back in...The article 13500 on John F.
;;; Kennedy has his "b." 6 sentences in, which might trigger false things in other articles??? e.g.
;;; on geometry, or algebra.
;;;
    (when verbose
      (format t "+ ~a Total Words ~a~%" (article-defn-title art)
              nr-words)
      (format t "+ Floruit indicated: ~a~%" floruit-indicated)
      (format t "+ Birth indicated: ~a death indicated: ~a~%" birth-indicated
              death-indicated)
      (format t "- He's: ~a (~a) She's: ~a (~a) ~%" nr-he (float (/ nr-he nr-words))
              nr-she
```

```lisp
                        (float (/ nr-she nr-words)))
              (format t "~ him/his: ~a (~a) Her/hers: ~a (~a)~%" nr-nim-his (float (/ nr-nim-his
                                                                                       nr-words))
                      nr-her-hers
                      (float (/ nr-her-hers nr-words)))
              (format t "~ Overall m/f prons/ total: ~a~%" (float (/ (+ nr-he nr-she nr-nim-his
                                                                        nr-her-hers)
                                                                     nr-words))))
          (setq found (or birth-indicated death-indicated floruit-indicated
                          (> (float (/ (+ nr-he nr-she nr-nim-his nr-her-hers)
                                        nr-words))
                             0.02)))
          found))
(defun validate-hypo-search (hypo limit unique-doc-ids)
    (let ((ambiguous-what-title-ref nil)
          (hypo-wds (who-defn-hypo-name hypo))
          go-ahead doc-id art doc-title adjusted-title-words title-vector)
       (do ((doc-index 0 (1+ doc-index)))
           ((= doc-index (min limit (length unique-doc-ids))))
           (setq doc-id (aref unique-doc-ids doc-index))
;;;
;;; First do a quick check that at least one of the hypo words occurs in the article title, before
;;; we go and tokenize the article (which is taking time even when we aren't tagging it.
;;;
          (setq go-ahead nil)
          (setq doc-title (tdb::doc-title doc-id concordance::*tdb*))
          (setq title-vector (vectorize-string doc-title))
          (do ((index 0 (1+ index)))
              ((or go-ahead (= index (length hypo-wds))))
              (when (search (aref hypo-wds index)
                            doc-title :test #'equalp)
                    (setq go-ahead t)))
          (when go-ahead
                (when *gr-verbose* (format t "~a: ~a" doc-id doc-title))
                (setq art (get-article doc-id :tagged nil))
                (when *gr-verbose*
                      (if (article-defn-person-name-p art)
                          (format t " This IS a person's name~%")
                          (format t " This IS NOT a person's name~%")))
                (when (article-defn-person-name-p art)
                      (setq adjusted-title-words (get-adjusted-title doc-id))
                      (when (np-refers-to-title 0 (1- (length hypo-wds))
                            hypo-wds adjusted-title-words)
                            (when *gr-verbose* (format t "~%WHO HYPO MATCH possible: ~a~%" hypo-wds))
;;; DO-ADJUSTED-TITLE does not add another copy if the hypo is already in *who-hypos*
                            (do-adjusted-title (article-defn-article art))))
;;; After all peoples names have been validated, go for what-title-refs
;;; Match between the hypo and the the title must be exact to within letter case. FIRST WORD MUST
;;; START IN UPPERCASE (JUST ALLOWING MINIMUM RIGHT NOW--TO FIX STONEHENGE QUESTION). The (null
;;; (who-defn-title-ref hypo)) is just to play safe..
                (when (and (null (article-defn-person-name-p art))
                           (null (who-defn-title-ref hypo))
                           (null (mismatch hypo-wds title-vector :test #'string-equal))
                           (upper-case-p (char (aref hypo-wds 0)
                                               0)))
                      (when *gr-verbose*
                            (when (null (who-defn-what-title-ref hypo))
                                  (format t
                                          "Validated Initial Uppercase what-title-ref :~A Art Ref. ~A~%"
                                          hypo-wds (who-defn-art-ref hypo))))
                      (if (and (who-defn-what-title-ref hypo)
                               (/= (who-defn-what-title-ref hypo)
                                   doc-id))
                          (progn (when *gr-verbose*
                                       (format t "Multiple Ambiguous what-title-refs :~A / ~A~%"
                                               (who-defn-what-title-ref hypo)
                                               doc-id)
                                       (format t "Existing ref ~A for ~A will be deleted~%"
                                               (who-defn-what-title-ref hypo)
                                               hypo-wds))
                                 (setq ambiguous-what-title-ref t))
                          (setf (who-defn-what-title-ref hypo)
                                doc-id)))))
       (when ambiguous-what-title-ref
```

```
;DSK\<project>markov>th-vp>qtagger>franz4.1>patent-source>answer-extraction.LISP;1    3-Jun-93 21:10
Page 24

(setf (who-defn-what-title-ref hypo)
                         nil))
                nil))
(defun validate-titles (analysis-limit &key (verbose nil))
    (let ((nr-hypos (length *who-hypos*))
          hit-vec saved-verbosity who-hypo hypo-was hypo-wd-str)
        (when *gr-verbose* (format t "~%Validating non-title Hypos..~%"))
        (setq saved-verbosity *gr-verbose*)
        (dotimes (hypo-index nr-hypos)
            (setq who-hypo (aref *who-hypos* hypo-index))
            (setq hypo-was (who-defn-hypo-name who-hypo))
            (when (and (any-word-initial-uppercase hypo-was)
                       (null (who-defn-title-ref who-hypo)))
;;;
;;; This is not great because the words are known to be noun-phrases, and it is possible they will
;;; get re-tagged as not being noun phrases.....
                (setq hypo-wd-str "")
                (dotimes (index (length hypo-was))
                    (setq hypo-wd-str (concatenate 'string hypo-wd-str " " (aref hypo-was index))
                    ))
                (when verbose (format t "Calling Query with: ~a ... " hypo-was))
                (setq *gr-verbose* nil)
                (query hypo-wd-str :max-hits analysis-limit :subsumption-limit analysis-limit
                       :no-broadening ( 1 5)
                       :show-results nil)
                (setq *gr-verbose* saved-verbosity)
;;;
;;; WOULD BE BETTER TO BUILD A LIST OF UNIQUE ARTICLE IDS AS CURRENTLY THEY ARE REPEATED IN EACH
;;; DIFFERENCE QUERY STRUCTURE
;;; DONE 28 Oct 92.
;;;
                (setq hit-vec (hits-from-query-list analysis-limit))
                (when verbose
                    (format t "Validating ~a hits~%" (length hit-vec)))
                (validate-hypo-search who-hypo analysis-limit hit-vec)))))
(defun verify-extra-type-score (score-vec &key (verbose nil))
    (let ((hypo (aref score-vec 5))
          (max-q-scores (aref score-vec 8))
          (nr-query-nps (length *original-query-np-starts*))
          (best-extra-score 0)
          excess-beyond-q-np-score prefs pref type-scores total-extra-score)
;;;
;;; Only non zero scores in MAX-Q-SCORES are for type NP. Don't need to check if they are within
;;; type NP bounds -- already know they are.
;;;
;;; Find max type scores out of all preferences
        (when verbose
            (format t "In VERIFY-EXTRA-TYPE-SCORE:~%")
            (format t "hypo-name: ~a  max-q-scores: ~a  NR-QUERY-NPS: ~a~%" (who-defn-hypo-name hypo)
                    max-q-scores nr-query-nps))
        (setq prefs (who-defn-type-match-preferences hypo))
        (dotimes (index (length prefs))
            (setq pref (aref prefs index))
            (setq type-scores (aref pref 6))
            (setq total-extra-score 0)
            (when verbose (format t "TYPE-SCORES : ~a~%" type-scores))
            (dotimes (np-index nr-query-nps)
;;;
;;; 15 April 93. Because "National Book Award" hypo appears in article 3801 (Wallace Stegner), with
;;; novelis, pulitzer prize and won. It ranks highest among the type hypos 'cos it has 4 stems.
;;;
                (setq excess-beyond-q-np-score (- (aref type-scores np-index)
                                                  (aref max-q-scores np-index)))
                (when (> excess-beyond-q-np-score 0)
                    (incf total-extra-score excess-beyond-q-np-score)))
            (when (> total-extra-score best-extra-score)
                (setq best-extra-score total-extra-score)))
        best-extra-score))
(defun word-vecs-in-sent (start-index end-index type-np hypo-np sent plural-posn plural sent-index)
    (let ((hypo-present nil)
          plural-type-np
          (type-present nil))
;;; Check and see if the subsequence of the type NP are present and in sequence
```

0000z8

```
DSK:<project>markov>thrvp>dtagger>franz4.l;patent-source>answer-extraction.LISP.1    1-Jun-93 21:10
Page 25

;;; IMPORTANT NOTE: RIGHT NOW THIS IS A STRICT WORD MATCH --- NO INFLECTIONS ARE BEING ACCOUNTED FOR
;;; 17 Nov 92 added plural form for NP head..
        (setq hypo-present (search hypo-np sent :start2 start-index :end2 end-index :test
                            #'equalp))
          (when hypo-present
            (when (and nil sent-index *gr-verbose*)
                (format t "Hypo NP: ~A Present in Sent nr: ~A~%" hypo-np sent-index))
            (setq type-present (search type-np sent :start2 start-index :end2 end-index :test
                                #'equalp))
            (when type-present
              (when (and nil sent-index *gr-verbose*)
                (format t "Type NP: ~A Present in Sent nr: ~A~%" type-np sent-index)))
;;; Failed to match a singular form, go for plural if supplied
            (when (null type-present)
              (when (and nil sent-index *gr-verbose*)
                (format t "Plural-posn: ~A Plural: ~A~%" plural-posn plural)))
            (when (and (null type-present)
                      plural-posn plural)
              (setq plural-type-np (make-array (length type-np)))
              (dotimes (index (length plural-type-np))
                (setf (aref plural-type-np index)
                      (copy-seq (aref type-np index))))
              (setf (aref plural-type-np plural-posn)
                    plural)
              (setq type-present (search plural-type-np sent :start2 start-index :end2
                                  end-index :test #'equalp))
              (when (and nil type-present sent-index *gr-verbose*)
                (format t "Plural Type NP: ~A Present in Sent nr: ~A~%" plural-type-np
                        sent-index)))
            (and hypo-present type-present)))
```

Kupiec

Document name: {DSK}<project>markov>trivp>qtagger>franz4.1 patent–source>basic–scoring.LISP;1
Document date: Thu Jun 3 21:08:41 1993
Printing date/time: June 3, 1993 9:14:21 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
DSK)<project>markov>trivp>atagger>franz4.1>patent-source>basic-scoring..LISP:1    1-Jun-93 21:03:27
Page 1

;;; -*- Package: USER; Syntax: Common-Lisp; Base: 10 -*-
;;; File converted on 30-Apr-93 15:12:50 from source basic-scoring
;;; Original source (dsk)<project>markov>trivp>atagger>franz4.1>basic-scoring..16 created 29-Apr-93 15
;
;;;; Copyright (c) 1993 by Xerox Corporation
(provide "BASIC-SCORING")
(in-package "USER")
;;; Shadow, Export, Require, Use-package, and Import forms should follow here
(provide "BASIC-SCORING")
(in-package "USER")
(defun add-id-for-prev-sent (best-ids art end-of-head pronoun-vec)
  (let* ((art-words (article-defn-words art))
         (nr-sents (length art-words))
         (art-scores (article-defn-scores art))
         pronoun-present sent-score sent)
;;;
;;; If any of the highest scoring primary document matches have a reasonable score (1 head word or
;;; more) and they contain the head word of a type phrase or a pronoun, add the previous sentence
;;; (if necessary) to the list of best id's so that later processing can test for referencing from
;;; the previous sentence.
;;;
    (dotimes (index nr-sents)
      (setq sent (aref art-words index))
      (setq sent-score (aref art-scores index))
      (setq pronoun-present (some #'(lambda (x)
                                      (position x pronoun-vec :test #'string-equal))
                                  sent))
      (when (and nil *gr-verbose*)
        (format t "Pronoun in sent ~A~%" index))
      (when (and (> index 0)
                 (>= sent-score (- *query-np-match-score* *query-head-match-score*))
                 (or pronoun-present (and end-of-head (position
                                                        *original-query-words*
                                                        end-of-head)
                                          sent :test #'string-equal)))
                 (null (position (1- index)
                                 best-ids)))
        (when *gr-verbose*
          (format t "Added prev sent nr: ~a art: ~a to primary matches~%" (1- index)
                  (article-defn-article art)))
        (vector-push-extend (1- index)
                            best-ids)))
    best-ids))
(defun add-instance (who-hypo doc-id sent-index)
  (let ((current-instances (who-defn-instances who-hypo))
        found pair)
    (if (null current-instances)
        (progn (setf (who-defn-instances who-hypo)
                     (make-array 1 :adjustable t :fill-pointer 0))
               (vector-push-extend (cons doc-id sent-index)
                                   (who-defn-instances who-hypo)))
        (progn (setq found nil)
               (do ((index 0 (1+ index)))
                   ((or found (= index (length current-instances))))
                 (setq pair (aref current-instances index))
                 (when (and (= doc-id (car pair))
                            (= sent-index (cdr pair)))
                   (setq found t)))
               (when (null found)
                 (vector-push-extend (cons doc-id sent-index)
                                     (who-defn-instances who-hypo)))))))
(defun score-italic-phrase (sent italic-ref-copy)
  (let ((curr-phrase-nr nil)
        (italic-score 0)
        start end this-phrase-nr)
    (do ((index 0 (1+ index)))
        ((= index (length *original-query-italic-refs*)))
      (setq this-phrase-nr (aref *original-query-italic-refs* index))
;;; end is non-inclusive
      (when this-phrase-nr
        (if (null curr-phrase-nr)
            (setq start index)
            (when (/= curr-phrase-nr this-phrase-nr)
              (setq end index)
```

000031

```
;DSK:<project>markov>trivo>dtagger>franz4.1>patent-source>basic-scoring.LISP:1    3-Jun-93 21:09:27
Page 2

;;; do stuff before start is re-assigned
                       (incf italic-score (score-italic-phrase-in-sent start end sent
                                                                       italic-ref-copy))
                       (setq start (index1))
                  (when (null this-phrase-nr)
                      (when curr-phrase-nr
                          (setq end index)
;;; do stuff
                          (incf italic-score (score-italic-phrase-in-sent start end sent italic-ref-copy)
                               )))
                  (setq curr-phrase-nr this-phrase-nr))
                (when curr-phrase-nr
                    (setq end (length *original-query-italic-refs*))
                    (incf italic-score (score-italic-phrase-in-sent start end sent italic-ref-copy)))
                italic-score))
(defun score-italic-phrase-in-sent (start end sent italic-ref-copy)
       (let ((italic-score 0))
            (when (null (aref italic-ref-copy start))
                (when (search *original-query-words* sent :start1 start :end1 end :test #'equalp)
;;; unsophisticated scoring... was planning to give open and closed class words differing scores.
                    (setq italic-score (min *query-max-italic-score* (* *query-italic-word-score*
                                                                         (1+ (- end start)))))
                    (do ((index start (1- index)))
                        ((= index end))
                      (setf (aref italic-ref-copy index)
                            t))))
             italic-score))
(defun score-verbs (verb-id-list word-vector composed-tokens sent-index &key (verbose t))
       (let ((score 0)
             sent-term-id copulative stemmed-word term-id)
            (dolist (query-verb-index *original-query-verbs*)
;;; To be occurs too often to contribute to scoring ?? also "am" doesn't stem right....
                (setq stemmed-word (get-stem (aref *original-query-words* query-verb-index)))
                (setq copulative (or (string-equal stemmed-word "be")
                                     (string-equal stemmed-word "am")
                                     (string-equal stemmed-word "will")
                                     (string-equal stemmed-word "become")))
                (when (null copulative)
                    (setq term-id (aref *original-query-tokens* (+ *composed-term-id-offset*
                                                                    (* *nr-token-features*
                                                                       query-verb-index))))
                    (dolist (sent-verb-index verb-id-list)
                        (setq sent-term-id (aref composed-tokens (+ *composed-term-id-offset*
                                                                     (* *nr-token-features*
                                                                        sent-verb-index))))
                            (when verbose
                                (when n-1
                                    (format t "Sent : ~3D verb ~a query/sent term-id: ~a/~a~%" sent-index
                                            (aref word-vector sent-verb-index)
                                            term-id sent-term-id)))
                            (when (= sent-term-id term-id)
                                (when verbose (format t "Sent  :~3D Match for verb: ~a Score: ~3D~%"
                                                      sent-index stemmed-word *verb-match-score*))
                                (incf score *verb-match-score*)))))
            score))
(defun print-sent (word-vector start-col stream)
       (let ((line-width 65)
             (curr-col start-col)
             word word-len)
            (do ((word-index 0 (1+ word-index)))
                ((>= word-index (length word-vector)))
              (setq word (aref word-vector word-index))
              (setq word-len (length word))
              (when (>= (+ curr-col word-len)
                        line-width)
                  (format stream "~%")
                  (setq curr-col 0))
              (format stream "~a " word)
              (incf curr-col (1+ word-len)))
            curr-col))
(defun get-n-best-scores (art how-many &key (verbose t))
       (let* ((scores (article-defn-scores art))
              (doc-id (article-defn-article art))
              (best-ids (make-array 0 :adjustable t :fill-pointer 0))
```

```
[DSK]<project>markov>t--vp>qtagger>franz4.1>patent-source>basic-scoring.LISP;1    3-Jun-93 21:08:27
Page 3

(max-score (reduce #'max scores))
                    (last-col score next-best-score)
                (when *debug* (format t "Initial Max score ~a~%" max-score))
                (do ((order-index 0 (1+ order-index)))
                    ((or (<= max-score 0)
                         (= (length best-ids)
                            how-many)
                         (= order-index how-many)))
                  (when *debug* (format t "Order index ~a~%" order-index))
                  (when *debug* (format t "Current max score ~a~%" max-score))
                  (setq next-best-score -1)
                  (dotimes (sent-index (length scores))
                       (setq score (aref scores sent-index))
                       (when (and (< score max-score)
                                  (> score next-best-score))
                            (when *debug* (format t "Setting next best score to ~a~%" score))
                            (setq next-best-score score))
                       (when (and (= score max-score)
                                  (< (length best-ids)
                                     how-many))
                            (when *debug* (format t "Assigned a best sent ~a~%" sent-index))
                            (vector-push-extend sent-index best-ids)))
                  (setq max-score next-best-score))
                (when verbose
                    (format t "~%~a: ~a" doc-id (article-defn-title art))
                    (if (title-about-person-p art)
                        (format t " This IS a person's name~%~%")
                        (format t " This IS NOT a person's name~%~%"))
                    (dotimes (index (length best-ids))
                        (format t "Sent: ~D/Score: ~D for: " (aref best-ids index)
                                  (aref scores (aref best-ids index)))
                        (setq last-col (print-sent (aref (article-defn-words art)
                                                        (aref best-ids index))
                                                  (length "Sent: xx/Score: xxx for: ")
                                                  t))
                        (terpri t)
                        (terpri t)))
                best-ids))
(defun test-scores (doc-id n-best end-of-head &key (verbose t))
    (let* ((art (get-article doc-id))
           (composed-token-vector (article-defn-composed-tokens art))
           (art-words (article-defn-words art))
           (nr-sents (length composed-token-vector))
           (art-scores (make-array nr-sents))
           (art-np-starts (make-array nr-sents))
           (art-np-ends (make-array nr-sents))
           (art-a-scores (make-array nr-sents))
           (pronoun-vec (vector "It" "him" "her" "he" "she" "them" "they"))
           np-score-vec verb-id-list score composed-tokens word-vector best-ids np-fsmvar)
      (setq *art-words* art-words)
      (setq *art-tokens* composed-token-vector)
      (when *gr-verbose*
          (format t "~%a (~a)~%" (article-defn-title art)
                  doc-id))
      (when (or (null *italic-ref-copy*)
                (< (length *italic-ref-copy*) (length *original-query-italic-refs*))))
          (setq *italic-ref-copy* (make-array (length *original-query-italic-refs*))))
      (setq np-fsmvar (get-fsmvar "np-grammar"))
      (dotimes (index nr-sents)
          (setq score 0)
          (setq composed-tokens (aref composed-token-vector index))
          (setq word-vector (aref art-words index))
          (setq *these-words* word-vector)
          (setq *this-sent* composed-tokens)
          (find-maximal-nps np-fsmvar *delimiters* word-vector composed-tokens :quiet t)
          (setf (aref art-np-starts index)
                (copy-seq *np-start-indices*))
          (setf (aref art-np-ends index)
                (copy-seq *np-end-indices*))
;;; And what about Italic phrases ???
          (setq np-score-vec (make-array (length *query-np-starts*)
                                         :initial-element 0))
          (setf (aref art-a-scores index)
                np-score-vec)
```

```
:SK:<project>markov>tr->o>ctagger>franz4.1>patent-source>basic-scoring.LISP;1   1-Jun-93 21:03:27
Page 4

(incf score (score-no-matches word-vector index composed-tokens (aref art-np-starts
                                                                                          index)
                                (aref art-np-ends index)
                                np-score-vec *italic-ref-copy* :verbose verbose))
        ::: Find the verbs for this sentence
                (setq verb-id-list (extract-verbs word-vector composed-tokens (aref art-np-starts
                                                                                          index)
                                        (aref art-np-ends index)))
                (incf score (score-verbs verb-id-list word-vector composed-tokens index :verbose
                                          verbose))
                (setf (aref art-scores index)
                      score))
           (setf (article-defn-q-np-scores art)
                 art-q-scores)
           (setf (article-defn-scores art)
                 art-scores)
           (setf (article-defn-np-starts art)
                 art-np-starts)
           (setf (article-defn-np-ends art)
                 art-np-ends)
           (setq best-ids (get-n-best-scores art n-best :verbose *gr-verbose*))
           (add-id-for-prev-sent best-ids art end-of-head pronoun-vec)
           best-ids))
(defun find-longest-np-match (query-np-index sent-index word-vector composed-tokens sent-np-starts
                              sent-np-ends &key (verbose t))
   (let (start end term-id sent-start found-index sent-end np-score query-pos nr-matching-words
         sent-end-term-id heads-match (heads-match-for-best-score nil)
         (nr-words-in-best-match 0)
         (best-match-np-len 0)
         (best-score 0))
     (setq start (aref *query-np-starts* query-np-index))
     (setq end (aref *query-np-ends* query-np-index))
;;;
;;; WHAT ABOUT INTERACTION WITH ITALIC TERMS ????
;;; Each np in question is only considered once. It doesn't depend on how often it occurs in the
;;; sentence
;;;
     (do ((sent-np-index 0 (1+ sent-np-index)))
         ((>= sent-np-index (length sent-np-starts)))
       (setq sent-start (aref sent-np-starts sent-np-index))
       (setq sent-end (aref sent-np-ends sent-np-index))
       (setq np-score 0)
       (setq nr-matching-words 0)
       (setq sent-end-term-id (aref composed-tokens (- *composed-term-id-offset*
                                                      (* *nr-token-features* sent-end))))
       (setq heads-match nil)
       (do ((index start (1+ index)))
           ((> index end))
         (setq term-id (aref *composed-query-tokens* (- *composed-term-id-offset*
                                                       (* *nr-token-features* index))))
         (setq query-pos (aref *composed-query-tokens* (+ *composed-pos-offset*
                                                         (* *nr-token-features* index))))
         (when (setq found-index (position term-id composed-tokens :start
                                           (- *composed-term-id-offset* (* *nr-token-features*
                                                                           sent-start))
                                           :end
                                           (- *composed-term-id-offset* (* *nr-token-features*
                                                                           (1+ sent-end)))))
           (incf nr-matching-words)
           (when verbose
             (format t "Sent :~3D - word ~18.2T~s/~a Score:~3D~%" sent-index
                 (aref word-vector (floor found-index *nr-token-features*))
                 (nth (aref composed-tokens (+ *composed-pos-offset*
                                               (* *nr-token-features* (floor
                                                                       found-index
                                                                       *nr-token-features*
                                                                       ))))
                    *ordered-state-list*)
                 *query-np-match-score*)
             (format t "Match: Target: ~13.2T~s Query: ~s~%" (curr-word-str sent-start
                                                                            sent-end word-vector)
                 (curr-word-str start end *query-words*)))
  ::: There was some kind of match for this query np.
           (setf (aref *matched-query-nps* query-np-index)
```

000034

```
[SK]<project>markov<tm/o>dtagger>franz4.1>patent-source>basic-scoring.LISP.1    1-Jun-93 21:03:17
Page 6 t)
                 (incf np-score *query-np-match-score*)
                 (when (and (= index end)
                            (eql term-id sent-end-term-id))
;;;
;;; One word in head position is worth two that are not.  NOTE If headed matches are not the best
;;; scoring here, they will get attenuated later....NOT THE BEST OF ARRANGEMENTS
;;;
                    (incf np-score *query-head-match-score*)
                    (when verbose (format t "----- Heads Match  (Score: ~a)~%"
                                              *query-head-match-score*))
                    (setq heads-match t))
;;;
;;; Add to score for this np match if pos categories match...STRICT MATCHING CURRENTLY DONE noun <->
;;; noun npr <-> npr etc. a noun doesn't match npr.
;;;
                 (when (and nil (= query-pos (aref composed-tokens (+ *composed-pos-offset*
                                                                      (* *nr-token-features*
                                                                         (floor found-index
                                                                                *nr-token-features*
                                                                                ))))))
;;; The word is already guaranteed to be part of an np, here we are just making adj/noun confusion
;;; more obvious... so took it out.
                    (incf np-score 1))
                    (when verbose
                      (format t "-----Also has matching pos: ~a~%" (nth query-pos
                                                                        *ordered-state-list*)))))
          (when (> np-score best-score)
              (setq best-score np-score)
              (setq best-match-np-len (1+ (- sent-end sent-start)))
              (setq nr-words-in-best-match nr-matching-words)
              (setq heads-match-for-best-score heads-match)))
;;;
;;; If the overlap is equal to the length of the query np , then the query np must be included in
;;; the longest matching sent np.  Only assign this extra score if the query np was longer than 1
;;; word --OBSOLETE
;;;
          (when (and nil (> best-score 0)
                     (> nr-words-in-best-match 1)
                     (= nr-words-in-best-match (1+ (- end start))))
              (incf best-score 11)
              (when verbose (format t "-----Increment score for Query NP inclusion~%")))
;;;
;;; If the longest matching sent-np was the same length as the query np then the query np was
;;; properly included (i.e. same nr words).  TOOK OUT
;;;
          (when (and nil (= nr-words-in-best-match best-match-np-len))
              (when verbose (format t "-----Increment score for EXACT Query NP word match~%"))
              (incf best-score 11)))
;;; If the rightmost word of the of the query and sent nps are not the same half thescore.
          (when (> best-score 0)
            (when (null heads-match-for-best-score)
                (setq best-score (round (/ best-score 2)))
                (when verbose (format t "----- No Matching Head (score reduced)~%")))
            (when verbose
              (format t "----- Query np[~a]:~13,2T~s Score assigned: ~a~%~%" query-np-index
                      (curr-word-str start end *query-words*)
                      best-score)))
          best-score))
(defun score-np-matches (word-vector sent-index composed-tokens np-starts np-ends np-score-vec
                                     italic-ref-copy &key (verbose t))
    (let ((score 0)
          (nr-query-nps (length *query-np-starts*))
          best-score np-start np-end)
;;; Only matching sentence against current sentence. no previous or next being used
        (when (or (null *matched-query-nps*)
                  (< (length *matched-query-nps*) nr-query-nps))
            (setq *matched-query-nps* (make-array nr-query-nps)))
        (dotimes (index nr-query-nps)
            (setf (aref *matched-query-nps* index)
                  nil))
        (dotimes (index (length italic-ref-copy))
            (setf (aref italic-ref-copy index)
```

```
;DSK;<project>markov>t-vo>qtagger>franz4.1>patent-source>basic-scoring.LISP:1   3-Jun-93 21:03:27
Page 6

--)))
  ;;;
  ;;; 26 Apr 93. Added scoring for italic phrases. First go through all italic phrases, then score
  ;;; other nps that aren't in them -- don't count words twice.  ITALIC-REF-COPY gets modified to show
  ;;; what words are included in the scoring of the italic phrase.
  ;;;
              (incf score (score-italic-phrase word-vector italic-ref-copy))
              (do ((query-np-index 0 (1+ query-np-index)))
                  ((>= query-np-index nr-query-nps))
                (setq np-start (aref *query-np-starts* query-np-index))
                (setq np-end (aref *query-np-ends* query-np-index))
  ;;; Conservative--If an np were to straddle across an italic phrase, it would not be counted as in
  ;;; the italic phrase. Right now this can't happen 'cos italic phrases are marked with delimiters.
                (unless (and nil (aref italic-ref-copy np-start)
                                 (aref italic-ref-copy np-end))
                  (setq best-score (find-longest-np-match query-np-index sent-index word-vector
                                                          composed-tokens np-starts np-ends :verbose verbose))
                  (setf (aref np-score-vec query-np-index)
                        best-score)
                  (incf score best-score)))
  ;;; This and verbs (in SCORE-VERBS called from test-scores) should also be fixed....
              (incf score (untagged-match *matched-query-nps* sent-index composed-tokens :verbose
                                          verbose))
              score))
  (defun show-n-best-scores (art how-many)
     (let* ((scores (article-defn-scores art))
            (doc-id (article-defn-article art))
            (best-ids (make-array how-many :initial-element nil))
            (max-score (reduce #'max scores))
            (best-index 0)
            last-col score next-best-score)
        (when *debug* (format t "Initial Max score ~a~%" max-score))
        (do ((order-index 0 (1+ order-index)))
            ((or (<= max-score 0)
                 (= best-index how-many)
                 (= order-index how-many)))
           (when *debug* (format t "Order index ~a~%" order-index))
           (when *debug* (format t "Current max score ~a~%" max-score))
           (setq next-best-score -1)
           (dotimes (sent-index (length scores))
              (setq score (aref scores sent-index))
              (when (and (< score max-score)
                         (> score next-best-score))
                 (when *debug* (format t "Setting next best score to ~a~%" score))
                 (setq next-best-score score))
              (when (and (= score max-score)
                         (< best-index how-many))
                 (when *debug* (format t "Assigned a best sent ~a~%" sent-index))
                 (setf (aref best-ids best-index)
                       sent-index)
                 (incf best-index)))
           (setq max-score next-best-score))
        (do-who-analysis doc-id :verbose nil)
        (dotimes (index best-index)
           (format t "Score: ~40 for: " (aref scores (aref best-ids index)))
           (setq last-col (print-sent (aref (article-defn-words art)
                                            (aref best-ids index))
                                      (length "Score: xxxx for: ")
                                      t)))
        (terpri t)
        (terpri t))))
  (defun do-who-question (nr-analyses end-of-head &key (what nil)
                                                       (verbose nil))
     (let ((relevant-articles nil)
           (n-best-scores 5)
           (best-sent-vector (make-array 0 :adjustable t :fill-pointer 0))
           (best-art-vector (make-array 0 :adjustable t :fill-pointer 0))
           best-sent-ids doc-id)
        (dolist (query *query-list*)
           (dolist (doc-id (qr-defn-article-list query))
              (setq relevant-articles (pushnew doc-id relevant-articles))))
        (setq relevant-articles (nreverse relevant-articles))
        (when *qr-verbose*
           (format t "~a~%" (curr-word-str 0 (1- (length *original-query-words*))
```

```
;DSK;<project>markov>tr>p>dtagger>franz4.1>patent-source>basic-scoring.LSP.1    1-Jun-93 21:03:27
Page 7
                                        *original-query-words*)))
             (do ((analysis-count 0 (1- analysis-count))
                  (tail relevant-articles (cdr tail)))
                 ((or (null tail)
                      (= analysis-count nr-analyses)))
               (setq doc-id (car tail))
               (when *qr-verbose*
                 (format t "~a~%" (qr-cefn-query (find doc-id *query-list* :test
                                                       #'(lambda (x y)
                                                           (position x y))
                                                       :key
                                                       #'(lambda (x)
                                                           (qr-defn-article-list x))))))
               (setq best-sent-ids (test-scores doc-id n-best-scores end-of-head :verbose verbose))
               (vector-push-extend best-sent-ids best-sent-vector)
               (vector-push-extend doc-id best-art-vector))
             (setq *best-art-vector* best-art-vector)
             (setq *best-sent-vector* best-sent-vector)
             (when *qr-verbose* (format t "Creating Who Hypotheses..~%"))
             (do-who-hypos best-art-vector best-sent-vector :what what :verbose verbose)))
(defun do-who-hypos (best-art-vector best-sent-vec &key (what nil)
                                                        (verbose nil))
  (let (head-term-id np-starts np-ends who-np-hypo hypo-index curr-sent-index
        adjusted-title-words start-of-np end-of-np doc-id best-sents art composed-tokens
        np-wd-array art-np-starts art-np-ends word-vector word-str word hypo-not-present)
    (if (null *who-nypos*)
        (setq *who-nypos* (make-array 0 :adjustable t :fill-pointer 0))
        (setf (fill-pointer *who-nypos*)
              0))
    (dotimes (index (length best-art-vector))
      (setq doc-id (aref best-art-vector index))
      (setq art (get-article doc-id))
      (setq adjusted-title-words (do-adjusted-title doc-id))
      (setq art-np-starts (article-defn-np-starts art))
      (setq art-np-ends (article-defn-np-ends art))
      (setq best-sents (aref best-sent-vec index))
      (dotimes (best-index (length best-sents))
        (setq curr-sent-index (aref best-sents best-index))
        (setq np-starts (aref art-np-starts curr-sent-index))
        (setq np-ends (aref art-np-ends curr-sent-index))
        (setq composed-tokens (aref (article-defn-composed-tokens art)
                                    curr-sent-index))
        (dotimes (np-index (length np-starts))
          (setq start-of-np (aref np-starts np-index))
          (setq end-of-np (aref np-ends np-index))
          (setq head-term-id (aref composed-tokens (- *composed-term-id-offset*
                                                      (* *nr-token-features* end-of-np)
                                                      ))) 
          (setq word-vector (aref (article-defn-words art)
                                  curr-sent-index))
          (setq word (aref word-vector start-of-np))
;;;
;;; OBSOLETE-- 30 Oct 92 THIS IS A TEMPORARY APPROXIMATION --- If the head word in the np matches
;;; any head of the nps in the original question, don't put them in the list of hypotheses, on the
;;; assumption that the words of the answer are not present in the question.
;;;
;;; All NP's that contain words that all have word-initial capitals, are possible names, and so
;;; possible answer hypotheses
;;;
;;; If the NP is a single word ending in "." e.g. "Tex." "Apr." etc., then discard it because I've
;;; decided there aren't any single word titles that end in "."
;;; 30 Oct. 92 inhibited discard..NOTE THE AND NIL..Took out obsolete code 15 feb 93
          (when (or what (all-initial-caps word-vector start-of-np end-of-np))
            (setq word-str (curr-word-str start-of-np end-of-np word-vector))
            (if (or (and (= start-of-np end-of-np)
                         (> (length word)
                            3)
                         (char= #\. (char word (1- (length word)))))
                    (digit-char-p (char word 0)))
                (when verbose (format t "Discarded: ~a~%" word-str))
                (progn
;;;
;;; The word string is not really necessary, word matching can be done using sent-start and sent-end
;;;
```

```
[DSK]<project>markov>tr:vo>qtagger>franz4.1>patent-source>basic-scoring.LISP:1   3-Jun-93 21:09:27
Page 6
                                  (setq np-wd-array (subseq word-vector start-of-np (1+
                                                                                      end-of-np
                                                                                      )))
                                  (setq who-np-hypo
                                        (make-who-defn :hypo-name np-wd-array :title-ref nil
;;; The #'string-equal is so that Soyuz matches SOYUZ etc...        :score 0 :art-ref doc-id))
;;; 3 Nov. 1992. A simple (setq hypo-index (position np-wd-array *who-hypos* :test #'equalp :key
;;; #'(lambda (x) (who-defn-hypo-name x))) is not good enough here, because the hypo must also be
;;; matched against its art-ref. We might get a false string match for a string with different
;;; art-ref. This was happening when I stop discarding hypos that were included in the question
                                  (setq hypo-index (is-hypo-present np-wd-array doc-id))
                                  (setq hypo-not-present (null hypo-index))
                                  (when hypo-not-present
                                     (vector-push-extend who-np-hypo *who-hypos*)
                                     (when verbose (format t
                                         "Doc: ~5@A/Sent: ~A ~26,5T Who Hypo: ~A"
;;; Does this np refer to a person's name in the title of this article. If so mark with a "t"
                                     (when (and (article-defn-person-name-p art)
                                                (np-refers-to-title start-of-np end-of-np
                                                          word-vector adjusted-title-words))
                                        (when (and hypo-not-present verbose)
                                           (format t " : MAYBE ref. to PERSON title: ~a" doc-id
                                           ))
                                        (when (and hypo-not-present verbose)
                                           (format t "~%"))))))))
                        (rank-who-hypos best-art-vector best-sent-vec)
                        (when *gr-verbose* (print-who-hypos))))
(defun rank-who-hypos (best-art-vector best-sent-vec)
   (let (art doc-id adjusted-title-words best-sents curr-sent-index)
     (dotimes (index (length best-art-vector))
        (setq doc-id (aref best-art-vector index))
        (setq art (get-article doc-id))
        (setq adjusted-title-words nil)
;;;
;;; If a document has a person's name as its title, then extract the possible NP's in the title that
;;; serve as an answer hypothesis
;;;
        (when (article-defn-person-name-p art)
           (setq adjusted-title-words (article-defn-adjusted-who-title art))
           (when (null adjusted-title-words)
              (setq adjusted-title-words (get-adjusted-title doc-id))
              (setf (article-defn-adjusted-who-title art)
                    adjusted-title-words)))
        (setq best-sents (aref best-sent-vec index))
        (dotimes (sent-index (length best-sents))
           (setq curr-sent-index (aref best-sents sent-index))
           (score-who-hypos art adjusted-title-words curr-sent-index)))
     (setq *who-hypos* (sort *who-hypos* #'(lambda (x y)
                                              (> (who-defn-score x)
                                                 (who-defn-score y)))))))
(defun not-a-subsumed-hypo-str (hypo-index word-vector)
   (let (who-np-hypo hypo-wds nr-hypo-wds other-hypo-wds hypo-present (not-a-subsumed-hypo nil)
         article-reference other-hypo)
;;;
;;; See if the given who-hypo matches an NP in the given sentence, and there is not a longer
;;; who-hypo that also matches the same NP
;;;
      (setq who-np-hypo (aref *who-hypos* hypo-index))
      (setq hypo-wds (who-defn-hypo-name who-np-hypo))
      (setq article-reference (who-defn-art-ref who-np-hypo))
      (setq nr-hypo-wds (length hypo-wds))
      (setq hypo-present (search hypo-wds word-vector :test #'equalp))
      (when hypo-present
;;; The who hypo must be present in the given sentence !
         (setq not-a-subsumed-hypo t)
;;;
;;; There must not be a longer who hypo that subsumes this one
;;; e.g. If this hypo was "John F. Kennedy" and the sentence contained "President John F. Kennedy"
;;; which was another hypo, then only the latter one should match.
;;;
;;; 24 Nov 92 This is necessary but not sufficient.....e.g. Now "Bok" hypo in sent1 of doc 24261
;;; (Edward William Bok), does not receive score (163) for the sentence because it is included in a
```

```
:DSK:<project>markov>tr>v3>tagger>finan24.1>patent-source>basic-scoring.LISP.1    1-Jun-93 21:03:27
Page 3

;;; longer hypo 'Bok Syndicate Press' which unlike the Kennedy example, does not refer to the same
;;; thing. Bok will match Root: Edward William Bok. but 'Bok Syndicate Press' will not, yet it is
;;; carrying the score which 'Bok' hypo should have passed to......NEEDS TO BE FIXED SOMETIME.
;;; 21 April 93 Problem occurred again with a sentence containing "Sumo" and "six major sumo
;;; tournaments".  The protection is meant for repetitions of peoples names (e.g. 'Kennedy' 'John F.
;;; Kennedy') not to get twice the score they deserve.  So: Added a check that the last word
;;; (probably a surname) must match for subsumption to be allowed.
;;;
            (dotimes (index (length *who-hypos*))
                (setq other-hypo (aref *who-hypos* index))
                (setq other-hypo-was (who-defn-hypo-name other-hypo))
;;;
;;; all of the words in the subsumed str must be contained in the subsuming string!!!
;;;
;;; 17 Feb. 93 The subsuming hypo must be for the same art ref. as the hypo it subsumes. e.g. John
;;; F. KENNEDY/1089 cant be subsumed by  John F. Kennedy/13500. as otherwise there will be no
;;; instances generated for the former in score-who-hypos.....
;;;
                (when (and (= (who-defn-art-ref other-hypo)
                              article-reference)
                           (> (length other-hypo-was)
                              nr-hypo-was)
                           (search hypo-was other-hypo-was :test #'equalp)
                           (search other-hypo-was word-vector :test #'equalp))
;;; 21 April 93 added the requirement that the rightmost words (surnames hopefully) must also match
;;; for subsumption.
                    (when (string-equal (aref hypo-was (1- nr-hypo-was))
                                        (aref other-hypo-was (1- (length other-hypo-was))))
                        (setq not-a-subsumed-hypo nil)))))
        (values not-a-subsumed-hypo hypo-present)))
(defun untagged-match (matched-query-nps sent-index composed-tokens &key (verbose t))
;;;
;;; This function is a fail-safe for tagger errors made for an article, to allow word root matches
;;; to take place for query nps.  E.g. in article 4846 "...walked in space and returned...". space
;;; was mistagged as an adjective  and thus there was no sentence np for it. so there was no match
;;; for the query np 'space' because there were no other nps involving 'space' in the sentence.
;;; Rather than lose a possible match, assign a low score for any word root match in this case.
;;; (Thus does not lose anything that a conventional retrieval system would keep).
;;;
    (let ((start end term-id found (score 0)))
        (dotimes (index (length matched-query-nps))
            (when (null (aref matched-query-nps index))
                (setq start (aref *original-query-np-starts* index))
                (setq end (aref *original-query-np-ends* index))
                (do ((np-word-index start (1- np-word-index)))
                    ((> np-word-index end))
                    (setq term-id (aref *original-query-tokens* (+ *composed-term-id-offset*
                                                                    (* *nr-token-features*
                                                                       np-word-index))))
                    (when (setq found (position term-id composed-tokens))
                        (when verbose
                            (format t "Sent : ~a FAIL-SAFE match for ~a Score: ~a~%" sent-index
                                (aref *original-query-words* np-word-index)
                                *untagged-score*))
                        (incf score *untagged-score*)))))
        score))
(defun find-pronomial-ref (word-vector)
    (let ((pron-list '("he" "his" "him" "she" "hers" "her"))
          found)
;;;
;;; Pronomial reference can only add a score to a who hypo that was for a title, that is the same
;;; title as the article that the reference is in. Otherwise various different hypos all referring
;;; to the same person and passing the (flaky) test for being part of a title, will all get the
;;; same score, when it should only be allocated once.
;;; 26 Oct. 92.  Only perform pronomial scoring if there is NO OTHER who hypo that matches.
;;; otherwise the name will be scored twice in the sentence.
;;;
        (setq found nil)
        (do ((index 0 (1- index)))
            ((or found (= index (length word-vector))))
            (setq found (position (aref word-vector index)
                                  pron-list :test #'string-equal)))
        found))
(defun score-who-hypos (art adjusted-title-words curr-sent-index)
```

```
;;SX\<project>markov>trivo>otagger>franz4.1>patent-source>basic-scoring.LSP;1   3-Jun-93 21:03:27
Page 10

(let ((score-vec (article-defn-scores art))
              (doc-id (article-defn-article art))
              (title-ref-hypo nil)
              (title-ref-present nil)
              title-reference not-included-in-longer-hypo hypo-matched who-np-hypo hypo-wds
              word-vector)
          (setq word-vector (aref (article-defn-words art)
                                  curr-sent-index))
          (dotimes (hypo-index (length *who-hypos*))
            (setq who-np-hypo (aref *who-hypos* hypo-index))
            (setq hypo-wds (who-defn-hypo-name who-np-hypo))
            (setq title-reference (who-defn-title-ref who-np-hypo))
            (when (and title-reference (= title-reference doc-id))
              (setq title-ref-hypo (aref *who-hypos* hypo-index)))
;;;
;;; See if the words of the hypo occur in this sentence. If not try and see if the words of the
;;; hypo occur in the title and there is a personal pronoun in the sentence. If so we treat it as
;;; pronominal reference.
;;;
;;; 21 October 92 There is a problem with the test: (search (aref who-np-hypo 0) word-vector :test
;;; #'equalp). Because this hypo might be a shorter one e.g. "John F. Kennedy" that matches a
;;; string in the sentence that actually is longer and is another who hypo e.g. "President John F.
;;; Kennedy"... Thus the need for NOT-A-SUBSUMED-HYPO-STR
;;;
            (multiple-value-setq (not-included-in-longer-hypo hypo-matched)
              (not-a-subsumed-hypo-str hypo-index word-vector))
            (if not-included-in-longer-hypo
                (progn
;;; If hypo matching is article-dependent (see comment of 26 Oct. 92 in DO-WHO-HYPOS), there would
;;; need to be a test that document id's match in the (if not-subsumed....) test... 26 Oct. PUT THIS
;;; IN HERE
                  (when (= doc-id (who-defn-art-ref who-np-hypo))
                    (incf (who-defn-score who-np-hypo)
                          (aref score-vec curr-sent-index))
;;; remember the article and sent in which this hypo occurred
                    (add-instance who-np-hypo doc-id curr-sent-index)
                    (when (np-refers-to-title 0 (1- (length hypo-wds))
                                              hypo-wds adjusted-title-words)
                      (setq title-ref-present t))))))
          (when (null title-ref-present)
            (when (and title-ref-hypo (find-pronomial-ref word-vector))
              (incf (who-defn-score title-ref-hypo)
                    (aref score-vec curr-sent-index))
              (add-instance title-ref-hypo doc-id curr-sent-index)
              (when *gr-verbose*
                (format t "Article ~a: ~a -- Sent: ~a Pronominal Ref. found~%" (
                                                           article-defn-article
                                                           art)
                        (article-defn-title art)
                        curr-sent-index)
                (format t "------ Title Ref. ~a -- Hypo: ~a~%" (who-defn-title-ref
                                                                title-ref-hypo)
                        (who-defn-hypo-name title-ref-hypo)))))))
```

Kupiec

Document name: {DSK}<project>markov>trivp>qtagger>franz4.1 patent–source>query–formulation.LISP;1
Document date: Thu Jun 3 21:05:33 1993
Printing date/time: June 3, 1993 9:11:44 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
[DSK]<project>markov>trivo>atagger>franz4.1>patent-source>query-formulation..LISP:1    1-Jun-93 21:05:
Page 1

;;; -*- Package: USER; Syntax: Common-Lisp; Base: 10 -*-
;;; File converted on 20-May-93 16:45:02 from source query-formulation
;;;. Original source (dsk)<project>markov>trivo>atagger>franz4.1>query-formulation.;41 created 12-May-9
26:35
;;;. Copyright (c) 1989, 1990, 1991, 1992, 1993 by Xerox Corporation
(provide "QUERY-FORMULATION")
(in-package "USER")
;;; Shadow, Export, Require, Use-package, and Import forms should follow here
;;; File converted on 28-Nov-90 14:29:04 from source query-formulation Original source
;;; (piglet/n)<piglet>speech>kuolec>hmm>tagger>release>v3>query-formulation.;1 created 27-Nov-90
;;; 17:30:37 Copyright (c) 1989, 1990 by Xerox Corporation
(provide "QUERY-FORMULATION")
(in-package "USER")
;;; Shadow, Export, Require, Use-package, and Import forms should follow here
(defstruct article-defn "Holds info for a tagged grolier article" (article nil)
     (title nil)
     (person-name-p nil)
     (words nil)
     (composed-tokens nil)
     (scores nil)
     (q-np-scores nil)
     (np-starts nil)
     (np-ends nil)
     (adjusted-who-title nil)
     (visited nil)
     (best-hypo-q-nps nil)
     (best-q-sent-scores nil)
     (best-q-sent-ids nil)
     (best-art-q-scores nil)
     (best-art-q-sent-ids nil)
     (best-art-q-sent-scores nil))
(defstruct fsmvar-defn "fsm info for a static fsm" (name nil)
     (expr nil)
     (fsm nil))
(defstruct qr-defn "Holds component query word terms to enable queries to be ranked" (query "")
     (nr-terms-made 0)
     (italic-terms nil)
     (initial-cap-terms nil)
     (terms nil)
     (np-proximity nil)
     (broadened-scope -1)
     (nr-hits 0)
     (article-list nil)
     (extra-terms-in-articles nil))
(defstruct (root-defn)
     "This contains detailed info for a hypo instance"
     (sent-ref nil)
     (subsuming-hypo nil)
     (subsuming-sent)
     (subsuming-root))
(defstruct tp-defn "Holds info for a template" (name nil)
     (fsm-matcher nil)
     (fsm nil)
     (matching-args nil))
(defstruct tp-match-defn "Defines a template match" (name t)
     (doc-id nil)
     (sent nil)
     (start nil)
     (end nil)
     (hypo-np))
(defstruct (who-defn)
     "Definition for contents of a WHO hypothesis"
     (hypo-name nil)
     (title-ref nil)
     (what-title-ref nil)
     (score 0)
     (art-ref nil)
     (root-score 0)
     (instances nil)
     (rooted-instances nil)
     (template-matches nil)
     (root-template-matches nil)
     (type-match-preferences nil)
     (verb-match-preferences nil))
```

```
[DSK]<project>markov>trivia>qtagger>f-1nz4.1>patent-source>query-formulation._ISP:1    3-Jun-93 21:05
Page 2

(defparameter *article-tokenizer* nil)
(defvar *fsmvars*
    (list (make-fsmvar-defn :name "np-grammar" :expr
                '((((* (/ :adj :n :npl :single-abbr :number))
                    (? :prespart)
                    (* (/ :n :npl :abbrev :number :npr :day :month))
                    (* (/ :adj :n :npl :single-abbr))
                    (* (/ :npr))
                    (* (/ :n :npl))))))
          (make-fsmvar-defn :name "np-fsm-1" :expr
                '((? :det)
                  (* :adv)
                  (* (/ :adj :pastpart :n :npl :abbrev :single-abbr :number :npr :day :month))
                  (/ (! :det :adj)
                     (! (/ :det :adj)
                        (:prespart))
                     (! (/ :n :adj)
                        (:prespart)
                        (/ :n :npl))
                     :n :npl :abbrev :single-abbr :number :npr :day :month)))
          (make-fsmvar-defn :name "np-pp-1" :expr
                '(! (* (! np-fsm-1 (? :pastpart)
                          (/ :poss :prep :to-prep :by-prep :in-prep)))
                    np-fsm-1))
          (make-fsmvar-defn :name "np-pp-paren-1" :expr
                '(! (* (! np-fsm-1 (? :pastpart)
                          (/ :poss :prep :to-prep :by-prep :in-prep)))
                    np-fsm-1
                    (? (! :lparen (* :word)
                           :rparen))))
          (make-fsmvar-defn :name "np-pp-paren-list" :expr
                '(! (* (! np-pp-paren-1 :comma))
                    np-pp-paren-1
                    (? (! (? :comma)
                          (= :conj "and")
                          np-pp-paren-1))))
          (make-fsmvar-defn :name "dummy-types" :expr
                '((/ "julianmkupiec-0" "julianmkupiec-1" "julianmkupiec-2" "julianmkupiec-3"
                     "julianmkupiec-4" "julianmkupiec-5" "julianmkupiec-6" "julianmkupiec-7"
                     "julianmkupiec-8" "julianmkupiec-9")))
          (make-fsmvar-defn :name "np-fsm-dummy-1" :expr
                '((& (! (* :word)
                        dummy-types
                        (* :word)))
                  (? :det)
                  (* :adv)
                  (* (/ :adj :pastpart :n :npl :abbrev :single-abbr :number :npr :day
                        :month))
                  (/ (! :det :adj)
                     (! (/ :det :adj)
                        (:prespart))
                     (! (/ :n :adj)
                        (:prespart)
                        (/ :n :npl))
                     :n :npl :abbrev :single-abbr :number :npr :day :month)))
          (make-fsmvar-defn :name "np-pp-dummy-1" :expr
                '(! np-fsm-dummy-1 (* (! (? :pastpart)
                                         (/ :prep :to-prep :by-prep :in-prep)
                                         np-fsm-1))))
          (make-fsmvar-defn :name "np-pp-dummy-2" :expr '(! np-fsm-1 (+ (! (? :pastpart)
                                                                           :poss np-fsm-dummy-1))))
          (make-fsmvar-defn :name "np-pp-dummy-paren-1" :expr
                '(! (/ np-pp-dummy-1 np-pp-dummy-2)
                    (? (! :lparen (* :word)
                          :rparen))))))
(defvar *gr-verbose* t)
(defvar *italic-phrases* nil)
(defvar *italic-ref-copy* nil)
(defvar *italic-refs* nil)
(defvar *matched-query-nps* nil)
(defvar *min-nr-reserved-strings* 10)
(defvar *my-grolier-stop-list* '("the" "is" "of" "and" "a" "in" "he" "to" "it" "an" "was" "were"))
(defparameter *my-grolier-stop-table* (let ((table (make-hash-table :test 'equal)))
```

```
:DSK><project>markov>trivo>qtagger>franz4.1>catent-source>query-formulation.LISP:1    3-Jun-93 21:05:
Page 3
                                       (dolist (word *my-grolier-stop-list*)
                                           (setf (gethash word table)
                                                 t))
                                       table))
(defconstant *nr-token-features* 2)
(defvar *old-fsmvars*
    (list (make-fsmvar-defn :name "np-grammar" :expr
                  '((((* (/ :adj :n :npl :single-abbr :number))
                      (? :prespart)
                      (* (/ :n :npl :abbrev :number :nor :day :month))
                      (* (/ :adj :n :npl :single-abbr))
                      (* (/ :npr))
                      (* (/ :n :npl))))))
          (make-fsmvar-defn :name "np-fsm-1" :expr
                  '((? :det)
                    (* :adv)
                    (* (/ :adj :pastpart :n :npl :abbrev :single-abbr :number :npr :day :month))
                    (/ (! (/ :det :adj)
                          (:prespart))
                       (! (/ :n :adj)
                          (:prespart)
                       (/ :n :npl))
                    :n :npl :abbrev :single-abbr :number :npr :day :month)))
          (make-fsmvar-defn :name "np-pp-1" :expr
                  '(! (* (! np-fsm-1 (? :pastpart)
                            (/ :poss :prep :to-prep :by-prep :in-prep)))
                      np-fsm-1))
          (make-fsmvar-defn :name "np-pp-paren-1" :expr
                  '(! (* (! np-fsm-1 (? :pastpart)
                            (/ :poss :prep :to-prep :by-prep :in-prep)))
                      np-fsm-1
                      (? (! :lparen (* :word)
                            :rparen))))
          (make-fsmvar-defn :name "np-pp-paren-list" :expr
                  '(! (* (! np-pp-paren-1 :comma))
                      np-pp-paren-1
                      (? (! (? :comma)
                            "and" np-pp-paren-1))))))
(defvar *old-templates*
    (list (make-tp-defn :name "head-1" :fsm-matcher '(! (* :word)
                                                        ($ :prep :to-prep :by-prep :in-prep :adv)
                                                        np-pp-dummy-paren-1
                                                        (* :word)
                                                        ($ :prep :to-prep :by-prep :in-prep :adv)
                                                        np-pp-dummy-paren-1
                                                        (* :word)))
          (make-tp-defn :name "is-a-1" :fsm-matcher
                 '! np-pp-paren-1 (* (! (/ :scolon :comma)
                                        (* :word)
                                        (/ :scolon :comma)))
                    (? "which")
                    (/ "is" "was" "became")
                    np-pp-paren-1
                    (? (! "and" (? "is")
                          np-pp-paren-1
                          (? (! :punct (/ :scolon :comma)
                                :sent-boundary)))))
          (make-tp-defn :name "incl-1" :fsm-matcher '(& (! (* :word)
                                                           "frankenstein"
                                                           (* :word))
                                                        np-pp-paren-1))
          (make-tp-defn :name "simple-np-inclusion" :fsm-matcher '(! np-fsm-1))
          (make-tp-defn :name "is-a-dummy-1" :fsm-matcher
                 '(& (! (* :word)
                         np-pp-dummy-paren-1
                         (* :word)
                         np-pp-dummy-paren-1
                         (* :word))
                     (! np-pp-paren-1 (* (! (/ :scolon :comma)
                                            (* :word)
                                            (/ :scolon :comma)))
                        (? "which")
                        (/ (= ::s "is")
                           (= :was "was")
```

000044

```
[DSK]<project>markov>trivo>dtagger>franz4.l>patent-source>query-formulation.LISP:1  3-Jun-93 21:05
Page 4

(= :past "became"))
                                     np-pp-paren-1
                                     (? (! (= :conj "and")
                                           (? (= ::s "'s"))
                                        np-pp-paren-1))))
                  (make-tp-defn :name "list-or-appo-dummy-1" :fsm-matcher
                         '(& (! (* :word)
                                np-pp-dummy-paren-1
                                (* :word))
                             (! (* (! np-pp-paren-1 :comma))
                                np-pp-paren-1
                                (? (! (? :comma)
                                      (= :conj "and")
                                      np-pp-paren-1)))))
                  (make-tp-defn :name "are-dummy-1" :fsm-matcher
                         '(& (! (* :word)
                                np-pp-dummy-paren-1
                                (* :word))
                             (! np-pp-paren-1 list (/ (= :are "are")
                                                      (= :were "were")
                                                      (= :past "became")
                                                      (! (= :have "have")
                                                         (= :been "been"))
                                                      (! (/ (= :modal "shall")
                                                            (= :modal :v "will"))
                                                         (/ (= :be "be")
                                                            (! (= :have "have")
                                                               (= :been "been")))))
                                (? (/ "both" "all"))
                                np-pp-paren-1))))
                  (make-tp-defn :name "list-dummy-2" :fsm-matcher
                         '(& (! (* :word)
                                np-pp-dummy-paren-1
                                (* :word))
                             (! np-pp-paren-1 (/ (= :are "are")
                                                 (= :were "were")
                                                 (= :v "include")
                                                 (= :past "became")
                                                 (! (? :comma)
                                                    "such" "as")
                                                 (! (= :have "have")
                                                    (= :been "been"))
                                                 (! (/ (= :modal "shall")
                                                       (= :modal :v "will"))
                                                    (/ (= :be "be")
                                                       (! (= :have "have")
                                                          (= :been "been")))))
                                np-pp-paren-list)))
                  (make-tp-defn :name "other-dummy-1" :fsm-matcher
                         '(& (! (* :word)
                                np-pp-dummy-paren-1
                                (* :word))
                             (! (* (! np-pp-paren-1 :comma))
                                np-pp-paren-1
                                (? :comma)
                                (= :conj "and")
                                (/ (= :adj :n "other")
                                   "such"
                                   (= :adj "similar"))
                                np-pp-paren-1)))))
(defvar *original-query-italic-phrases* nil)
(defvar *original-query-italic-refs* nil)
(defvar *original-query-np-ends* nil)
(defvar *original-query-np-starts* nil)
(defvar *original-query-tokens* nil)
(defvar *original-query-verbs* nil)
(defvar *original-query-words* nil)
(defconstant *untagged-score* 10)
(defconstant *verb-match-score* 40)
(defvar *verb-phrase-templates* '("who-vb-act-np" "who-vb-pass-np"))
(defvar *who-hypos* nil)
(defvar *current-term-ids* (make-array *default-array-size* :adjustable t :fill-pointer 0))
(defvar *tagged-articles* nil)
(defvar *term-hash-table* nil)
```

```
[DSK]<project>markov>thivo>ctagger>franz4.1>patent-source>query-formulation.LISP:1   1-Jun-93 21:05.
Page 6

(defvar *type-phrase-templates* '(/"is-a-1" "are-1" "np-inclusion" "list-or-appo-1" "list-2" "other-1"
                                   :))
(defconstant *query-head-match-score* 43)
(defvar *query-italic-word-score* 30)
(defvar *query-list* nil)
(defvar *query-max-italic-score* 120)
(defvar *query-np-ends* nil)
(defconstant *query-no-match-score* 40)
(defvar *query-np-starts* nil)
(defparameter *query-tokenizer* nil)
(defconstant *query-type-head-inferred-score* 38)
(defconstant *query-type-inferred-score* 35)
(defvar *query-verbs* nil)
(defvar *query-words* nil)
(defconstant *composed-pos-offset* 0)
(defvar *composed-query-tokens* nil)
(defconstant *composed-term-id-offset* 1)
(defvar *composed-token-array* (make-array (* *nr-token-features* *default-array-size*)
                                            :adjustable t :fill-pointer 0))
(defvar *debug* nil)
(defvar *delimiters* nil)
(defvar *doc-id-hashtable* nil)
(defvar *np-end-indices* nil)
(defvar *np-start-indices* nil)
(defvar *templates*
        (list (make-tp-defn :name "who-vb-act-np" :fsm-matcher
                    '(! "who" (? :modal)
                        (* :adv)
                        (/ (! (/ :has :have :had)
                              (* :adv)
                              :pastpart)
                           (! (/ :is :was :were :are)
                              :prespart)
                           (/ :past :v3sg :v))
                        (* :adv)
                        np-pp-1))
              (make-tp-defn :name "who-vb-pass-np" :fsm-matcher
                    '(! "who" (? :modal)
                        (* :adv)
                        (/ (! (? (/ "shall" "will"))
                              (/ :has :have :had)
                              (* :adv)
                              :been :pastpart)
                           (! (? (/ "shall" "will"))
                              :be :pastpart)
                           (! (/ :is :was :were :are)
                              :being :pastpart)
                           (! (/ :was :were)
                              :pastpart))
                        :by-prep np-pp-1))
              (make-tp-defn :name "head-1" :fsm-matcher
                    '(! (? (! (* :word)
                              ($ :prep :to-prep :by-prep :in-prep :det :adv :adj :pastpart :n :npl
                                 :abbrev :single-abbr :number :npr :day :month)))
                        np-pp-dummy-paren-1
                        (? (! (* :word)
                              ($ :prep :to-prep :by-prep :in-prep :det :adv :adj :pastpart :n :npl
                                 :abbrev :single-abbr :number :npr :day :month)))
                        np-pp-dummy-paren-1
                        (* :word)))
              (make-tp-defn :name "who-or-what-is-np" :fsm-matcher
                    '(! (/ (/ "which" "what")
                           (! (/ "who" "which" "what")
                              (/ (= :is "is")
                                 (= :was "was")
                                 (= :are "are")
                                 (= :were "were")
                                 (= :past "became")
                                 (! (/ (= :have "have")
                                       (= :has "has"))
                                    (= :been "been"))
                                 (! (/ (= :modal "shall")
                                       (= :modal :v "will"))
                                    (/ (= :be "be")
```

```
;[DSK]<project>markov>tr-vp>qtagger>franz4.1>patent-source>query-formulation.LISP:1   3-Jun-93 21:0
Page 6
                                    (! (= :have "have")
                                       (= :been "been"))))))
                        np-pp-1))
            (make-tp-defn :name "is-a-1" :fsm-matcher
                '(! np-pp-paren-1 (* (! (/ :scolon :comma)
                                        (* :word)
                                        (/ :scolon :comma)))
                    (? "which")
                    (/ (= :is "'s")
                       (= :was "was")
                       (= :past "became"))
                    np-pp-paren-1
                    (? (! (= :conj "and")
                          (? (= :is "'s"))
                          np-pp-paren-1))))
    (make-tp-defn :name "np-inclusion" :fsm-matcher '(! np-pp-1))
    (make-tp-defn :name "type-head-np" :fsm-matcher '(! np-pp-dummy-paren-1))
    (make-tp-defn :name "np-dummy" :fsm-matcher '(! np-fsm-dummy-1))
    (make-tp-defn :name "word-dummy" :fsm-matcher '(! dummy-types))
    (make-tp-defn :name "list-or-appo-1" :fsm-matcher
            '(! (+ (! np-pp-paren-1 :comma))
                np-pp-paren-1
                (? (! (? :comma)
                      "and" np-pp-paren-1))))
    (make-tp-defn :name "are-1" :fsm-matcher
        '(! np-pp-paren-list (/ (= :are "are")
                                (= :were "were")
                                (= :past "became")
                                (! (= :have "have")
                                   (= :been "been"))
                                (! (/ (= :modal "shall")
                                      (= :modal :v "will"))
                                   (/ (= :be "be")
                                      (! (= :have "have")
                                         (= :been "been")))))
            (? (/ "both" "all"))
            np-pp-paren-1))
    (make-tp-defn :name "list-2" :fsm-matcher
        '(! np-pp-paren-1 (/ (= :are "are")
                             (= :were "were")
                             (= :v "include")
                             (= :past "became")
                             (! (? :comma)
                                "such" "as")
                             (! (= :have "have")
                                (= :been "been"))
                             (! (/ (= :modal "shall")
                                   (= :modal :v "will"))
                                (/ (= :be "be")
                                   (= :have "have")
                                   (= :been "been"))))
            np-pp-paren-list))
    (make-tp-defn :name "other-1" :fsm-matcher '(! (* (! np-pp-paren-1 :comma))
                                                   np-pp-paren-1
                                                   (? :comma)
                                                   (* :conj "and")
                                                   (/ (= :adj :n "other")
                                                      "such"
                                                      (= :adj "similar"))
                                                   np-pp-paren-1))))
(defvar *sorted-q-np-scores* nil)
(defvar *sorted-type-ranking* nil)
(defun apply-fsm-op (op expr nr-args-expected)
    (let (dummy-sub-expr)
        (when (and (/= nr-args-expected -1)
                   (/= nr-args-expected (1- (length expr))))
            (error "Wrong number of Args in fsm expr ~a actual/expected ~a/~a op: ~a%" expr
                (length expr)
                nr-args-expected op))
        (apply op (loop for dummy-sub-expr in (cdr expr)
                        collect
                        (new-expr-to-fsm dummy-sub-expr)))))
(defun apply-stop-word-filter (word-vector start end)
    (let ((nr-stop-words 0)
```

```
[DSK]<project>markov>trive>qtagger>franz4.1>patent-source>query-formulation.LISP:1    3-Jun-93 21:05
Page 7

(actual-start nil)
                   actual-end
                   (word-indices (make-array 0 :fill-pointer 0 :adjustable t))
                   word nr-non-stop-terms scope)
                  (do ((index start (1- index)))
                      ((> index end))
                    (setq word (aref word-vector index))
                    (if (gethash (string-downcase word)
                                 *my-grolier-stop-table*)
                        (incf nr-stop-words)
                      (progn (when (null actual-start)
                               (setq actual-start index))
                             (setq actual-end index)
                             (vector-push-extend index word-indices))))
                  (setq nr-non-stop-terms (1+ (- end start nr-stop-words)))
                  (if (> nr-non-stop-terms 0)
                      (setq scope (if (> nr-non-stop-terms 1)
                                      nr-stop-words
                                    0))
                    (progn (setq actual-start start)
                           (setq actual-end end)
      ;;; The phrase was composed completely of stop words, don't throw them all away
                           (do ((index start (1+ index)))
                               ((> index end))
                             (vector-push-extend index word-indices))
                           (setq scope 0)))
                  (list scope word-indices)))
(defun case-split-nps (fsm word-vector composed-tokens start end &key (quiet nil))
  ;;;
  ;;; If there are case changes in the words of the NP split them apart and see if the components are
  ;;; still nps, if so include them. If not exclude them, and if no case changes, just copy the
  ;;; maximal NP.
  ;;;
  (let ((last-case curr-case index (last-start-index start))
        (setq last-case (upper-case-p (char (aref word-vector start)
                                            0)))
        (setq index last-start-index)
        (do nil
            ((> index end))
          (setq curr-case (upper-case-p (char (aref word-vector index)
                                              0)))
          (if (null (eql curr-case last-case))
              (progn (when *debug*
                       (format t "Case change at ~a~%" index)
                       (format t "Checking possible NP: ~a~%" (curr-word-str last-start-index
                                                                            (1- index)
                                                                            word-vector)))
                     (when (np-match fsm last-start-index (1- index)
                                     composed-tokens)
                       (when (and *gr-verbose* (null quiet))
                         (format t "Case split for NP: ~a~%" (curr-word-str last-start-index
                                                                           (1- index)
                                                                           word-vector)))
                       (vector-push-extend last-start-index *np-start-indices*)
                       (vector-push-extend (1- index)
                                           *np-end-indices*))
                     (setq last-case curr-case)
                     (setq last-start-index index)))
          (incf index))
        ;;; Need to check last one Eg. "Willie Mosconi famed" where famed was and adj. was accepting fame
        ;;; as a Final NP
        (when (and (<= last-start-index end)
                   (np-match fsm last-start-index end composed-tokens))
          (when (and *gr-verbose* (null quiet))
            (format t "Final NP: ~a~%" (curr-word-str last-start-index (1- index)
                                                     word-vector)))
          (vector-push-extend last-start-index *np-start-indices*)
          (vector-push-extend (1- index)
                              *np-end-indices*))))
(defun compose-tokens (model &key (stem t))
  (let ((term-id nil)
        word the-term (default-extension 1000))
    (setf (fill-pointer *composed-token-array*)
          0)
```

000048

```
DSK:<project>markov>trevo>dtagger>finzl4.lispatent-source>query-formulation.LISP.1    1-Jun-93 21:05
Page 5

(setf (fill-pointer *current-term-ids*)
                0)
          (dotimes (index (length *current-words*))
              (setq word (aref *current-words* index))
              (setf (fill-pointer *downcase-buffer*)
                    0)
              (dotimes (index (length word))
                  (vector-push-extend (char-downcase (char word index))
                                      *downcase-buffer* *default-string-extension*))
              (setq the-term word)
              (when stem
                (setq the-term (get-stem word)))
              (when (hash-table-p *term-hash-table*)
                (setq term-id (gethash word *term-hash-table*))
                (when (and (null term-id)
                           stem)
                   (setq term-id (gethash the-term *term-hash-table*))))
              (when (null term-id)
                (setq term-id *null-term-hash-val*))
              (vector-push-extend term-id *current-term-ids* default-extension)
              (vector-push-extend (find-base-state model (aref rhmm:*viterbi-states* (1+ index)))
                                  *composed-token-array* default-extension)
              (vector-push-extend term-id *composed-token-array* default-extension))))
(defun curr-word-str (start end-inclusive &optional (word-array nil))
    (let ((word-str ""))
         (do ((index start (1- index)))
             ((> index end-inclusive))
           (setq word-str (concatenate 'string word-str (if (> index start)
                                                            " "
                                                            "")
                                       (if word-array
                                           (aref word-array index)
                                           (aref *current-words* index)))))
         (format nil "~a" word-str)))
(defun do-phrase-extension (query-np-fsm word-vector composed-tokens use-disjunctions np-proximity
                                          term-elimination np-index)
    (let ((term-occurrence 0)
          proximity)
         (do ((tail '(1 5 10 20 40)
                    (cdr tail)))
             ((or (> term-occurrence 0)
                  (null tail)))
           (when *gr-verbose* (format t "Extending proximity: "))
           (setq term-occurrence (get-phrase-occurrence query-np-fsm word-vector composed-tokens
                                                       np-index (car tail)))
           (setq proximity (car tail)))
;;; If still failed use a disjunctive query as a final resort
         (when (and use-disjunctions (= term-occurrence 0))
           (when *gr-verbose* (format t "Switching to disjunction: "))
;;;
;;; NOTE proximity of nil means disjunction. see MAKE-NP-QUERY-STR
;;;
           (setq term-occurrence (get-phrase-occurrence query-np-fsm word-vector composed-tokens
                                                       np-index nil))
           (setq proximity nil))
         (setf (aref np-proximity np-index)
               proximity)
         (setf (aref term-elimination np-index)
               (cons term-occurrence np-index))))
(defun drop-or-broaden-single-np (word-vector mode nr-non-zero-nps term-elimination np-proximity
                                              broadening-list max-hits subsumption-limit)
    (let (dropped-np-index np-start np-end saved-proximity)
         (do ((drop-index 0 (1+ drop-index)))
             ((= drop-index nr-non-zero-nps))
;;; Dont extend scope for a -1 drop-index. i.e. for all nps
           (setq dropped-np-index (car (aref term-elimination drop-index)))
;;;
;;; fiddle with NP-PROXIMITY to get desired phrase proximity
;;; NOTE therefore can use -1 for loosening internal np scope. and wil main verb addition and
;;; scoping each time.
;;;
;;; If broadening dont bother broadening nps that only have one word.
;;; Don't broaden italic phrases either
           (setq np-start (aref *np-start-indices* dropped-np-index))
```

```
[SK]<project>markov>thrive>dtagger>franz4.1>patent-source>query-formulation.LISP.1    1-Jun-93 21.05
Page 9

(setq np-end (aref *np-end-indices* dropped-np-index))
                  (when (and (= mode 0)
                             (= np-start np-end))
                    (when *gr-verbose*
                      (format t "Broadening: ~a~%" (curr-word-str np-start np-end word-vector)))
;;;
;;; Scope may have already been extended, so pick the max of the existing value or 40.  Only doing a
;;; single extension here.
;;; If the No occurrence count is zero then it has already been tried for extension and failed, so
;;; don't need to override the test:
;;;
;;;  () (car (aref term-elimination (position np-index term-elimination :key #'cdr))) 0)
;;; in MAKE-FULL-QUERY-STR
;;;
                  (dolist (boadening-proximity broadening-list)
                    (setq saved-proximity (aref np-proximity dropped-np-index))
                    (when (> boadening-proximity saved-proximity)
                      (setf (aref np-proximity dropped-np-index)
                            boadening-proximity)
                      (grolier-queries-cont term-elimination np-proximity -1 max-hits
                                            subsumption-limit)
                      (setf (aref np-proximity dropped-np-index)
                            saved-proximity))))
                  (when (= mode 1)
                    (when *gr-verbose*
                      (format t "Dropping: ~a~%" (curr-word-str np-start np-end word-vector)))
                    (grolier-queries-cont term-elimination np-proximity dropped-np-index max-hits
                                          subsumption-limit)))))
(defun drop-two-nps (word-vector nr-non-zero-nps term-elimination np-proximity max-hits
                     subsumption-limit)
  (let (np-start np-end omitted-np-index dropped-np-index)
    (do ((omit-index 0 (1+ omit-index)))
        ((= omit-index nr-non-zero-nps))
      (setq omitted-np-index (cdr (aref term-elimination omit-index)))
      (when *gr-verbose*
        (format t "Omitting: ~a~%" (curr-word-str (aref *np-start-indices* omitted-np-index
                                                        )
                                                  (aref *np-end-indices* omitted-np-index)
                                                  word-vector)))
      (do ((drop-index 0 (1+ drop-index)))
          ((= drop-index nr-non-zero-nps))
        (when (/= omit-index drop-index)
          (setq dropped-np-index (cdr (aref term-elimination drop-index)))
;;;
          (setq np-start (aref *np-start-indices* dropped-np-index))
          (setq np-end (aref *np-end-indices* dropped-np-index))
          (when *gr-verbose*
            (format t "Dropping 2nd term: ~a~%" (curr-word-str np-start np-end
                                                               word-vector)))
          (grolier-queries-cont term-elimination np-proximity dropped-np-index max-hits
                                subsumption-limit :omit-np omitted-np-index))))))
(defun except-fsm (expr)
  (let ((returned-fsm nil)
        (pos-list (remove-if-not #'(lambda (x)
                                     (position (intern (symbol-name x)
                                                       "KEYWORD")
                                               *ordered-state-list*))
                                 (cdr expr))))
    (if (= (length pos-list)
           (length (cdr expr)))
        (setq returned-fsm (fsm:concat-fsm
                            (fsm:sigma-but (map 'list
                                                #'(lambda (x)
                                                    (position (intern (symbol-name
                                                                       x)
                                                                      "KEYWORD")
                                                              *ordered-state-list*))
                                                pos-list))
                           (fsm:sigma-but)))
        (error "~s: has member not in *ordered-state-list*~%" expr))
    returned-fsm))
(defun extract-verbs (word-vector composed-tokens np-starts np-ends)
  (let ((verb-list nil)
        base-state pos)
```

```
[DSK]<project>markov>trivp>qtagger>franz4.1>patent-source>query-formulation.LISP:1    3-Jun-93 21:05
Page 10

(dotimes (index (length word-vector))
                        ;; account for initial sent-boundary that prefixes codewords (1+ index)--DOES NOT IN
                        ;; COMPOSED CODEWORDS TOOK OUT 1 oct 92
                        (setq base-state (aref composed-tokens (- *composed-pos-offset* (*
                                                                                          *nr-token-features*
                                                                                          index))))
                        ;; mustn't be a pastpart that is in an NP. modals and is, was, have etc are separate
                        ;; states so don't need to account for them in the current tagger
                        (setq pos (nth base-state *ordered-state-list*))
                        (when (position pos '(:v :v3sg :past :pastpart))
                            (if (eq pos :pastpart)
                                (let ((inside-an-np nil))
                                    (dotimes (index (length np-starts))
                                        (when (and (>= index (aref np-starts index))
                                                   (<= index (aref np-ends index)))
                                            (setq inside-an-np t)))
                                    (when (null inside-an-np)
                                        (setq verb-list (pushnew index verb-list))))
;;;
                                (setq verb-list (pushnew index verb-list)))))
              verb-list))
(defun find-base-state (model state-index)
    (let ((tied-state-matrix (rhmm::nmm-defn-tied-states model)))
        (if (>= state-index (length *ordered-state-list*))
            (aref tied-state-matrix state-index)
            state-index)))
(defun find-italicized-phrase (word-vector composed-tokens query-np-fsm)
    (let ((matched nil)
          (apostrophe-posn (position :apostrophe *ordered-state-list*))
          nr-hits filtered-phrase)
;;;
;;; Phrases in italics in Trivial Pursuit questions are represented by enclosing quotes
;;; '' Currently the open qote doesn't have a category so it can't be recognized with the FSM (it
;;; is :punct)
;;;
        (setq *italic-refs* (make-array (length word-vector)
                                         :initial-element nil))
        (do ((start-index 0 (if matched
                                (1+ matched)
                                (1+ start-index))))
            ((= start-index (length word-vector)))
            (setq matched nil)
            (when (char= #\' (char (aref word-vector start-index)
                                    0))
                (setq matched (let (found)
                                (do ((end-index (1+ start-index)
                                                 (1+ end-index)))
                                    ((or (setq found (eql apostrophe-posn
                                                          (aref composed-tokens
                                                                (- *composed-pos-offset*
                                                                   (* *nr-token-features*
                                                                      end-index))))))
                                     (= end-index (length word-vector)))
                                    (if found
                                        (1- end-index)
                                        nil)))))
            (if matched
                (when (>= matched (1+ start-index))
;;; Above, if no words between open and close quote, then no phrase,
                    (setq filtered-phrase (apply-stop-word-filter word-vector (1+ start-index)
                                                                    matched))
;;;
;;; If longer than an existing noun phrase remember it. IF it occurs in groliers and mark its extent
;;; in *ITALIC-REFS*
;;;
                    (setq nr-hits (get-phrase-occurrence query-np-fsm word-vector
                                                          composed-tokens nil nil :italic-phrase filtered-phrase
                                                          ))
                    (when *gr-verbose*
                        (format t "~a hits for Italic phrase covering : ~a~%" nr-hits
                                (curr-word-str (1+ start-index)
                                               matched word-vector)))
                    (when *debug*
                        (format t "Italic phrase MARKED from ~a to ~a~%" (1+ start-index)
```

```
[DSK:<project>markov>th/o>qtagger>franz4.1>patent-source>query-formulation.LISP:1    3-Jun-93 21:05:
Page 11
                                matched))
                         (do ((index (1- start-index)
                                     (1+ index)))
                             ((> index matched))
                           (setf (aref *italic-refs* index)
                                 (fill-pointer *italic-phrases*))
    ;;;
    ;;; All italic nps are remembered, they are only marked for later use if they have non zero
    ;;; occurrences and aren't covered by existing nps. The ocurrences are appended here
    ;;;
    ;;; 26 Apr 93. If I change this from a list to a vector, I will have to change the (copy-seq...) in
    ;;; (ask..) otherwise internal structure won't be copied
    ;;;
                         (vector-push-extend (append filtered-phrase (list nr-hits))
                                             *italic-phrases*))
                       (format t "WARNING: No Matching CLOSE quote for italicized phrase~%")))))))
(defun find-maximal-nps (fsm delimiters word-vector composed-tokens &key (start 0)
                              (end (length word-vector))
                              (quiet nil)
                              (case-split t))
  (let ((end-index-copy 0)
        (found nil))
    (setf (fill-pointer *np-start-indices*)
          0)
    (setf (fill-pointer *np-end-indices*)
          0)
    (when (and nil *debug*)
      (format t "-------------~%Len(~a) ~a~%" (length word-vector)
              word-vector)
      (format t "~%~a~%" composed-tokens))
    (setq end-index-copy -1)
    (do ((start-index start (1+ start-index)))
        ((>= start-index end))
      (setq found nil)
      (when (> start-index end-index-copy)
        (when (and nil *debug*)
          (format t "start: ~a " start-index))
        (do ((end-index start-index (1+ end-index)))
            ((or (>= end-index end)
                 (position (aref composed-tokens (+ *composed-pos-offset* (*
                                                                           *nr-token-features*
                                                                           end-index)))
                           delimiters)))
          (when (and nil *debug*)
            (format t " end: ~a~%" end-index))
          (when (np-match fsm start-index end-index composed-tokens)
            (setq end-index-copy end-index)
            (when *debug* (format t "find-maximal-nps: Match from ~A to ~A~%" start-index
                                  end-index))
            (setq found t))))
      (when found
        (if case-split
            (case-split-nps fsm word-vector composed-tokens start-index end-index-copy
                            :quiet quiet)
            (progn (vector-push-extend start-index *np-start-indices*)
                   (vector-push-extend end-index-copy *np-end-indices*)))))
    (when (and nil *debug*)
      (format t "~%"))))
(defun find-nr-useable-italic-phrases (italic-phrases italic-refs)
  (let ((count 0))
    ;;; A useable italic phrase has non zero occurrence and isnt exactly the same extent as an existing
    ;;; np.
    (dotimes (index (length italic-phrases))
      (when (> (third (aref italic-phrases index))
               0)
        (when (null (same-extent-as-np italic-refs index))
          (incf count))))
    count))
(defun find-nr-useable-nps (term-elimination)
  (let ((count 0))
    (dotimes (index (length term-elimination))
      (when (> (car (aref term-elimination index))
               0)
        (incf count)))))
```

```
DSK)<project>markov>trivp>qtagger>franz4.1>patent-source>query-formulation.LISP.1    3-Jun-93 21:05
Page 12 count))
    (defun find-strings (wds-so-far the-list)
        (let (new-wds (returned-wds was-so-far))
            (dolist (el the-list)
                (if (stringp el)
                    (setq returned-wds (pushnew el returned-wds :test #'string=))
                    (when (listp el)
                        (when (setq new-wds (find-strings wds-so-far el))
                            (setq returned-wds (if returned-wds
                                                   (append returned-wds new-wds)
                                                   new-wds))))))
            returned-wds))
    (defun get-fsmvar (name &optional (make-copy t))
        (let (fsmvar)
            (setq fsmvar (find name *fsmvars* :key #'fsmvar-defn-name :test #'string-equal))
            (if fsmvar
                (if make-copy
                    (fsm:copy-fsm (fsmvar-defn-fsm fsmvar))
                    (fsmvar-defn-fsm fsmvar)))))
    (defun get-phrase-occurrence (query-np-fsm word-vector composed-tokens np-index word-sep &key
                                  (italic-phrase nil))
        (let ((return-val nil)
              (query nil))
    ;;;
    ;;; The term freq includes multiple mentions in different documents. we want the same kind of count
    ;;; as for other phrases --- or different docs. so don't use term-frequency as count for single
    ;;; words
    ;;;
            (if italic-phrase
                (setq query (make-italic-query-str word-vector italic-phrase))
                (let ((np-start (aref *np-start-indices* np-index))
                      (np-end (aref *np-end-indices* np-index)))
                    (when (np-match query-np-fsm np-start np-end composed-tokens)
                        (setq query (make-np-query-str word-vector np-start np-end word-sep)))))
    ;;; add an arg to only return count and not build list...speed things up.
            (when query
                (concordance::my-boolean-search (concordance::parse-boolean-query query
                                                 concordance::*tdb*)
                  concordance::*tdb* nil)
                (setq return-val (length concordance::*doc-id-list*))
                (when *gr-verbose*
                    (format t "~a hits for ~a query: ~a~%" return-val (if italic-phrase
                                                                          "Italic"
                                                                          "Noun")
                            query)))
            return-val))
    (defun get-stem (word)
        (let ((word-downcase (string-downcase word)))
    ;;; Use a buffer.---12 March 93 lookup-stem needs a simple-string.
            (or (twol-stemmer::lookup-stem word-downcase)
                word-downcase)))
    (defun grolier-queries-cont (term-elimination proximity-array drop-index max-hits subsumption-limit
                                 &key (use-italic-phrases nil)
                                      (only-italic-phrases nil)
                                      (omit-np nil))
    ;;;
    ;;; This is an approximation which will only drop single terms, and not modify the internal extent
    ;;; of compund nps' e.g. by dropping the first/last words.
    ;;; what about (valid-subquery)
    ;;;
        (let ((max-query-recall max-hits)
              (nr-non-zero-nps (find-nr-useable-nps term-elimination))
              (verb-query nil)
              nr-hits full-query nr-terms-made qr-struc)
            (setq qr-struc
                  (make-full-query *current-words* term-elimination proximity-array drop-index nil
                                   *italic-phrases* *italic-refs* subsumption-limit :use-italic-phrases
                                   use-italic-phrases :omit-np omit-np :only-italic-phrases only-italic-phrases
                                   ))
            (setq full-query (qr-defn-query qr-struc))
            (setq nr-terms-made (qr-defn-nr-terms-made qr-struc))
    ;;; add an arg to only return count and not build list...speed things up.
            (setq nr-hits (qr-defn-nr-hits qr-struc))
            (when *gr-verbose*
```

```
:DSK\<project>markov>trivp>qtagger>franz4.1>patent-source>query-formulation.LISP:1   3-Jun-93 21:05:
Page 13

(format t "~a hits for Complete Query: ~a~%" nr-hits full-query)
               (when (> nr-hits 0)
                   (print-query-info qr-struc))
               (when (< nr-hits 25)
                   (print-doc-id-list))))
;;; 20 April don't broaden or narrow italic phrase queries...
          (when (and (null only-italic-phrases)
                     (= drop-index -1)
                     (> nr-terms-made 0)
                     (> nr-hits max-query-recall)
                     (= nr-non-zero-nps (length *np-start-indices*)))
;;; Use main verb if I have a lot of hits, and all noun phrases occur at least once so that there is
;;; reason to believe all the verbs arguments are present - otherwise it will be introducing
;;; noise....
            (setq verb-query (extract-verbs *current-words* *composed-token-array*
                                            *np-start-indices* *np-end-indices*))
            (when verb-query
              (when *qr-verbose* (format t "Adding main verbs..~%"))
              (setq qr-struc (make-full-query *current-words* term-elimination proximity-array
                                  drop-index nil *italic-phrases* *italic-refs*
                                  subsumption-limit :add-verb-query verb-query
                                  :use-italic-phrases use-italic-phrases))
              (setq full-query (qr-defn-query qr-struc))
              (setq nr-terms-made (qr-defn-nr-terms-made qr-struc))
              (setq nr-hits (qr-defn-nr-hits qr-struc))
              (when *qr-verbose*
                (format t "~a hits for Query incl. main verb(s): ~a~%" nr-hits full-query)
                (when (> nr-hits 0)
                  (print-query-info qr-struc))
                (when (< nr-hits 20)
                  (print-doc-id-list)))))
;;; No point narrowing a single query term
;;; 20 April 93 ... or title phrases on their own
          (when (and (null only-italic-phrases)
                     (> nr-terms-made 1)
                     (= drop-index -1))
            (do ((tail '(40 20 10 5)
                       (cdr tail)))
                ((or (< nr-hits max-query-recall)
                     (null tail)))
              (setq qr-struc (make-full-query *current-words* term-elimination proximity-array
                                  drop-index (car tail)
                                  *italic-phrases* *italic-refs* subsumption-limit
                                  :add-verb-query verb-query :use-italic-phrases
                                  use-italic-phrases :omit-np omit-np))
              (setq full-query (qr-defn-query qr-struc))
              (setq nr-terms-made (qr-defn-nr-terms-made qr-struc))
              (setq nr-hits (qr-defn-nr-hits qr-struc))
              (when (> nr-hits 0)
                (print-query-info qr-struc))
              (when *qr-verbose*
                (format t "~a hits for Narrowed Query: ~a~%" nr-hits full-query)
                (when (< nr-hits 20)
                  (print-doc-id-list)))))
;;;
;;; Eliminate sub queries... fewer words with same result.
;;;
;;; If toomany narrow range and try again -- maybe include main verb first?
;;; if not enough, drop a term
;;;
))
(defun identical-query-terms (q1 q2)
    (and (equal (qr-defn-italic-terms q1)
                (qr-defn-italic-terms q2))
         (equal (qr-defn-initial-cap-terms q1)
                (qr-defn-initial-cap-terms q2))
         (equal (qr-defn-terms q1)
                (qr-defn-terms q2))))
(defun in-a-noun-phrase (italic-phrase-index italic-phrases italic-refs)
     (let ((inside nil)
            np-start np-end italic-start italic-end)
;;; See if the given italic phrase overlaps one or more NP's
          (dotimes (np-index (length *np-start-indices*))
               (setq np-start (aref *np-start-indices* np-index))
```

```
[JSK]<project>markov>tr-/o>qtagger>franz4.1>patent-source>query-formulation.LISP:1   3-Jun-93 21:05:
Page 14

(setq np-end (aref *np-end-indices* np-index))
                    (setq italic-start (aref italic-refs np-start))
                    (setq italic-end (aref italic-refs np-end))
                 (when (or (and italic-start (= italic-phrase-index italic-start))
                           (and italic-end (= italic-phrase-index italic-end)))
;;; An italic phrase must occur to be considered as being in an np
                   (when (> (third (aref *italic-phrases* italic-phrase-index))
                            0)
                     (setq inside t))))
          inside))
(defun in-italic-phrase (use-italic-phrases query-np-index)
     (let ((inside nil)
           (np-start (aref *np-start-indices* query-np-index))
           (np-end (aref *np-end-indices* query-np-index))
           index)
;;; If an italic phrase has zero hits it is recorded and marked, but is not useable in any query.
       (when (and use-italic-phrases (setq index (or (aref *italic-refs* np-start)
                                                     (aref *italic-refs* np-end)))
                  (> (third (aref *italic-phrases* index))
                     0))
          (setq inside t))
       inside))
(defun make-atomic-fsm (expr &key (complete-feature t))
     (let (string-token symbol-token (returned-fsm nil)
           (is-an-fsm nil)
           (string-fsm (fsm:sigma-out))
           (number-fsm (fsm:sigma-out))
           (sym-fsm (fsm:sigma-out)))
        (typecase expr
           (string (if (setq string-token (gethash expr *term-hash-table*))
                       (progn (setq string-fsm (fsm:symbol-fsm string-token))
                              (setq returned-fsm string-fsm))
                       (error "~s not in term hashtable~%" expr)))
           (number
               (error "numbers not currently allowed in FSM's~%")
               (setq number-fsm (fsm:symbol-fsm expr))
               (setq returned-fsm number-fsm))
           (symbol (if (setq is-an-fsm (get-fsmvar (symbol-name expr)))
                       (setq returned-fsm is-an-fsm)
                       (if (setq symbol-token (position (intern (symbol-name expr)
                                                                "KEYWORD")
                                                        *ordered-state-list*))
                           (progn (setq sym-fsm (fsm:symbol-fsm symbol-token))
                                  (setq returned-fsm sym-fsm))
                           (if (eq :word (intern (symbol-name expr)
                                                 "KEYWORD"))
                               (setq returned-fsm sym-fsm)
                               (format t "WARNING: ~s not in *ordered-state-list*~%" expr))))))
        (if (and (null is-an-fsm)
                 complete-feature)
            (fsm:concat-fsm sym-fsm string-fsm)
            returned-fsm)))
(defun make-full-query (word-vector term-elimination np-proximity drop-index word-sep italic-phrases
                        italic-refs subsumption-limit &key (add-verb-query nil)
                        (use-italic-phrases nil)
                        (only-italic-phrases nil)
                        (omit-np nil))
     (let (qr-struc)
        (setq qr-struc
              (make-full-query-str word-vector term-elimination np-proximity drop-index word-sep
                                   italic-phrases italic-refs :add-verb-query add-verb-query
                                   :use-italic-phrases use-italic-phrases :omit-np omit-np :only-italic-phrases
                                   only-italic-phrases))
        (concordance::my-boolean-search (concordance::parse-boolean-query (qr-defn-query qr-struc
                                                                                           )
                                        concordance::*tdb*)
              concordance::*tdb* nil)
        (setf (qr-defn-nr-hits qr-struc)
              (length concordance::*doc-id-list*))
        (setf (qr-defn-article-list qr-struc)
              (copy-seq concordance::*doc-id-list*))
        (setf (qr-defn-np-proximity qr-struc)
              (copy-seq np-proximity))
        (setf (qr-defn-broadened-scope qr-struc)
```

00005.

```
DSK:<project>markov>inito>dtagger>franz4.1>patent-source>query-formulation.LISP:1    1-Jun-93 21:15
Page 15
                    word-sep)
              (query-subsumed qr-struc subsumption-limit)
            qr-struc))
(defun make-full-query-str (word-vector term-elimination np-proximity drop-index word-sep
                            italic-phrases italic-refs &key (add-verb-query n-1)
                                              (use-italic-phrases nil)
                                              (only-italic-phrases nil)
                                              (omit-np nil))
  (let ((nr-nps (length *np-start-indices*))
        (query "")
        (nr-terms-made 0)
        (included-italic-phrases nil)
        (qr-struc (make-qr-defn))
        the-italic-phrase np-start np-end)
    (when (and *debug* only-italic-phrases)
      (format t "USING ONLY ITALIC PHRASES FOR QUERY~%"))
    (when (and *debug* use-italic-phrases)
      (format t "USING ITALIC PHRASES FOR QUERY~%"))
    (dotimes (np-index nr-nps)
      (when (and (or (null omit-np)
                     (= omit-np np-index))
                 (or (< drop-index 0)
                     (= np-index drop-index))
                 > (car (aref term-elimination (position np-index term-elimination :key
                                                        #'cdr)))
                 ))
      (setq np-start (aref *np-start-indices* np-index))
      (setq np-end (aref *np-end-indices* np-index))
;;; 20 April 93 Correct operation will occur if just ONLY-ITALIC-PHRASES is set to t, irrespective
;;; of setting for USE-ITALIC-PHRASES
      (if (and (null only-italic-phrases)
               (null (in-italic-phrase use-italic-phrases np-index)))
          (progn (incf nr-terms-made)
                 (setq query (concatenate 'string query (make-np-query-str word-vector
                                                                            np-start np-end
                                                                            (aref np-proximity
                                                                                  np-index))
                                                   " "))
                 (do ((wd-index np-start (1+ wd-index)))
                     ((> wd-index np-end))
                   (if (upper-case-p (char (aref word-vector wd-index)
                                           0))
                       (pushnew wd-index (qr-defn-initial-cap-terms qr-struc))
                       (pushnew wd-index (qr-defn-terms qr-struc))))
                 (when *debug* (format t "Made NP query term: ~a~%" query)))
          (when (and (in-italic-phrase (or only-italic-phrases use-italic-phrases)
                                        np-index)
                     (null (position (aref italic-refs np-start)
                                     included-italic-phrases)))
            (pushnew (aref italic-refs np-start)
                     included-italic-phrases)
;;;
;;; The above pushnew is so that the italic phrases only get inserted once, not for each component
;;; np that is being scanned here.
;;;
            (setq the-italic-phrase (aref italic-phrases (aref italic-refs np-start))
                  )
            (setq query (concatenate 'string query (make-italic-query-str word-vector
                                                                           the-italic-phrase)
                                             " "))
            (dotimes (wd-index (length (second the-italic-phrase)))
              (pushnew (aref (second the-italic-phrase)
                             wd-index)
                       (qr-defn-italic-terms qr-struc)))
            (when *debug* (format t "Made ITALIC query term: ~a~%" query))
            (incf nr-terms-made)))))
;;;
;;; There may be italic phrases that did not have any component noun phrases --- we must tag these
;;; on.
;;;
    (when (or only-italic-phrases use-italic-phrases)
;;;
;;; Italic phrases are recorded for later use whether or not they have zero occurrences. The
;;; occurrence must also be checked outside IN-A-NOUN-PHRASE
```

```
;DSK:<project>markov>trivo>otagger>franz4.1>patent-source>query-formulation.LISP.1   3-Jun-93 21:05
Page 15

;;;
                (dotimes (index (length italic-phrases))
                  (when (and (null (in-a-noun-phrase index italic-phrases italic-refs))
                             (> (third (aref italic-phrases index))
                                0))
                    (setq the-italic-phrase (aref italic-phrases index))
                    (setq query (concatenate 'string query (make-italic-query-str word-vector
                                                                                 the-italic-phrase)
                                             " "))
                    (dotimes (wd-index (length (second the-italic-phrase)))
                      (pushnew (aref (second the-italic-phrase)
                                     wd-index)
                               (qr-defn-italic-terms qr-struc)))))
            (when add-verb-query
              (dolist (verb-index add-verb-query)
                (pushnew verb-index (qr-defn-terms qr-struc))))
            (setq query (concatenate 'string (if word-sep
                                                 (format nil "(~d " word-sep)
                                               "[")
                                     query
                                     (if add-verb-query
                                         (verb-list-to-query add-verb-query)
                                       "")
                                     (if word-sep
                                         ")"
                                         "]")))
            (when *debug* (format t "Full Query: ~a~%" query))
            (sort-term-lists qr-struc)
            (setf (qr-defn-query qr-struc)
                  query)
            (setf (qr-defn-nr-terms-made qr-struc)
                  nr-terms-made)
            qr-struc))
(defun make-grolier-queries (query-np-fsm max-hits subsumption-limit np-broadening full-term-dropping
                             )
    (let* ((nr-nps (length *np-start-indices*))
           (term-elimination (make-array nr-nps))
           (np-proximity (make-array nr-nps))
           (use-disjunctions nil)
           np-start np-end np-len term-occurrence nr-non-zero-nps)
;;;
;;; NR-DROPPED-FROM-END, DROP-RANK
;;;
;;; allow for dropping final word of an np e.g as in "wilson brothers" or "president elect" "king
;;; James I". only allowing one drop from end. all other np words must be contiguous and form an
;;; np. Dropping from the end should be a last resort -- for "President Abraham Lincoln" you would
;;; get "president Abraham". Really NP's should be preferably split at the place where non
;;; capitalized and capitalized words join.
;;;
        (dotimes (np-index nr-nps)
;;;
;;; should check that np between NP-START and NP-END is valid
;;; Using (np-match *np-fsm* NP-START NP-END)
;;;
          (setq np-start (aref *np-start-indices* np-index))
          (setq np-end (aref *np-end-indices* np-index))
          (setq np-len (1+ (- np-end np-start)))
          (setq term-occurrence (get-phrase-occurrence query-np-fsm *current-words*
                                                      *composed-token-array* np-index 0))
          (when (null term-occurrence)
            (error "TERM-OCCURRENCE returned nil"))
;;;
          (setf (aref term-elimination np-index)
                (cons term-occurrence np-index))
          (setf (aref np-proximity np-index)
                0)
;;;
;;; This proximity extension interacts with broadening NP scope. If it is not done then occurrence
;;; count test in MAKE-FULL-QUERY-STR must be overriden, because extending the scope may result in
;;; a non-zero count
;;;
          (when (and (> np-len 1)
                     (= term-occurrence 0))
            (do-phrase-extension query-np-fsm *current-words* *composed-token-array*
                                 use-disjunctions np-proximity term-elimination np-index)))
```

```
;DSK>;<project>markov>tn-vo>dtagger>franz4.l>patent-source>query-formulation.LISP;1    3-Jun-93 21:05
Page 1

;;;
;;; see if compound nouns are zero hits if so loosen them successively
;;; then do query. if no hits drop most likely terms.
;;; if too many add main verb, or restrict scope.
;;;
            (sort term-elimination #'(lambda (x y)
                                      (> (car x)
                                         (car y))))
            (setq nr-non-zero-nps (find-nr-useable-nps term-elimination))
;;; Do a search with italic phrases preserved.. 20 April 93 A search using only italic phrases is
;;; gonna be done anyway, if it isn't there's the possibility that not enough other np's will get
;;; dropped for it to be effective on its own..
            (when (and nil (> (length *italic-phrases*)
                              0)
                       (= (find-nr-useable-italic-phrases *italic-phrases* *italic-refs*)
                          0))
              (when *gr-verbose* (format t "No advantage to using Italic phrases....~%")))
;;; 20 April 93 Also do a search with JUST italic phrases...
            (when (> (length *italic-phrases*)
                     0)
              (when *gr-verbose* (format t "Search with ONLY ITALIC phrases....~%"))
              (grolier-queries-cont term-elimination np-proximity -1 max-hits subsumption-limit
                                    :use-italic-phrases t :only-italic-phrases t))
            (when (> (find-nr-useable-italic-phrases *italic-phrases* *italic-refs*)
                     0)
              (when *gr-verbose* (format t "Search with ITALIC phrases preserved....~%"))
              (grolier-queries-cont term-elimination np-proximity -1 max-hits subsumption-limit
                                    :use-italic-phrases t))
;;; Do a search with all nps
            (when *gr-verbose* (format t "Search with Regular NPS....~%"))
            (grolier-queries-cont term-elimination np-proximity -1 max-hits subsumption-limit)
            (do* ((mode 0 (1+ mode)))
                 ((= mode 2))
              (when *gr-verbose*
                (if (= mode 0)
                    (format t "BROADENING INTERNAL PHRASE SCOPE....~%")
                    (when full-term-dropping (format t "DROPPING SINGLE TERM....~%"))))
              (when (or (= mode 0)
                        full-term-dropping)
                (drop-or-broaden-single-np *current-words* mode nr-non-zero-nps
                                           term-elimination np-proximity np-broadening max-hits subsumption-limit)))
            (when (and (> nr-non-zero-nps 2)
                       full-term-dropping)
              (when *gr-verbose* (format t "DROPPING TWO TERMS....~%"))
              (drop-two-nps *current-words* nr-non-zero-nps term-elimination np-proximity max-hits
                            subsumption-limit))))
(defun make-italic-query-str (word-vector italic-phrase)
  (let ((scope (first italic-phrase))
        (query "")
        (word-indices (second italic-phrase))
        word)
    (when *debug* (format t "ITALIC PHRASE: ~a~%" italic-phrase))
    (dotimes (index (length word-indices))
      (setq word (aref word-vector (aref word-indices index)))
      (setq query (concatenate 'string query (if (> index 0)
                                                 " "
                                                 "")
                               word)))
    (if (> (length word-indices)
           1)
        (setq query (concatenate 'string (format nil "<~d " scope)
                                 query ">")))
    (if (> (length query)
           0)
        query
        nil)))
(defun make-np-query-str (word-vector np-start-index np-end-index word-sep)
  (let ((query "")
        (nr-query-terms 0))
    (do ((term-index np-start-index (1+ term-index)))
        ((> term-index np-end-index))
      (setq query (concatenate 'string query (aref word-vector term-index)
                               (if (/= term-index np-end-index)
```

```
;DSK}<project>markov>trivo>gtagger>franz4.1>patent-source>query-formulation.LISP:1   3-Jun-93 21:05
Page 13

")))
                      (incf nr-query-terms))
                  (when (> nr-query-terms 1)
                     :setq query (concatenate string (if (null word-sep)
                                                        "{"
                                                        (
                                                        (if (= word-sep 0)
                                                            (format nil "(~d " word-sep)
                                                            (format nil "(~d " word-sep)))
                                         query
                                         (if (null word-sep)
                                             "}"
                                             (if (= word-sep 0)
                                                 ">"
                                                 ")")))))
           query))
(defun multiple-atomic-fsm (expr)
      (let (string-list sym-list num-list)
        :: not great. consing
        (setq string-list (remove-if-not #'stringp (cdr expr)))
        (setq sym-list (remove-if-not #'symbolp (cdr expr)))
        (setq num-list (remove-if-not #'numberp (cdr expr)))
        (fsm:concat-fsm (if sym-list
                            (progn (when (set-difference sym-list *ordered-state-list*)
                                     (error
                                      "Symbols in a merge are not all pos categories: ~a~%"
                                      (set-difference sym-list *ordered-state-list*)))
                                   (fsm:union-fsm (map 'list #'(lambda (x)
                                                                 (make-atomic-fsm x
                                                                                  :complete-feature
                                                                                  nil))
                                                       sym-list)))
                            (fsm:sigma-out))
                        (if string-list
                            (fsm:union-fsm (map 'list #'(lambda (x)
                                                          (make-atomic-fsm x :complete-feature nil))
                                                string-list))
                            (fsm:sigma-out)))))
(defun new-expr-to-fsm (expr)
::: Converts A Regular Expression To A Finite State Machine. Special Symbols: Iteration = * Positive
::: Iteration = + Complementation = ~ Intersection = & Union = / Concatenation = ! -- Can be
::: omitted. Difference = -
      (let nil (fsm::make-connected (if (null (listp expr))
                                        (make-atomic-fsm expr)
                                        (case (car expr)
                                          (($ except) (except-fsm expr))
                                          ((? optional) (apply-fsm-op #'fsm:optional-fsm expr 1))
                                          ((* star zero-plus) (apply-fsm-op #'fsm:zero-plus expr 1
                                                              ))
                                          ((+ plus one-plus) (apply-fsm-op #'fsm:one-plus expr 1))
                                          ((~ not compl) (apply-fsm-op #'fsm:negate-fsm expr 1))
                                          ((- minus relcompl) (apply-fsm-op #'fsm:minus-fsm expr 2
                                                              ))
                                          ((& and) (apply-fsm-op #'fsm:intersect-fsm expr -1))
                                          ((/ or) (apply-fsm-op #'fsm:union-fsm expr -1))
                                          ((= merge) (multiple-atomic-fsm expr))
                                          ((! seq sequence) (apply-fsm-op #'fsm:concat-fsm expr -1
                                                             ))
                                          (otherwise (apply-fsm-op #'fsm:concat-fsm
                                                                   (cons '! expr)
                                                                   -1)))))))
(defun new-set-term-hashtable (expr &key (stem nil))
      (let (term hash-id wds max-term-id downcase-wd)
        (setq wds (find-strings nil expr))
        (when (and nil *gr-verbose*)
          (format t "String content: ~a~%" wds))
        ;; find the current max term id in the table so that we add the next properly
        (setq max-term-id (let ((max-curr-term-id (1- (length *ordered-state-list*))))
                            (maphash #'(lambda (dummy-key val)
                                         (when (> val max-curr-term-id)
                                           (setq max-curr-term-id val)))
                                     *term-hash-table*)
                            (1+ max-curr-term-id)))
        (when (and nil *gr-verbose*)
          (format t "Max Current term id: ~a~%" max-term-id))
```

```
DSK1<project>markov>trivp>qtagger>franz4.1>patent-source>query-formulation.LISP:1    3-Jun-93 21:05:
Page 19

(dolist (wd wds)
                (setq downcase-wd (string-downcase wd))
 ;;; Always look to see if the inflected word has a unique hash id before checking the stem. 5 Nov
 ;;; 1992. Thus if "was" is already in the hashtable because it was inserted from a template, a
 ;;; subsequent use of the word will get the same hash id even if :stem was t
                (setq hash-id (gethash downcase-wd *term-hash-table*))
                (when (null hash-id)
                    (setq term (if stem
                                  (get-stem wd)
                                  downcase-wd))
                    (setq hash-id (gethash term *term-hash-table*)))
                (if (null hash-id)
                    (progn (setf (gethash term *term-hash-table*)
                                 max-term-id)
                           (when (and nil *qr-verbose*)
                               (format t "Word ~a / term ~a has term id ~a~%" wd term max-term-id))
                           (incf max-term-id))))
            (1- max-term-id)))
(defun np-match (fsm start end composed-tokens)
    (eq :accepted (fsm:apply-fsm-to-array composed-tokens fsm (* *nr-token-features* start)
                                          (* *nr-token-features* (+ (1- *nr-token-features*)
                                                                     end)))))
(defun partial-np-count (qr-struc)
 ;;;
 ;;; This function takes a list of document id's produced by other queries, and looks to see if
 ;;; component words of NP's that aren t included in this query are present anywhere in the list of
 ;;; documents. NOTE THESE TERMS DO NOT HAVE TO BE IN A ZERO OCCURRENCE NP. Thus <0 directorial
 ;;; debut> which occurs thrice will still get matched in Redford article where debut is mentioned
 ;;; but not directorial.
 ;;;
 ;;; It is thus a simpler alternative at selective dropping of component words of np's that hasn't
 ;;; seemed necessary as a complete measure yet. NOTE THIS RANKING IS ONLY WITHIN ANY GIVEN QUERY
 ;;; the main ordering has already been established
 ;;;
    (let ((doc-id-list (qr-defn-article-list qr-struc))
          (initial-cap-words (qr-defn-initial-cap-terms qr-struc))
          (other-words (qr-defn-terms qr-struc))
          downcase-word np-start np-end)
        (if (hash-table-p *doc-id-hashtable*)
            (clrhash *doc-id-hashtable*)
            (setq *doc-id-hashtable* (make-hash-table :test #'equal)))
        (dolist (doc-id doc-id-list)
            (setf (gethash doc-id *doc-id-hashtable*)
                  0))
        (dotimes (np-index (length *np-start-indices*))
            (setq np-start (aref *np-start-indices* np-index))
            (setq np-end (aref *np-end-indices* np-index))
 ;;;
 ;;; If the word is already in a query then don't continue
 ;;; ARE ITALIC TERMS BEING DEALT WITH PROPERLY.... NONE ARE USED HERE
 ;;; MUST ALLOW USE OF THEM AT LEAST COMPONENETS IN NPS' otherwise Brockton Bomber won't get used...
            (when (and (> np-end np-start)
                       (null (position np-start initial-cap-words))
                       (null (position np-end initial-cap-words))
                       (null (position np-start other-words))
                       (null (position np-end other-words)))
                (do ((wd-index np-start (1+ wd-index)))
                    ((> wd-index np-end))
                    (when (and nil *qr-verbose*)
                        (format t "Counting doc. matches for extra term: ~a~%" (aref
                                                                                 *current-words*
                                                                                 wd-index)))
                    (setq downcase-word (string-downcase (aref *current-words* wd-index)))
                    (concordance::co-freqs (doc-id dummy-freq (get-stem downcase-word)
                                                   concordance::*tdb*)
                        (when (gethash doc-id *doc-id-hashtable*)
                            (incf (gethash doc-id *doc-id-hashtable*)))))))
        (setf (qr-defn-article-list qr-struc)
              (sort (qr-defn-article-list qr-struc)
                    #'(lambda (x y)
                        (> (gethash x *doc-id-hashtable*)
                           (gethash y *doc-id-hashtable*)))))
        (dolist (doc-id (qr-defn-article-list qr-struc))
            (setf (qr-defn-extra-terms-in-articles qr-struc)
```

```
;DSK)<project>markov>trivo>qtagger>franz4.1>patent-source>query-formulation.LISP.1   3-Jun-93 21:05
Page 20
                    (push (gethash doc-id *doc-id-hashtable*)
                          (qr-defn-extra-terms-in-articles qr-struc))))
            (setf (qr-defn-extra-terms-in-articles qr-struc)
                  (nreverse (qr-defn-extra-terms-in-articles qr-struc)))))
(defun print-doc-id-list (&optional (limit 10))
      (let ((nr-docs (length concordance::*doc-id-list*)))
           (do ((tail concordance::*doc-id-list* (cdr tail))
                (index 0 (1+ index)))
               ((or (null tail)
                    (>= index limit)))
             (format t "~&~5D: ~A~%" (car tail)
                     (tdb::doc-title (car tail)
                                     concordance::*tdb*)))
           (when (> nr-docs limit)
             (format t "..... ~a more titles.~%" (- nr-docs limit)))))
(defun print-queries (&optional (limit 10))
      (let (nr-hits)
           (format t "Ranked Queries...~%")
           (dolist (query *query-list*)
             (setq nr-hits (qr-defn-nr-hits query))
             (format t "~a Hits for Query: ~a~%" nr-hits (qr-defn-query query))
             (do ((tail (qr-defn-article-list query)
                        (cdr tail))
                  (extra-term-tail (qr-defn-extra-terms-in-articles query)
                                   (cdr extra-term-tail))
                  (index 0 (1+ index)))
                 ((or (null tail)
                      (>= index limit)))
               (format t "~&~5D: ~A" (car tail)
                       (tdb::doc-title (car tail)
                                       concordance::*tdb*))
               (if (> (car extra-term-tail)
                      0)
                   (format t "~30,10T(extras: ~a)~%" (car extra-term-tail))
                   (format t "~%")))
             (when (> nr-hits limit)
                (format t "..... ~a more titles.~%" (- nr-hits limit))))
           nil))
(defun query (str &key (norm nil)
                       (hmm-file nil)
                       (read-tokenizer nil)
                       (full-init (null *tagger-stable-p*))
                       (name *hmm-default-model-name*)
                       (max-hits 10)
                       (subsumption-limit 50)
                       (full-term-dropping t)
                       (np-broadening '(1 5 20 40))
                       (show-results t)
                       (force-pos-after-scolon nil))
      (let (model (tokenizer-stream nil)
            query-np-fsm sent-boundary-codeword start semicolon-state pos)
;;; The *tokenizer-fsm* is better suited to the original grolier indexing analysis
        (when (or read-tokenizer (null *query-tokenizer*))
          (setq *query-tokenizer* (read-tokenizer "query-tokenizer.rules" (null read-tokenizer)
                                   )))
        (setq model (setup-hmm :verbose nil :hmm-file hmm-file :full-init full-init :name name))
        (setq sent-boundary-codeword (word-to-codeword "."))
        ;; pass new storage to rank-doc-nps each time
        (setq *np-start-indices* (make-array 0 :fill-pointer 0 :adjustable t))
        (setq *np-end-indices* (make-array 0 :fill-pointer 0 :adjustable t))
        (setq *italic-phrases* (make-array 0 :fill-pointer 0 :adjustable t))
;;; No stemming for FSMVARS
        ;; Now done in "ask" so we don't lose the strings associated with the hash ids used in
        ;; the original question.
        (when nil (setup-static-fsms *fsmvars* t))
        (setq query-np-fsm (get-fsmvar "np-grammar"))
        (setq *query-list* nil)
        (when model
          (with-input-from-string (file-stream str)
            (if (null norm)
                (setq tokenizer-stream (make-instance
                                         'fsm-tokenizer:symbolic-fsm-tokenizer
                                         :char-stream file-stream :tokenizer-fsm
                                         *query-tokenizer* :start 0)))
```

```
(DSK)<project>markov>trivp>atagger>franz4.1>patent-source>query-formulation.LISP:1    1-Jun-93 21:05
Page 21

:loop (when (eof-p file-stream)
                              (return nil))
                          (fst-read-sentence file-stream tokenizer-stream nil
                                             sent-boundary-codeword)
                          (do-viterbi model)
::: Special frig for MAKE-TYPE-HYPO-QUERY, to force phrase-types to :n or :v
                          (when force-pos-after-scolon
                            (setq pos (position force-pos-after-scolon *ordered-state-list*))
                            (when (null pos)
                              (error "QUERY given illegal FORCE-POS-AFTER-SCOLON"))
                            (when (null (setq semicolon-state (position :scolon
                                                                        *ordered-state-list*)))
                              (error "QUERY :SCOLON illegal POS"))
                            (when (setq start (position semicolon-state *composed-query-tokens*)
                                        )
                              (do ((index (+ start *nr-token-features*)
                                          (+ index *nr-token-features*)))
                                  ((>= index (length *composed-query-tokens*)))
                                (setf (aref *composed-query-tokens* index)
                                      pos))))
                          (when *gr-verbose* "Entering Query words into term hashtable:~%")
::: Do stem question words
                          (new-set-term-hashtable (nreverse (map 'list #'(lambda (x)
                                                                          x)
                                                                 *current-words*))
                                                  :stem t)
                          (compose-tokens model)
                          (find-maximal-nps query-np-fsm *delimiters* *current-words*
                                            *composed-token-array*)
                          (find-italicized-phrase *current-words* *composed-token-array*
                                                  query-np-fsm)
:::
::: The question, contained in *current-codewords*, will get overwritten when the tagger comes to
::: analyze documents, so save it....
                          (setq *query-words* (copy-seq *current-words*))
                          (setq *query-np-starts* (copy-seq *np-start-indices*))
                          (setq *query-np-ends* (copy-seq *np-end-indices*))
                          (setq *composed-query-tokens* (copy-seq *composed-token-array*))
                          (setq *query-verbs* (extract-verbs *current-words*
                                                             *composed-token-array* *np-start-indices*
                                                             *np-end-indices*))
                          (make-grolier-queries query-np-fsm max-hits subsumption-limit
                                                np-broadening full-term-dropping)
                          (rank-query-list)
                          (when show-results (print-queries))))))
(defun query-subsumed (new-query retention-limit)
  (let ((is-subsumed nil)
        (nr-hits (qr-defn-nr-hits new-query))
        same-proximity same-or-worse-proximity same-or-tighter-proximity tighter-scope
        curr-proximity curr-scope identical-terms curr-articles)
:::
::: A query is subsumed if either it has exactly the same terms and the same or looser scope.
::: A query with identical terms are often generated when 2 terms are being dropped
:::
    (when (> nr-hits retention-limit)
      (when *gr-verbose*
        (format t "Query has been ignored...~%")
        (format t "Nr hits: ~a greater than retention limit (~a)~%" nr-hits
                retention-limit)))
    (when (and (> nr-hits 0)
               (<= nr-hits retention-limit))
      (let ((new-proximity (qr-defn-np-proximity new-query))
            (new-scope (qr-defn-broadened-scope new-query))
            (new-articles (qr-defn-article-list new-query)))
        (do* ((tail *query-list* (cdr tail))
              (query (car tail)
                     (car tail)))
             ((or (null tail)
                  is-subsumed))
          (setq identical-terms (identical-query-terms new-query query))
          (setq curr-proximity (qr-defn-np-proximity query))
          (setq same-proximity t)
          (setq same-or-tighter-proximity t)
          (setq same-or-worse-proximity t)
```

```
{DSK}<project>markov>t-tvo>qtagger>franz4.1>patent-source>query-formulation.LISP:1   3-Jun-93 21:05:
Page 22

(dotimes (index (length curr-proximity))
                      ;; for disjunctive queries this could be nil EQL handles this
                      (when (null (eql (aref curr-proximity index)
                                       (aref new-proximity index)))
                        (setq same-proximity nil))
;;;
;;; If ALL component terms have same or tighter proximity, and nr-hits are the same as existing
;;; query, copy the tighter proximity. If there was disjunction forget it.
;;;
                      (when (or (null (aref curr-proximity index))
                                (null (aref new-proximity index))
                                (> (aref new-proximity index)
                                   (aref curr-proximity index)))
                        (setq same-or-tighter-proximity nil))
                      (when (and (aref curr-proximity index)
                                 (aref new-proximity index)
                                 (< (aref new-proximity index)
                                    (aref curr-proximity index)))
                        (setq same-or-worse-proximity nil)))
;;;
;;; check for same proximity of terms...NULL scope is matching anywhere in an article
;;;
                    (setq tighter-scope nil)
                    (setq curr-scope (qr-defn-broadened-scope query))
                    (when (or (and new-scope (null curr-scope))
                              (and new-scope curr-scope (< new-scope curr-scope)))
                      (setq tighter-scope t))
                    (setq curr-articles (qr-defn-article-list query))
                    (when (and identical-terms (and (null same-proximity)
                                                   same-or-worse-proximity)
                               (equal (qr-defn-article-list query)
                                      new-articles))
                      (setq is-subsumed t)
                      (when *gr-verbose* (format t
                                 "This query has LARGER SCOPE which is subsumed~%"
                                 )))
;;;
;;; are all the articles for the new query already contained somewhere else
;;; check for same article list
;;;
                    (when (and identical-terms (or same-proximity same-or-tighter-proximity)
                               (equal (qr-defn-article-list query)
                                      new-articles))
                      (setq is-subsumed t)
                      (if tighter-scope
                          (progn
;;; If the new query has a tighter scope, copy it into the existing one.. this doesn't currently
;;; happen 'cos looser and looser scope is applied, likewise for proximity
                            (when *gr-verbose* (format t
                                 "This query has SMALLER SCOPE and REPLACES a previous one~%"
                                 ))
                            (setf (qr-defn-broadened-scope query)
                                  new-scope)
                            (setf (qr-defn-query query)
                                  (qr-defn-query new-query)))
                          (if (null (and same-or-tighter-proximity (null same-proximity)))
                              (when *gr-verbose* (format t
                                 "This query is SUBSUMED and will be IGNORED~%"
                                 )))))
                    (when (and same-or-tighter-proximity (null same-proximity))
;;; If the new query has a tighter overall proximity , copy it into the existing one
                      (when *gr-verbose* (format t
                                 "This query has SMALLER PROXIMITY and REPLACES a previous one~%"
                                 ))
                      (setf (qr-defn-np-proximity query)
                            new-proximity)
                      (setf (qr-defn-query query)
                            (qr-defn-query new-query)))))
                    (when (null is-subsumed)
                      (push new-query *query-list*))))))))
(defun
rank-query-list nil
(let
 nil
```

000063

```
[DSK]<project>markov>trivio>qtagger>franz4.1>patent-source>query-formulation.LSP:1   3-Jun-93 21:05
Page 23

;; Ranking based on Scoping not currently included here.....
(setq
 *query-list*
 (sort *query-list*
       #'(lambda (q1 q2)
           (let ((italics-q1 (qr-defn-italic-terms q1))
                 (italics-q2 (qr-defn-italic-terms q2))
                 (initial-caps-q1 (qr-defn-initial-cap-terms q1))
                 (initial-caps-q2 (qr-defn-initial-cap-terms q2))
                 (terms-q1 (qr-defn-terms q1))
                 (terms-q2 (qr-defn-terms q2))
                 (nr-hits-q1 (qr-defn-nr-hits q1))
                 (nr-hits-q2 (qr-defn-nr-hits q2)))
             (if (and italics-q1 (or (null italics-q2)
                                     (> (length italics-q1)
                                        (length italics-q2))))
                 t
               (if (or (and (null italics-q1)
                            italics-q2)
                       (< (length italics-q1)
                          (length italics-q2)))
                   nil
                 (if (and initial-caps-q1 (or (null initial-caps-q2)
                                              (> (length initial-caps-q1)
                                                 (length initial-caps-q2))))
                     t
                   (if (or (and (null initial-caps-q1)
                                initial-caps-q2)
                           (< (length initial-caps-q1)
                              (length initial-caps-q2)))
                       nil
                     (if (and terms-q1 (or (null terms-q2)
                                           (> (length terms-q1)
                                              (length terms-q2))))
                         t
                       (if (or (and (null terms-q1)
                                    terms-q2)
                               (< (length terms-q1)
                                  (length terms-q2)))
                           nil
                         (< nr-hits-q1 nr-hits-q2)))))))))))
;;; Obtain ranking of articles within each query, based on the number of extra terms they have...
;;; This is a hack instead of dropping component words from NP's
(dolist (query *query-list*)
  (partial-np-count query))))
(defun read-tokenizer (filename quiet)
  (let ((*package* (find-package :fsm-tokenizer))
        (pathname (merge-pathnames filename *tagger-pathname*)))
    (unless quiet (format *error-output* "READING TOKENIZER RULES FROM ~A~%" pathname))
    (with-open-file (s pathname)
      (eval (read s)))))
(defun setup-hmm (&key (verbose nil)
                       (hmm-file nil)
                       (full-init (null *tagger-stable-p*))
                       (name *hmm-default-model-name*))
  (let ((model (rhmm:find-model name))
        (ok t)
        (hmm-name name)
        hmm-pathname saved-report-level)
    ;;
    ;; The name keyword takes priority over hmm-file for defining the hmm to use. It must
    ;; be a loaded model, then hmm-name is used. If it is not supplied and there is a
    ;; single model currently loaded, it will be used. Then if *hmm-pathname* defines an
    ;; hmm file it is used, lastly the file "name".hmm is used for reading. In production
    ;; this is default.hmm
    ;;
    (when (null model)
      (setq hmm-pathname (if hmm-file
                             (make-pathname :defaults hmm-file)
                             (if (pathname-name *hmm-pathname*)
                                 *hmm-pathname*
                                 (merge-pathnames (make-pathname :name hmm-name :type
                                                                 "rhmm")
                                                  *tagger-pathname*)))))
```

```lisp
{DSK}<project>markov>trevor>qtagger>franz4.1>patent-source>query-formulation.LISP;1   3-Jun-93 21:05:2
Page 24
                  :when (null hmm-file)
                     (when (= (length rhmm:*models*)
                              1)
                        (setq model (car rhmm:*models*))
                        (when verbose
                           (format t "Using model: ~a~%" (rhmm::hmm-defn-name model))))
                     (when (> (length rhmm:*models*)
                              1)
                        (format t "There are several current models~%")
                        (format t "Select one of them using the :name keyword~%")
                        (format t "The current models loaded are:~%")
                        (dolist (the-hmm rhmm:*models*)
                           (format t "~s~%" (rhmm::hmm-defn-name the-hmm)))
                        (setq ok nil)))
                  (when (and (null model)
                             ok)
                     (format t "Reading RHMM: ~a~%" hmm-pathname)
                     (setq model (rhmm:read-hmm hmm-pathname))
                     (when (null model)
                        (format t "Could not read this hmm, check it exists~%")
                        (set ok nil))))
              (if model
                 (setq hmm-name (rhmm::hmm-defn-name model)))
              (when (and ok (check-data model))
                 (when (or full-init (null *codeword-vector*))
                    (format t "~%Reading Codeword Vector..~%")
                    (setq *codeword-vector* (read-vector *eqv-class-pathname*))
                    (when (null *codeword-vector*)
                       (format t "ERROR: Codeword Vector is null~%")
                       (setq ok nil)))
                 (setq saved-report-level rhmm:*report-level*)
                 (setq rhmm:*report-level* nil)
                 (rhmm:make-log-matrices model :always-recompute full-init)
                 (when (or full-init (null *index-to-state-name*))
                    (setq *index-to-state-name* (make-array (length *ordered-state-list*)))
                    (dotimes (index (length *ordered-state-list*))
                       (setf (aref *index-to-state-name* index)
                             (string-downcase (symbol-name (nth index *ordered-state-list*)))))))
              (setq rhmm:*report-level* saved-report-level)
              (if ok
                 model
                 nil)))
(defun setup-static-fsms (fsmvar-list use-delimiters &key (verbose nil))
   (let (max-term-id)
      (when verbose (format t "Setting up FSMVAR's..."))
      (if (hash-table-p *term-hash-table*)
         (clrhash *term-hash-table*)
         (setq *term-hash-table* (make-hash-table :test #'equal)))
      (setq *delimiters*
         (if use-delimiters
            (mapcar #'(lambda (x)
                        (position x *ordered-state-list*))
                    (set-difference *ordered-state-list*
                       '(:number :adj :n :npl :npr :pastpart :prespart :abbrev :poss
                         :prep :det :day :month :single-abbr)))
            nil))
      (dolist (fsmvar fsmvar-list)
         (setq max-term-id (new-set-term-hashtable (fsmvar-defn-expr fsmvar))))
      (dolist (fsmvar fsmvar-list)
         (setf (fsmvar-defn-fsm fsmvar)
               (new-expr-to-fsm (fsmvar-defn-expr fsmvar))))
      (when verbose (format t "Done~%"))))
(defun sort-term-lists (qr-struc)
   (let (initial-length)
;;;
;;; 30 Sept 1992. This shouldn't be necessary ?? I can't remember why this is the case, although it
;;; was done after italic phrases implemented so is probably true
;;;
;;;
;;; If a word appears in the italic term count it must not be counted in any other term count.
;;; Currently Aug 92 this can happen because of inexact overlap calculation.  To counter this,
;;; simply delete elements that are in the italic list from the others.  Also sort all list to get
;;; a canonical order for checking for redundancy
;;;
```

```
[DSK]<project>markov>trivo>gtagger>franz4.1>patent-source>query-formulation.LSP.1   3-Jun-93 21:05
Page 25
            (setq initial-length (length (qr-defn-initial-cap-terms qr-struc)))
            (setf (qr-defn-initial-cap-terms qr-struc)
                  (sort (delete-if #'(lambda (x)
                                       (position x (qr-defn-italic-terms qr-struc)))
                                   (qr-defn-initial-cap-terms qr-struc))
                        #'(lambda (x y)
                            (>= x y))))
            (when (/= (length (qr-defn-initial-cap-terms qr-struc))
                      initial-length)
              (format t "~%INITIAL CAP TERMS WERE SHORTENED IN SORT-TERM-LISTS~%"))
            (setq initial-length (length (qr-defn-terms qr-struc)))
            (setf (qr-defn-terms qr-struc)
                  (sort (delete-if #'(lambda (x)
                                       (position x (qr-defn-italic-terms qr-struc)))
                                   (qr-defn-terms qr-struc))
                        #'(lambda (x y)
                            (>= x y))))
            (when (/= (length (qr-defn-terms qr-struc))
                      initial-length)
              (format t "~%TERMS WERE SHORTENED IN SORT-TERM-LISTS~%"))
            (setf (qr-defn-italic-terms qr-struc)
                  (sort (qr-defn-italic-terms qr-struc)
                        #'(lambda (x y)
                            (>= x y)))))
(defun verb-list-to-query (verb-list)
  (let ((verb-query "")
        verb)
    ;; make an or query string for all valid ones
    (if (= 1 (length verb-list))
        (setq verb-query (format nil "~a" (aref *current-words* (car verb-list))))
      (progn (dolist (verb-posn verb-list)
               (setq verb (aref *current-words* verb-posn))
               (setq verb-query (concatenate 'string (if (> (length verb-query)
                                                            0)
                                                         (format nil "~a " verb)
                                                       (format nil "~a" verb))
                                             verb-query)))
             (setq verb-query (concatenate 'string "(" verb-query ")"))))
    verb-query))
```

Kupiec

Document name: {DSK}<project>markov>trivp>qtagger>franz4.1 patent–source>type–ranking.LISP;1
Document date: Thu Jun 3 21:01:12 1993
Printing date/time: June 3, 1993 9:06:49 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
[SK]<project>markov>trivp>qtagger>franz4.1>patent-source>type-ranking.LISP;1    3-Jun-93 20:57:51
Page 1

;;;-*- Package: USER; Syntax: Common-Lisp; Base: 10 -*-
;;; File converted on 12-May-93 17:26:46 from source type-ranking
;;; Original source {dsk}<project>markov>trivp>qtagger>franz4.1>type-ranking.;31 created 11-May-93 17.
;;; Copyright (c) 1993 by Xerox Corporation
(provide "TYPE-RANKING")
;(in-package "USER")
;;; Shadow, Export, Require, Use-package, and Import forms should follow here
(provide "TYPE-RANKING")
;(in-package "USER")
(defun exact-type-stems (match-start match-end leftmost-start rightmost-end end-of-head sent
                         invalid-pos-stems)
    (let ((highest-exact-matches 0)
          (highest-leftmost-exact-matches 0)
          (highest-rightmost-exact-matches 0)
          (left-matching-index end-of-head)
          (right-matching-index end-of-head)
          total-matches)
;;;
;;; See if the type NP words are in order in the given sentence.  Words preceding the last word of
;;; the head noun phrase of the type phrase must also precede it in the match. otherwise
;;; "...novelist....Pulitzer prize.." gets match of 2 with "Pulitzer prize winning novelist".
;;;
;;; 15 April this is a partial fix to the problem that arises with the "National Book Award" hypo
;;; ranking higher than "Mailer". The full fix requires better overall matching procedures...
;;; FIRST Go to the left of the head word...(including it)
;;;
        (do ((left-index end-of-head (1- left-index)))
            ((or (< left-index leftmost-start)
                 (null (search *original-query-words* sent :start1 left-index :end1 (1+
                                                                                    end-of-head
                                                                                    )
                               :start2 match-start :end2 (1+ match-end)
                               :test
                               #'stem-equal))))
;;; A match comprising a consecutive sequence of words is assured
            (when (null (position (aref *original-query-tokens* (+ *composed-pos-offset*
                                                                   (* *nr-token-features*
                                                                      left-index)))
                                  invalid-pos-stems))
                (incf highest-leftmost-exact-matches)
                (setq left-matching-index left-index)
                (when (> highest-leftmost-exact-matches highest-exact-matches)
                    (setq highest-exact-matches highest-leftmost-exact-matches))))
        (setq highest-rightmost-exact-matches 0)
        (setq right-matching-index end-of-head)
;;; THEN go to the right of the head word (not including it)
        (do ((right-index (1+ end-of-head)
                          (1+ right-index)))
            ((or (> right-index rightmost-end)
                 (null (search *original-query-words* sent :start1 left-index :end1
                               (1+ right-index)
                               :start2 match-start :end2 (1+ match-end)
                               :test
                               #'stem-equal))))
            (when (null (position (aref *original-query-tokens* (+ *composed-pos-offset*
                                                                   (* *nr-token-features*
                                                                      right-index)))
                                  invalid-pos-stems))
                (incf highest-rightmost-exact-matches))
            (setq right-matching-index right-index)
            (setq total-matches (+ highest-rightmost-exact-matches highest-leftmost-exact-matches
                                   ))
            (when (> total-matches highest-exact-matches)
                (setq highest-exact-matches total-matches))))
        (values highest-exact-matches left-matching-index right-matching-index)))
(defun find-minimum-mismatch (hypo-np leftmost-start rightmost-end matching-doc matching-sent &key
                              (verbose nil))
;;;
;;; There may be more than one match  if the type phrase is repeated -- go for the favourable case
;;; (i.e. any match is ok)
;;; This code assumes the "np-inclusion" template having the form np-pp-1
;;; NOTE: The code for this won't work when type and hypo NP's are distinguished... First use the
;;; type NP as the Hypo as well, then look for both
;;;
```

000068

```
[DSK]<project>markov>archivo>qtagger>franz4.1>patent-source>type-ranking.LISP.1   1-Jun-93 20:57:31
Page 2

(let* ((type-np-vec (subseq *original-query-words* leftmost-start (1- rightmost-end)))
               (type-np-matches (find-matches-in-instance type-np-vec type-np-vec
                                                          (vector (cons matching-doc matching-sent))
                                                          nil
                                                          '("np-inclusion")))
               (hypo-np-matches (find-matches-in-instance type-np-vec hypo-np (vector (cons
                                                                                      matching-doc
                                                                                      matching-sent
                                                                                      ))
                                                          nil
                                                          '("np-inclusion")))
               (full-type-span (1+ (- rightmost-end leftmost-start)))
               (minimum-mismatch nil)
               template-span match hypo-type-compound hypo-match hypo-match-end hypo-match-start
               type-match-end type-match-start)
;;;
;;; If all the words of the type NP are present, and they aren't included in a longer NP in the
;;; template, then we have minimum mismatch.  This works for 1) "chief" "justice" in "Earl Warren
;;; was a chief justice..", But it must also account for 2) "chief justice Earl Warren"
;;;
          (do ((index 0 (1+ index)))
              ((or minimum-mismatch (= index (length type-np-matches))))
            (setq match (aref type-np-matches index))
            (when verbose
              (format t "Checking for minimum mismatch on template:~%")
              (print-tp-match match))
            (setq type-match-start (tp-match-defn-start match))
            (setq type-match-end (tp-match-defn-end match))
            (setq template-span (1+ (- type-match-end type-match-start))))
;;; Check to see if the type NP is on its own as in 1) above
            (when (= template-span full-type-span)
              (when verbose (format t "Minimum mismatch found~%"))
              (setq minimum-mismatch t))
;;; Now check to see if the type np is in a compound with the hypo, and is no longer than the sum of
;;; both as in 2).
;;; The two templates start/end on the same words and the span is equal to the sum of words in the
;;; hypo and in the type
            (when (null minimum-mismatch)
              (setq hypo-type-compound nil)
              (do ((index 0 (1+ index)))
                  ((or hypo-type-compound (= index (length hypo-np-matches))))
                (setq hypo-match (aref hypo-np-matches index))
                (setq hypo-match-end (tp-match-defn-end hypo-match))
                (setq hypo-match-start (tp-match-defn-start hypo-match))
;;; Must be a template match that had both type and hypo in it, i.e. not a NIL match
                (when (and (tp-match-defn-name hypo-match)
                           (= hypo-match-end type-match-end)
                           (= hypo-match-start type-match-start)
                           (= template-span (+ (length hypo-np)
                                               full-type-span)))
                  (setq minimum-mismatch t)
                  (when verbose (format t "Compound NP Minimum mismatch found~%")))))))
           minimum-mismatch))
(defun debug-f-max-nps (head-word sent)
    (let ((model (setup-hmm :verbose nil :hmm-file nil :full-init nil :name
                            *hmm-default-model-name*))
          (type-head-fsm (tp-defn-fsm (find "type-head-np" *templates* :key #'tp-defn-name :test
                                            #'string=))))
      (tag-article nil :from-string sent)
      (compose-tokens model)
      (setup-type-head-template head-word (find "type-head-np" *templates* :key #'tp-defn-name
                                                 :test #'string=))
      (format t "starting FIND-MAXIMAL-NPS~%")
      (find-maximal-nps type-head-fsm nil *current-words* *composed-token-array* :case-split
                        nil :quiet t)
      (reset-type-head-template head-word (find "type-head-np" *templates* :key #'tp-defn-name
                                                 :test #'string=))))
(defun detailed-who-type-match (tp-match leftmost-start rightmost-end end-of-head invalid-pos-stems
                                type-head-fsm &key (verbose nil))
    (let* ((hypo-np-vec (tp-match-defn-hypo-np tp-match))
           (match-start (tp-match-defn-start tp-match))
           (match-end (tp-match-defn-end tp-match))
           (match-doc-id (tp-match-defn-doc-id tp-match))
           (match-sent (tp-match-defn-sent tp-match))
```

```
[SK]<project>markov>thvo>ctagger>finsh24.1>patent-source>type-ranking.lisp.1    1-Jun-93 20:57:51
Page 3 art (get-article match-doc-id))
            (sents (article-defn-words art))
            (sent (aref sents match-sent))
            (composed-token-vec (article-defn-composed-tokens art))
            (composed-tokens (aref composed-token-vec match-sent))
            (highest-exact-matches 0)
            (nr-stem-matches 0)
            (minimum-mismatch nil)
            (matching-stems (make-array 0 :adjustable t :fill-pointer 0))
            (query-np-scores (make-array (length *original-query-np-starts*)
                                         :initial-element 0))
            type-np-vec query-np-index left-matching-index right-matching-index)
;;;
;;; Find the details about a type match for ranking purposes. Up till now only the single rightmost
;;; headword has been matched.
;;;
;;; Note: This does not include thesaurus matching, or equivalence of (simple) genitive form X's Y
;;; and Y of X, as an exact match
;;;
;;; First check to see if the exact word sequence in the overall type phrase matches exactly (thus
;;; function words are included). Next back-off step is to find the number of matching stems (or
;;; terms?) with the type np.
;;; 15 April 93 In response to the "National Book Award" hypo. See notes 15 April 93. Look for the
;;; HIGHEST NUMBER OF EXACT MATCHES THAT INCLUDE THE LAST WORD OF THE HEAD PHRASE
;;;
            (multiple-value-setq (highest-exact-matches left-matching-index right-matching-index)
                exact-type-stems match-start match-end leftmost-start rightmost-end end-of-head
                    sent invalid-pos-stems))
            (when *debug* (format t "Type subphrase ~a, exact matches ~a~%" type-np-vec
                                    highest-exact-matches))
            (do ((type-index left-matching-index (1- type-index)))
                ((> type-index right-matching-index))
;;;
;;; This word or its stem appears anywhere in the template match. Prepositions don't count as they
;;; are likely to give false matches. For this check if the word is included in one of the original
;;; query np's which are all simple NP's. E.g. In "Who was the last Anglo Saxon King of England",
;;; "of" isn't a valid stem match for the type phrase.
;;;
            (when (null (position (aref *original-query-tokens* (- *composed-pos-offset*
                                                                    (* *nr-token-features*
                                                                       type-index)))
                                    invalid-pos-stems))
;;;
;;; Find the question np in which this word lies. It may not lie in any, because of case-splitting,
;;; then resultant word not being a noun. e.g. "Who was the last Anglo-Saxon king.." where last is
;;; tagged as an adj. -- There will be no query np for "last", although it will be included in the
;;; span of a matching type np.
;;; -- A matching type np 'last king" will be ranked higher than just 'king' in the preferences,
;;; but not in the following scores... REMEMBER THIS.
;;;
            (setq query-np-index (get-query-np-index type-index))
            (when query-np-index
;;; Assign scores to query np array. For later merging to get overall score.
;;; Scoring strategy must follow that in FIND-LONGEST-NP-MATCH, as these scores will be merged with
;;; the query np scores for it... Note that stems are required for scoring and this has been done
;;; above. Inferred scores are 5 less than original ones.
                    (incf (aref query-np-scores query-np-index)
                          *query-type-inferred-score*)
;;; Add extra for the rightmost head word as in find-longest-np-match
                    (when (= type-index end-of-head)
                        (incf (aref query-np-scores query-np-index)
                              *query-type-head-inferred-score*)))
                    (vector-push-extend (aref *original-query-words* type-index)
                                        matching-stems)))
;;; 30 April 93 Better stem matching... for Harold II question. Stems don't have to be in strict
;;; order, but must be in the phrase match---NOT GOOD ENOUGH!!
;;;
;;; 7 May replaced ORDERED-TYPE-STEMS-HACK with ORDERED-TYPE-STEMS
            (setq nr-stem-matches (ordered-type-stems match-start match-end leftmost-start
                                    rightmost-end sent composed-tokens invalid-pos-stems
                                    type-head-fsm))
            (when verbose
                (format t "~%>> ")
                (print-tp-match tp-match))
```

000070

```
[DSK]<project>markov<...>dtagger>franz4.1>patent-source>type-ranking.LISP:1    3-Jun-93 20:57:51
Page 4

;;;
;;; Next check to see if the inclusion is a minimum-mismatch, and  get the number of words that
;;; mismatch.
;;;
           (when (= highest-exact-matches (1- (- rightmost-end leftmost-start)))
;;;  hypo-np-vec is the who hypo np involved in the match. it needed to be saved in the template
;;; because templates get assigned to root hypos. thus the length of the who hypo involved in the
;;; original match would otherwise be lost.
             (setq minimum-mismatch (find-minimum-mismatch hypo-np-vec leftmost-start
                                          rightmost-end match-doc-id match-sent :verbose verbose
                                          )))
           (when verbose
             (format t "~a ~20,10T Matches: ~a in order, ~a stems, ~a min-mismatch~%"
                     (curr-word-str 0 (1- (length matching-stems)))
                     matching-stems)
                     highest-exact-matches nr-stem-matches minimum-mismatch))
           (values highest-exact-matches nr-stem-matches minimum-mismatch query-np-scores)))
(defun is-a-type-template (index template-matches)
  (let ((match (aref template-matches index)))
    (or (null (to-match-defn-name match))
        (position (to-match-defn-name match)
                  *type-phrase-templates* :test #'string=))))
(defun ordered-type-stems (match-start match-end leftmost-start rightmost-end sent composed-tokens
                           invalid-pos-stems type-head-fsm &key (debug nil))
  (let ((best-stem-matches 0)
        last-posn nr-stem-matches end-posn start-pos)
;;;
;;;  7 May 93. A replacement for ORDERED-TYPE-STEMS-HACK. Find out how many of the words in the type
;;;  phrase occur IN SAME NP as the TYPE PHRASE HEAD WORD. Previously, these could be in any order
;;;  in the sentence. (causing national book award to have 4 matching stems with the type phrase
;;; "Pulitzer Prize winning novelist (sent 2 art 3801 (Alice Stegner)).
;;; --- Thus "Pulitzer Prize" does not cause a two-word stem match because it is not in the same NP
;;; as novelist.
;;; This function is support for exact type matches. For example: The exact matching restriction on
;;; the LHS of the type phrase means that for the question "Who was the last Anglo-Saxon king of
;;; England?"  "last" does not get matched, because the de-hyphenated Anglo Saxon was not
;;; recognized.
;;; This function helps out in this case.
;;;
;;;   NOTE: Finding the optimal subsequence that has the highest ordering is tricky (involves a max
;;; over all subsequences )and has overhead that isn't worth it?
;;;
;;;  Find all nps containing the end of the type phrase
          (find-maximal-nps type-head-fsm nil sent composed-tokens :start match-start :end
                   (1- match-end)
                   :case-split n-1 :quiet t)
    (when debug
      (format t "Nr nps isolated: ~A~%" (length *np-start-indices*)))
    (dotimes (index (length *np-start-indices*))
      (setq start-pos (aref *np-start-indices* index))
      (setq end (aref *np-end-indices* index))
;;;
;;; Go through each matching NP instance...THESE ARE ALL LEFT-TO-RIGHT MATCHES....NOW DOING
;;; EXHAUSTIVE SEARCH....   MAY 93...WILL PICK OUT BEST NR STEMS EVEN IF THERE ARE DIFFERING REPEATED
;;; SUBSEQUENCES. due to use of start-pos
;;;
          (when debug (format t "start-pos/end: ~A/~A~%" start-pos end))
          (do ((start start-pos (1+ start)))
              ((> start end))
            (setq last-posn -1)
            (setq nr-stem-matches 0)
            (do ((type-index leftmost-start (1+ type-index)))
                ((> type-index rightmost-end))
              (when (null (position (aref *original-query-tokens* (+ *composed-pos-offset*
                                                                     (* *nr-token-features*
                                                                        type-index)))
                                    invalid-pos-stems))
;;; When doing match look to the right of the last matching item..hence (max start last-posn).
;;; otherwise a  word at the beginning of a long match that is repeated later after another word in
;;; the type phrase, will cause a failure..e.g. "lake" in 1465 (Lake Victoria)...the template match
;;; was (incorrectly-out not worth fixing FSMVAR)) very long---'Lake Victoria (or ..), the largets
;;; lake in Africa and the  ...lake in the world (after Lake Superior)" Problem is parens match more
;;; than I want in np-pp-dummy-paren1--thus affect head-type-1)
                (when (setq posn (position (aref *original-query-words* type-index)
```

```
[DSK]<project>markov>trivo>dtagger>franz4.1>patent-source>type-marking.LISP:1    1-Jun-93 20:57:51
Page 6 sent :start (max start last-posn)
                                             :end
                                             (1- end)
                                             :test
                                             #'stem-equal))
                            (when () posn last-posn)
                                (when debug
                                    (format t "type/sent index: ~A/~A (~A) accepted~%" type-index
                                            posn (aref sent posn)))
                                (incf nr-stem-matches))
                            (when (<= posn last-posn)
                                (when debug
                                    (format t "* type/sent index: ~A/~A (~A) not accepted~%"
                                            type-index posn (aref sent posn))))
                            (setq last-posn posn))))
                    (when () nr-stem-matches best-stem-matches)
                        (setq best-stem-matches nr-stem-matches)
                        (when debug (format t "Nr best-matches: ~A~%" best-stem-matches)))))
                best-stem-matches))
(defun ordered-type-stems-hack (match-start match-end leftmost-start rightmost-end sent
                                invalid-pos-stems)
    (let ((nr-stem-matches 0)
          (last-posn -1)
          posn)
;;; THIS FUNCTION ISN'T PROPERLY THOUGHT OUT
;;; 30 April 93. This is a fix to the changes of 16 April "TYPE-NP-WDS-IN-ORDER" a change that
;;; stopped spurious matches from all over a sentence to match with the type phrase. (causing
;;; national book award to have 4 matching stems with the type phrase "Pulitzer Prize winning
;;; novelist (sent 2 art 3801 (Alice Stegner)). The exact matching restriction on the LHS of the
;;; type phrase means that for the question "Who was the last Anglo-Saxon king of England?" "last
;;; does not get matched, because the de-hyphenated Anglo Saxon was not recognized. Now look and
;;; see if the words of the type phrase cane be found IN THE EXTENT OF THE TEMPLATE MATCH--NO!! or
;;; National Book Award problem would re-appear in a list-or-appol.
;;; Instead insist that the type phrase word appear in order and assume there are no repetitions of
;;; the words otherwise this will fail
;;; --- although a better approach is necessary
;;;
        (do ((type-index leftmost-start (1+ type-index)))
            ((> type-index rightmost-end))
            (when (null (position (aref *original-query-tokens* (+ *composed-pos-offset*
                                                                   (* *nr-token-features*
                                                                      type-index)))
                                  invalid-pos-stems))
                (when (setq posn (position (aref *original-query-words* type-index)
                                           sent :start match-start :end match-end :test #'stem-equal))
                    (when () posn last-posn)
                        (incf nr-stem-matches)
                        (setq last-posn posn))))
        nr-stem-matches))
(defun repeated-tp-match (index template-matches)
    (let ((match (aref template-matches index)))
;;; OBSOLETE 8 March 93 by REPEATED-TYPE-TP-MATCH
        (and (< index (1- (length template-matches)))
             (position match template-matches :start (1+ index)
                       :test
                       #'(lambda (y z)
                           (and (eql (tp-match-defn-doc-id y)
                                     (tp-match-defn-doc-id z))
                                (eql (tp-match-defn-sent y)
                                     (tp-match-defn-sent z))))))))
(defun repeated-type-tp-match (from-index template-matches)
    (let ((match (aref template-matches from-index)))
;;; Check to see if the type phrase match defined by (aref template-matches index) is repeated in
;;; any other TYPE PHRASE TEMPLATE, i.e NOT VERB TEMPLATES
        (and (< from-index (1- (length template-matches)))
             (position match template-matches :start (1+ from-index)
                       :test
                       #'(lambda (y z)
                           (and (eql (tp-match-defn-doc-id y)
                                     (tp-match-defn-doc-id z))
                                (eql (tp-match-defn-sent y)
                                     (tp-match-defn-sent z)))))
             (is-a-type-template from-index template-matches))))
(defun reset-type-head-template (head-word type-head-np-template)
```

```
DSK:<project>markov>thryo>dtagger>final4.1>patent-source>type-ranking.LISP.1    3-Jun-93 20:57:51
Page 6

(let ((reserved-id type-head-nasn-id))
            (setq reserved-id (car (get-reserved-nasn-ids)))
          (setq type-head-nasn-id (gethash head-word *term-nasn-table*))
        (if type-head-nasn-id
            (setf (tp-defn-fsm type-head-np-template)
                  (fsm::symsubst type-head-nasn-id reserved-id (tp-defn-fsm type-head-np-template
                                                                )))
          (error "No nasn code for type phrase head ~%"))))
(defun rank-hypos-by-type-match (leftmost-start rightmost-end end-of-head &key (verbose nil)
                                 (how-many 20))
  (let ((invalid-pos-stems (map 'vector #'(lambda (x)
                                            (position x *ordered-state-list*))
                                '(:det :prep :to-prep :by-prep :in-prep :poss)))
        (sort-vector (make-array 0 :adjustable t :fill-pointer 0))
        (template-matches nil)
        type-head-np-template query-np-scores hypo nr-unique-doc-sents nr-nil-matches match
        best-exact-match highest-exact-matches best-stem-match nr-stem-matches element
        nr-min-mismatches type-match-preferences minimum-mismatch)
    ;;;
    ;;; Assign a ranked list of template matches for a type phrase / hypo correspondence, in the
    ;;; (who-defn-type-match-preferences slot of a hypo)
    ;;;
    (when verbose (format t "~%Ranking Type matches~%"))
    (when (null (setq type-head-np-template (find "type-head-np" *templates* :key
                                                  #'tp-defn-name :test #'string=)))
      (error "Can't find template: ~A~%" 'type-head-np))
    (setup-type-head-template (get-stem (aref *original-query-words* end-of-head))
                              type-head-np-template)
    (unwind-protect
         (dotimes (hypo-index (length *who-hypos*))
           (setq hypo (aref *who-hypos* hypo-index))
           ;;; If this hypo is a root who-hypo, use the combined list from its references.
           (setq template-matches (or (who-defn-root-template-matches hypo)
                                      (who-defn-template-matches hypo)))
           ;;; Modified 5 Feb 93 Just took out the(and TEMPLATE-MATCHES (null root-hypo) from the following
           ;;; condition.  * mar took out the (when (and template-matches)...) here and out in a test below.
           ;;; (> (length type-match-preferences) 0)  This will accommodate verb matches that will cause
           ;;; template matches to be non-nil and otherwise insert non-type matches.
           ;;;
           ;;; Make a vector to record the best type matches, so we can later choose the best one if they are
           ;;; needed as supporting evidence for this hypo.  They can be sorted with the same sorting function
           ;;; as the overall best types.
           (setq type-match-preferences (make-array 0 :adjustable t :fill-pointer 0))
           ;;;
           ;;; All who hypos that can be dealt with via their root hypo, don't get ranked.
           ;;; Multiple template matches in the same sentence are not counted more than once.
           ;;;
           (setq nr-unique-doc-sents 0)
           (setq nr-nil-matches 0)
           (setq highest-exact-matches 0)
           (setq nr-stem-matches 0)
           (setq nr-min-mismatches 0)
           (setq best-exact-match 0)
           (setq best-stem-match 0)
           (when (and verbose (< hypo-index how-many))
             (if (who-defn-root-template-matches hypo)
                 (format t "~%Root template matches:~%")
               (format t "~%Template matches:~%"))
             (print-who-hypo-info hypo :show-rooted nil))
           (dotimes (index (length template-matches))
             (setq match (aref template-matches index))
             ;;; 5 March will be mixing verb and type match templates, need to count the latter differently. 8
             ;;; March need to allow NIL template matches
             ;;; Added 3 April, notsure if it does anything
             (setq minimum-mismatch nil)
             (setq highest-exact-matches 0)
             (setq nr-stem-matches 0)
             (setq query-np-scores nil)
             (when (is-a-type-template index template-matches)
               ;;; Don't do detailed analysis when the template didn't match....
               (when (tp-match-defn-name match)
                 ;;; Count the quality and number of type matches
                 (multiple-value-setq (highest-exact-matches nr-stem-matches
                                       minimum-mismatch query-np-scores)
```

```
(DSK)<project>markov>thivo>otagger>franz4 1>patent-source>type-ranking.LISP.1  3-Jun-93 20:57:51
Page 1

(detailed-who-type-match match leftmost-start rightmost-end
                                    end-of-head invalid-pos-stems (to-defn-fsm
                                                                    type-head-np-template
                                                                   )
                                    (verbose verbose)))
                (when (null (repeated-type-to-match index template-matches))
  ;;;
  ;;; This means that the match being considered is not repeated later, i.e. we are counting all the
  ;;; last such occurrences. They are differentiated by doc-id and sentence index
  ;;;
                            (incf nr-unique-doc-sents)
                          (when minimum-mismatch (incf nr-min-mismatches))
                          (when (null (to-match-defn-name match))
                             (incf nr-nil-matches))
  ;;; Remember the longest nr of words in stem and exact matches for any of these template matches
                          (when (> nr-stem-matches best-stem-match)
                             (setq best-stem-match nr-stem-matches))
                          (when (> highest-exact-matches best-exact-match)
                             (setq best-exact-match highest-exact-matches))
  ;;; Remember this match for this hypo
                          (vector-push-extend (vector (if minimum-mismatch
                                                          1
                                                          0)
                                                      highest-exact-matches nr-stem-matches 1
                                                      (if (to-match-defn-name match)
                                                          1
                                                          0)
                                                      match
                                                      (or query-np-scores (make-array
                                                                           (length
                                                                            *original-query-np-starts*
                                                                            )
                                                                           :initial-element 0)))
                                              type-match-preferences))))
                (when (> (length type-match-preferences)
                         0)
                  (when verbose
                    (format t "~a total different (doc/sent) matches~%" nr-unique-doc-sents)
                    (format t "~a different NIL matches~%" nr-nil-matches))
  ;;; Rank the type matches for this hypo
                  (setf (who-defn-type-match-preferences hypo)
                        (sort-type-matches type-match-preferences))
  ;;; Remember the overall ranking info of type matching for this hypo.
                  (vector-push-extend (vector nr-min-mismatches best-exact-match
                                              best-stem-match nr-unique-doc-sents nr-nil-matches
                                              hypo)
                                      sort-vector))
                (reset-type-head-template (get-stem (aref *original-query-words* end-of-head))
                                          type-head-np-template)))
      (setq sort-vector (sort-type-matches sort-vector))
      (when *gr-verbose*
        (format t "Ranked hypos by TYPE~%")
        (format t
                "Hypo/Art. Ref.:Nr Min Mismatch/Highest Exact/Highest Stems/Nr Unique/Nr NIL~%"
                )
        (dotimes (index (length sort-vector))
          (setq element (aref sort-vector index))
          (format t "~a ~a ~30,5T ~33A ~33A ~3@A ~3@A ~3@A~%" (who-defn-hypo-name
                                                                (aref element 5))
                  (who-defn-art-ref (aref element 5))
                  (aref element 0)
                  (aref element 1)
                  (aref element 2)
                  (aref element 3)
                  (aref element 4))))
      sort-vector))
(defun setup-type-head-template (head-word type-head-np-template)
   (let ((reserved-id type-head-hasn-id)
  ;;; All this stuff is used in "ordered-type-stems"
        (setq reserved-id (car (get-reserved-hash-ids)))
        (setq type-head-hash-id (gethash head-word *term-hash-table*))
  ;;; See if the hash code for the head word is already in the hash table
  ;;; NOTE FOR THE FUTURE:
  ;;; If, for some unfortunate reason the head word is mentioned in the lexico-syntactic patterns.
```

```
:SK)<project>markov>t-vo>qtagger>franz4.:>patent-source>type-ranking.LISP:1    3-Jun-93 20:57:51
Page 6

;;; and used with them. make a copy of the 'np-inclusion-dummy' fsmver. because resetting the
;;; hash-id would screw up the template
;;;
            (if type-head-hash-id
                (setf (tp-defn-fsm type-head-np-template)
                     (fsm::symsubst reserved-id type-head-hash-id (tp-defn-fsm type-head-np-template
                                                                                                  )))
                (error "No hash code for Type phrase head~%"))))
(defun
 sort-type-matches
 (sort-vector)
 (stable-sort
  sort-vector
  #'(lambda (x y)
         (if (> (aref x 0)
                (aref y 0))
             t
             (if (< (aref x 0)
                    (aref y 0))
                 nil
                 (if (> (aref x 1)
                        (aref y 1))
                     t
                     (if (< (aref x 1)
                            (aref y 1))
                         nil
                         (if (> (aref x 2)
                                (aref y 2))
                             t
                             (if (< (aref x 2)
                                    (aref y 2))
                                 nil
                                 (if (> (aref x 3)
                                        (aref y 3))
                                     t
                                     (if (< (aref x 3)
                                            (aref y 3))
                                         nil
                                         (> (aref x 4)
                                            (aref y 4)))))))))))))
(defun find-matches-in-instance (type-np hypo-np instances plural-posn templates &key (verbose nil))
    (let ((plural nil)
          (matches (make-array 0 :adjustable t :fill-pointer 0))
          doc-id pair sent-index art composed-tokens sents singular template match-start match-end
          hypo-and-type-included)
;;; Returns a list of matches for the given data. called by FIND-MINIMUM-MISMATCH.
;;; Templates must match --- no NIL matches are recorded
      (when plural-posn
         (multiple-value-setq (singular plural)
             (get-sing-and-plural (aref type-np plural-posn)))
         (when (null plural)
             (when *gr-verbose* (format t "FAILED TO CONSTRUCT PLURAL FOR: ~a~%"))))
      (dotimes (index (length instances))
         (setq pair (aref instances index))
         (setq doc-id (car pair))
         (setq sent-index (cdr pair))
         (setq art (get-article doc-id))
         (setq sents (article-defn-words art))
         (setq composed-tokens (article-defn-composed-tokens art))
         (when (or (null sents)
                   (null composed-tokens))
             (format t "ERROR: sents or tokens null for doc-id: ~a~%" doc-id))
         (dolist (template-name templates)
             (when (null (setq template (find template-name *templates* :key #'tp-defn-name
                                                         :test #'string=)))
                 (error "Cant find: ~a~%" template-name))
             (multiple-value-setq (match-start match-end hypo-and-type-included)
                 (validate-template type-np hypo-np (aref sents sent-index)
                         (aref composed-tokens sent-index)
                         (tp-defn-fsm template)
                         :terse
                         (null verbose)))
             (when match-start
                 (vector-push-extend (make-tp-match-defn :name template-name :doc-id doc-id
```

```
DSK:<project>markov/thrivo>dtagger>franz4.1>patent-source>type-ranking.LISP.1    1-Jun-93 20:57:51
Page 3

:sent sent-index :start match-start :end match-end
                              :hypo-np (copy-seq hypo-np))
                    matches)
            when (and verbose *gr-verbose*)
              (format t "Template: ~a Matched doc: ~a sent ~a~%" template-name doc-id
                      sent-index)
              (format t "Type NP: ~a Hypo NP: ~a~%" (curr-word-str 0
                                                                  (1- (length type-np))
                                                                  type-np)
                                                   (curr-word-str 0 (1- (length hypo-np))
                                                                  hypo-np)))))))
       matches))
```

Kupiec

Document name: {DSK}<project>markov>trivp>qtagger>franz4.1 patent-source>query-np-ranking.LISP;1
Document date: Thu Jun 3 21:03:05 1993
Printing date/time: June 3, 1993 9:08:31 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
[DSK]<project>markov>trivo>qtagger>franz4.1>patent-source>query-np-ranking.LISP:1    1-Jun-93 21:02:5
Page 1

;;;-*- Package: USER; Syntax: Common-Lisp; Base: 10 -*-
;;; File converted on 5-Mar-93 08:27:34 from source query-np-ranking
;;; Original source {dsk}<project>markov>trivo>qtagger>franz4.1>query-np-ranking.;3 created 5-Mar-93 0
.01
;;;; Copyright (c) 1993 by Xerox Corporation
(provide "QUERY-NP-RANKING")
(in-package 'USER')
;;; Shadow. Export. Require. Use-package. and Import forms should follow here
(provide "QUERY-NP-RANKING")
(in-package "USER")
(defun print-query-np-scores (score-vec)
     (let ((nr-hypo-query-nps (aref score-vec 0))
           (total-hypo-query-score (aref score-vec 1))
           (nr-q-nps (aref score-vec 2))
           (total-query-np-score (aref score-vec 3))
           (doc-id (aref score-vec 4))
           (hypo (aref score-vec 5)))
        (print-who-hypo-info hypo :show-rooted nil)
        (format t "   Occurring Query NP anywhere nr./total score: ~3D/~A~%" nr-q-nps
                 total-query-np-score)
        (format t "   Co-occurring Hypo + Query NP's nr./total score: ~3D/~A~%"
                 nr-hypo-query-nps total-hypo-query-score)
        (dotimes (index (length (aref score-vec 6)))
           (format t "   ~A:~21,3T~3D/~3A    Sent: ~A/~A~%" (get-query-np-str index)
                  (aref (aref score-vec 6)
                        index)
                  (aref (aref score-vec 8)
                        index)
                  (aref (aref score-vec 7)
                        index)
                  (aref (aref score-vec 9)
                        index)))))
(defun print-query-np-rank (&key (how-many 20)
                                 (nr nil))
     (let (score-vec)
        (format t "~%Best Hypos. ranked on Query NP Scores...~%~%" how-many)
        (do ((index 0 (1+ index)))
            ((or (= index how-many)
                 (= index (length *sorted-q-np-scores*))))
           (when (or (null nr)
                     (= nr index))
              (setq score-vec (aref *sorted-q-np-scores* index))
              (print-query-np-scores score-vec)))))
(defun sort-query-np-scores (sort-vector)
     (stable-sort sort-vector
           #'(lambda (x y)
                (if (> (aref x 2)
                       (aref y 2))
                   t
                   (if (< (aref x 2)
                          (aref y 2))
                      nil
                      (if (> (aref x 3)
                             (aref y 3))
                         t
                         (if (< (aref x 3)
                                (aref y 3))
                            nil
                            (if (> (aref x 0)
                                   (aref y 0))
                               t
                               (if (< (aref x 0)
                                      (aref y 0))
                                  nil
                                  (> (aref x 1)
                                     (aref y 1)))))))))))
(defun rank-hypos-by-query-np nil (let ((nr-hypos (length *who-hypos*))
                                         hypo)
;;;
;;; This finds the best query np scores that occur in the same document, for the various who-hypos.
;;;
        (when *qr-verbose* (format t
                                    "Within-Document Max Query NP Scores...~%"
                                    ))
```

```
[DSK]<project>markov>c-- .s>otagger>franz4.i>patent-source>query-np-ranking.LISP:1   3-Jun-93 21:02:
Page 2

(setq *sorted-q-np-scores* (make-array 0 :adjustable t
                                                                            :fill-pointer 0))
                              (dotimes (hypo-index nr-hypos)
                                  (setq hypo (aref *who-hypos* hypo-index))
;;;
;;; First find all the articles involved. clean the visit marks, and set up a query np array in
;;; each. initialized to zero.
;;; Must go through all articles to make sure visit marks are nil. because make-q-np-scores
;;; searches this list, not the instances
                                  (dolist (the-article *tagged-articles*)
                                      (setf (article-defn-visited the-article)
                                            nil))
                                  (setup-q-np-ranking (who-defn-instances hypo))
;;;
;;; Then go through the instances involving the who hypos picking up the highest scoring sentences
;;; covering the most query np s. Then the highest scoring sentences involving query np
;;; co-occurrence, finally just single query np's (Both the latter can be done by ranking sentence
;;; scores. )
;;;
;;; Find best scores in the article referred to by this instance, and maintain a copy of the best
;;; to date
;;;
                                  (best-q-nps-with-hypo (who-defn-instances hypo))
                                  (best-q-nps (who-defn-instances hypo))
;;;
;;; Now go through all the articles involved one more time. and build vectors of the best q scores
;;; for both hypo cooccurrence and occurrence anywhere in the article. All the relevant articles
;;; have their visit marks set. The sort vector will have one entry per who-hypo having
;;; corresponding indices. but will get sorted next so I must record the hypo
;;;
;;; It is possible for hypos to have no instances (e.g. a who hypo for a name like 1087 "Earl
;;; Warren". Don't make null entries in *SORTED-Q-NP-SCORES* for them. Such hypos are typically
;;; root hypos for name verification.
                                  (when (who-defn-instances hypo)
                                      (make-q-np-scores hypo)))
;;; Now rank the hypos
                              (setq *sorted-q-np-scores* (sort-query-np-scores
                                                              *sorted-q-np-scores*))))
(defun make-q-np-scores (hypo)
    (let ((nr-query-nps (length *original-query-np-starts*))
          (at-least-one-visited nil)
          doc-id art best-hypo-query-nps best-sent-ids max-q-scores max-q-sent-ids
          nr-hypo-query-nps total-hypo-query-score total-query-np-score nr-q-nps)
;;; untagged-score comes from untagged match
        (dolist (the-article *tagged-articles*)
            (when (article-defn-visited the-article)
;;; It is possible for hypos to have no instances (e.g. a who hypo for a name like 1087 "Earl
;;; Warren". Don't make null entries in the *SORTED-Q-NP-SCORES* for them
                (setq at-least-one-visited t)
                (setq doc-id (article-defn-article the-article))
                (setq art (get-article doc-id))
;;; Guaranteed to visit each article once
                (setq best-hypo-query-nps (article-defn-best-hypo-q-nps art))
                (setq best-sent-ids (article-defn-best-q-sent-ids art))
                (setq max-q-scores (article-defn-best-art-q-scores art))
                (setq max-q-sent-ids (article-defn-best-art-q-sent-ids art))
                (setq nr-hypo-query-nps 0)
                (setq total-hypo-query-score 0)
                (setq total-query-np-score 0)
                (setq nr-q-nps 0)
                (dotimes (np-index nr-query-nps)
;;; NOTE UNTAGGED-SCORE should be a global ?
;;; Note that the total score makes use of an "untagged score" but the latter is not considered as
;;; making a valid query np.
                    (incf total-hypo-query-score (aref best-hypo-query-nps np-index))
                    (incf total-query-np-score (aref max-q-scores np-index))
                    (when (> (aref best-hypo-query-nps np-index)
                             *untagged-score*)
                        (incf nr-hypo-query-nps))
                    (when (> (aref max-q-scores np-index)
                             *untagged-score*)
                        (incf nr-q-nps)))))
;;; need to take copies of the vectors because they will be overwritten for next hypo.
        (when at-least-one-visited
```

```
[SK]<project>markov>trivia>qtagger>franz4.1>patent-source>query-np-ranking._LSP:1    3-Jun-93 21:02:1
Page 3

(vector-push-extend (vector nr-hypo-query-nps total-hypo-query-score nr-q-nps
                                       total-query-np-score doc-id hypo (copy-seq
                                                                             best-hypo-query-nps
                                                                           )
                                       (copy-seq best-sent-ids)
                                       (copy-seq max-q-scores)
                                       (copy-seq max-q-sent-ids))
                         *sorted-q-np-scores*))))
(defun best-q-nps (instances)
   (let ((nr-query-nps (length *original-query-np-starts*))
         max-art-q-scores max-art-q-sent-ids max-art-q-sent-scores doc-id art art-q-scores
         sent-q-scores sentence-scores sent-score np-score best-so-far)
;;;
;;; Find the highest scores associated with each query np in every document that is included in
;;; INSTANCES. This is a level of ranking next lower in absolute priority than the co-occurrence of
;;; the hypo with query np's. (see RANK-HYPOS-BY-QUERY-NP)
;;;
         (dotimes (index (length instances))
             (setq doc-id (car (aref instances index)))
             (setq art (get-article doc-id))
             (when (null (article-defn-visited art))
;;; This only needs to be done once per article. per hypo
                 (setf (article-defn-visited art)
                       t)
                 (setq max-art-q-scores (article-defn-best-art-q-scores art))
                 (setq max-art-q-sent-ids (article-defn-best-art-q-sent-ids art))
                 (setq max-art-q-sent-scores (article-defn-best-art-q-sent-scores art)))
;;;
             (setq sentence-scores (article-defn-scores art))
             (setq art-q-scores (article-defn-q-np-scores art))
             (dotimes (sent-index (length sentence-scores))
;;;
;;; These are the sentence indexes in which the highest scoring query np occurred.
;;;
                 (setq sent-q-scores (aref art-q-scores sent-index))
                 (setq sent-score (aref sentence-scores sent-index))
;;; These are the sentence scores associated with the highest ranking query np's (Query np's that
;;; have the same  score  are outranked by ones having the same score but a higher sentence score.
                 (dotimes (np-index nr-query-nps)
                    (setq np-score (aref sent-q-scores np-index))
                    (setq best-so-far (aref max-art-q-scores np-index))
                    (when (and (> np-score 0)
                               (or (> np-score best-so-far)
                                   (and (= np-score best-so-far)
                                        (> sent-score (aref max-art-q-sent-scores np-index))
                                   ))
                       (setf (aref max-art-q-scores np-index)
                             np-score)
                       (setf (aref max-art-q-sent-scores np-index)
                             sent-score)
                       (setf (aref max-art-q-sent-ids np-index)
                             sent-index)))))))
(defun best-q-nps-with-hypo (instances)
   (let ((nr-query-nps (length *original-query-np-starts*))
         doc-id art sent-index art-q-scores sent-q-scores sent-score-vec max-hypo-q-nps
         max-hypo-q-sent-ids max-hypo-sent-scores sent-score np-score best-so-far)
;;;
;;; This finds the sentences in which  the highest scoring QUERY NPS co-occur with the instances for
;;; a hypo. (ranked secondarily by sentence score).
;;; Note that because query np's are used. case splits could cause some word matches to get lost
;;; (cos after a split words did not form an np e.g. as "who was the last Anglo-Saxon..") In this
;;; situation, at least for type matches. we have been covered  by higher ranking criteria in
;;; detailed-who-type-match. --- Also there are FAIL-SAFE sentence scores assigned--- these would
;;; help here, but what about elsewhere, as they are generally crap.
;;;
         (dotimes (index (length instances))
             (setq doc-id (car (aref instances index)))
             (setq sent-index (cdr (aref instances index)))
             (setq art (get-article doc-id))
             (setq art-q-scores (article-defn-q-np-scores art))
             (setq sent-q-scores (aref art-q-scores sent-index))
             (setq sent-score-vec (article-defn-scores art))
             (setq sent-score (aref sent-score-vec sent-index))
;;; These are the highest scoring query nps in the given article (so far) that co-occur with the
```

```
[JSK]<project>markov>trivp>qtagger>franz4.1>patent-source>query-np-ranking.LISP:1    3-Jun-93 21:02:5
Page 4

;;; given hypo and its INSTANCES
            (setq max-hypo-q-nps (article-defn-best-hypo-q-nps art))
;;; These are the sentence indexes in which the highest scoring query nps occurred
            (setq max-hypo-q-sent-ids (article-defn-best-q-sent-ids art))
;;; These are the sentence scores associated with the highest scoring query np's. (Query np's that
;;; have the same score in BEST-HYPO-QUERY-NPS are outranked by ones having the same score but a
;;; higher sentence score.
            (setq max-hypo-sent-scores (article-defn-best-q-sent-scores art))
            (dotimes (np-index nr-query-nps)
                (setq np-score (aref sent-q-scores np-index))
                (setq best-so-far (aref max-hypo-q-nps np-index))
                (when (and (> np-score 0)
                           (or (> np-score best-so-far)
                               (and (= np-score best-so-far)
                                    (> sent-score (aref max-hypo-sent-scores np-index)))))
                    (setf (aref max-hypo-q-nps np-index)
                          np-score)
                    (setf (aref max-hypo-sent-scores np-index)
                          sent-score)
                    (setf (aref max-hypo-q-sent-ids np-index)
                          sent-index))))))
(defun setup-q-np-ranking (hypo-instances)
    (let ((nr-query-nps (length *original-query-np-starts*))
          doc-id art max-hypo-q-nps max-hypo-sent-scores max-hypo-q-sent-ids max-art-q-scores
          max-art-q-sent-scores max-art-q-sent-ids)
        (dotimes (index (length hypo-instances))
            (setq doc-id (car (aref hypo-instances index)))
            (setq art (get-article doc-id))
            (setq max-hypo-q-nps (article-defn-best-hypo-q-nps art))
            (setq max-hypo-q-sent-ids (article-defn-best-q-sent-ids art))
            (setq max-hypo-sent-scores (article-defn-best-q-sent-scores art))
            (setq max-art-q-scores (article-defn-best-art-q-scores art))
            (setq max-art-q-sent-ids (article-defn-best-art-q-sent-ids art))
            (setq max-art-q-sent-scores (article-defn-best-art-q-sent-scores art))
            (if (null max-hypo-q-nps)
                (progn (setf (article-defn-best-hypo-q-nps art)
                             (make-array nr-query-nps :initial-element 0))
                       (setf (article-defn-best-q-sent-scores art)
                             (make-array nr-query-nps :initial-element 0))
                       (setf (article-defn-best-q-sent-ids art)
                             (make-array nr-query-nps :initial-element nil))
                       (setf (article-defn-best-art-q-scores art)
                             (make-array nr-query-nps :initial-element 0))
                       (setf (article-defn-best-art-q-sent-scores art)
                             (make-array nr-query-nps :initial-element 0))
                       (setf (article-defn-best-art-q-sent-ids art)
                             (make-array nr-query-nps :initial-element nil)))
                (dotimes (index nr-query-nps)
                    (setf (aref max-hypo-q-nps index)
                          0)
                    (setf (aref max-hypo-sent-scores index)
                          0)
                    (setf (aref max-hypo-q-sent-ids index)
                          nil)
                    (setf (aref max-art-q-scores index)
                          0)
                    (setf (aref max-art-q-sent-scores index)
                          0)
                    (setf (aref max-art-q-sent-ids index)
                          nil))))))
```

Kupiec

Document name: {DSK}<project>markov>trivp>qtagger>franz4.1 patent-source>phrase-matching.LISP;1
Document date: Thu Jun 3 21:07:03 1993
Printing date/time: June 3, 1993 9:12:51 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
{DSK}<project>markov>trivp>qtagger>franz4.1>patent-source>phrase-matching.LISP:1    3-Jun-93 21:06:5
Page 1

;;;-*- Package: USER: Syntax: Common-Lisp: Base: 10 -*-
;;; File converted on 10-May-93 14:32:48 from source phrase-matching
;;;. Original source {dsk}<project>markov>trivp>qtagger>franz4.1>phrase-matching.:27 created 10-May-93
:57
;;;. Copyright (c) 1993 by Xerox Corporation
(provide "PHRASE-MATCHING")
(in-package "USER")
;;; Shadow. Export. Require. Use-package, and Import forms should follow here
;;; File converted on 28-Nov-90 14:29:04 from source phrase-matching Original source
;;; {piglet/n}<piglet>speech>kupiec>hmm>tagger>release>v3>phrase-matching.:1 created 27-Nov-90
;;; 17:30:37 Copyright (c) 1989, 1990 by Xerox Corporation
(provide "PHRASE-MATCHING")
(in-package "USER")
(defun get-reserved-hash-ids (&key (reserved-fsmvar-name "dummy-types"))
    (let (reserved-strings fsmvar (hash-id-list nil))
        (setq fsmvar (find reserved-fsmvar-name *fsmvars* :key #'fsmvar-defn-name :test
                         #'string-equal))
        (when (null fsmvar)
            (error "NO reserved fsmvar called ~A~%" reserved-fsmvar-name))
        (setq reserved-strings (find-strings nil (fsmvar-defn-expr fsmvar)))
        (when (< (length reserved-strings)
                 *min-nr-reserved-strings*)
            (error "NOT ENOUGH RESERVED STRINGS (~A) should have at least (~A)~%" (length
                                                                                    reserved-strings
                                                                                    )
                   *min-nr-reserved-strings*))
        (setq hash-id-list (map 'list #'(lambda (x)
                                          (gethash x *term-hash-table*))
                                reserved-strings))
        (when (position nil hash-id-list)
            (error "NULL reserved hash id in list: ~A~%" hash-id-list))
        hash-id-list))
(defun validate-who-type-np (phrase-type end-of-head &key (test-min-matches 1)
                             (limit (length *who-hypos*))
                             (debug-index nil)
                             (what nil))
    (let (any-root-refs who-hypo type-np title-reference root-instances)
;;;
;;; Last Modified 5 Feb 93 see below
;;; If RIGHTMOST-NON-MIXED-CASE-START is not nil, it means that there are mixed uppercase words in
;;; the type np, in this case only have strict enforcement of the rightmost single head word.
;;;
;;; First of all go through existing instances of tagged docs, to try and find a type match. (This
;;; is fastest). Currently 11/13/92, only validated person name who-hypos are considered....Also
;;; Note that only the head-start and end-of-head are used. Because the longest match are
;;; returned, if a phrase extends from the LEFTMOST-START to TEMPLATE-END it will be returned
;;; anyway...Maybe just do single word head checking and filter out other stuff later....Yes
;;;
;;; Template matches are made for the weakest evidence -- just the last word of the head noun phrase
;;; (within the type phrase). Longest matches are returned, and these are analyzed for suitability
;;; afterwards.
;;;
        (when (null (or (eq phrase-type :n)
                        (eq phrase-type :v)))
            (error "VALIDATE-WHO-TYPE-NP was given illegal PHRASE-TYPE: ~A~%" phrase-type))
        (when (eq phrase-type :n)
            (setq type-np (subseq *original-query-words* end-of-head (1+ end-of-head))))
        (when (eq phrase-type :v)
            (when (= 0 (length *original-query-verbs*))
                (error "VALIDATE-WHO-TYPE-NP called in :v mode with no main verb"))
            (when (> (length *original-query-verbs*)
                     1)
                (format t "WARNING: Only first question verb is accounted for~%"))
            ;; TheSTEM of the verb is not used yet, as above with the np. Matching with stems
            ;; occurs lower down (in WORDS-PRESENT in validate-template)
            (setq type-np (subseq *original-query-words* (car *original-query-verbs*)
                                  (1+ (car *original-query-verbs*)))))
        (when *qr-verbose*
            (format t "LAST WORD OF THE ~A IS: ~A~%" (if (eq :n phrase-type)
                                                         "TYPE NP"
                                                         "1st VERB PHRASE")
                    type-np))
        (dotimes (hypo-index limit)
            (when (or (null debug-index)
```

```
[DSK)<project>markov>tr-vp>gtagger>franz4.1>patent-source>phrase-matching..LSP:1   3-Jun-93 21:06:54
Page 2

(= debug-index hypo-index))
                  (setq who-hypo (aref *who-hypos* hypo-index))
                  (setq title-reference (who-defn-title-ref who-hypo))
                  (setq root-instances (who-defn-rooted-instances who-hypo))
                  (setq any-root-refs nil)
                  (dotimes (root-ref-index (length root-instances))
                     (when (root-defn-subsuming-root (aref root-instances root-ref-index))
                        (setq any-root-refs t)))
::: 5 Feb 93.
::: First look at hypos that have instances, which contained at least one word of the original
::: question, and which are either peoples names, or (5 FEB 93) have at least one root reference (to
::: root hypos that are peoples names). (Otherwise we are wasting computation??)
:::
                  (when (or title-reference any-root-refs what)
                     (when *gr-verbose*
                        (format t "~%Template matching who-hypo: ~a title-ref: ~a art-ref ~a~%"
                                (who-defn-hypo-name who-hypo)
                                title-reference
                                (who-defn-art-ref who-hypo)))
                     (who-type-template-match phrase-type type-np who-hypo :test-min-matches
                                test-min-matches :terse t :analysis-limit (if what
                                                                              50
                                                                              100)))
::: 9 feb assign the template matches in VALIDATE-WHO-TYPE-NP, not here
::: Now we have template instantiations, we need to see if they are acceptable, and if so, which
::: ones are most suitable.
:::
::: np-type (e.g. "chief justice" or "famed English site") looks to see if the given np-hypo (e.g.
::: "Earl Warren" or "Stonehenge") can be matched against it using various templates. If the full
::: np-type doesn't match left-to-right sub phrases are tried, (e.g. "justice" or "English site"
::: etc). If instances are present, they are used for matching. If they fail or aren't present, a
::: query is generated automatically.
   )
                  (when (and *gr-verbose* (= hypo-index (1- limit)))
                     (format t "WARNING: stopped validating hypos after nr: ~A~%" hypo-index)))))
(defun who-type-template-match (phrase-type type-np who-hypo &key (test-min-matches 1)
                                                                  (terse nil)
                                                                  (analysis-limit 100))
    (let ((nr-matches 0)
          reserved-id)
       (when (and nil type-np (eq phrase-type :n))
::: Just doing head of type phrase now (4 May 93)
          (setq reserved-id (car (get-reserved-nash-ids)))
          (setf (gethash (aref type-np 0)
                         *term-nash-table*)
                reserved-id))
       (when (and (who-defn-instances who-hypo)
                  (> (who-defn-score who-hypo)
                     0))
::: This head is safe as the one to use for plural forms...
          (setq nr-matches (test-np-type phrase-type type-np who-hypo (who-defn-instances
                                                                         who-hypo)
                                         :analysis-limit analysis-limit :terse terse)))
::: When no matches, need another secondary search to try to find matches in other articles.
          (when (< nr-matches test-min-matches)
::: Go for full new query in the encyclopedia
::: For these unbounded searches need to check that a name is not getting picked up to spuriously
::: match. E.g. in article about Anthony Kennedy, there is a match between the type NP "justice"
::: and Kennedy (i.e. Anthony Kennedy). If the hypo occurs in the title the filter the template
::: match out. This is done with :DO-SECONDARY-SEARCH t
             (test-np-type phrase-type type-np who-hypo nil :analysis-limit analysis-limit :terse
                           terse))
          (when (and nil type-np (eq phrase-type :n))
::: Just doing head of type phrase now (4 May 93)
             (remhash (aref type-np 0)
                      *term-hash-table*))))
(defun words-present (type-np hypo-np sent &key (start 0)
                                                (end (length sent))
                                                (stemmed-type nil)
                                                (stemmed-sent nil))
    (let ((hypo-present nil)
          (type-present nil))
::: Inflected posn is the rightmost for the plural of a noun phrase, and is the only posn for verbs,
::: which are assumed to be single words??
```

000084

```
DSK\<project>markov/trivo/qtagger>franz4.1>patent-source>phrase-matching.LISP:1   3-Jun-93 21:06:54
Page 3

;;; IMPORTANT NOTE: RIGHT NOW THIS IS A STRICT WORD MATCH --- NO INFLECTIONS ARE BEING ACCOUNTED FOR.
;;; 5 March 1993 Just see what happens if we admit loose stem matching
          (setq hypo-present (search hypo-np sent :start2 start :end2 end :test #'equalp))
          (when hypo-present
               (setq type-present (search (or stemmed-type (map 'vector #'get-stem type-np))
                                          (or stemmed-sent (map 'vector #'get-stem sent))
                                          :start2 start :end2 end :test #'equalp)))
          (and hypo-present type-present)))
(defun test-np-type (phrase-type type-np who-hypo existing-instances &key (remake nil)
                                 (analysis-limit 50)
                                 (terse nil))
  (let (nr-matches)
    (setup-templates :make-and-dump remake)
    (if (null existing-instances)
        (progn
;;; The filtering of spurious hypo matches only has to be done (via MAKE-TYPE-HYPO-QUERY) if there
;;; were no existing instances, as filtering has already been done if instances is non nil. It is
;;; needed for filtering a Kennedy hypo match for a "justice" type NP as in Justice Kennedy, in
;;; article about Anthony Kennedy... It was not the same Kennedy as was represented by the who hypo.
          (setq nr-matches (make-type-hypo-query phrase-type type-np who-hypo
                                                  analysis-limit :terse terse)))
        (progn (setq nr-matches (validate-np-sub-type phrase-type type-np who-hypo
                                                       existing-instances nil :terse terse))))
    nr-matches))
(defun make-type-hypo-query (phrase-type type-np who-hypo analysis-limit &key (terse nil))
  (let ((hypo-wds (who-defn-hypo-name who-hypo))
        (hypo-wd-str "")
        (saved-verbosity *gr-verbose*)
        (type-wd-str "")
        hit-vec nr-matches)
    (dotimes (index (length hypo-wds))
      (setq hypo-wd-str (concatenate 'string hypo-wd-str " " (copy-seq (aref hypo-wds index
                                                                             )))))
    (do ((index 0 (1+ index)))
        ((= index (length type-np)))
      (setq type-wd-str (concatenate 'string type-wd-str " " (copy-seq (aref type-np index))))
      )
    (when (null terse)
      (format t "--- SECONDARY QUERY: Hypo NP: ~S  Type NP: ~S ..." hypo-wds type-np))
;;;
;;; A big assumption here is that the phrases will get re-tagged as np s again.....5Mar 1993
;;; addressed this problem.
;;;
;;; Prevent query from dropping terms.....to do so is completely wasted here.
;;; NP broadening of 10 for long lists as in 9171 novelists such as ......Mailer
;;;
    (setq *gr-verbose* nil)
;;; 5 Mar. 1993 It is now important that TYPE-WD-STR follows the semicolon. NOTE It is not
;;; guaranteed that the verb get used in the query......
    (unwind-protect
        (query (concatenate 'string hypo-wd-str " ; " type-wd-str)
               :max-hits analysis-limit :subsumption-limit analysis-limit :np-broadening
               '(1 10)
               :full-term-dropping nil :show-results nil :force-pos-after-scolon phrase-type)
      (setq *gr-verbose* saved-verbosity))
    (setq hit-vec (hits-from-query-list analysis-limit))
    (when (null terse)
      (format t "~A HITS~%" (length hit-vec)))
    (setq nr-matches (validate-type-hypo-query phrase-type type-np who-hypo hit-vec :terse t)
          )
    nr-matches))
(defun validate-type-hypo-query (phrase-type type-np who-hypo hit-vec &key (max-doc-size 50000)
                                             (terse nil))
  (let (doc-id doc-size art sents sent nr-matches (hypo-wds (who-defn-hypo-name who-hypo))
        (new-instances (make-array 0 :adjustable t :fill-pointer t)))
    (dotimes (index (length hit-vec))
      (setq doc-id (aref hit-vec index))
      (setq doc-size (concordance::get-doc-size doc-id concordance::*tdb*))
      (if (>= doc-size max-doc-size)
          (when (null terse)
            (format t "WARNING: Article: ~A ignored---too long (~A) (Max: ~A)~%" doc-id
                    doc-size 50000))
          (progn
;;; This means tagging a whole article... really just want to tag sentences that are relevant. 8
```

```
[DSK]<project>markov>trivo>qtagger>franz4.1>patent-source>phrase-matching.LISP;1    3-Jun-93 21:06:54
Page 4

;;; March 93 --No don't nee this just for comparing stems!!
                         (when (null terse)
                           (format t "Getting doc: ~a: ~A ..." doc-id (tdb::doc-title doc-id
                                                                     concordance::*tdb*)
                                     (length sents)))
;;; 11 March put :tagged t as there was a bug in fst-read-sentence with :tagged nil. Probably did
;;; not save much???
;;; (setq art (get-article doc-id :tagged nil))
                         (setq art (get-article doc-id :tagged t))
                         (setq sents (article-defn-words art))
                         (when (null terse)
                           (format t " Nr sents: ~a~%" (length sents)))
                         (dotimes (sent-index (length sents))
                           (setq sent (aref sents sent-index))
;;; See if both type and hypo NP's are present...Allow for plural word in type np
                           (when (words-present type-np hypo-wds sent)
                             (vector-push-extend (cons doc-id sent-index)
                                                 new-instances)
                             (when (and nil (null terse)
                                        *gr-verbose*)
                               (format t "  Hypo ~A and Type ~A in sent: ~a~%"
                                       (curr-word-str 0 (1- (length hypo-wds))
                                                      hypo-wds)
                                       (curr-word-str 0 (1- (length type-np))
                                                      type-np)
                                       sent-index)))))
             (setq nr-matches (validate-np-sub-type phrase-type type-np who-hypo new-instances t
                                                   :terse terse))
             nr-matches))
(defun validate-np-sub-type (phrase-type type-np who-hypo instances doing-secondary-search &key
                                                    (terse t))
;;;
;;; Does the hypo-name of who hypo and type-np satisfy any of the given templates in any of the
;;; given instances...
;;;
  (let ((hypo-wds (who-defn-nypo-name who-hypo))
        (nr-matches 0)
        (doc-already-mentioned t)
        (hypo-might-refer-to-title nil)
        (templates (if (eq phrase-type :n)
                       *type-phrase-templates*
                       *verb-phrase-templates*))
        doc-id pair sent-index art adjusted-title-words)
;;;
;;; 9 Feb 93. changed MATCHES from an array built for (who-defn-template-matches who-hypo) to adding
;;; the match to the root-hypo involved -- this is much more accurate. Thus the match gets assigned
;;; to the right hypo from the start.
;;;
    (when (and nil (= 0 (length instances)))
      (format t "ZERO INSTANCES IN VALIDATE-NP-SUB-TYPE ~%"))
    (dotimes (index (length instances))
      (setq pair (aref instances index))
      (setq doc-id (car pair))
      (setq sent-index (cdr pair))
      (setq art (get-article doc-id))
      (setq adjusted-title-words (article-defn-adjusted-who-title art))
      (when (and doing-secondary-search (null adjusted-title-words)
                 (article-defn-person-name-p art))
        (setq adjusted-title-words (get-adjusted-title doc-id))
        (setf (article-defn-adjusted-who-title art)
              adjusted-title-words))
;;;
;;; Need a special check if a secondary, (unconstrained) template match is being done.
;;;
;;; See if this doc-id exists as an art-ref anywhere in any who-hypo constructed so far. If so,
;;; all is fine. If not, check the title to see if the hypo e.g. "Kennedy" might be for another
;;; person e.g. "Anthony Kennedy" that has not been put forward so far. Thus a false match may be
;;; possible e.g. Kennedy (John F.) getting assigned the type NP "justice". To avoid this
;;; possibility, if the hypo refers to the title, throw out any template match that was made for the
;;; doc-id. (We were looking for Earl Warren as the chief justice)
;;;
      (when doing-secondary-search
        (setq doc-already-mentioned (position doc-id *who-hypos* :key
                                              #'(lambda (x)
```

```
;DSK\<project>markov/trivo/qtagger/franz4.1>patent-source>phrase-matching.LISP:1   3-Jun-93 21:06:54
Page 6

(who-defn-art-ref x))))
            (setq hypo-might-refer-to-title (np-refers-to-title 0 (1- (length hypo-wds))
                                                hypo-wds adjusted-title-words)))
          (when (and doing-secondary-search hypo-might-refer-to-title (null
                                                                    doc-already-mentioned
                                                                    ))
             (when *gr-verbose*
                (format t "Doc ~a: ~a IGNORED for Template matching~%" doc-id (
                                                                    article-defn-title
                                                                    art))
                (format t "---Possible Name AMBIGUITY for hypo: ~a~%" hypo-wds)))
          (when (and nil *gr-verbose* hypo-might-refer-to-title)
             (format t "HYPO-MIGHT-REFER-TO-TITLE is true~%"))
          (when (or (null doing-secondary-search)
                    doc-already-mentioned
                    (null hypo-might-refer-to-title))
             (incf nr-matches (validate-np-templates type-np who-hypo art sent-index templates
                                              :terse terse))))
;;; 15 Jan 93 If there were no matches, return nil rather than a zero length array OBSOLETE 9 feb 93
;;; 9 feb assign the template matches down here, not in VALIDATE-WHO-TYPE-NP
          (when (and (null terse)
                     *gr-verbose*)
             (format t "--- ~a matches found~%" nr-matches))
;;; Return the number of matches for WHO-TYPE-TEMPLATE-MATCH to find out if it should do a
;;; secondary search
          nr-matches))
(defun validate-np-templates (type-np who-hypo art sent-index templates &key (terse t))
     (let ((hypo-wds (who-defn-hypo-name who-hypo))
           (doc-id (article-defn-article art))
           (at-least-one-match nil)
           (nr-matches 0)
           sent template match-start match-end hypo-and-type-included sents composed-tokens
           root-hypo)
       (setq sents (article-defn-words art))
       (setq sent (aref sents sent-index))
       (setq composed-tokens (article-defn-composed-tokens art))
       (when (or (null sents)
                 (null composed-tokens))
          (format t "ERROR: sents or tokens null for doc-id: ~a~%" doc-id))
;;; Try and find the appropriate root hypo for this instance, with the help of find-root, the match
;;; is then attached to (who-defn-template-matches root-hypo)
;;; If This instance does not have a root reference it belongs to this hypo..
       (setq root-hypo (or (find-root who-hypo doc-id sent-index)
                           who-hypo))
       (dolist (template-name templates)
          (when (null (setq template (find template-name *templates* :key #'tp-defn-name :test
                                           #'string=)))
             (error "Cant find: ~a~%" template-name))
          (multiple-value-setq (match-start match-end hypo-and-type-included)
             (validate-template type-np hypo-wds sent (aref composed-tokens sent-index)
                                (tp-defn-fsm template)
                                :terse terse))
          (when match-start
             (setq at-least-one-match t)
;;;
;;; The :hypo-np slot is for later use in FIND-MINIMUM-MISMATCH. It needs to know the exact length
;;; of the who hypo np that was involved in the match. This info gets lost from a template when it
;;; gets assigned to its root hypo, which of course probably is longer than the one involved in the
;;; match. So remember it.
;;;
             (incf nr-matches)
             (add-to-match (make-tp-match-defn :name template-name :doc-id doc-id :sent
                                               sent-index :start match-start :end match-end :hypo-np
                                               (copy-seq hypo-wds))
                           root-hypo)
             (when (and (null terse)
                        *gr-verbose*)
                (format t "      Hypo/Type: ~A/~A  Doc/Sent: ~a/~a Template: ~a~%"
                          (curr-word-str 0 (1- (length hypo-wds))
                                         hypo-wds)
                          (curr-word-str 0 (1- (length type-np))
                                         type-np)
                          doc-id sent-index template-name))))
       (when (and (null at-least-one-match)
```

```
[DSK]<project>markov>tr-vo>qtagger>franz4.1>patent-source>phrase-matching.LISP:1   3-Jun-93 21:06:5
Page 6

(words-present type-np hypo-wds sent))
                    (when (and (null terse)
                               *gr-verbose*)
                      (format t "---    NIL Match: ~a~%" (curr-word-str 0 (1- (length sent))
                                                                        sent))
                      (format t "       Hypo/Type: ~a/~a  Doc/Sent: ~a/~a Template: NIL~%"
                              (curr-word-str 0 (1- (length hypo-wds))
                                             hypo-wds)
                              (curr-word-str 0 (1- (length type-np))
                                             type-np)
                              doc-id sent-index))
   :::
   ::: A match with a template name and start/end of nil means no match but both hypo and type NP's
   ::: were present in the sentence (This is guaranteed from instances that were passed to this
   ::: routine---15 Jan 93 NO IT ISN'T -f Called direct from TEST-NP-TYPE). This could well be useful
   ::: later for lower grade matching or other analysis.FIXED--- CHECK TYPE AND HYPO PRESENT...
   :::
                    (incf nr-matches)
                    (add-tp-match (make-tp-match-defn :name nil :doc-id doc-id :sent sent-index :start
                                                      nil :end nil :hypo-np (copy-seq hypo-wds))
                                  root-hypo))
                 nr-matches))
(defun validate-template (type-np hypo-np sent composed-tokens fsm &key (start 0)
                                   (end nil)
                                   (terse nil))
  (let ((stemmed-type (map 'vector #'get-stem type-np))
        (stemmed-sent (map 'vector #'get-stem sent))
        (end-index-copy 0)
        start-index-copy
        (template-matched nil)
        sent-end
        (nps-in-sent nil))
    (setq sent-end (or end (length sent)))
    (setq start-index-copy start)
   ::: Based on a copy of FIND-MAXIMAL-NPS.
    (setq end-index-copy -1)
   :::
   ::: Only the first match of any multiple matches is used as evidence.
   :::
   ::: 16 Nov 92 The longest rightmost match is used. otherwise there would be problems with stuff like
   ::: "Jerusalem is the capital of Israel" versus "Beersneba is the capital of Israel 's Southern
   ::: District". because the shortest match means that both are equally valid. but the correct one has
   ::: shorter scope.
   ::: ---16 Nov 92.....It is still the case that the first  leftmost match is used as an anchor foe
   ::: everything else
   :::
   ::: 11 Mar 93 It is worth seeing if the type and hypo np's are anywhere in the sentence before
   ::: considering each start/end combination. Most of the time this has already been filtered out--->
   ::: 12 Nov 92. If NP-TYPE-VEC and NP-HYPO-VEC are nil, do not do any matching, just accept template
   ::: match. (for calls from find-wh-vb-type-np)  5 MAR 93  NOT OBSOLETE
   :::
            (when (or (words-present type-np hypo-np sent :stemmed-type stemmed-type :stemmed-sent
                                     stemmed-sent)
                      (and (null hypo-np)
                           (null type-np)))
              (do ((start-index start (1+ start-index)))
                  ((or template-matched (>= start-index sent-end)))
                (when (> start-index end-index-copy)
   ::: To be a match, all the words of the type np must be present. in order, in the sentence fragment
   ::: and likewise the words of the hypo np. This is quicker than doing intersection operations. and
   ::: is a bit hacky in that no use is being made of markers within the fsm matchers (which are not
   ::: yet implemented at 5 Nov 1992)
   :::
   ::: All the words must be present. and the template must match of course..
   ::: 12 Nov 92. If NP-TYPE-VEC and NP-HYPO-VEC are nil, do not do any matching, just accept template
   ::: match. (for calls from find-wh-vb-type-np)  5 MAR 93  NOT OBSOLETE
   :::
                    (when (and nil *debug*)
                      (format t "start: ~a " start-index))
   ::: Find the rightmost end match
                    (do ((end-index start-index (1+ end-index)))
                        ((>= end-index sent-end))
                      (when (and nil *debug*)
```

```
[DSK]<project>markov>trivo>dtagger>franz4.1>patent-source>phrase-matching.LISP:1    3-Jun-93 21:06:5-
Page 7
                           (format t " end: ~a~%" end-index))
                  (when (np-match fsm start-index end-index composed-tokens)
                    (setq nps-in-sent (words-present type-np hypo-np sent :start start-index
                                                    :end (1- end-index)
                                                    :stemmed-type stemmed-type :stemmed-sent
                                                    stemmed-sent))
                    (when (or nps-in-sent (and (null hypo-np)
                                               (null type-np)))
                      (setq end-index-copy end-index)
                      (setq start-index-copy start-index)
                      (when *debug* (format t "found -- start: ~a end: ~a~%"
                                            start-index-copy end-index-copy))
                      (setq template-matched t)))))
              (when template-matched
                (when (and (null terse)
                           *gr-verbose*)
                  (format t "--+Template Match: ~a~%" (curr-word-str start-index
                                                                    end-index-copy sent)))))))
       (when (and nil *debug*)
         (format t "~%"))
       (if template-matched
           (values start-index-copy end-index-copy nps-in-sent)
           (values nil nil nps-in-sent))))
```

Kupiec

Document name: {DSK}<project>markov>trivp>qtagger>franz4.1 patent–source>root–hypos.LISP;1
Document date: Thu Jun 3 20:54:54 1993
Printing date/time: June 3, 1993 9:00:42 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
:SK}<project>markov>trivo>dtagger>franz4.l>patent-source>root-hypos..LSP:1    3-Jun-93 23:54:14
Page 1

;;;-*- Package: USER; Syntax: Common-Lisp; Base: 10 -*-
;;; File converted on 20-May-93 15:47:38 from source root-hypos
;;; Original source (dsk}<project>markov>trivo>dtagger>franz4.l>root-hypos.:24 created 12-May-93 17:1
;;; Copyright (c) 1993 by Xerox Corporation
(provide "ROOT-HYPOS")
(in-package "USER")
;;; Shadow, Export, Require, Use-package, and Import forms should follow here
(provide "ROOT-HYPOS")
(in-package "USER")
(defun hypo-name-subsumed (subsumed-hypo subsuming-hypo)
    (let* ((subsumed-name (who-defn-hypo-name subsumed-hypo))
           (subsuming-name (who-defn-hypo-name subsuming-hypo))
           (nr-subsumed-words (length subsumed-name))
           (hypo-subsumed nil)
           (hypo-overlap 0))
;;;
;;; Find out if the name of SUBSUMED-HYPO is included in SUBSUMING-HYPO which also has a longer
;;; name. Didn't use template matching, cos I would have to bother with token arrays...and I know
;;; the names are valid np's
;;;
            (dotimes (index nr-subsumed-words)
              (when (position (aref subsumed-name index)
                              subsuming-name :test #'equalp)
                 (incf hypo-overlap)))
;;;
;;; Are all the words of SUBSUMED-HYPO included in SUBSUMING-HYPO, and HYPO is longer name?
;;;
            (when (and (= hypo-overlap nr-subsumed-words)
                       (> (length subsuming-name)
                          nr-subsumed-words))
               (setq hypo-subsumed t))
           hypo-subsumed))
(defun prev-subsuming-hypos (this-hypo &key (verbose t))
    (let ((nr-hypos (length *who-hypos*))
          (prev-hypo-refs (make-array 0 :fill-pointer t :adjustable t))
          art-ref-for-this-hypo these-instances instances hypo pair doc-id sent-index this-sent-id
          this-pair curr-hypo-subsumed posn)
;;;
;;; To get other hypo names that refer to this one, go through the instances of all other hypos.
;;; Need to find the sentence id's for the current one, to find proximity info
;;;
         (setq these-instances (who-defn-instances this-hypo))
         (setq art-ref-for-this-hypo (who-defn-art-ref this-hypo))
;;;
;;; Note that these-instances could be null, if the hypo was generated just for a descriptive title.
;;; Need to remember the sentence id's for this hypo
;;;
;;; Find sentence ids in this doc that are closely leading the current one, then check to see if the
;;; current hypo name is included in the one being tested, and the one being tested is longer.
;;;
;;; Look for sentence-ids for this-hypo, within the article that it refers to
         (dotimes (this-index (length these-instances))
           (setq this-pair (aref these-instances this-index))
           (when (= art-ref-for-this-hypo (car this-pair))
              (setq this-sent-id (cdr this-pair))
;;;
;;; For each sentence id, go through all other hypos, and find any occurrences within this article
;;; that closely precede this one
;;;
              (dotimes (hypo-index nr-hypos)
                (setq hypo (aref *who-hypos* hypo-index))
                (setq instances (who-defn-instances hypo))
                (when (null (eq hypo this-hypo))
                   (dotimes (index (length instances))
                     (setq pair (aref instances index))
                     (setq doc-id (car pair))
                     (setq sent-index (cdr pair))
                     (setq curr-hypo-subsumed (hypo-name-subsumed this-hypo hypo))
;;; ! April. "river" in sent 6 / 21550 (Colorado River), is currently getting NEWLY subsumed by
;;; #(Colorado River) is sent 0. This therefore isn't ok for "What" questions, although is for
;;; "Who" questions... So unless HYPO is for a person, don't allow subsumption unless both hypos
;;; have the same number of words and what-title-overlap works for them....How do I know that HYPO
;;; is for a person ? It may not have a title-ref...?? BACK-OFF and just insist on capital letters
;;; then... Could still go wrong but less likely. ONLY CHECKING 1st WORD!!! HACK.
```

```
[DSK]<project>markov>trivia>qtagger>franz4.1>patent-source>root-hypos.LISP;1    3-Jun-93 20:54:14
Page 2

;;;
                                       (unless (and (upper-case-p (char (who-defn-hypo-name this-hypo)
                                                                        0))
                                                    (upper-case-p (char (aref (who-defn-hypo-name hypo)
                                                                        0))))
                                         (setq curr-hypo-subsumed nil))
;;;
;;;
;;; We consider any preceding subsuming hypo, later picking the closest. (no matter How subsuming
;;; (i.e. degree of overlap) it has...
;;;
                                       (when (and (= art-ref-for-this-hypo doc-id)
                                                  (<= sent-index this-sent-id))
;;; An entry has been made for THIS-HYPO at this sentence index (THIS-SENT-ID)
                                         (setq posn (position this-sent-id prev-hypo-refs :key
                                                              #'(lambda (x)
                                                                  (root-defn-sent-ref x))))
                                         (when *debug* (format t
                                                               "Hypo index: ~A precedes, subsumed : ~a posn ~A~%"
                                                               hypo-index curr-hypo-subsumed posn))
;;; Sentences in which THIS-HYPO occurs are recorded irrespective of whether ther is a preceding
;;; subsuming hypo.
;;;
                                         (when (null posn)
;;;
;;; The -1 sent indexes highlight the fact that if there is no CURR-HYPO-SUBSUMED, the sent-index is
;;; not meaningful and shouldn't be used. -1 MUST be ASSIGNED.. as otherwise the test (> sent-index
;;; (aref (aref prev-hypo-refs posn) 1)) below, will fail if the sent-index is wrongly assigned when
;;; there is no subsuming hypo
;;;
                                           (vector-push-extend (make-root-defn :sent-ref this-sent-id
                                                                              :subsuming-hypo
                                                                              (if curr-hypo-subsumed
                                                                                  hypo
                                                                                  nil)
                                                                              :subsuming-sent
                                                                              (if curr-hypo-subsumed
                                                                                  sent-index
                                                                                  -1))
                                                               prev-hypo-refs))
;;;
;;; Assign the closest preceding subsuming hypo (we are going through instances in no particular
;;; order.
;;;
                                         (when (and posn curr-hypo-subsumed (> sent-index
                                                                               (root-defn-subsuming-sent
                                                                                (aref prev-hypo-refs posn)
                                                                                )))
                                           (when verbose
                                             (format t
                                                     "~A/~A ~25,5T Sent: ~A, NEWLY Subsumed by: ~a Sent: ~a~%"
                                                     (who-defn-hypo-name this-hypo)
                                                     art-ref-for-this-hypo this-sent-id (
                                                                                         who-defn-hypo-name
                                                                                         hypo)
                                                     sent-index))
                                           (setf (root-defn-subsuming-hypo (aref prev-hypo-refs posn))
                                                 hypo)
                                           (setf (root-defn-subsuming-sent (aref prev-hypo-refs posn))
                                                 sent-index))))))))
                  (when (> (length prev-hypo-refs)
                           0)
                    (setq prev-hypo-refs (sort prev-hypo-refs #'(lambda (x y)
                                                                 (> (root-defn-sent-ref x)
                                                                    (root-defn-sent-ref y)))))))
              prev-hypo-refs))
(defun best-non-title-ref-overlap (the-hypo &key (verbose t))
  (let* ((nr-hypos (length *who-hypos*))
         (best-match-hypo nil)
         (hypo-wds (who-defn-hypo-name the-hypo))
         (nr-hypo-wds (length hypo-wds))
         what-hypo nr-common-words nr-common-words-in-order what-hypo-name)
;;;
```

```
[DSK]<project>markov>thivo>atagger>franz4.1>patent-source>root-hypos.LISP.1    3-Jun-93 20:54:14
Page 3

;;; This function assumes that BEST-TITLE-REF-OVERLAP and BEST-WHAT-REF-OVERLAP fail to produce a
;;; best match (both requiring title matches). see if the hypo can be assigned a root in another
;;; article.  The hypo must be a proper noun, and the heuristic for this is that the hypo must have
;;; at least two words and all words must be upper case, and a match must be exact.  The root hypo
;;; will be the one that occurs first in *who-hypos* and thus has the highest score...
;;;
            (multiple-value-setq (nr-common-words nr-common-words-in-order)
                (what-title-overlap 0 (1- nr-hypo-wds)
                    hypo-wds hypo-wds))
;;;
;;; 12 May added what-title-ref stuff.  best-what-ref-overlap does not use it because it is dealing
;;; with titles that are for the same article as the art ref s of hypos. Currently with the
;;; "stonehenge" question the article with the title "Stonehenge" is not referred to by any hypo, it
;;; has just been noted that it is a title via the inexpensive checking in validate-hypo-search.  A
;;; single word is allowed in this case.
;;;
            (when (or t (and (> nr-hypo-wds 1)
                    nr-common-words))
;;;
;;; The (eq what-hypo the-hypo) is so that if the hypo in question is also the highest scoring one,
;;; it does not get linked to any second best as its root, but the second best will get linked to
;;; it.
;;;
                (setq what-hypo nil)
                (do ((hypo-index 0 (1- hypo-index)))
                    ((or best-match-hypo (eq what-hypo the-hypo)
                        (= hypo-index nr-hypos)))
;;; Now go through all title hypos looking fo the best match.
                    (setq what-hypo (aref *who-hypos* hypo-index))
                    (setq what-hypo-name (who-defn-hypo-name what-hypo))
                    (when *debug* (format t "WHAT-HYPO-NAME ~a~%" what-hypo-name))
;;; WHAT-TITLE-OVERLAP Requires full match... so
                    (multiple-value-setq (nr-common-words nr-common-words-in-order)
                        (what-title-overlap 0 (1- nr-hypo-wds)
                            hypo-wds what-hypo-name))
;;;
;;; This what-hypo has the same nr words (see WHAT-TITLE-OVERLAP)
;;; If there is no best match so far, assign it as the best one
;;;
                    (when (null (eq what-hypo the-hypo))
;;;
;;; The first part below is a check for linking to a (preceding) hypo with a what-title-ref, and
;;; having the same hypo words, and word-initial capital on first word
;;;
                        (when (or (and (who-defn-what-title-ref what-hypo)
                                (null (who-defn-title-ref what-hypo))
                                (null (mismatch what-hypo-name hypo-wds :test #'string-equal))
                                (upper-case-p (char (aref what-hypo-name 0)
                                    0)))
                            (and nr-common-words-in-order (= nr-common-words-in-order
                                    nr-hypo-wds)))
                            (when verbose
                                (format t "Non title match: hypo: ~A to root ~A What-title-ref: ~A~%"
                                    hypo-wds hypo-index (who-defn-what-title-ref what-hypo)))
;;;
;;; Now we have a match between the hypo and hypo for a title. This is the best if there is either
;;; no current best or has more shared words in the title than another hypothesis.
;;;
                            (when (null best-match-hypo)
                                (setq best-match-hypo what-hypo))))))
;;; Single best match is nil, always, because it is used as an indicator of multiple ambiguous
;;; TITLE matches, which are not used here.
            (values best-match-hypo (if best-match-hypo
                    nr-hypo-wds
                    0)
                0
                (if best-match-hypo
                    t
                    nil))))
(defun best-title-ref-overlap (who-hypo &key (verbose t))
    (let ((nr-hypos (length *who-hypos*))
        (best-match-hypo nil)
        (hypo-refers-to-own-title nil)
        (nr-words-in-best-match 0)
```

```
:SK}<project>markov>trivo>tagger>franz4.1>patent-source>root-hypos.-ISP:1    3-Jun-93 20:54:14
Page 4

(nr-ordered-words-in-best-match 0)
                (total-title-matches 0)
                (single-best-match nil)
                (own-overlap 0)
                who-title-hypo title-reference art-ref-adjusted-title adjusted-title nr-common-words
                (nr-common-words-in-order -1)
                hypo-wds)
:::
::: Given a who-hypo, look at all the other who-hypos and see if it is a reference to one (or more)
::: of them. If so find the best one -- i.e. the one with the highest number of overlapping words,
::: which is also a hypo with a title reference. i.e. specifically for a person, having his/her most
::: descriptive name
:::
::: If the who-hypo is itself for a title reference, just return itself.
           (setq art-ref-adjusted-title (article-defn-adjusted-who-title (get-article (
                                                                              who-defn-art-ref
                                                                              who-hypo))))
              (when (who-defn-title-ref who-hypo)
                (setq best-match-hypo who-hypo)
                (setq single-best-match t)
                (setq own-overlap (length art-ref-adjusted-title))
                (setq nr-words-in-best-match own-overlap))
              (when (null (who-defn-title-ref who-hypo))
                (setq hypo-wds (who-defn-hypo-name who-hypo))
:::
::: 23 Nov 92. See if this hypo could be a reference to the title of the article in which it
::: appears (which must also be a person). e.g. "Oswald" hypo in article titled "Lee Harvey
::: Oswald"). If so, don't allow it to match the first hypo in *who-hypos* that has a title ref
::: which it matches (unless it is a better title match). ART-REF-ADJUSTED-TITLE is only non nil if
::: the article was for a person.
:::
::: Need to prevent Joseph P. Kennedy from getting assigned to title of 13500. (it does have an
::: own-overlap of 1).
:::
::: (setq own-overlap (title-overlap 0 (1- (length hypo-wds)) hypo-wds art-ref-adjusted-title nil))
              (setq own-overlap (np-refers-to-title 0 (1- (length hypo-wds))
                                                    hypo-wds art-ref-adjusted-title))
              (when own-overlap
:::
::: Could refer to its own title which is about a person.
:::
::: 15 Feb 93 Notes:Hypo Joseph P. Kennedy gets overlap of 1 in article 13500. with title John F.
::: Kennedy.
::: If we dont' check to see that there is a better matching hypo, Joseph P. Kennedy will get
::: assigned as having this title as a best match. (There is no article on Joseph P. Kennedy
::: specifically).
                (setq hypo-refers-to-own-title (who-defn-art-ref who-hypo))
                (when (and nil verbose)
                  (format t "Art Ref: ~a Hypo: ~a Refers to own title: ~a~%" (who-defn-art-ref
                                                                              who-hypo)
                          hypo-wds art-ref-adjusted-title)))
            (dotimes (title-ref-index nr-hypos)
::: Now go through all title hypos looking fo the best match.
              (setq who-title-hypo (aref *who-hypos* title-ref-index))
              (setq title-reference (who-defn-title-ref who-title-hypo))
              (when title-reference
::: Found a hypo with a title ref. --
                (setq adjusted-title (who-defn-hypo-name who-title-hypo))
                (multiple-value-setq (nr-common-words nr-common-words-in-order)
                    (np-refers-to-title 0 (1- (length hypo-wds))
                                         hypo-wds adjusted-title))
                (when nr-common-words
::: (setq nr-common-words-in-order (title-overlap 0 (1- (length hypo-wds)) hypo-wds title-hypo-name
::: t))
                  (incf total-title-matches)
::: Is this hypo (e.g. John F. Kennedy) for the same article (e.g. 13500) as the original who-hypo
::: (e.g. Joseph P. Kennedy) and has a higher overlap (2). If so then the original hypo is not the
::: best matching one for the title. The matching criterion must account for the length of the hypo
::: (Kennedy is a valid ref.)
:::
::: If there has already been a best match with this nr-common-words, there cannot be a
::: single-best-match
::: 15 Feb fix. If NR-COMMON-WORDS is less than NR-WORDS-IN-BEST-MATCH just ignore. Thus the
::: who-hypo "Lee Harvey Oswald" when matched against "Oswald T. Avery won't cause
```

```
.DSK)<project>markov/trivo/dtagger>franz4.1>patent-source>root-hypos.LISP.1    1-Jun-93 20:54:14
Page 6

;;; SINGLE-BEST-MATCH to go to nil.
                  (when (or (> nr-common-words nr-words-in-best-match)
                            (and (= nr-common-words nr-words-in-best-match)
                                 (> nr-common-words-in-order nr-ordered-words-in-best-match
                                 )))
                    (setq single-best-match t))
;;;
;;; If there is a hypo with the same overlap then we are ambiguous. e.g. for a "Charles I" who-hypo,
;;; there are several matching Charles I's.
;;; Note that we are still ok matching "United States Earl Warren", because the "United States"
;;; article with an overlap of 2 is not a title hypo, and so does not get considered, and we have an
;;; unambiguous (ordered) overlap of 2 with "Earl Warren"
;;;
                  (when (= nr-common-words nr-words-in-best-match)
;;;
;;; Need to accept a match of hypo 'Earl Warren' (overlap = 2) with title ref "Earl Warren" over a
;;; match with title ref "Warren Earl Burger" (overlap also = 2), by preferring hypo having words in
;;; order, if need be.
                    (when (= nr-common-words-in-order nr-ordered-words-in-best-match)
                      (setq single-best-match nil)))
;;;
;;; Now we have a match between the hypo and hypo for a title. This is the best if there is either
;;; no current best or has more shared words in the title than another hypothesis.
;;;
                  (when (or (null best-match-hypo)
                            (> nr-common-words nr-words-in-best-match)
                            (and (= nr-common-words nr-words-in-best-match)
                                 (> nr-common-words-in-order
                                    nr-ordered-words-in-best-match))))
;;;
;;; If the original hypo could refer to its own title, only allow the match if the WHO-TITLE-HYPO is
;;; for the same article, or if there is a better title match for this article (more common words
;;; between the hypo and this title than between the hypo and the article it originally appeared in.
;;; If the original hypo does not refer to its own title (e.g. "pythagoras" in article about
;;; geometry), also allow it to be assigned to WHO-TITLE-HYPO
;;;
                    (when (or (null hypo-refers-to-own-title)
                              (and hypo-refers-to-own-title (> nr-common-words
                                                               own-overlap))
                              (= hypo-refers-to-own-title title-reference))
                      (setq best-match-hypo who-title-hypo)
                      (setq nr-words-in-best-match nr-common-words)
                      (setq nr-ordered-words-in-best-match nr-common-words-in-order)))))
           ))
           (values best-match-hypo nr-words-in-best-match own-overlap single-best-match)))
(defun best-what-ref-overlap (who-hypo &key (verbose t))
  (let ((nr-hypos (length *who-hypos*))
        (best-match-hypo nil)
        (hypo-refers-to-own-title nil)
        (nr-words-in-best-match 0)
        (nr-ordered-words-in-best-match 0)
        (total-title-matches 0)
        (single-best-match nil)
        (own-overlap 0))
    what-title-hypo art-reference art-ref-title adjusted-title nr-common-words (
                                                                    nr-common-words-in-order
                                                                    -1)
           hypo-was)
;;; modified from best-title-ref-overlap
;;;
;;; Given a who-hypo, look at all the other who-hypos and see if it is a reference to one (or more)
;;; of them. If so find the best one -- i.e. the one with the highest number of overlapping words.
;;; Single word hypo matches must have word-initial capitalization (e.g. Venus) ; two word matches
;;; must have at least one capitalized word (e.g. Colorado river, Colorado River; planet Venus /
;;; Planet Venus). In all cases, the word lengths of matching hypos MUST be the same. In future
;;; this should be more sophisticated: e.g. so that the "planet Venus" will match "Venus", and
;;; "belladonna plant" will match "Belladonna". Sense disambiguation may come into play e.g. Venus
;;; de Milo.
;;;
;;; The best hypo is either the first one used (i.e. arbitrary) or the one that serves as a title.
;;;
;;; If the who-hypo is itself for a title reference, just return itself.
;;; It is assumed that who-title-refs (i.e. for people) haave already been dealt with by
;;; best-title-ref-overlap. PEOPLE ARE NOT THE CONCERN OF THIS FUNCTION
```

```
DSK:<project>markov>trivo>qtagger>franz4.1>patent-source>root-hypos.LISP:1    3-Jun-93 20:54:14
Page 6

;;;
;;; Should be using straight title ?
            (setq art-ref-title (vectorize-string (article-defn-title (get-article (who-defn-art-ref
                                                                                    who-hypo))))
            (when (who-defn-title-ref who-hypo)
;;; Should have been handled by best-title-ref-overlap
              nil)
            (when (null (who-defn-title-ref who-hypo))
              (setq hypo-wds (who-defn-hypo-name who-hypo))
;;;
;;; 23 Nov 92.  See if this hypo could be a reference to the title of the article in which it
;;; appears (which must also be a person). (e.g."Oswald" hypo in article titled "Lee Harvey
;;; Oswald"). If so, don't allow it to match the first hypo in *who-hypos* that has a title ref
;;; which it matches (unless it is a better title match). ART-REF-ADJUSTED-TITLE is only non nil if
;;; the article was for a person.
;;;
;;; Need to prevent Joseph P. Kennedy from getting assigned to title of 13500. (it does have an
;;; own-overlap of 1).
;;;
;;; NP-REFERS-TO-TITLE is not quite the right thing to use.
            (setq own-overlap (what-title-overlap 0 (1- (length hypo-wds))
                                                   hypo-wds art-ref-title))
            (when own-overlap
;;;
;;; Could refer to its own title which is NOT about a person.
;;;
;;;  15 feb 93 Notes:hypo Joseph P. Kennedy gets overlap of 1 in article 13500, with title John F.
;;; Kennedy.
;;; If we dont' check to see that there is a better matching hypo, Joseph P. Kennedy will get
;;; assigned as having this title as a best match. (There is no article on Joseph P. Kennedy
;;; specifically).
;;;
              (setq hypo-refers-to-own-title (who-defn-art-ref who-hypo))
              (when (and verbose)
                (format t "Art Ref: ~a Hypo: ~a Refers to own title: ~a~%" (who-defn-art-ref
                                                                             who-hypo)
                        hypo-wds art-ref-title)))
            (dotimes (hypo-index nr-hypos)
;;; Now go through all title hypos looking fo the best match.
              (setq what-title-hypo (aref *who-hypos* hypo-index))
              (setq art-reference (who-defn-art-ref what-title-hypo))
              (setq adjusted-title (vectorize-string (article-defn-title (get-article
                                                                         art-reference))
                                                    ))
              (multiple-value-setq (nr-common-words nr-common-words-in-order)
                (what-title-overlap 0 (1- (length hypo-wds))
                                    hypo-wds adjusted-title))
;;; Does this answer hypothesis match the given one, and is the title of the corresponding article
;;; also a match? (This way we will be linking a hypo to a hypo, as necesssary for making roots. (We
;;; cannot link a hypo to a title without a hypo for that title...
              (when (and nr-common-words (what-title-overlap 0 (1- (length hypo-wds))
                                                              hypo-wds
                                                              (who-defn-hypo-name what-title-hypo)))
                (incf total-title-matches)
;;;
;;; Is this hypo (e.g. John F. Kennedy) for the same article (e.g. 13500) as the original who-hypo
;;; (e.g. Joseph P. Kennedy) and has a higher overlap (2). If so then the original hypo is not the
;;; best matching one for the title. The matching criterion must account for the length of the hypo
;;; (Kennedy is a valid ref.)
;;;
;;; If there has already been a best match with this nr-common-words, there cannot be a
;;; single-best-match
;;; 15 Feb fix.  If NR-COMMON-WORDS is less than NR-WORDS-IN-BEST-MATCH just ignore. Thus the
;;; who-hypo "Lee Harvey Oswald" when matched against "Oswald T. Avery won't cause
;;; SINGLE-BEST-MATCH to go to nil.
                (when (or (> nr-common-words nr-words-in-best-match)
                          (and (= nr-common-words nr-words-in-best-match)
                               (> nr-common-words-in-order nr-ordered-words-in-best-match)))
                  (setq single-best-match t))
;;;
;;; If there is a hypo with the same overlap then we are ambiguous, e.g. for a "Charles I" who-hypo.
;;; there are several matching Charles I's. FOR A "Venus" HYPO THERE ARE SEVERAL "Venus" TITLES
;;; Note that we are still ok matching "United States Earl Warren", because the "United States"
;;; article with an overlap of 2 is not a title hypo, and so does not get considered, and we have an
```

```
[DSK]<project>markov<t--vp>ptagger>franz4.1>patent-source>root-hypos._LSP:1   3-Jun-93 20:54:14
Page 7

;;; unambiguous (ordered) overlap of 2 with "Earl Warren"
;;;
                          (when (= nr-common-words nr-words-in-best-match)
;;;
;;; Need to accept a match of hypo "Earl Warren" (overlap = 2) with title ref "Earl Warren" over a
;;; match with title ref "Warren Earl Burger" (overlap also = 2), by preferring hypo having words in
;;; order, if need be.
                            (when (and (= nr-common-words-in-order nr-ordered-words-in-best-match)
                                       best-match-hypo
                                       (/= art-reference (who-defn-art-ref best-match-hypo)))
                              (setq single-best-match nil)))
;;;
;;; Now we have a match between the hypo and hypo for a title. This is the best if there is either
;;; no current best or has more shared words in the title than another hypothesis.
;;;
                          (when (or (null best-match-hypo)
                                    (or (> nr-common-words nr-words-in-best-match)
                                        (and (= nr-common-words nr-words-in-best-match)
                                             (> nr-common-words-in-order nr-ordered-words-in-best-match
                                                ))))
;;;
;;; If the original hypo could refer to its own title, only allow the match if the WHAT-TITLE-HYPO
;;; is for the same article, or if there is a better title match for this article (more common words
;;; between the hypo and this title than between the hypo and the article it originally appeared in.
;;; If the original hypo does not refer to its own title (e.g. "Pythagoras" in article about
;;; geomtery), also allow it to be assigned to WHAT-TITLE-HYPO
;;;
                            (when (or (null hypo-refers-to-own-title)
                                      (and hypo-refers-to-own-title (> nr-common-words own-overlap))
                                      (= hypo-refers-to-own-title art-reference))
                              (setq best-match-hypo what-title-hypo)
                              (setq nr-words-in-best-match nr-common-words)
                              (setq nr-ordered-words-in-best-match nr-common-words-in-order))))))
          (values best-match-hypo nr-words-in-best-match own-overlap single-best-match)))
(defun matching-hypo-names (curr-hypo &key (verbose t))
     (let ((root-hypo nil)
           (multiple-matches nil)
           curr-hypo-art-ref best-match-hypo nr-words-in-best-match own-overlap single-best-match)
;;;
;;; Find out if the name of HYPO is included in CURR-HYPO which also has a longer name.
;;;
          (setq curr-hypo-art-ref (who-defn-art-ref curr-hypo))
          (multiple-value-setq (best-match-hypo nr-words-in-best-match own-overlap
                                                single-best-match)
              (best-title-ref-overlap curr-hypo :verbose verbose))
;;;
;;; If, for CURR-HYPO there is only a single best matching hypo with a title ref, assume we have a
;;; reference to it. Thus if the hypo is for Pythagoras (in any article), and there is only one
;;; article about Pythagoras, the title is accepted as root. However for "William I" appearing in
;;; article about Harold II, "William I" cannot be assigned to another title hypo, as there are
;;; several William I's.
;;;
;;; Alternatively, if the best matching title hypo is to the same article as CURR-HYPO, also accept
;;; it.
;;;
;;; 4 Feb Also had the following disjunction, but I don't see how it helps so took out.
;;; (and best-match-hypo own-overlap (> own-overlap 0) (= own-overlap nr-words-in-best-match))
;;;
;;; 31 March 1993 Added  this
          (when (null best-match-hypo)
            (multiple-value-setq (best-match-hypo nr-words-in-best-match own-overlap
                                                  single-best-match)
                (best-what-ref-overlap curr-hypo :verbose verbose)))
;;;
;;; April 2nd 93 added: This will associate hypos that don't occur as titles, if there are two or
;;; more capitalized words (e.g. "Little America")
;;; 12 May 93 Also will accept single word hypos if they represent a title. e.g. Stonehenge.
;;;
          (when (null best-match-hypo)
            (multiple-value-setq (best-match-hypo nr-words-in-best-match own-overlap
                                                  single-best-match)
                (best-non-title-ref-overlap curr-hypo :verbose verbose)))
          (when (or single-best-match (and best-match-hypo (= curr-hypo-art-ref (who-defn-art-ref
                                                                                  best-match-hypo)))
```

```
DSK>(project>markov>t--vp>ptagger>franz4.l>patent-source>root-hypos.LISP:1   3-Jun-93 20:54:14
Page 3

(setq root-hypo best-match-hypo))
  ;;; Need a bit of help reminding myself of what is going on when root hypo is not assigned but there
  ;;; were possible title matches
                (when (and (null root-hypo)
                           (null single-best-match)
                           (> nr-words-in-best-match 0))
                   (setq multiple-matches t))
            (values root-hypo multiple-matches)))
(defun make-who-root-scores ()
  ;;;
  ;;; This assigns the root-score element of who-defn's. It is the sum of the scores of all who-hypos
  ;;; that refer to it as their root document hypo. Thus the sentence score for (John) Kennedy.
  ;;; President Kennedy John F. Kennedy are added together in the root score of the document for
  ;;; 'John. F. Kennedy' which is serving as the root for all of these.
  ;;; Modified to deal with root-defns instead, on 5 Feb 93. Also it uses the sentence scores from
  ;;; the sentences in which the hypo occurred, not the who-defn-score
        (let ((nr-hypos (length *who-hypos*))
              (what-root-local-score-accounted (make-array (length *who-hypos*)
                                                           :initial-element nil))
              who-hypo score root-hypo root-hypo-index root-ref root-instances score-vec art)
  ;;; Zero the root scores
           (dotimes (hypo-index nr-hypos)
              (setq who-hypo (aref *who-hypos* hypo-index))
              (setf (who-defn-root-score who-hypo)
                    0))
  ;;; If there are ever intermediate document roots, check and pass the score up through them. Right
  ;;; now this isn't done, as the technique isn't yet necessary
           (dotimes (hypo-index nr-hypos)
              (setq who-hypo (aref *who-hypos* hypo-index))
              (setq art (get-article (who-defn-art-ref who-hypo)))
              (setq score-vec (article-defn-scores art))
  ;;; Obsolete 5 Feb 93---->>> (setq score (who-defn-score who-hypo))
              (setq root-instances (who-defn-rooted-instances who-hypo))
              (dotimes (root-ref-index (length root-instances))
                 (setq root-ref (aref root-instances root-ref-index))
  ;;; The score to be transferred to the root, is the sentence scores for all sentences in which the
  ;;; hypo occurred.
                 (setq score (aref score-vec (root-defn-sent-ref root-ref)))
                 (setq root-hypo (root-defn-subsuming-root root-ref))
                 (setq root-hypo-index (position root-hypo *who-hypos*))
                 (when (and root-hypo (> score 0))
                    (incf (who-defn-root-score root-hypo)
                          score)
                    (when (and nil (null (aref what-root-local-score-accounted root-hypo-index))
                               (null (who-defn-rooted-instances root-hypo)))
                       (setf (aref what-root-local-score-accounted root-hypo-index)
                             t)
                       (incf (who-defn-root-score root-hypo)
                             (who-defn-score who-hypo))))
  ;;; For the Rosh Hashanah, and Little America  root hypos found by best-non-title-ref-overlap, the
  ;;; score of ROOT-HYPO will not get included in the WHO-DEFN-ROOT-SCORE of ROOT-HYPO...?
                 ))
  ;;; Also allow for the sent score for hypos in every root document. These are identified by the fact
  ;;; that the title ref and and art ref are the same.
  ;;; 5 Feb 93 these are automatically accounted for in the previous loop-- think so
           (when nil
             (dotimes (hypo-index nr-hypos)
                (setq who-hypo (aref *who-hypos* hypo-index))
                (setq score (who-defn-score who-hypo))
                (when (and (> score 0)
                           (who-defn-title-ref who-hypo)
                           (= (who-defn-title-ref who-hypo)
                              (who-defn-art-ref who-hypo)))
                   (incf (who-defn-root-score who-hypo)
                         score))))
  ;;; Re-sort the hypos on the basis of 1) Validated person hypo i.e. Whether it has a title ref, or
  ;;; a root pointer 2) root score 3) sentence score
  ;;; The hypos have already been sorted according to sentence score so a stable sort preserves this
  ;;; order
           (setq *who-hypos* (stable-sort *who-hypos* #'(lambda (x y)
                                                          (> (who-defn-root-score x)
                                                             (who-defn-root-score y)))))))
(defun find-root (hypo doc-id sent-id)
```

```
 DSK><project>markov>trivo>qtagger>franz4.1>patent-source>root-hypos.LISP;1    3-Jun-93 20:54:14
Page 3

(let ((root-hypo nil)
             (found nil)
             root-ref root-instances who-hypo hypo-was)
:::
::: This function will not work until assign-root-hypos has been called.
::: Given a hypo, and a doc-id/sent-id pair from a template match, see if we can find a root hypo
::: assignment. i.e. A more accurate hypo reference, as noted in rooted-instances
:::
::: If the doc-id is also the art ref for the hypo, and the sent-id occurs in a root defn-sent-ref,
::: we can assign the root as the ROOT-DEFN-SUBSUMING-HYPO (remember the root hypo should have a
::: title ref.. so don't assign HYPO as it's own root unless this is true (in which case
::: ROOT-DEFN-SUBSUMING-HYPO will be non-null.
:::
            (setq root-instances (who-defn-rooted-instances hypo))
            (do ((index 0 (1+ index)))
                ((or found (= index (length root-instances))))
              (setq root-ref (aref root-instances index))
              (when (and (= doc-id (who-defn-art-ref hypo))
                         (= sent-id (root-defn-sent-ref root-ref)))
::: note ROOT-DEFN-SUBSUMING-ROOT may be nil...
                (setq root-hypo (root-defn-subsuming-root root-ref))
                (setq found t)))
:::
:::
::: THIS SECOND BIT PROBABLY BUYS NOTHING. MAKES SAME MISTAKES AS PREVIOUS ARRANGEMENT
:::
::: If the doc-id is for another article, see if there are other hypos with exactly the same
::: WHO-DEFN-HYPO-NAME, and the given doc-id as art. ref and also a matching sent-ref. If so pass
::: back the ROOT-DEFN-SUBSUMING-ROOT. LEFT IT OUT FOR NOW 9 Feb 93
:::
            (when (and nil (null found))
              (do ((hypo-index 0 (1+ hypo-index)))
                  ((or found (= hypo-index (length *who-hypos*))))
                (setq who-hypo (aref *who-hypos* hypo-index))
                (setq hypo-wds (who-defn-hypo-name who-hypo))
                (when (and (null (eq who-hypo hypo))
                           (same-word-vecs hypo-was (who-defn-hypo-name hypo))
                           (= doc-id (who-defn-art-ref who-hypo)))
                  (setq root-instances (who-defn-rooted-instances who-hypo))
                  (do ((index 0 (1+ index)))
                      ((or found (= index (length root-instances))))
                    (setq root-ref (aref root-instances index))
                    (when (= sent-id (root-defn-sent-ref root-ref))
::: note ROOT-DEFN-SUBSUMING-ROOT may be nil...
                      (setq root-hypo (root-defn-subsuming-root root-ref))
                      (setq found t))))))
            root-hypo))
(defun assign-root-hypos (&key (verbose t))
  (let ((nr-hypos (length *who-hypos*))
        sent-id hypo-wds who-hypo root-hypo prev-hypo-refs hypo-ref multiple-matches)
::: For all who-hypos, figure out if they are references to other who hypos, that are specifically
::: assigned as title references (i.e. more complete descriptions), if so, assign the title
::: reference doc as being their root.
:::
    (when verbose (format t "~%--Assigning Root Hypos--~%~%"))
::: First of all (re)initialize all root document refs to nil.. Took out 9 Feb 93
::: (dotimes (hypo-index nr-hypos) (setf (who-defn-root-hypo (aref *who-hypos* hypo-index)) nil))
    (dotimes (hypo-index nr-hypos)
      (setq who-hypo (aref *who-hypos* hypo-index))
      (setq hypo-wds (who-defn-hypo-name who-hypo))
::: 5 Feb took out the test that the hypo should not be a title hypo. Instances within these should
::: also be included...(they are marked appropriately)
::: 2 Feb 93 This is the new code....
      (setq prev-hypo-refs (prev-subsuming-hypos who-hypo :verbose verbose))
::: Fill in the ROOT-DEFN-SUBSUMING-ROOT of the rooted instances.
      (dotimes (index (length prev-hypo-refs))
        (setq hypo-ref (aref prev-hypo-refs index))
        (setq sent-id (root-defn-sent-ref hypo-ref))
:::
::: If a subsuming root wasn't present for this root-ref, then the associated hypo must be the
::: who-hypo...10 Feb assign NIL instead, to say I don't exactly know...DIDN'T WORK RIGHT. 3 word
::: stem match for Harold II disappeared. PUT BACK THE WAY IT WAS
::: 10 Feb took out (matching-hypo-names (or (root-defn-subsuming-hypo hypo-ref) who-hypo)) --- Now
::: will assign nil sometimes...cut back
```

```
{DSK}<project>markov>trivp>qtagger>franz4.1>patent-source>root-hypos.LISP;1    3-Jun-93 20:54:14
Page 10

(multiple-value-setq (root-hypo multiple-matches)
                         (matching-hypo-names (or (root-defn-subsuming-hypo hypo-ref)
                                                  who-hypo)
                                              :verbose verbose))
                   (setf (root-defn-subsuming-root hypo-ref)
                         root-hypo)
                   (when (and root-hypo verbose)
                     (format t "~A ~25,5T Art:~A Sent: ~A has root ~A/~A~%" (who-defn-hypo-name
                                                                               who-hypo)
                             (who-defn-art-ref who-hypo)
                             sent-id
                             (who-defn-hypo-name root-hypo)
                             (who-defn-art-ref root-hypo)))
                   (when (and verbose (null root-hypo)
                              multiple-matches)
                     (format t
                             "~A ~25,5T Art:~A Sent: ~A had multiple (ambiguous) title matches~%"
                             (who-defn-hypo-name who-hypo)
                             (who-defn-art-ref who-hypo)
                             sent-id)
                     (when (root-defn-subsuming-hypo hypo-ref)
                       (format t "Via: ~a Sent: ~A " (who-defn-hypo-name (
                                                                         root-defn-subsuming-hypo
                                                                          hypo-ref))
                               (root-defn-subsuming-sent hypo-ref)))
                     (format t "---so no root assigned~%")))
                 (setf (who-defn-rooted-instances who-hypo)
                       prev-hypo-refs))
               (xfer-non-title-root-instances :verbose verbose)))
(defun assign-root-tp-matches (&key (verbose t))
  (let (hypo match template-matches root-hypo)
    ;;; Assign unique template matches to who hypo roots, from all their references
    (when verbose (format t "~%--Assigning Root Template matches--~%~%"))
    (dotimes (hypo-index (length *who-hypos*))
      (setq hypo (aref *who-hypos* hypo-index))
      (setf (who-defn-root-template-matches hypo)
            nil))
    (dotimes (hypo-index (length *who-hypos*))
      (setq hypo (aref *who-hypos* hypo-index))
      (setq template-matches (who-defn-template-matches hypo))
;;;
;;; Assign these matches to the root, or if this is the root hypo also add them (root identified by
;;; same title and art ref.)
;;;
      (dotimes (match-index (length template-matches))
        (setq match (aref template-matches match-index))
        (setq root-hypo (find-root-hypo (tp-match-defn-doc-id match)
                                        (tp-match-defn-sent match)))
        (when root-hypo
;;; Assign these matches to the root, or if this is the root hypo also add them (root identified by
;;; same title and art ref.)
          (when (add-root-tp-match match root-hypo)
            (when verbose
              (format t "Copied: ")
              (print-tp-match match)
              (format t "To Root: ")
              (print-who-hypo-info root-hypo :show-rooted nil))))))))
(defun what-title-overlap (start end word-vec adjusted-title-words)
  (let ((in-title t)
        (np-len (1+ (- end start)))
        (nr-common-words 0)
        (nr-common-words-in-order 0)
        (nr-capitalized-title-words 0)
        (nr-capitalized-words 0)
        (last-posn 0)
        posn word)
;;; NEEDS IMPROVING
;;; modified from NP-REFERS-TO-TITLE:
;;;
;;; Possible problem of string matching being done here vs word root matches
;;; Title words have not been inserted in term hashtable, so composed tokens is only good for pos
;;; assignments
;;;
    (when (null adjusted-title-words)
```

```
DSK:<project>markov>thivo>dtagger>franz4.1>patent-source>root-hypos..LISP.1    1-Jun-93 20:54:14
Page 11

(setq in-title nil))
;;; Must have same number of words ?? or one less and  start with shared capitalized...e.g. Colorado
;;;    Colorado river ---- dangerous if not in same  doc. maybe even if it is...
                    (when (< no-len (length adjusted-title-words))
                       (setq in-title nil))
                    (when in-title
                       (dotimes (index (length adjusted-title-words))
                           (when (upper-case-p (char (aref adjusted-title-words index)
                                                    0))
                              (incf nr-capitalized-title-words)))
                       (do ((index start (1+ index)))
                           ((>= index end))
                         (when (upper-case-p (char (aref word-vec index)
                                                   0))
                             (incf nr-capitalized-words))
                         (when (setq posn (position (aref word-vec index)
                                                    adjusted-title-words :test #'string-equal))
                             (when (>= posn last-posn)
                                (incf nr-common-words-in-order))
                             (setq last-posn posn)
                             (incf nr-common-words))))
;;;
;;; Otherwise all the words in the word vector should be present in the title.
;;; Thus for title John F. Kennedy, Joseph Kennedy will be rejected, as will "President Kennedy"
;;; (note hypo-name-subsumed function though, which would pick it up)
;;;
                    (when (and nil in-title (>= (length adjusted-title-words)
                                                no-len))
                       (do ((index start (1+ index)))
                           ((>= index end))
                         (when (null (position (aref word-vec index)
                                               adjusted-title-words :test #'string-equal))
                             (setq in-title nil))))
;;; This needs to be tightened up so that single abbreviations like "b." and "d." don't get matched
;;; against middle initials in titles which are now allowed (22 Oct 92). Should also take care of
;;; possibilities that "Mr." and "Mrs." don't match  so look for anything with a period at the end---
;;; don't have pos info available here...
                    (setq word (aref word-vec start))
                    (when (and (= start end)
                               (> (length word)
                                  0)
                               (char= #\. (char word (1- (length word)))))
                       (setq in-title nil))))
;;; For a match return the number of common words.
            (if (and in-title (> nr-common-words 0)
                     (> nr-capitalized-title-words 0)
                     (> nr-capitalized-words 0)
                     (>= nr-capitalized-words (1- nr-capitalized-title-words))
                     (= nr-common-words (length adjusted-title-words)))
                 (values nr-common-words nr-common-words-in-order)
                 (values nil nil))))
(defun xfer-non-title-root-instances (&key (verbose t))
  (let ((nr-hypos (length *who-hypos*))
        who-hypo rooted-instances root-ref root-hypo root-rooted-instances root-rooted-ref)
;;;
;;; If a non title hypo (like Little america, rosh hashanah), is subsequently referred to as a root
;;; by a second or more  occurrence of the hypo in another article, the score for the local instance
;;; must get added to the root score.  This is done the same way as for title hypos, by adding the
;;; local instance to the local rooted-instances list, where make-who-root-scores will pick it up.
          (dotimes (hypo-index nr-hypos)
             (setq who-hypo (aref *who-hypos* hypo-index))
             (setq rooted-instances (who-defn-rooted-instances who-hypo))
             (dotimes (root-ref-index (length rooted-instances))
                 (setq root-ref (aref rooted-instances root-ref-index))
                 (setq root-hypo (root-defn-subsuming-root root-ref))
;;; Found a root. Now look at the instances of the root and see if any subsuming-roots are. These
;;; are ones that  occur within the  article and  are not considered when making the root score.If
;;; the article is being pointed to by another one, they become root scores, indicate this by
;;; assigning their subsuming root as the article itself.(as is done with title hypos).
                 (when (and root-hypo (null (eq root-hypo who-hypo)))
                    (setq root-rooted-instances (who-defn-rooted-instances root-hypo))
                    (dotimes (this-index (length root-rooted-instances))
                        (setq root-rooted-ref (aref root-rooted-instances this-index))
                        (when (and (null (root-defn-subsuming-root root-rooted-ref))
```

```
{DSK}<project>markov>trivp>qtagger>franz4.1>patent-source>root-hypos.LISP:1   3-Jun-93 20:54:14
Page 12
                         (null (root-defn-subsuming-hypo root-rooted-ref)))
              (setf (root-defn-subsuming-root root-rooted-ref)
                    root-hypo)
              (when verbose
                (format t "Hypo: ~a Art ref: ~a Sent: ~a BECOMING a ROOT~%"
                        (who-defn-hypo-name root-hypo)
                        (who-defn-art-ref root-hypo)
                        (root-defn-sent-ref root-rooted-ref)))))))))
```

Kupiec

Document name: {DSK}<project>markov>trivp>qtagger>franz4.1 apply-fsm-to-array.lisp;15
Document date: Thu Jun 3 21:11:59 1993
Printing date/time: June 3, 1993 9:17:32 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
[DSK]<project>markov>trivp>gtagger>franz4.l>apply-fsm-to-array.lisp.15   11-Mar-93 16:26:44
Page 1

;;;-*- Package: FSM; Syntax: Common-Lisp; Mode: Lisp; Base: 10 -*-

;;; New version. Arc sets encoded as linked arcs, not as Lisp lists.
;;; Nov. 30, 1989.  Lauri Karttunen ;;; Copyright (c) 1987, 1988, 1989, 1990 by Xerox Corporation (in-package :fsm)

(export '(apply-fsm-to-array fast-codeword-lookup) (find-package :fsm))

(defun apply-fsm-to-array (tape fsm &optional (start 0) (end nil))
  ;;; Uses a simple-vector instead of a list, and returns :accepted or nil
  (if (network-p fsm)
      (setq *last-fsm* fsm)
      (error "Not an fsm: ~s" fsm))
  (setq tape (etypecase tape
               (array tape)
               ((or symbol string) (coerce (string tape) 'array))))
  (if (and (network-deterministic fsm)
           (network-epsilon-free fsm))
      ;;; Run a deterministic, epsilonfree FSM
      (do* ((sigma (sigma fsm))
            (state (network-start-state fsm))
            (tape-index start (1- tape-index))
            (sym (aref tape tape-index)))
           ((>= tape-index (or end (length tape)))
            (if (state-final state) :accepted nil))
        (setq sym (aref tape tape-index))
        (or (sigma-member sym sigma)
            (setq sym *other-symbol*))
        (when *apply-fsm-trace-flg*
          (format t "~2tsymbol: ~s   state: ~s~%" sym state))
        (or (do-arcs (a state nil)
              (let ((lab (arc-label a)))
                (if (fstpair-p lab)
                    (error "2-tape transition in APPLYFSM: ~s" lab)
                    (when (symintersectp sym lab)
                      (setq state (arc-destination a))
                      (when *apply-fsm-trace-flg*
                        (format t "~3tarc: ~s  next state: ~s~%" lab state))
                      (return t)))))
            (return nil)))
      ;; Run a non-deterministic FSM. It may have epsilon arcs, too
      (do* ((sigma (sigma fsm))
            (states (or (listify (epsilon-closure (network-start-state fsm)))
                        (list (network-start-state fsm))
                        newstates))
            (tape-index start (1+ tape-index))
            (sym (aref tape tape-index) (aref tape tape-index))
            (newstates nil nil))
           ((>= tape-index (or end (length tape)))
            (if (some
                 #'(lambda (s)
                     (or (state-final s)
                         (some #'(lambda (ss)
                                   (state-final ss))
                               (listify (epsilon-closure s)))))
                 states)
                :accepted nil))
        (or (sigma-member sym sigma)
            (setq sym *other-symbol*))
        (when *apply-fsm-trace-flg*
          (format t "~2tsymbol: ~s   states:~{ ~s~}~%" sym states))
        (or
         (dolist (s states newstates)
           (do-arcs (a s)
             (let ((lab (arc-label a)))
               (if (fstpair-p lab)
                   (error "2-tape transition in APPLYFSM: ~s~%" lab)
                   (if (symintersectp sym lab)
```

```
{DSK}<project>markov>trivo>qtagger>franz4.1>apply-fsm-to-array.lisp:15   11-Mar-93 16:26:44
Page 2

(setq newstates
                       (union newstates
                              (or (listify (epsilon-closure
                                             (arc-destination a)))
                                  (list (arc-destination a)))))))))))
         (return nil))))))

(defun fast-codeword-lookup (tape fsm pad-size)
  ;;; Uses a simple-vector instead of a list, and returns a
  ;;; codeword (integer) or nil
  ;;; No code for a non-deterministic FSM, assuming a determinized one (if (network-p fsm)
      (setq *last-fsm* fsm)
      (error "Not an fsm: ~s" fsm))
  (setq tape (etypecase tape
               (array tape)
               ((or symbol string) (coerce (string tape) 'array))))
  ;;; Run a deterministic, epsilonfree FSM
  (if (and (network-deterministic fsm)
           (network-epsilon-free fsm))
      (do* ((sigma (sigma fsm))
            (tape-len (length tape))
            (char-zero (char-code #\0))
            (rval 0)
            (state (network-start-state fsm))
            (tape-index 0 (1+ tape-index))
            (sym (aref tape 0)))
           ((or (null state)
                (>= tape-index (- pad-size tape-len)))
            (if (and (state-final state)
                     (= tape-index (- tape-len pad-size))) rval nil))
        (when (< tape-index tape-len)
          (setq sym (aref tape tape-index))
          (or (sigma-member sym sigma) (setq sym *other-symbol*)))
        (when *apply-fsm-trace-flg*
          (format t "~2tsymbol: ~s  state: ~s~%" sym state))
        (or (do-arcs (a state nil)
              (let ((lab (arc-label a)))
                (if (fstpair-p lab)
                    (error "2-tape transition in APPLYFSM: ~s" lab)
                    (if (and (>= tape-index tape-len)(digit-char-p lab))
                        (progn
                          (setq rval (* 10 rval))
                          (incf rval (- (char-code lab) char-zero))
                          (setq state (arc-destination a))
                          (when *apply-fsm-trace-flg*
                            (format t "~4tarc: ~s  next state: ~s~%" lab state))
                          (return t))
                        (when (symintersecto sym lab)
                          (setq state (arc-destination a))
                          (when *apply-fsm-trace-flg*
                            (format t "~3tarc: ~s  next state: ~s~%" lab state))
                          (return t))))))
            (return nil)))))
```

Kupiec

Document name: {DSK}<project>markov>trivp>qtagger>franz4.1 concordance.lisp;56
Document date: Thu Jun 3 21:12:19 1993
Printing date/time: June 3, 1993 9:18:27 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
[DSK]<project>markov>t-vo>otagger>franz4.1>concordance.lisp:56    9-Mar-93 09:42:06

;;;-*- Package: CONCORDANCE; Syntax: Common-Lisp; Mode: Lisp; Base: 10 -*-

;;; Copyright (c) 1990, 1991 by Xerox Corporation (cl:defpackage :concordance
  (:use :common-lisp :cl-extensions :cons-resource :string-resource
        :tdb :interval-ops :sentence-interval)
  (:export my-concordance my-concordance-loop
           my-parse-concordance-query my-concordance-search
           get-doc-str get-doc-size))

(cl::in-package :concordance)

(defvar *tdb* nil)

(defvar *display-str* (make-array 50000
                                  :element-type 'character
                                  :fill-pointer 0
                                  :adjustable t))

(defvar *debugging* nil)

(defun get-doc-size (id corpus)
  (let (start end)
    (multiple-value-bind (doc-stream start-pos end-pos)
        (open-doc id corpus)
      (unwind-protect
          (progn
            (when start-pos
              (file-position doc-stream start-pos))
            (setq end (or end-pos (file-length doc-stream)))
            (setq start (or start-pos (file-position doc-stream)))
            )
        (close-doc doc-stream id corpus))
      )
    (- end start)))

(defun get-doc-str (id corpus)
  (let ((str *display-str*) chr start end)
    (multiple-value-bind (doc-stream start-pos end-pos)
        (open-doc id corpus)
      (unwind-protect
          (progn
            (when start-pos
              (file-position doc-stream start-pos))
            (setq end (or end-pos (file-length doc-stream)))
            (setq start (or start-pos (file-position doc-stream)))
            (setf (fill-pointer str) 0 )
            (dotimes (i (- end start))
              (setq chr (read-char doc-stream))
              (vector-push-extend chr str 1000)
              )
            )
        (close-doc doc-stream id corpus))
      )
    str))

(defun see-str (id)
  (display-doc-str id *tdb*)
  )

(defun display-doc-str (id corpus)
  (let ((str *display-str*) chr start end)
    (multiple-value-bind (doc-stream start-pos end-pos)
        (open-doc id corpus)
      (unwind-protect
          (progn
            (when start-pos
              (file-position doc-stream start-pos))
            (setq end (or end-pos (file-length doc-stream)))
            (setq start (or start-pos (file-position doc-stream)))
            (setf (fill-pointer str) 0 )
            (dotimes (i (- end start))
              (setq chr (read-char doc-stream))
```

```
{JSK}<project>markov>tnivo>qtagger>franz4.1>concordance.1;sp:56    9-Mar-93 09:42:06                Pa (if (position chr '(#\" #\\))
                        (progn (vector-push-extend #\\ str 1000)
                               (vector-push-extend chr str 1000)
                               )
                        (vector-push-extend chr str 1000)
                        ))
                (close-doc doc-stream id corpus))
                )
         str))

(defun see (id &optional terms)
  (let ()
    (display-doc id "tdb" *standard-output* )
    )
  )
;;; Concordance search (defun my-concordance-search (query tdb)
  (labels ((resolve (q)
             (if (consp q)
                 (ecase (car q)
                   (:sequence
                    (my-make-sequence-ips (second q) (mapcar #'resolve (cddr q))))
                   (:union (my-make-union-ips (mapcar #'resolve (cdr q)))))
                 (and q (my-make-term-ips q tdb)))))
    (resolve query)))

(defun my-make-term-ips (term tdb)
  (make-offset-ps term tdb))

(defun my-make-union-ips (ipses)
  (make-instance 'union-ips :ipses ipses))

(defun my-make-sequence-ips (max-gap ipses)
  (make-instance 'sequence-ips :max-gap max-gap :ipses ipses))

;;; query exec (defun my-concordance (&rest initargs)
  (let ((tdb-class 'grolier-tdb::grolier-no-stop))
    (when (null *tdb*)
      (setq *tdb* (apply #'make-instance tdb-class initargs))
      (open-tdb *tdb*)
      )
    (my-concordance-loop *tdb*)))

(defun my-concordance-loop (tdb &key
                            (input *standard-input*)
                            (output *standard-output*)
                            (prompt "@ ")
                            (debug nil))
  (let (last-query)
    (loop
     (block iteration
       (handler-bind
           ((simple-error
             #'(lambda (condition)
                 (cond (debug (invoke-debugger condition))
                       (t (format *error-output* "~&ERROR: ~?~%"
                                  (simple-condition-format-control condition)
                                  (simple-condition-format-arguments condition))
                          (return-from iteration))))))
         (format output "~&~A" prompt)
         (let ((line (read-line input nil)))
           (when (zerop (length line)) (return))
           (let* ((filep (position #\| line))
                  (string-query
                   (if filep
                       (if (zerop filep) last-query (subseq line 0 filep))
                       line))
                  (query (parse-boolean-query string-query tdb)))
             (if filep
                 (let ((file (remove #\space (subseq line (1+ filep)))))
                   (format output "Output ~Ato end of ~A ... "
```

```
DSK)<project>markov>trivo>qtagger>franz4.1>concordance.lisp:56   3-Mar-93 09:42:06

(if (zerop filep) "of previous pattern " "") file)
                    (with-open-file (stream file :direction :output
                                           :if-exists :append
                                           :if-does-not-exist :create)
                              (format stream "~A~A~%" prompt string-query)
                              (my-boolean-search query tdb stream))
                  (format output " done.~%"))
                (my-boolean-search query tdb output))
            (setq last-query string-query))))))))

(defun my-perform-query (query tdb &optional (output *standard-output*))
  (format output "Searching ...~%")
  (print-sentence-intervals (my-concordance-search query tdb) tdb output))

;;; query parser
(defvar *doc-id-list* nil)

(defun my-boolean-search (query tdb &optional (output *standard-output*))
  (let ((ps (boolean-ps::make-boolean-ps query tdb output)))
    (setq *doc-id-list* nil)
    (loop (let ((id (or (next-posting ps) (return))))
           (push id *doc-id-list*)
           (when output
             (format output "~&~5D: ~A~%" id (doc-title id tdb)))))
    (setq *doc-id-list* (nreverse *doc-id-list*))))

(defun boolean-query (query &optional (tdb *tdb*))
  (let ()
    (my-boolean-search (parse-boolean-query query tdb) tdb)
    )
  )

(defun parse-boolean-query (query &optional (tdb *tdb*))
  (parse-boolean-terms (make-ts (make-string-input-stream query) tdb)))

(defun parse-boolean-terms (ts &optional stop-char)
  (let ((term (parse-boolean-term ts stop-char)))
    (cond ((null term) ())
          (t (multiple-value-bind (rest)
                 (parse-boolean-terms ts stop-char)
               (if rest
                   rest
                   term))))))

(defun parse-bag (ts proximity)
  (cons :bag
        (cons proximity
              (with-collection
                (loop (let ((term (parse-boolean-term ts #\)))))
                       (if term (collect term) (return))))))))

(defun parse-my-sequence (ts proximity)
  (cons :sequence
        (cons proximity
              (with-collection
                (loop (let ((term (parse-boolean-term ts #\>)))
                       (if term (collect term) (return))))))))

(defun parse-boolean-term (ts &optional stop-char)
  (let* ((chink-start (token-end-pos ts))
         (token (next-token ts))
         (chink (get-text-string chink-start (token-start-pos ts) ts))
         proximity ttoken)
    (do ((i 0 (1+ i))
         (limit (length chink)))
        ((= i limit))
      (let ((char (schar chink i)))
        (cond ((char= char stop-char)
               (setf (token-end-pos ts) (+ chink-start i 1))
               (return-from parse-boolean-term))
              ((char= char #\()
               (multiple-value-bind
                 (proximity delim)
                 (parse-integer chink :junk-allowed t
                                :start (1+ i))
```

```
{DSK}<project>markov>trivo>qtagger>franz4.1>concordance.lisp.56    9-Mar-93 09:42:06

;;    (format t "chink: ~s token: ~s i: ~a chink-start ~a delim: ~a~%"
          ;;        chink token i chink-start delim)
          (when (null (numberp proximity))
               (error "Number required for proximity but ~s given~%"
                     (subseq chink (+ chink-start 1) delim)))
          (setf (token-end-pos ts) (1- (+ chink-start 1 delim)))
          (when nil (setq ttoken (get-text-string
                                     (token-start-pos ts)
                                     (token-end-pos ts) ts)))
          ;; (format t "~s~%" token)

(return-from parse-boolean-term
                 (parse-bag ts proximity))))
       ((char= char #\<)
        (multiple-value-bind
         (proximity delim)
         (parse-integer chink :junk-allowed t
                        :start (1+ i))
          ;; (format t "chink: ~s token: ~s i: ~a chink-start ~a delim: ~a~%"
          ;;     chink token i chink-start delim)
          (when (null (numberp proximity))
               (error "Number required for proximity but ~s given~%"
                     (subseq chink (+ chink-start 1) delim)))
          (setf (token-end-pos ts) (1- (+ chink-start 1 delim)))
          (when nil (setq ttoken (get-text-string
                                     (token-start-pos ts)
                                     (token-end-pos ts) ts)))
          ;; (format t "~s~%" token)

(return-from parse-boolean-term
                 (parse-my-sequence ts proximity))))

((char= char #\{)
        (setf (token-end-pos ts) (+ chink-start 1 1))
        (return-from parse-boolean-term (parse-boolean-or ts)))
       ((char= char #\[)
        (setf (token-end-pos ts) (+ chink-start 1 1))
        (return-from parse-boolean-term (parse-boolean-and ts )))))))
  (when (null token)
       (when stop-char
            (error "Missing ~A" stop-char))
       (return-from parse-boolean-term ()))
  (prog1
     (copy-seq token)
    (free-string token)
    (free-string chink))))

(defun parse-boolean-and (ts)
  (cons :and
       (with-collection
          (loop (let ((term (parse-boolean-term ts #\])))
                (if term (collect term) (return))))))))

(defun parse-boolean-or (ts)
  (cons :or
       (with-collection
          (loop (let ((term (parse-boolean-term ts #\})))
                (if term (collect term) (return))))))))

(defvar *my-gap-size* 10)

(defun my-parse-concordance-query (query tdb)
  (my-parse-query (make-ts (make-string-input-stream query) tdb)))

(defun my-parse-query (ts &optional stop-char)
  (let ((term (my-parse-term ts stop-char)))
   (cond ((null term) ())
         ((eq term :gap)
          (values (my-parse-query ts stop-char) t))
         (t (multiple-value-bind
             (rest gap-seen-p)
              (my-parse-query ts stop-char)
             (if rest
                 `(:sequence ,(if gap-seen-p *my-gap-size* 0) ,term ,rest)
                 term))))))
```

```
:DSK><project>markov>trivo>dtagger>franz4.1>concordance.1:sp:66    3-Mar-93 09:42:05                    Pa (defun my-parse-term (ts &optional stop-char)
  (let* ((chink-start (token-end-pos ts))
         (token (next-token ts))
         (chink (get-text-string chink-start (token-start-pos ts) ts)))
    (do ((i 0 (1+ i))
         (limit (length chink)))
        ((= i limit))
      (let ((char (schar chink i)))
        (cond ((char= char stop-char)
               (setf (token-end-pos ts) (+ chink-start i 1))
               (return-from my-parse-term))
              ((char= char #\{)
               (setf (token-end-pos ts) (+ chink-start i 1))
               (return-from my-parse-term (my-parse-union ts)))
              ((char= char #\.)
               (setf (token-end-pos ts) (+ chink-start i 1))
               (return-from my-parse-term :gap))
              ((char= char #\[)
               (setf (token-end-pos ts) (+ chink-start i 1))
               (return-from my-parse-term (my-parse-query ts #\]))))))
    (when (null token)
      (when stop-char
        (error "Missing ~A" stop-char))
      (return-from my-parse-term ()))
    (prog1
        (copy-seq token)
      (free-string token)
      (free-string chink))))

(defun my-parse-union (ts)
  (cons :union
        (with-collection
          (loop (let ((term (my-parse-term ts #\})))
                  (if term (collect term) (return)))))))

(defun stems-byte-offsets (function tokens char-stream tdb &key start end)
  ;;; Calls (FUNCTION <token> <start pos> <length>) for occurence of a token in
  ;;; TOKENS in STREAM between START and END.
  (let ((table (make-hash-table :test 'equal :size (length tokens))))
    (dolist (token tokens)
      (setf (gethash token table) token))
    (let ((stream (make-ts char-stream tdb)))
      (do-tokens (token stream)
        (let ((start-pos (token-start-pos stream)))
          (declare (type byte28 start-pos))
          (when (and end (> start-pos (the byte28 end)))
            (return))
          (when (and (gethash token table)
                     (or (null start) (>= start-pos (the byte28 start))))
            (funcall function (gethash token table)
                     start-pos (token-end-pos stream))))))))

(defun seeterm (term &optional (doc-no nil))
  (let ((doc-stream nil)
        (curr-id -1)
        curr-offset
        (nr-leading-tokens 12)
        (nr-trailing-tokens 12)
        next doc-start doc-end
        (last-id -1)
        stream start end separated first-term-in-doc
        start-pos (end-pos -1))
    ;; (declare (type byte28 start-pos start end))
    (unwind-protect
        (progn
          (do-offsets
            (doc-id term-offset term *tdb*)
            (when (or (null doc-no) (= doc-no doc-id))
              (setq first-term-in-doc (/= curr-id doc-id))
              (when (/= curr-id doc-id)
                (when doc-stream
                  (close-doc doc-stream curr-id *tdb*))
```

```
[DSK]<project>markov>trivo>ctagger>franz4.1>concordance.lisp:56    9-Mar-93 09:42:06

(multiple-value-setq
               (doc-stream doc-start doc-end)
             (open-doc doc-id *tdb*))
           (setq *doc-stream* doc-stream)
           (setq curr-id doc-id)
           (setq stream (make-ts doc-stream *tdb* :start doc-start))
           (setq curr-offset -1)
           )
        (setq next (next-token stream))
        (when next
             (free-string next))
        (incf curr-offset)
        (when *debugging*
              (format t "~%doc-id : ~a Offset: ~a curr-offset: ~a doc-end ~a~%"
                      doc-id term-offset curr-offset doc-end))
        (setq separated nil)
        (do ()
            ((or (null next)
                 (>= curr-offset (- term-offset nr-leading-tokens))))
          (setq separated t)
          (incf curr-offset)
          (setq next (next-token stream))
          (when next
             (free-string next)))
        (when (and
               (/= last-id -1)
               (or (and first-term-in-doc
                        (/= last-id curr-id))
                   (and separated (> curr-offset 0))))
          (format t " ........>~%"))
        (when first-term-in-doc
              (format t "~%title: ~a~%" (doc-title doc-id *tdb*))
              )
        (when (or first-term-in-doc separated)
              (format t "~%<~a....... " separated))
        (setq start-pos (token-start-pos stream))
        (when *debugging*    (format t "~%start pos. ~a~%" start-pos))
        (do ()
            ((or (>= curr-offset (+ term-offset nr-trailing-tokens))
                 (null (setq next (next-token stream)))))
          (free-string next)
          (incf curr-offset)
          )

(when (and
               (null first-term-in-doc)
               (null separated)
               (>= start-pos end-pos)
               (< start-pos (1- doc-end)))
          ;;
          ;; spit out the chink between the end of the last token
          ;; and the next start, if two instances are not separated
          ;;
          (princ (get-text-string end-pos start-pos stream))
          )
        ;; don't know why this needs to be 1- doc-end!!
        (setq end-pos (min (token-end-pos stream) (1- doc-end)))
        (when *debugging*    (format t "end-pos: ~a~%" end-pos))

(when (< start-pos end-pos)
              (princ (get-text-string start-pos end-pos stream)))
        (setq last-id curr-id)
        ))
    (format t " ........>~%"))
  (progn
    (when doc-stream
         (close-doc doc-stream curr-id *tdb*)
         (setq doc-stream nil)
         )))))
```

000112

Kupiec

Document name: {DSK}<project>markov>trivp>qtagger>franz4.1 load-qa.lisp;7
Document date: Thu Jun 3 21:12:51 1993
Printing date/time: June 3, 1993 9:18:31 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
[DSK1<project>markov>trivp>qtagger>franz4.1>load-da.lisp.1    5-Mar-93 13:47:24                    Page 1

;;; -*- Package: USER; Syntax: Common-Lisp; Mode: Lisp; Base: 10 -*-

(in-package "USER")

(defvar *load-data* t)

(defvar *srce-pathname*
    (make-pathname
      :defaults "/project/markov/grammar/v2/"
      :type "f41"))

(defvar *tagger-pathname*
    (make-pathname
      :defaults "/project/markov/trivp/qtagger/franz4.1/"
      :type "f41"))

(defvar *rhmm-pathname*
    (make-pathname
      :defaults "/project/markov/cfg/"
      :type "f41"))

(defvar *fsm-pathname*
    (make-pathname
      :defaults "/project/lisp-fsm/rel1.1/"
      :type "f41"))

(defvar *hmm-pathname*
    (merge-pathnames
      (make-pathname :type "hmm")
      *tagger-pathname*))

(defvar *hmm-new-model-name* "new-hmm")

(defvar *hmm-default-model-name* "default")

(defvar *lexicon-pathname* (make-pathname :defaults "/project/markov/trivp/qtagger/franz4.1/english-lexi
fst"))

(defun load-tagger-files ()
  (let nil
    (format t "Loading FSM and FST packages...~%")
    (in-package "USER")
    (load (merge-pathnames
            (make-pathname
              :name "fsm-calculus-sysdcl"
              :type "lisp")
            *fsm-pathname*))
    (pdefsys:load-system :fsm-calculus)
    (load (merge-pathnames
            *srce-pathname*
            (make-pathname :name "fsm-utilities")))
    (load (merge-pathnames
            *tagger-pathname*
            (make-pathname :name "apply-fsm-to-array")))
    (pdefsys::load-system :tdb-sysdcl)
    (pdefsys::load-system :concordance)
    (pdefsys::load-system :grolier-tdb)
    (pdefsys::load-system :boolean-ps)
    (load "concordance")
    (pdefsys:load-system :fsm-tokenizer-rules)
    ;;
    ;; Disable Auto load of lexicon with the undesired function
    ;; "read-lexicon-fst" --- use my version of twol-lexicon instead
    ;;
    (load (merge-pathnames
            (make-pathname :name "twol-lexicon")
            *srce-pathname*))

(load (merge-pathnames
            (make-pathname :name "rhmm")
            *rhmm-pathname*))

(load (merge-pathnames
            *tagger-pathname*
            (make-pathname :name "text-tagger")))
```

```
{DSK}<project>markov>trivp>qtagger>franz4.1>load-qa.lisp:7    5-Mar-93 13:47:24                Page 2

(load (merge-pathnames
           *srce-pathname*
           (make-pathname :name "tagger-support")))
    (load (merge-pathnames
           *tagger-pathname*
           (make-pathname :name "grolier-fns")))
    (load (merge-pathnames
           (make-pathname :name "grammar-utilities")
           *srce-pathname*))
    (load (merge-pathnames
           (make-pathname :name "english-grammar-v1")
           *srce-pathname*))

(load (merge-pathnames
           *tagger-pathname*
           (make-pathname :name "query-formulation")))
    (load (merge-pathnames
           *tagger-pathname*
           (make-pathname :name "answer-extraction")))
    (load (merge-pathnames
           *tagger-pathname*
           (make-pathname :name "phrase-matching")))
    (load (merge-pathnames
           *tagger-pathname*
           (make-pathname :name "basic-scoring")))
    (load (merge-pathnames
           *tagger-pathname*
           (make-pathname :name "root-hypos")))
    (load (merge-pathnames
           *tagger-pathname*
           (make-pathname :name "type-ranking")))
    (load (merge-pathnames
           *tagger-pathname*
           (make-pathname :name "query-np-ranking")))
    (load (merge-pathnames
           *tagger-pathname*
           (make-pathname :name "franz-to-emacs")))

(load (merge-pathnames
           *tagger-pathname*
           (make-pathname :name "init-qa")))))
(eval-when (load)
   (load-tagger-files))
```

Kupiec

Document name: {DSK}<project>markov>trivp>qtagger>franz4.1 init-qa.lisp;2
Document date: Thu Jun 3 21:16:53 1993
Printing date/time: June 3, 1993 9:22:17 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```lisp
[DSK]<project>markov>trivo>qtagger>franz4.l>init-qa.lisp:2   16-Apr-93 11:24:09                    Page 1

;;;-*- Package: USER; Syntax: Common-Lisp; Mode: Lisp; Base: 10 -*-

(cl::in-package "USER")
;;; Shadow, Export, Require, Use-package, and Import forms should follow here (defun init-qa nil
  (let (hmm-pathname)
    (setq *lexicon* (finite-state-machine:lexicon-from-file
                     *lexicon-pathname*))
    (format t "Reading Lexicon Transducer~%")
    (finite-state-machine:index-network *lexicon*)
    (when (probe-file (merge-pathnames "fast-lexicon.fsm"
                                       *tagger-pathname*))
      (format t "Reading Fast Lexicon FSM~%")
      (setq *fast-lexicon-fsm* (
                                finite-state-machine:network-from-file
                                (merge-pathnames
                                 "fast-lexicon.fsm"
                                 *tagger-pathname*))))
    (when (null **fast-lexicon-fsm*)
      (format t "There is no Fast Lexicon available~%"))
    (format t "Creating Mapping Hash Tables~%")
    (make-tag-map)
    (setq *lexical-hash-table* (make-hash-table :test #'equal))
    (if (null *load-data*)
        (format t
                "~%Reminder: No data is being loaded. *load-data* is nil~%"
                )
        (progn ;;;
;;; 8 th Nov 90 . Changed this from doing all codewords in codeword
;;; vector, to only doing those that are not unique ones, as otherwise
;;; the hash table will get multiple entries for the same tags.....The
;;; unique codes are always all in the front vector.
;;;

(format t "~%Reading Unique Words..~%")
          (setq *unique-words* (read-word-file
                                *unique-words-pathname*))
          (when (null *unique-words*)
            (format t "ERROR: Unique Words are nil~%"))
          (format t "~%Reading Codeword Vector..~%")
          (setq *codeword-vector* (read-vector
                                   *eqv-class-pathname*))
          (if (null *codeword-vector*)
              (format t "ERROR: Codeword Vector is nil~%"))
          (do ((index (length *unique-words*)
                      (1+ index)))
              ((= index (length *codeword-vector*)))
            (setf (gethash (aref *codeword-vector* index)
                           *lexical-hash-table*)
                  index))
          (format t "Reading Front FSM..~%")
          (setq *front-fsm* nil)
          (when (probe-file (merge-pathnames "front-end.fsm"
                                             *tagger-pathname*))
            (setq *front-fsm* (
                               finite-state-machine:network-from-file
                               (merge-pathnames
                                "front-end.fsm"
                                *tagger-pathname*))))
          (if (null *front-fsm*)
              (format t "ERROR: Front FSM is nil~%"))
          (finite-state-machine:index-network *front-fsm*)
          (format t "Reading Front Vector..~%")
          (setq *front-vector* (read-vector (merge-pathnames
                                             "front-vector.lisp"
                                             *tagger-pathname*))
                )
          (if (null **front-vector*)
```

```
;DSK;<project>markov>tnt>p>qtagger>franz4.1>init-qa.lisp.2    15-Apr-93 11:24:09                    Page 2

(format t "ERROR: Front vector is nil~%")))
;;;
      (setq hmm-pathname
        (if (pathname-name *hmm-pathname*)
            *hmm-pathname*
          (merge-pathnames (make-pathname :name
                                          *hmm-default-model-name*
                                          :type "hmm")
                           *tagger-pathname*)))
      (format t "Reading Tagger RHMM..~%")
;;              (in-package "RHMM")
      (let (model nr-outputs)
        (setq model (rhmm::read-hmm hmm-pathname))
        (when (null model)
          (format t "ERROR: Could not read ~a~%"
                  hmm-pathname))
        (when model
          (setq nr-outputs (rhmm::hmm-defn-nr-outputs
                            model))
          (when (/= nr-outputs (length
                                *codeword-vector*
                                ))
            (format t
                    "ERROR: Nr outputs (~a) in model: ~a~%
                     nr-outputs (rhmm::hmm-defn-name
                                 model))
            (format t
                    "ERROR: do not match nr. codewords (~a)~%"
                    (length *codeword-vector*)))
          (format t "Creating Matrix Logarithms..~%")
          (rhmm::make-log-matrices model
                                   :always-recompute t)
          (when *predict-unknown-words*
            (read-suffix-priors
             model)))))
;;    (in-package "USER")
      (format t "Loading Completed~%")
      (format t "Initializing TDB and loading Emacs code..")
      (concordance::init-tdb-and-load-emacs-to-franz)
      (format t "Done~%")
      ))

(init-qa)
```

000118

Kupiec

Document name: {DSK}<project>markov>trivp>qtagger>franz4.1 patent—source>tagger—support.LISP;1
Document date: Thu Jun 3 21:20:51 1993
Printing date/time: June 3, 1993 9:27:35 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
;;;-*- Package: USER; Syntax: Common-Lisp; Base: 10 -*-
;;; File converted on 11-Mar-93 13:21:01 from source tagger-support
;;; Original source {dsk}<project>markov>grammar>v2>tagger-support.;16 created 11-Mar-93 13:02:09
;;; Copyright (c) 1989, 1990, 1991, 1992, 1993 by Xerox Corporation
(provide 'TAGGER-SUPPORT')
(in-package "USER")
;;; Shadow, Export, Require, Use-package, and Import forms should follow here
;;; File converted on  2-Oct-90 16:33:22 from source tagger-support Original source
;;; {piglet}<piglet>speech>kupiec>hmm>tagger>release>v3>tagger-support.;1 created  2-Oct-90
;;; 16:30:15 Copyright (c) 1989, 1990 by Xerox Corporation
(in-package "USER")
(provide 'TAGGER-SUPPORT')
;;; Shadow, Export, Require, Use-package, and Import forms should follow here
(defvar *hash-table* nil)
(defvar *max-suffix-len* nil)
(defparameter *my-stop-list*
    '("a" "able" "about" "above" "access" "accomplish" "accord" "across" "act" "actual" "actually"
      "affect" "afraid" "aft" "after" "afterward" "again" "against" "ago" "agree" "ahead"
      "all" "allow" "ally" "almost" "alone" "along" "already" "also" "although" "always" "am"
      "among" "amongst" "amount" "an" "and" "another" "answer" "any" "anyhow" "anyone"
      "anything" "anyway" "anywhere" "appear" "approach" "appropriate" "are" "aren" "argue"
      "arise" "around" "as" "aside" "ask" "assume" "at" "attempt" "avail" "avoid" "away"
      "awhile" "b" "back" "bad" "be" "became" "because" "become" "been" "before" "beforehand"
      "began" "begin" "behave" "behind" "being" "belief" "believe" "below" "beside" "best"
      "bet" "better" "between" "beyond" "big" "both" "bring" "brought" "but" "by" "c" "call"
      "came" "can" "cannot" "care" "carefully" "carefully" "cause" "cc" "cent" "certain"
      "certainly" "change" "choice" "choose" "chose" "claim" "clarify" "clear" "clever" "co"
      "come" "commend" "comment" "completely" "consider" "considerate" "convenient" "convince"
      "could" "couldn" "courage" "course" "cove" "current" "d" "date" "deal" "decide"
      "decision" "delve" "depend" "despite" "detect" "determine" "did" "didn" "different"
      "difficult" "discuss" "discussion" "do" "doesn" "don" "done" "down" "during" "e" "each"
      "earlier" "easy" "effect" "effort" "eg" "either" "else" "elsewhere" "end" "enough"
      "entirely" "especially" "essential" "establish" "etc" "even" "eventual" "ever" "every"
      "everyone" "everything" "everywhere" "evident" "exact" "example" "except" "exist"
      "expect" "explain" "extra" "extract" "extreme" "f" "fact" "far" "favor" "feel" "felt"
      "few" "find" "first" "follow" "for" "force" "form" "fortunate" "found" "forward"
      "friend" "from" "full" "fully" "further" "furthermore" "g" "gather" "gave" "generally"
      "get" "give" "given" "glad" "go" "goes" "going" "gone" "good" "got" "gotten" "great"
      "greater" "guess" "h" "had" "hadn" "hadn" "hand" "happen" "happy" "hard" "has" "hasn"
      "have" "haven" "he" "hear" "heard" "held" "hence" "her" "here" "hereafter" "hereby"
      "herein" "hereupon" "hers" "herself" "highly" "him" "himself" "his" "hold" "hope" "how"
      "however" "i" "idea" "ideal" "ie" "if" "ified" "imagine" "immediate" "important"
      "impose" "in" "inc" "include" "indeed" "indicate" "instead" "instruct" "intend"
      "intention" "into" "involve" "is" "isn" "issue" "it" "item" "its" "itself" "j" "just"
      "k" "keep" "kept" "kind" "knew" "know" "known" "l" "laid" "large" "last" "later"
      "latter" "lay" "lead" "least" "leave" "left" "less" "lesser" "lest" "let" "lie" "like"
      "likely" "little" "ll" "look" "lot" "low" "ltd" "m" "made" "make" "many" "mark" "matte"
      "may" "maybe" "me" "mean" "meant" "meanwhile" "meet" "mention" "mere" "might" "mild"
      "mind" "more" "moreover" "most" "mostly" "much" "must" "my" "myself" "n" "name" "near"
      "nearly" "necessary" "nee" "need" "needn" "needn't" "neither" "never" "nevertheless"
      "new" "next" "nice" "no" "nobody" "non" "none" "noone" "nor" "normal" "not" "note"
      "nothing" "notice" "notion" "notwithstanding" "now" "nowhere" "nt" "o" "obvious" "occur"
      "of" "off" "often" "ok" "okay" "old" "on" "once" "one" "only" "onto" "or" "other"
      "otherwise" "ought" "our" "ourselves" "out" "over" "own" "p" "particular" "people" "per"
      "perfect" "perform" "perhaps" "place" "please" "plenty" "possible" "prefer" "preferably"
      "presense" "presume" "pretty" "previous" "probably" "problem" "produce" "prompt"
      "proper" "propos" "proposal" "propose" "provide" "purpose" "put" "q" "quest" "question"
      "quick" "quite" "r" "raise" "rather" "re" "ready" "really" "reason" "reasonable"
      "reasonably" "receive" "refer" "regard" "relevant" "rely" "reply" "respect" "result"
      "retain" "right" "run" "s" "said" "same" "save" "saw" "say" "see" "seem" "seen" "send"
      "sense" "sent" "serious" "serve" "several" "shall" "she" "shortly" "should" "shouldn"
      "show" "shown" "similar" "simple" "simply" "since" "situate" "slight" "slightly" "slow"
      "so" "solve" "some" "somebody" "somehow" "someone" "something" "sometime" "somewhat"
      "somewhere" "soon" "sorry" "speak" "specific" "specify" "spend" "spent" "stand" "start"
      "state" "stay" "still" "strong" "stuff" "subject" "such" "suffice" "sufficient"
      "suggest" "suggestion" "supple" "support" "suppose" "sure" "t" "take" "taken" "talk"
      "tell" "tend" "terrible" "than" "thank" "that" "the" "their" "them" "themselves" "then"
      "thence" "there" "thereafter" "thereby" "therefore" "therein" "thereupon" "these" "they"
      "thing" "things" "think" "this" "those" "though" "thought" "through" "throughout" "thru"
      "thus" "til" "till" "time" "tire" "to" "together" "told" "too" "took" "total" "toward"
      "treat" "tried" "trouble" "truly" "try" "two" "u" "under" "unless" "unlikely" "until"
      "up" "upon" "us" "use" "useful" "useless" "usual" "usually" "v" "valid" "various" "ve"
      "vent" "very" "via" "view" "w" "wait" "want" "was" "wasn" "wasnt" "way" "we" "well"
      "went" "were" "what" "whatever" "when" "whence" "whenever" "where" "whereafter"
```

```
<DSK)<project>markov>three>qtagger>franz4.l>patent-source>tagger-support.LISP.1    3-Jun-93 21:20:20
Page 2

"whereas" "whereby" "wherein" "whereupon" "wherever" "whether" "which" "while" "whither"
                    "who" "whoever" "whole" "whom" "whose" "whosoever" "why" "will" "wish" "with" "within"
                    "without" "won" "wonder" "work" "worry" "worthy" "would" "wouldn" "writ" "write"
                    "written" "x" "y" "yes" "yet" "yield" "you" "your" "yours" "yourself" "yourselves" "z"))
(defvar *temp-str1* (make-array 100 :element-type 'string-char :fill-pointer 0 :adjustable t))
(defvar *temp-str2* (make-array 100 :element-type 'string-char :fill-pointer 0 :adjustable t))
(defvar *debugging* nil)
(defvar *lexicon-index* nil)
(defvar *eqv-class-index* nil)
(defvar *codeword-count-vector* nil)
(defvar *codeword-suffixes* nil)
(defvar *fixes-index* nil)
(defvar *default-training-file* (merge-pathnames "training-corpus.codes" *tagger-pathname*))
(defvar *dict-word-vector* nil)
(defvar *initial-counts* nil)
(defvar *initial-matrix* nil)
(defvar *nr-pos-obs* nil)
(defvar *nr-pos-states* nil)
(defvar *output-matrix* nil)
(defparameter *stop-table* (let ((table (make-hash-table :test 'equal)))
                             (dolist (word *my-stop-list*)
                               (setf (gethash word table)
                                     t))
                             table))
(defvar *tied-states* nil)
(defvar *transition-matrix* nil)
(defvar *unrecognized-suffixes* nil)
(defvar *unique-eof* (cons nil nil))
(defvar *unique-index* nil)
(defvar *unique-words* nil)
(defvar *unique-words-pathname* (merge-pathnames "unique-words.lisp" *tagger-pathname*))
(defvar *word-array* nil)
(defvar *word-fixes* nil)
(defvar *word-fixes-pathname* (merge-pathnames "word-fixes.lisp" *tagger-pathname*))
(defvar *wordcount-pathname* (merge-pathnames "wordcount-vector.lisp" *tagger-pathname*))
(defvar *wordcount-vector* nil)
(defun add-to-suffix-count (word count max-suffix-len)
  (let ((suffix-buffer *temp-str2*)
        codeword wd-len fsm-index)
    (when word
      (setq codeword (word-to-codeword word))
      (setq wd-len (length word))
;;;
;;; Increment the codeword count corresponding to this word. Do not increment any of the unique
;;; codewords (also -- should really check the front-fsm and not increment if it was in there--- no?
;;; (and !) codeword *n--unique-words*) (null (finite-state-machine:word-to-number word
;;; **front-fsm*))) Instead assume that all possible closed class items have been mentioned in the
;;; dictionary. Thus. all possible equivalence classes that have them as a member should be set to
;;; zero
;;;
      (when (> codeword (length *unique-words*))
        (incf (aref *codeword-count-vector* codeword)
              count)
        (setq fsm-index nil)
        ;; Look up the longest matching suffix of this word with the suffix fsm.
        (do ((suffix-len max-suffix-len (1- suffix-len)))
            ((or fsm-index (<= suffix-len 0)))
          (when (>= wd-len suffix-len)
;;;
;;; Changed 12 Dec 1991 from (setq suffix (subseq word (- wd-len suffix-len) wd-len))
;;;
            (setf (fill-pointer suffix-buffer)
                  0)
            (do ((index (- wd-len suffix-len)
                        (1+ index)))
                ((>= index wd-len))
              (vector-push-extend (char word index)
                                  suffix-buffer))
            (setq fsm-index (fsm:word-to-number suffix-buffer *suffix-fsm*))
            (when *debugging* (format t "~a ~a ~a ~a~%" word suffix-len suffix-buffer
                                      fsm-index))))
;;;
;;; If there is a match. increment the count of number of times the corresponding codeword for the
;;; word had this suffix. from the word count (COUNT)
```

```
DSK1<project>markov>trivo>qtagger>franz4.1>patent-source>tagger-support.LISP:1    3-Jun-93 21:20:30
Page 3

;;;
                      .when fsm-index
                         ((incf (aref *codeword-suffixes* codeword fsm-index)
                                count)
                           (when n=1
                              :format t "~a ~a ~a ~a : ~a~%" word codeword fsm-index (aref
                                                                           *codeword-vector*
                                                                           codeword)
                                   count))))
;;;
;;; If there is no match, increment the entry in the unrecognized suffix vector for this word.
;;;
                      (when (null fsm-index)
                         (incf (aref *unrecognized-suffixes* codeword))))))))
(defun build-tagger (&key (make-func 'make-qtagger)
                          (train-on (list (merge-pathnames (make-pathname :name "dbs" :type "corpus")
                                                 *srce-pathname*)
                                          (merge-pathnames (make-pathname :name "dbs1" :type "corpus"
                                                                )
                                                 *srce-pathname*)
                                          (merge-pathnames (make-pathname :name "questions" :type
                                                                           "corpus")
                                                 *tagger-pathname*)))
                          (name *hmm-new-model-name*)
                          (iterate 15)
                          (read t)
                          (to-codes nil)
                          (suffixes nil)
                          (train-only nil))
  (let (model-name model hmm-pathname coded-file saved-predict (training-files nil)
        (code-file (or to-codes (null train-only))))
    (setq saved-predict *predict-unknown-words*)
    (setq *predict-unknown-words* nil)
    (setq *tagger-stable-p* nil)
    (when (null train-only)
       (format t "Making Tag Map..~%")
       (make-tag-map)
       (format t "Reading Unique words..~%")
       (setq *unique-words* (read-word-file *unique-words-pathname*))
       (format t "Reading Word fixes..~%")
       (setq *word-fixes* (read-word-file *word-fixes-pathname*))
       (make-front-end-fsm)
       (format t "~%Finding Equivalence Classes..~%")
       (find-eqv-classes *lexicon*)
       (format t "Making Codeword Vector..~%")
       (setq *codeword-vector* (make-codeword-vector))
       (setq *word-array* (get-word-array :fix-up t))
       (format t "Making Wordcount Vector..~%")
       (setq *wordcount-vector* (make-wordcount-vector *codeword-vector* *word-array*)))
    (when train-only
       (format t "WARNING: No Lexicon or Codeword rebuilding...~%")
       (check-data nil)
       (when (null *wordcount-vector*)
          (format t "Reading Wordcount Vector~%")
          (setq *wordcount-vector* (read-vector *wordcount-pathname*))))
    (format t "Making Tagger RHMM....~%")
    (if make-func
       (progn (funcall make-func)
              (setq model (first rhmm:*models*))
              (format t "SELECTING ~a~%" (rhmm::hmm-defn-name model)))
       (progn (format t "Creating HMM model named: ~a~%" name)
              (setq model (make-first-order-pos (length *ordered-state-list*)
                                                 (length *codeword-vector*)
                                                 :reset t :name name))))
    (setq model-name (rhmm::hmm-defn-name model))
    (setq hmm-pathname (if (pathname-name *hmm-pathname*)
                           *hmm-pathname*
                           (merge-pathnames (make-pathname :name model-name :type "hmm")
                                  *tagger-pathname*)))
;;; Converting corpora to codes
    (when code-file (format t "Converting to codes ~%"))
    (dolist (pathname train-on)
       (setq coded-file (merge-pathnames (make-pathname :type "codes")
                              pathname))
```

```
{DSK}<project>markov>tr-vp>qtagger>franz4.1>patent-source>tagger-support.LISP;1    3-Jun-93 21:20:23
Page 4

(push coded-file training-files)
              (when code-file
                (format t "Converting ~a~%" pathname)
                (tag pathname :full-init nil :outfile coded-file :to-codes t :show nil :name
                     model-name)))
             (train-tagger :name model-name :train-on training-files :read read :iterate iterate)
        (if (or suffixes (null train-only))
            (progn (setq *predict-unknown-words* t)
                   (find-suffix-probs model)
                   (when (null train-only)
                     (setq *tagger-stable-p* t)
                     (format t "Complete New Tagger: ~a declared stable~%")))
          (progn (format t "WARNING: No suffix rebuild...~%")
                 (setq *predict-unknown-words* saved-predict)
                 (format t "*PREDICT-UNKNOWN-WORDS* left alone (~a)...~%"
                         *predict-unknown-words*)))))
(defun code-lexicon-fst (&key (build-fsm-only nil))
    (let (fsm (outfile "coded-lexicon.txt")
          (coded-lexicon-file *fast-lexicon-pathname*))
       (when (null build-fsm-only)
         (setq *lexicon-index* 0)
         (setq **sm-pad-char-length* (length (format nil "~D" (length *codeword-vector*)))))
       (with-open-file (stream outfile :direction :output :if-exists :new-version)
              (setq *temp-stream* stream)
;;; MAP-PATH-TO-CODE throws out all words with apostrophes. (for words with genitive markers, so the
;;; special ones must be included below
             (format t "Adding special codewords (incl. apostrophes)~%")
             (dolist (el '("." "," "?" "!" "-" "(" ")" ";" ":" "\"" "`" "A." "O" "U.S.A"
                           "s" "re" "m" "t" "d" "ll" "ve"))
                (format *temp-stream* "~A~3,'0D~%" el (word-to-codeword el)))
             (format t "Mapping over lower side of Lexicon~%")
             (format t "All words containing apostrophe will be ignored~%")
             (fsm::map-network *lexicon* #'map-path-to-code :label-fn #'fsm::lower-symbol)
             (format t "Mapping over Front fsm~%")
             (format t "All words containing apostrophe will be ignored~%")
             (fsm::map-network *front-fsm* #'map-path-to-code)))
       (format t "Making coded lexicon fsm~%")
       (with-open-file (stream outfile :direction :input)
          (setq fsm (fsm:make-word-list-fsm (loop (return (read-line stream nil nil)))
                          :partition-form
                          (format t "Partition number: ~a States so far: ~a~%"
                                  fsm::partition-count fsm::total-states-created))))
       (format t "Writing fsm to: ~A~%" coded-lexicon-file))
       (fsm:network-to-file fsm coded-lexicon-file)
       (setq **fast-lexicon-fsm* fsm)
       (when (null fsm)
         (format t "WARNING: No Coded Lexicon FSM has been made~%"))
       fsm))
(defun compute-n-grams (n stream &key (use-stop-list-p nil)
                                       (reset-hash-table t))
   (let ((grams nil))
       (when reset-hash-table
         (setq *hash-table* (make-hash-table :test 'equal)))
       (map-text #'(lambda (word)
                     (when (or (not use-stop-list-p)
                               (not (stop-word-p word)))
                       (when (= (length grams)
                                n)
                         (pop grams))
                       ;; add WORD to each gram in GRAMS
                       (do ((last-tail nil tail)
                            (tail grams (cdr tail)))
                           ((null tail)
                            ;; add new entry at end w/ just this word
                            (if last-tail
                                (setf (cdr last-tail)
                                      (list (list word)))
                                (setf grams (list (list word)))))
                         (push word (car tail)))
                       ;; increment the count of each gram in GRAMS
                       (dolist (gram grams)
                         (incf (gethash gram *hash-table* 0)))))
                 stream)
       *hash-table*))
```

```
;;SK>(project)markov>tr vo>dtagger>finaz4.1>patent-source>tagger-support..ISP;1    3-Jun-93 21:20:20
Page 6

(defun compute-suffix-probs (model &key (start 5000)
                                        (use-lexicon t))
     (let* ((nr-codewords (length *codeword-vector*))
            (max-suffix-len (apply 'max (map 'list 'length *suffix-list*)))
            (closed-classes (set-difference *ordered-state-list* *open-classes*))
            nr-suffixes uninformed-prior count suffix-count saved-print-array)
;;;
;;; This function creates a vector of probabilities for a word suffix for the given states of a
;;; model
;;;
;;; 9 oct 91.  NR-SUFFIXES should be taken from the fsm size, not the (length *suffix-list*) because
;;; any repeated suffix in the latter will map to the same entry in the fsm..
;;;
       (format t "Making Suffix FSM~%")
       (setq *suffix-fsm* (make-suffix-fsm))
       (setq nr-suffixes (fsm:state-name (fsm:network-start-state *suffix-fsm*)))
       (when (/= (length *suffix-list*)
                 nr-suffixes)
           (format t "WARNING: Suffix FSM (~a) and suffix list (~a) different lengths~%"
                   nr-suffixes (length *suffix-list*))
           (format t "WARNING: Check that there are no duplicate entries~%"))
       (when (null *codeword-vector*)
           (format t "ERROR...should have called FIND-SUFFIX-PROBS first!~%"))
       (setq *codeword-suffixes* (make-array (list nr-codewords nr-suffixes)
                                             :initial-element 0))
       (setq *codeword-count-vector* (make-array nr-codewords :initial-element 0))
       (setq *unrecognized-suffixes* (make-array nr-codewords :initial-element 0))
;;; This is a global to be accessible to COUNT-LEXICON-SUFFIXES
       (setq *max-suffix-len* max-suffix-len)
       (new-make-suffix-counts :start start :use-lexicon use-lexicon)
;;;
;;; Now zero all counts for any equivalence class that included a closed class, as it is assumed
;;; that these have all been explicitly mentioned in the dictionary. It is quicker to zero here,
;;; rather than use (word-to-states ..) in the previous loop. NOTE that :unknown is considered as
;;; a closed-class.
;;;
       (format t "Zeroing closed class members~%")
       (do ((index (length *unique-words*)
                   (1+ index)))
           ((>= index nr-codewords))
         (when (intersection closed-classes (aref *codeword-vector* index))
             (setf (aref *codeword-count-vector* index)
                   0)
             (dotimes (suffix-index nr-suffixes)
                 (setf (aref *codeword-suffixes* index suffix-index)
                       0))
             ;;
             ;; Note that :prepart is listed as an open class but as all -ing suffixes are
             ;; detected there should never be a non zero count for it.
             ;;
             (setf (aref *unrecognized-suffixes* index)
                   0)))
       (format t "Making Uninformed prior~%")
       (setq uninformed-prior (make-uninformed-log-prior model *unrecognized-suffixes*
                                                         *codeword-count-vector*))
;;;
;;; Find the conditional probability of the suffix given the codeword
;;;
       (format t "Computing suffix probs conditioned on Eqv classes~%")
       (dotimes (index nr-codewords)
           (when (> (setq count (aref *codeword-count-vector* index))
                    0)
               (dotimes (suffix-index nr-suffixes)
                   (setq suffix-count (aref *codeword-suffixes* index suffix-index))
                   (when (> suffix-count 0)
                       (setf (aref *codeword-suffixes* index suffix-index)
                             (/ (float suffix-count)
                                (float count)))))))
;;;
       (make-suffix-priors model uninformed-prior *suffix-fsm* *codeword-suffixes*)
       (setq saved-print-array *print-array*)
       (setq *print-array* t)
       (with-open-file (stream *suffix-priors-pathname* :direction :output :if-exists
                               :new-version)
```

```
;DSK}<project>markov>trvp>dtagger>franz4.1>patent-source>tagger-support.LISP:1    3-Jun-93 21:20:20
Page 6

;;;
;;; 4 dec 1991 add writeout of *suffix-priors* to permit read without lengthy initialization when
;;; software is stable
;;;
                (print *suffix-priors* stream)
                (print *codeword-suffixes* stream)
                (print *codeword-count-vector* stream)
                (print *unrecognized-suffixes* stream))
          (setq *print-array* saved-print-array)
               nil))
(defun count-lexicon-suffixes (lst)
     (let ((the-char #\*)
           in-front-fsm word tag-list genitive-tag-p)
          (declare (character the-char))
          (setf (fill-pointer *temp-str1*)
                0)
          (dolist (sym lst)
               (dotimes (n (length (symbol-name sym)))
                    (declare (fixnum n))
                    (setq the-char (char (symbol-name sym)
                                         n))
                    (vector-push the-char *temp-str1*)))
          (setq word *temp-str1*)
          (incf *lexicon-index*)
          (if (<= *lexicon-index* 5000)
               (if (= 0 (rem *lexicon-index* 1000))
                    (format t "------ ~a words done. Current word: ~a~%" *lexicon-index* *temp-str1*)
                    )
               (if (= *lexicon-index* 5001)
                    (format t "------ Reporting every 20,000 from now on~%")
                    (if (= 0 (rem *lexicon-index* 200000))
                         (format t "------ ~a words done. Current word: ~a~%" *lexicon-index*
                                 *temp-str1*))))
;;;
;;;   In case of mismatching/unknown tags it is nice to know the word
;;;   involved, so use lookup instead of lookup-tag
;;;   (setq tag-list (finite-state-machine:lookup-tag *temp-str1*
;;;   :network *lexicon* :plus-tag-p t))
;;;
          (setq tag-list (fsm::lookup *temp-str1* :network *lexicon*))
          (when *debugging*
               (format t "~&=================== ~a~%" *temp-str1*)
               (format t "~a~%" tag-list))
;;; Don't need to intern the tags into the KEYWORD package, or convert them. JUST find out if the
;;; genitive tag was present, and can do this with string compare
          (setq genitive-tag-p nil)
          (dolist (tag-str tag-list)
               (when (search "+{Gen}" tag-str)
                    (setq genitive-tag-p t)))
          (when (and tag-list (null genitive-tag-p))
               ;;
               ;;  All common words with special tags should be accounted for
               ;;  in the front-end.fsm
               ;;
               ;;  For some strange reason in the following (word-to-index)
               ;;  complains about word initial caps whereas (word-to-number)
               ;;  doesn't
               (setq in-front-fsm (and *front-fsm* (fsm:word-to-number word **front-fsm*)))
               (when (null in-front-fsm)
                    (add-to-suffix-count word 1 *max-suffix-len*)))))
(defun create-tied-transitions (model)
     (let* ((nr-states (rhmm::hmm-defn-nr-states model))
            (to-prep (position :to-prep *ordered-state-list*))
            (prep (position :prep *ordered-state-list*))
            (that-list '((:that-det :det)
                         (:that-prel :prel)
                         (:that-pnom :pnom)
                         (:that-pobl :pobl)))
            (do-thats t)
            (tied-transitions (rhmm:my-make-array (list nr-states nr-states)
                                                  :initial-element nil)))
          (when (and to-prep prep)
               (dotimes (index (length *ordered-state-list*))
                    (setf (aref (aref tied-transitions to-prep)
```

```
DSK:<project>markov>thivo>tagger>finz4.0>patent-source>tagger-support.LISP:1    1-Jun-93 21:20:20
Page 2 index)
                                   (cons prep index)))
                        (setf (nmm::nmm-defn-tied-transitions model)
                              tied-transitions))
                     (when (or (null to-prep)
                               (null prep))
                       (format t "No Tied transitions added..~%")
                       (format t "...either :prep or :to-prep state absent..~%"))
                     (dolist (pair that-list)
                       (when (or (null (member (first pair)
                                               *ordered-state-list*))
                                 (null (member (second pair)
                                               *ordered-state-list*)))
                         (setq do-thats nil)))
                     (when do-thats
                       (dolist (pair that-list)
                         (dotimes (index (length *ordered-state-list*))
                           (setf (aref (aref tied-transitions (position (first pair)
                                                                        *ordered-state-list*))
                                       index)
                                 (cons (position (second pair)
                                                 *ordered-state-list*)
                                       index))))
                       (setf (nmm::nmm-defn-tied-transitions model)
                             tied-transitions))
                     (when (null do-thats)
                       (format t "No Tied transitions for *that* were added..~%"))))
(defun new-make-eqvclass-hashtable (lexicon)
  (let* ((total-entries 0)
         list-tag)
    (setq *lexical-hash-table* (make-hash-table :test 'equal))
    (setq *eqv-class-index* (length *unique-words*))
    (when lexicon
      (setq total-entries (fsm:state-name (fsm:network-start-state lexicon))))
    (format t "There are ~a lexicon entries, and ~a unique Equivalence classes~%"
            total-entries *eqv-class-index*)
    (if *lexicon*
        (progn (setq *lexicon-index* 0)
               (fsm::map-network *lexicon* #'for-each-lexicon-index :label-fn
                                 #'fsm::lower-symbol))
        (progn (format t "WARNING: There is no Lexicon supplied~%")
               (format t "WARNING: Only words in front-fsm will be recognized~%")))
    ;;
    ;; Insert a codeword for the  tags that probably do not
    ;; show up in the lexicon or front-fsm.
    ;;
    ;; The Lexicon contains only words. ::  Some special
    ;; parts of speech may not  be covered by this:    i.e.
    ;; Punctuation, Sentence boundaries, Abbreviations,
    ;; Numbers   (maybe others) These tokens will be seen in
    ;; text, and codewords need to be created for them. (they
    ;; are mutually exclusive, so no other combined classes
    ;; need be considered).
    ;;
    (dolist (special-tag *special-codewords*)
      (setq list-tag (list special-tag))
      (when (null (gethash list-tag *lexical-hash-table*))
        (when t (format t "New Eqv Class (~a) for special tag ~a~%" *eqv-class-index*
                        list-tag))
        (setf (gethash list-tag *lexical-hash-table*)
              *eqv-class-index*)
        (incf *eqv-class-index*)))
    *eqv-class-index*))
(defun new-make-suffix-counts (&key (start 5000)
                                    (use-lexicon t))
  (let (array-len word wd-len count ok)
    (when (null *word-array*)
      (format t "Reading word-array..~%")
      (setq *word-array* (get-word-array)))
    (format t "~%Starting at word ~a max suffix length ~a~%" start *max-suffix-len*)
    (setq array-len (length *word-array*))
    ;;
    ;; Go through the word-array , ignoring the most common (START) words so that suffix
    ;; statistics aren't biased by the suffixes of common words.
```

```
(DSK)<project>markov>tr-vp>qtagger>franz4.1>patent-source>tagger-support.LISP:1   3-Jun-93 21:20:20"
Page 3

;;
        (dotimes (index array-len)
            (when (>= index start)
                (setq word (car (aref *word-array* index)))
                (setq wd-len (length word))
                (setq count (cdr (aref *word-array* index)))
                ;;
                ;; To stop the transducer complaining in get-tags (called via word-to-states).
                ;; filter out words that it wont parse...A HACK
                ;;
                (setq ok t)
                (dotimes (i wd-len)
                    (let ((the-char (char word i)))
                        (when (or (char= #\* the-char)
                                  (digit-char-p the-char)
                                  (char= #\- the-char))
                            (setq ok nil))))
                (when (null ok)
                    (setq word nil))
                (add-to-suffix-count word count *max-suffix-len*)))
;;;
;;; Also go through the lexicon.
;;;
;;; Ignore the genitive entries.
;;;
;;; 20 September 1991 replaced calls to get-lexicon-tags with map-network.
;;;
        (if (and use-lexicon *lexicon*)
            (progn (setq *lexicon-index* 0)
                (fsm::map-network *lexicon* #'count-lexicon-suffixes :label-fn
                                  #'fsm::lower-symbol))
            (progn (when (and use-lexicon (null *lexicon*))
                       (format t "ERROR: No Lexicon present when wanted!!~%"))
                   (format t "WARNING: Only words in *WORD-ARRAY* were used~%"))))
(defun read-word-file (word-file)
    (let ((word-vector (make-array 0 :adjustable t :fill-pointer 0))
          (input-line t)
          value start word tag-list)
        (when (probe-file word-file)
            (with-open-file (stream word-file :direction :input)
                (do nil
                    ((null input-line))
                    (setq input-line (read-line stream nil nil))
                    (when input-line
                        (setq value t)
                        (setq start 0)
                        (setq word nil)
                        (setq tag-list nil)
                        (do nil
                            ((null value))
                            (multiple-value-bind (new-value new-start)
                                (read-from-string input-line nil nil :start start)
                                (setq value new-value)
                                (when new-value
                                    (if (= start 0)
                                        (setq word new-value)
                                        (push new-value tag-list)))
                                (setq start new-start)))
;;;
;;; 9 August 91 took this out -- the tags should be in the *ordered-state-list* set, not the FST set.
;;; (setq tag-list (convert-tags tag-list))
;;;
;;; put in error messages and checks that tags are all in ordered-state-list
;;; Null words can occur when reading comments
;;;
                        (when (and word (null (stringp word)))
                            (format t "Word: ~s is not a string~%" word))
                        (when (set-difference tag-list *ordered-state-list*)
                            (format t "Tags: ~a for word ~s are not all in the required set~%"
                                    tag-list word)
                            (setq tag-list nil))
;;;
;;; 6 Jan 92 put in sort as in convert-tags so that correct lexical order is preserved from the start
;;;
```

```
DSK:<project>markov>trivia>tagger>franz4.1>patent-source>tagger-support.LISP.1    3-Jun-93 21:20:20
Page 3

(when (and (stringp word)
                                          tag-list)
                                 (vector-push-extend (cons word (sort tag-list #'string<))
                                                     word-vector))))
(defun train-tagger (&key (train-on *default-training-file*)
                          (iterate 16)
                          (obs-stem "tr")
                          (read t)
                          (from-hmm-file nil)
                          (to-hmm-file nil)
                          (load-grolier nil)
                          (name *hmm-new-model-name*))
  (let ((hmm-pathname (hmm-name name))
        (model (rhmm:find-model name))
        (count 0)
        (eof-val (cons nil nil))
        obs-name file-name ok delta uninformed-prior)
    (setq *tagger-stable-p* nil)
    ;;; Delete the observation sequence used by the tagger
    (setq rhmm:*training-sets* (delete "CURRENT-SENTENCE" rhmm:*training-sets* :test
                                       #'equal :key #'rhmm::training-defn-name))
    (in-package "RHMM")
    (when (or from-hmm-file (null model))
      (setq hmm-pathname (if from-hmm-file
                             (make-pathname :defaults from-hmm-file)
                             (if (pathname-name *hmm-pathname*)
                                 *hmm-pathname*
                                 (merge-pathnames (make-pathname :name hmm-name :type "hmm")
                                                  *tagger-pathname*))))
      (format t "Reading RHMM: ~a~%" hmm-pathname)
      (setq model (rhmm:read-rmm hmm-pathname))
      (if model
          (setq hmm-name (rhmm::hmm-defn-name model))
          (format t "Could not read rhmm: ~a~%" hmm-pathname)))
    ;;
    ;; Don't create matrix logs because it is going to get written out, and they take up a
    ;; lot of space
    ;;
    (when (and model (check-data model))
      (when read
        (when (and load-grolier (null (find-package "GROLIER")))
          (load (merge-pathnames (make-pathname :name "load-grolier")
                                 *tagger-pathname*))
          (load (merge-pathnames (make-pathname :name "grolier-train")
                                 *tagger-pathname*)))
        (setq rhmm:*training-sets* nil)
        (when (null (listp train-on))
          (setq train-on (list train-on)))
        (dolist (train-file train-on)
          (format t "Reading ~a~%" train-file)
          (with-open-file (stream train-file :direction :input)
            (do ((obs-vec (read stream nil eof-val)
                          (read stream nil eof-val)))
                ((eq eof-val obs-vec))
              (setq obs-name (concatenate 'string obs-stem "-"
                                          (format nil "~a" count)))
              ;;;
              ;;; These observation matrices must be changed to be for a single codebook, and each observation is
              ;;; converted from a single value to an array of one value as appropriate for a codebook.
              ;;;
              (dotimes (index (length obs-vec))
                (setf (aref obs-vec index)
                      (vector (aref obs-vec index))))
              (rhmm:set-training-data (list obs-name obs-vec)
                                      :overwrite nil)
              (incf count)))))
      (in-package "USER")
      (setq rhmm:*epsilon* (double-float 1.0E-15))
      (multiple-value-setq (ok delta)
        (rhmm:estimate-model hmm-name :all :iterate iterate :preserve-matrix-structure
                             t :after-every 500))
      (if (null ok)
```

```lisp
;DSK><project>markov>trivo>qtagger>franz4.1>patent-source>tagger-support.LISP:1    3-Jun-93 21:20:20
Page 10

(format t "Error occurred in training--model aborted~%")
                        (progn (format t "Training completed ok: final delta: ~a~%" delta)
                               (setq file-name (if to-hmm-file
                                                   (make-pathname :defaults to-hmm-file)
                                                   (merge-pathnames (make-pathname
                                                                     :type "hmm" :name
                                                                     (concatenate 'string hmm-name "-"
                                                                                  (format nil "~a" (length
                                                                                                    rhmm:*training-sets*
                                                                                                    ))
                                                                                  "s-"
                                                                                  (format nil "~a" iterate)
                                                                                  "its"))
                                                                    *tagger-pathname*)))
                               (format t "Writing RHMM model to file : ~a~%" file-name)
                               (rhmm:write-rhmm file-name hmm-name)
                               (if *predict-unknown-words*
                                   (progn (if (or (null *unrecognized-suffixes*)
                                                  (null *codeword-count-vector*)
                                                  (null *suffix-fsm*)
                                                  (null *codeword-suffixes*))
                                              (find-suffix-probs model)
                                              (progn (format t "Making Uninformed Prior~%")
                                                     (setq uninformed-prior (make-uninformed-log-prior
                                                                             model
                                                                             *unrecognized-suffixes*
                                                                             *codeword-count-vector*))
                                                     (make-suffix-priors model uninformed-prior
                                                                         *suffix-fsm* *codeword-suffixes*))))
                                   (format t
                                           "WARNING: No new Suffix Probs created~% *predict-unknown-words* is nil~%"
                                           )))))
                        t))
(defun word-for-front-fsm nil (let ((word nil))
                                ;; Read all the words from the fixes file first
                                (when (< *fixes-index* (length *word-fixes*))
                                  (setq word (car (aref *word-fixes* *fixes-index*)))
                                  (incf *fixes-index*))
                                ;; Make sure the most common *nr-unique-words* are included in
                                ;; the list
                                (when (and (null word)
                                           (< *unique-index* (length *unique-words*)))
                                  (setq word (car (aref *unique-words* *unique-index*)))
                                  (incf *unique-index*))
                                word))
(defun dump-vector (vector file-name)
  (with-open-file (stream file-name :direction :output :if-exists :new-version)
    (let ((length (length vector))
          saved-print-array)
      (setq saved-print-array *print-array*)
      (setq *print-array* t)
      ;; write out length
      (print length stream)
      (write-char #\Newline stream)
      (dotimes (i length)
        (print (aref vector i)
               stream)
        (write-char #\Newline stream))
      (setq *print-array* saved-print-array)))
  t)
(defun find-eqv-classes (lexicon)
  (let (nr-eqv-classes)
    ;;
    ;; Make equivalence classes for lexicon and special codewords
    ;;
    (setq nr-eqv-classes (new-make-eqvclass-hashtable lexicon))
    ;;
    ;; Make codewords for words in front fsm
    ;; AND ALSO..
    ;; Add any extra equivalence classes for words in the front fsm
    ;;
    (format t "Making Front Vector..~%")
    (setq *front-vector* (make-coded-front-vector nr-eqv-classes))
    (format t "Nr Unique Equivalence classes: ~a~%" (length *unique-words*))
```

```
[SK]<project>markov>th-vo>qtagger>franz4.1>patent-source>tagger-support.LISP:1   3-Jun-93 21:20:20
Page 11

(format t "Total Equivalence classes: ~a~%" (- (length *unique-words*)
                                                                (hash-table-count *lexical-hash-table*))))
(defun find-missing-codewords ()
    (let ((lst nil)
          (buffer (make-array 40 :element-type 'string-char :fill-pointer 0 :adjustable t))
          word)
      (dotimes (i (length *word-array*))
        (setq word (car (aref *word-array* i)))
        (when (let ((ret t))
                (dotimes (j (length word))
                  (when (or (char= #\- (char word j))
                            (char= #\* (char word j))
                            (digit-char-p (char word j)))
                    (setq ret nil)))
                ret)
          (when (null (word-to-codeword word))
            (format t "~a~%" word)
            (pushnew (get-tags word buffer)
                     lst))))
      lst))
(defun find-suffix-probs (model)
    (let* ((nr-outputs (rhmm::hmm-defn-nr-outputs model))
           (nr-codewords (length *codeword-vector*)))
      ;;
      (if (= nr-codewords nr-outputs)
          (progn (format t "Cannot make Suffix probs...~%")
                 (format t "Nr. codewords (~a) does not agree with nr. outputs (~a)~%"
                         nr-codewords nr-outputs)
                 (format t "for model: ~a~%" (rhmm::hmm-defn-name model)))
          (progn (compute-suffix-probs model)))))
(defun for-each-lexicon-index (lst)
    (let ((return-tags nil)
          (tag *temp-str2*)
          in-front-fsm word tags sym-name tag-list)
;;; 10 June 1992 added sym-name, and changed vector-push to vector-push-extend
      (setf (fill-pointer *temp-str1*)
            0)
      (dolist (sym lst)
        (setq sym-name (symbol-name sym))
        (dotimes (n (length sym-name))
          (declare (fixnum n))
          (vector-push-extend (char sym-name n)
                              *temp-str1*)))
      (setq word *temp-str1*)
      (incf **lexicon-index*)
      (if (<= **lexicon-index* 5000)
          (if (= 0 (rem **lexicon-index* 1000))
              (format t "------ ~a words done. Current word: ~a~%" **lexicon-index* *temp-str1*)
              )
          (if (= **lexicon-index* 5001)
              (format t "------ Reporting every 20,000 from now on~%")
              (if (= 0 (rem **lexicon-index* 20000))
                  (format t "------ ~a words done. Current word: ~a~%" **lexicon-index*
                          *temp-str1*))))
;;;
;;;   In case of mismatching/unknown tags it is nice to know the word
;;;   involved, so use lookup instead of lookup-tag
;;;   (setq tag-list (finite-state-machine:lookup-tag *temp-str1*
;;;   :network *lexicon* :plus-tag-p t))
;;;
      (setq tag-list (fsm::lookup *temp-str1* :network *lexicon*))
      (when *debugging*
        (format t "~&================ ~a~%" *temp-str1*)
        (format t "~a~%" tag-list))
      (setq tags nil)
      (dolist (tag-str tag-list)
        (let ((count 0)
              end-of-tag)
          (declare (fixnum count))
          (do ((index (search "+{" tag-str :start2 count)
                      (search "+{" tag-str :start2 count)))
              ((null index))
            (setq end-of-tag (or (position #\} tag-str :start index :test #'char=)
```

```
[DSK]<project>markov>trivia>atagger>franz4.1>patent-source>tagger-support.LISP.1    3-Jun-93 21:20:20
Page 12

(length tag-str)))
                        (when *debugging* (format t "index: ~a count ~a end-of-tag ~a~%" index count
                                                    end-of-tag))
                        (setf (fill-pointer tag)
                              0)
                        (do ((index2 (+ 2 index)
                                     (1+ index2)))
                            ((>= index2 end-of-tag))
                          (vector-push-extend (char-upcase (char tag-str index2))
                                              tag))
                        (when *debugging* (format t "tag:  ~a~%" tag))
                        (push (intern tag "KEYWORD")
                              tags)
                        (setq count end-of-tag))))
              (when *debugging* (format t "tags: ~a~%" tags))
              (setq return-tags (convert-tags tags))
              (when (and return-tags (null (position :gen return-tags)))
                ;;
                ;; All common words with special tags should be accounted for
                ;;    in the front-end.fsm
                ;;
                ;;    For some strange reason in the following (word-to-index)
                ;;    complains about word initial caps whereas (word-to-number)
                ;;    doesn t
                (setq in-front-fsm (and **front-fsm* (fsm:word-to-number word **front-fsm*)))
                (if (null (subsetp return-tags *ordered-state-list*))
                    (block unaccounted-for-tags (format t
                                       "WARNING: Cannot convert tags ~a for word ~s~%"
                                       return-tags word))
                  (when (null in-front-fsm)
                    (when (null (gethash return-tags *lexical-hash-table*))
                      (when t (format t "New Eqv Class (~a) ~a for ~a~%" *eqv-class-index*
                                      return-tags word))
                      (setf (gethash return-tags *lexical-hash-table*)
                            *eqv-class-index*)
                      (incf *eqv-class-index*)))))))))
(defun get-lexicon-tags (entry-index lexicon &optional (word (make-array 40 :element-type
                                                                        'string-char :fill-pointer 0
                                                                        :adjustable t))
                                             (tag (make-array 40 :element-type 'string-char :fill-pointer 0
                                                              :adjustable t)))
  (let ((tags nil)
        (lowest-index nil)
        (epsilon-length (length "EPSILON"))
        (contiguous-index (1- entry-index))
        index-list upper-str lower-str)
    (declare (fixnum epsilon-length contiguous-index))
;;;
;;; Look up the word corresponding to this index on the lower side which may have EPSILON sequences
;;; included in it
;;;
    (setq lower-str (fsm:index-to-word entry-index lexicon :label-fn #'lower-symbol))
;;; Take out the EPSILON's
    (setf (fill-pointer word)
          0)
    (let ((count 0))
      (declare (fixnum count))
      (do ((index (search "EPSILON" lower-str :start2 count)
                  (search "EPSILON" lower-str :start2 count)))
          ((null index))
        (do ((index2 count (1+ index2)))
            ((>= index2 index))
          (declare (fixnum index2))
          (vector-push-extend (char lower-str index2)
                              word))
        (setq count (+ epsilon-length index)))
      (do ((index2 count (1+ index2))
           ((>= index2 (length lower-str)))
        (declare (fixnum index2))
        (vector-push-extend (char lower-str index2)
                            word)))
;;; Now find all the indices in the lexicon that correspond to this exact word form
    (setq index-list (fsm:word-to-index word lexicon :label-fn #'lower-symbol))
    (when (null (listp index-list))
```

```
DSK\<project>markov><hmvo>tagger>franz4.1>patent-source>tagger-support..LISP;1    1-Jun-93 21:10:12
Page 13

(setq index-list (list index-list)))
;;;
;;; Go through them, collecting the part-of-speech markers except "Gen" for this the whole entry is
;;; thrown out
;;; If entry-index is larger than the minimum value on this list, we know the concatenation has
;;; already been done for an earlier entry index value..
;;;
;;; 5 June 91 The index-list often is a contiguous sequence of numbers, so we can take advantage of
;;; this in "make-eqv-class-hashtable" by jumping to the end, rather than re-doing it all for each
;;; member
;;;
          (dolist (index index-list)
              (when (= (1- contiguous-index)
                       index)
                 (setq contiguous-index index))
              (setq upper-str (fsm:index-to-word index lexicon :label-fn #'upper-symbol))
              (when nil (format t "upper-str: ~a " upper-str))
              (let ((count 0)
                    end-of-tag)
                 (declare (fixnum count))
                 (do ((index (search "-{" upper-str :start2 count)
                             (search "-{" upper-str :start2 count)))
                     ((null index))
                   (setq end-of-tag (position #\} upper-str :start index :test #'char=))
                   (setf (fill-pointer tag)
                         0)
                   (do ((index2 (+ 2 index)
                                (1+ index2)))
                       ((>= index2 end-of-tag))
                     (vector-push-extend (char-upcase (char upper-str index2))
                                         tag))
                   (push (intern tag "KEYWORD")
                         tags)
                   (setq count end-of-tag)))
              (when (null (position :gen tags))
                 (when (or (null lowest-index)
                           (< index lowest-index))
                    (setq lowest-index index)))))
;;;
;;; Got to find the lowest instance that does not have :gen in its tags, as otherwise the functions
;;; that call this one may ignore a word because it had :gen in the lowest index.
;;;
;;; Return the maximum contiguous index, so that this function is not called again with indices
;;; below (or equal to) this value, or return the original entry-index, so the next call is for
;;; entry-index - 1
;;;
          (values (convert-tags tags)
                  word
                  (or (null lowest-index)
                      (= lowest-index entry-index))
                  (max contiguous-index entry-index)))))
(defun get-word-array (&key (path-name (merge-pathnames "word-array.lisp" *tagger-pathname*))
                            (fix-up nil))
   (let ((array nil)
         (extra-entries 6)
         count)
      (when (probe-file path-name)
         (with-open-file (stream path-name :direction :input)
            (setq count (read stream))
            ;; The word array has been decided to contain counts for all equivalence
            ;; classes -- non-words as well as words. So it must be fixed up for the
            ;; cases never put into it originally by the COUNT-WORDS program.. These are
            ;; estimates ... The fix up is to enable sentence boundaries to be given
            ;; their own observation symbol --- this need s to be extended to punctuation
            ;; as well...DONE The non-words must be recognized by the function
            ;; "word-to-states" The canonical example of an abbreviation has been decided
            ;; upon as "usa". The non-word counts are estimates, but shouldnt pose a
            ;; problem because they belong to unique states
            (setq array (make-array (if fix-up
                                        (+ extra-entries count)
                                        count)))
            (dotimes (i count)
               (setf (aref array i)
                     (read stream)))
```

```
(DSK)<project>markov>trivo>qtagger>franz4.1>patent-source>tagger-support.LISP:1    3-Jun-93 21:23:23
Page 14

;; Should a canonical form for proper nouns be included below, e.g. for
                    ;; "xerox" --- yes
                    when fix-up
                        (setf (aref array count)
                              (cons "." 6000))
                        (setf (aref array (+ 1 count))
                              (cons ":" 2000))
                        (setf (aref array (+ 2 count))
                              (cons "!" 1000))
                        (setf (aref array (+ 3 count))
                              (cons "e.g." 1000))
                        (setf (aref array (+ 4 count))
                              (cons "xerox" 1000))
                        (setf (aref array (+ 5 count))
                              (cons "." 1000)))))
            array))
(defun make-coded-front-vector (current-eqv-class-index &key (verbose t)
                                 (coded-vector-file (merge-pathnames "front-vector.lisp"
                                                     *tagger-pathname*)))
    (let* (word posn tags existing-eqv-class fsm-index (new-equiv-class current-eqv-class-index)
          (nr-fsm-entries (if *front-fsm*
                              (fsm:state-name (fsm:network-start-state *front-fsm*))
                              0))
          (coded-vector (make-array nr-fsm-entries :initial-element nil)))
    ;;
    ;; The order of the words in *unique-words* determines the order of assignment of
    ;; unique codewords.  NOTE that entries for them are not put in the lexical hash table,
    ;; as they are meant to be unique
    ;;
    (when *unique-words*
        (dotimes (index (length *unique-words*))
            (setq posn (fsm:word-to-number (first (aref *unique-words* index))
                                            *front-fsm*))
            (setf (aref coded-vector posn)
                  index)))
    ;;
    ;; Now  deal with all the rest of the entries in the fsm I.E. the word fixes
    ;; 7 Aug 91 changed this to go through the fixes rather than through fsm-indices, so it
    ;; does not have to find the word in the fix file corresponding to the fsm index ---
    ;; much quicker for longer  word-fix files
    ;;
    (dotimes (fix-index (length *word-fixes*))
        (setq word (car (aref *word-fixes* fix-index)))
        (setq fsm-index (fsm:word-to-index word *front-fsm*))
        (when (null fsm-index)
            (format t "ERROR: Cannot find ~a in front-fsm~%" word))
;;;
;;; unique codewords already done...
;;;
        (when (and fsm-index (null (aref coded-vector fsm-index)))
            (setq tags (cdr (aref *word-fixes* fix-index)))
            (when (null tags)
                (format t "ERROR: Tags for word fix ~a are nil~%" word))
            ;;
            ;; See if this word fix is already in the hash table, if it isn't, put it in
            ;; with a  new eqv class index
            ;;
            (when tags
                (setq existing-eqv-class (gethash tags *lexical-hash-table*))
                (if existing-eqv-class
                    (block exists
                        (setf (aref coded-vector fsm-index)
                              existing-eqv-class))
                    (block need-new-one
                        (when verbose (format t "New Eqv Class (~a) ~a for word fix ~a~%"
                                              new-equiv-class tags word))
                        (setf (gethash tags *lexical-hash-table*)
                              new-equiv-class)
                        (setf (aref coded-vector fsm-index)
                              new-equiv-class)
                        (incf new-equiv-class))))))
    (when (> (length coded-vector)
             0)
        (dump-vector coded-vector coded-vector-file))
```

```
{DSK}<project>markov><two>dtagger>finai4.1>patent-source>tagger-support.LISP:1   3-Jun-93 21:20:20
Page 15
                  coded-vector))
(defun make-codeword-vector (&key (file *eqv-class-pathname*))
     (let* ((total-eqv-classes (+ (length *unique-words*)
                                  (hash-table-count *lexical-hash-table*)))
            (codewords-to-tags (make-array total-eqv-classes))
            tags)
          ;;
          ;; Add equivalence classes for unique words into CODEWORDS-TO-TAGS--thus keeping a
          ;; complete set there for utility, although the unique codes will be caught in the
          ;; front fsm and front vector
          ;;
          (dotimes (eqv-index (length *unique-words*))
               (setq tags (cdr (aref *unique-words* eqv-index)))
               (when (null tags)
                    (format t "ERROR: Null Tags for word fix ~s~%" (aref *unique-words* eqv-index)))
;;; Put the tags in same sorted order as for hash table -- just for consistency although not
;;; necessary...This will also allow entries in the unique words file to have lexicon tags that will
;;; get automatically converted. This feature should not be used!!!
;;;
;;; 9 August 1991.  Convert-tags has already been done when the *unique-words* array was read in
;;; with read-word-file, so don't do it again here...It caused a problem with the Brown tagger
;;; because the :nn state exists both as a brown corpus tag and also in the FST. In the tag map it
;;; gets mapped to '(:nn :nns)
;;;
               (setf (aref codewords-to-tags eqv-index)
                     tags))
          ;;
          ;; Fill in the rest of the entries from the lexical-hash-table
          ;;
          (maphash #'(lambda (tags eqv-index)
                         (setf (aref codewords-to-tags eqv-index)
                               tags))
                   *lexical-hash-table*)
          ;;
          ;; write out the codeword vector to a file for future use..
          ;;
          (dump-vector codewords-to-tags file)
          codewords-to-tags))
(defun make-eqvclass-hashtable (lexicon &key (verbose t))
     (let* ((eqv-class-index (length *unique-words*))
            (total-entries (fsm:state-name (fsm:network-start-state lexicon)))
            (word-array (make-array 40 :element-type 'string-char :fill-pointer 0 :adjustable t))
            (tag-array (make-array 40 :element-type 'string-char :fill-pointer 0 :adjustable t))
            list-tag tags word first-time end-index in-front-fsm)
          (setq *lexical-hash-table* (make-hash-table :test 'equal))
          (do ((index 0 (1+ end-index)))
              ((>= index total-entries))
               (when (and (<= index 5000)
                          (= 0 (rem index 1000)))
                    (format t "~a words done~%" index))
               (when (= index 5001)
                    (format t "Reporting every 10,000 from now on~%"))
               (when (and (> index 5000)
                          (= 0 (rem index 10000)))
                    (format t "~a words done~%" index))
;;;
;;; Word-array and tag-array are passes in to avoid unnecessary storage allocation
;;;
               (multiple-value-setq (tags word first-time end-index)
                    (get-lexicon-tags index lexicon word-array tag-array))
               ;;
               ;; Do not bother with genitive forms as they are accounted for elsewhere and are
               ;; basically just copies of the noun form already catered for. If tags are seen more
               ;; than once there is no problem here ( "first-time" could be ignored)
               ;;
               ;; All common words with special tags should be accounted for in the front-end.fsm
               ;;
               ;; For some strange reason in the following (word-to-index) complains about word
               ;; initial caps whereas (word-to-number) doesn't
               (when (null (position :gen tags))
                    (setq in-front-fsm (and *front-fsm* (fsm:word-to-number word *front-fsm*)))
                    (if (set-difference tags *ordered-state-list*)
                        (block unaccounted-for-tags (format t
```

000134

```
{DSK}<project>markov>trivo>dtagger>franz4.i>patent-source>tagger-support.LISP;1   3-Jun-93 21:20:23
Page 16

"WARNING: Cannot convert tags ~a for word ~s~%"
                    (when (null in-front-fsm)
                        (when (null (gethash tags *lexical-hash-table*))
                            (when verbose (format t "New Eqv Class (~a) ~a for ~a~%"
                                              eqv-class-index tags word))
                            (setf (gethash tags *lexical-hash-table*)
                                  eqv-class-index)
                            (incf eqv-class-index)))))))
     ::
     :: Insert a codeword for the tags that probably do not show up in the lexicon or
     :: front-fsm.
     ::
     :: The Lexicon contains only words. :: Some special parts of speech may not be
     :: covered by this.  i.e. Punctuation, Sentence boundaries, Abbreviations, Numbers
     :: (maybe others)  These tokens will be seen in text, and codewords need to be created
     :: for them. (they are mutually exclusive, so no other combined classes need be
     :: considered).
     ::
     (dolist (special-tag *special-codewords*)
         (setq list-tag (list special-tag))
         (when (null (gethash list-tag *lexical-hash-table*))
             (when verbose (format t "New Eqv Class (~a) for special tag ~a~%"
                               eqv-class-index list-tag))
             (setf (gethash list-tag *lexical-hash-table*)
                   eqv-class-index)
             (incf eqv-class-index)))
     eqv-class-index))
(defun make-first-order-pos (nr-states nr-outputs &key (reset nil)
                               (name *hmm-new-model-name*))
    (let (model total state-list saved-level)
        (when (or reset (null *transition-matrix*))
            (setq *transition-matrix* (rhmm:my-make-array (list nr-states nr-states)
                                             :element-type
                                             'double-float)))
::: Output matrix is different from hmm, as has extra codebook dimension
        (when (or reset (null *output-matrix*))
            (setq *output-matrix* (rhmm:my-make-array (list 1 nr-states nr-outputs)
                                       :element-type
                                       'double-float)))
        (when (or reset (null *initial-matrix*))
            (setq *initial-matrix* (rhmm:my-make-array (list nr-states)
                                        :element-type
                                        'double-float)))
        (when (or reset (null *wordcount-vector*))
            (setq *wordcount-vector* (read-vector *wordcount-pathname*)))
        ::
        (dotimes (i-state nr-states)
            (setq total 0.0)
            (dotimes (obs nr-outputs)
                (setf (aref (aref (aref *output-matrix* 0)
                                  i-state)
                            obs)
                      (double-float 0.0)))
            (setq state-list (aref *codeword-vector* obs))
            (when (member (nth i-state *ordered-state-list*)
                          state-list)
                (setf (aref (aref (aref *output-matrix* 0)
                                  i-state)
                            obs)
                      (double-float (aref *wordcount-vector* obs)))
                (incf total (aref *wordcount-vector* obs))))
            (dotimes (obs nr-outputs)
                (when (> (aref (aref (aref *output-matrix* 0)
                                     i-state)
                               obs)
                         (double-float 0.0))
                    (setf (aref (aref (aref *output-matrix* 0)
                                      i-state)
                                obs)
                          (double-float (/ (aref (aref (aref *output-matrix* 0)
                                                       i-state)
                                                 obs)
                                           (double-float total)))))))))
```

```
DSK)<project>markov>thrvo>dtagger>franz4.1)patent-source>tagger-support.LISP:1    3-Jun-93 21:20:20
Page 17

(dotimes (i-state nr-states)
              (setf (aref *initial-matrix* i-state)
                    (/ (double-float 1.0)
                       (double-float nr-states))))
          (dotimes (i-state nr-states)
              (dotimes (j-state nr-states)
                  (setf (aref (aref *transition-matrix* i-state)
                              j-state)
                        (/ (double-float 1.0)
                           (double-float nr-states)))))
          (setq saved-level rhmm:*report-level*)
          (setq rhmm:*report-level* nil)
          (rhmm:set-model-parameters name nr-states nr-outputs :allow-incomplete-model t)
          (setq rhmm:*report-level* saved-level)
          (setq model (find name rhmm:*models* :key #'rhmm::hmm-defn-name :test #'equal))
          (setf (rhmm::hmm-defn-outputs model)
                *output-matrix*)
          (setf (rhmm::hmm-defn-transitions model)
                *transition-matrix*)
          (setf (rhmm::hmm-defn-initial model)
                *initial-matrix*)
          (setf (rhmm::hmm-defn-output-to-state-index model)
                (rhmm:make-output-to-state-index nr-states nr-outputs *output-matrix*))
          ;;
          ;(create-tied-transitions model)
          model))
  (defun make-front-end-fsm (&key (fsm-output-file (merge-pathnames "front-end.fsm")))
      (let ((fsm nil)
            total)
          (format t "Making Front End FSM~%")
          (when (null *unique-words*)
              (setq *unique-words* (read-word-file *unique-words-pathname*)))
          (when (null *word-fixes*)
              (setq *word-fixes* (read-word-file *word-fixes-pathname*)))
          (setq *fixes-index* 0)
          (setq *unique-index* 0)
          ;; Merges words from word-fixes,   and most common words into an FSM
          (setq total 0)
          (when (or *word-fixes* *unique-words*)
              (setq fsm (fsm:make-word-list-fsm (loop (let ((word (word-for-front-fsm)))
                                                          (unless (eq word :skip)
                                                              (incf total)
                                                              (return word))))
                                                :partition-form
                                                (format t "Partition number: ~a States so far: ~a~%"
                                                        fsm::partition-count fsm::total-states-created)))
              (fsm:index-network fsm)
              (fsm:network-to-file fsm fsm-output-file))
          (setq *front-fsm* fsm)
          (when (null fsm)
              (format t "WARNING: No Front End FSM has been made~%"))
          fsm))
  (defun make-second-order-model (&key (nr-unique-states *nr-pos-states*)
                                       (nr-outputs *nr-pos-obs*)
                                       (nr-codebooks 1)
                                       (allocate-space nil)
                                       (model-name *hmm-new-model-name*))
      (let (model total state-list nr-states)
          (setq nr-states (* nr-unique-states nr-unique-states))
          (when allocate-space
              (setq *transition-matrix* (rhmm:my-make-array (list nr-states nr-states)
                                                            :initial-element 0.0 :element-type 'double-float))
              (setq *output-matrix* (rhmm:my-make-array (list nr-codebooks nr-states nr-outputs)
                                                        :initial-element 0.0 :element-type 'double-float))
              (setq *initial-matrix* (rhmm:my-make-array (list nr-states)
                                                         :initial-element 0.0 :element-type 'double-float))
              (setq *tied-states* (make-array (list nr-states)
                                              :initial-element nil)))
          ;; Set up Zeroth column of output matrix
          (dotimes (i-state nr-unique-states)
              (setq total 0.0)
              (dotimes (obs nr-outputs)
                  (setf (aref (aref (aref *output-matrix* 0)
                                    i-state)
```

```
{DSK}<project>markov>trivp>qtagger>franz4.1>patent-source>tagger-support.LISP:1   3-Jun-93 21:20:20
Page 13
                                        obs)
                                     0.0)
                        ;; (setq state-list (obs-to-states obs))
                        (when (member i-state state-list)
                           (setf (aref (aref (aref *output-matrix* 0)
                                             i-state)
                                       obs)
                                 (aref *initial-counts* obs))
                           (incf total (aref *initial-counts* obs))))
                     (dotimes (obs nr-outputs)
                        (when (> (aref (aref (aref *output-matrix* 0)
                                             i-state)
                                       obs)
                                 0.0)
                           (setf (aref (aref (*output-matrix* 0)
                                             i-state)
                                       obs)
                                 (/ (float (aref (aref (aref *output-matrix* 0)
                                                       i-state)
                                                 obs))
                                    (float total)))))))
              (dotimes (i-state nr-unique-states)
                 (dotimes (j-state (1- nr-unique-states))
                    (dotimes (obs nr-outputs)
                       (setf (aref (aref (aref *output-matrix* 0)
                                         (+ i-state (* nr-unique-states (1+ j-state))))
                                   obs)
                             (aref (aref (aref *output-matrix* 0)
                                         i-state)
                                   obs)))))
              ;; Set up tied states first initialize to nil
              (dotimes (i-state nr-states)
                 (setf (aref *tied-states* i-state)
                       nil))
              (dotimes (i-state nr-unique-states)
                 (dotimes (j-state (1- nr-unique-states))
                    (setf (aref *tied-states* (+ i-state (* (1+ j-state)
                                                            nr-unique-states)))
                          i-state)))
              (dotimes (i-state nr-states)
                 (setf (aref *initial-matrix* i-state)
                       (/ 1.0 (float nr-states))))
              (dotimes (i-state nr-states)
                 (dotimes (j-state nr-states)
                    (setf (aref (aref *transition-matrix* i-state)
                                j-state)
                          0.0)))
              (dotimes (i-state nr-states)
                 (dotimes (j-state nr-states)
                    (setf (aref (aref *transition-matrix* i-state)
                                (+ (* (mod i-state nr-unique-states)
                                      nr-unique-states)
                                   j-state))
                          (/ 1.0 (float nr-states)))))
              (rhmm:setup-tied-states nr-states nr-outputs nr-codebooks *output-matrix* *tied-states*)
              (rhmm:set-model-parameters model-name nr-states nr-outputs :default-zero nil
                                         :allow-incomplete-model t)
              (setq model (find-model model-name))
              (setf (rhmm::hmm-defn-outputs model)
                    *output-matrix*)
              (setf (rhmm::hmm-defn-transitions model)
                    *transition-matrix*)
              (setf (rhmm::hmm-defn-initial model)
                    *initial-matrix*)
              (setf (rhmm::hmm-defn-tied-states model)
                    *tied-states*)
              ;;
              ))
(defun make-suffix-counts (max-suffix-len &key (start 5000))
   (let* ((total-entries (fsm:state-name (fsm:network-start-state *lexicon*)))
          array-len word wd-len count ok)
      (when (null *word-array*)
         (format t "Reading word-array..~%")
         (setq *word-array* (get-word-array)))
```

```
DSK\<project>markov\trivo\ctagger>franz4.1>patent-source>tagger-support.LISP.1    3-Jun-93 21:03:33
Page 19

(format t "~%Starting at word ~a max suffix length ~a~%" start max-suffix-len)
           (setq array-len (length *word-array*))
           ;;
           ;; Go through the word-array , ignoring the most common (START) words so that suffix
           ;; statistics aren't biased by the suffixes of common words.
           ;;
           (dotimes (index (max array-len total-entries))
             ;;
             (when (and (>= index start)
                        (< index array-len))
               (setq word (car (aref *word-array* index)))
               (setq wo-len (length word))
               (setq count (cdr (aref *word-array* index)))
               ;;
               ;; To stop the transducer complaining in get-tags (called via word-to-states).
               ;; filter out words that it wont parse...A HACK
               ;;
               (setq ok t)
               (dotimes (i wo-len)
                  (let ((the-char (char word i)))
                     (when (or (char= #\* the-char)
                               (digit-char-p the-char)
                               (char= #\- the-char))
                        (setq ok nil))))
               (when (null ok)
                  (setq word nil))
               (add-to-suffix-count word count max-suffix-len))
;;;
;;; Also go through the lexicon
;;;
;;; The following isn't really right because the same word is referenced as many times as it has
;;; categories in this lookup strategy for the lexicon. So it will have multiple instead of single
;;; counts.
;;; FIXED 31 OCT 90 via use of first-time value (see below)
;;; Also the first 25k entries will be ignored cos they are looked up in the word array? ALSO FIXED
;;; 31 OCT.
;;;
;;; Ignore the genitive entries
;;;
             (when (< index total-entries)
                (multiple-value-bind (tags lex-word first-time)
                    (get-lexicon-tags index *lexicon*)
;;;
;;; If the word has already been seen with a lower index ignore it, as otherwise it will get counted
;;; more than once
;;;
                   (setq word (if (or (null first-time)
                                      (member :gen tags))
                                  nil
                                  lex-word))
                   (add-to-suffix-count word 1 max-suffix-len)))
             (when (and (<= index 10000)
                        (= 0 (rem index 1000)))
                (format t "~a Lexicon Indices done~%" index))
             (when (= index 10001)
                (format t "Reporting every 20,000 from now on~%"))
             (when (and (> index 10000)
                        (= 0 (rem index 20000)))
                (format t "~a Lexicon Indices done~%" index)))))
(defun make-suffix-fsm (&key (suffix-list *suffix-list*)
                              (fsm-output-file *suffix-fsm-pathname*))
   (let (fsm (tail suffix-list))
      (setq fsm (fsm:make-word-list-fsm (let (temp)
                                           (setq temp (car tail))
                                           (setq tail (cdr tail))
                                           temp)
                                        :partition-form
                                        (format t "Partition number: ~a States so far: ~a~%"
                                                fsm::partition-count fsm::total-states-created)))
      (fsm:index-network fsm)
      (fsm:network-to-file fsm fsm-output-file)
      ;; indexing seems to get zapped......
      (fsm:index-network fsm)
      fsm))
```

```
{DSK}<project>markov>trivo>qtagger>franz4.1>patent-source>tagger-support.LISP;1   3-Jun-93 21:20:2
Page 20

(defun make-tagger (&key (hmm-file nil))
      (let (hmm-pathname)
        (setq *tagger-stable-p* nil)
        (format t "Making Tag Map..~%")
        (make-tag-map)
        (format t "Reading Unique words..~%")
        (setq *unique-words* (read-word-file *unique-words-pathname*))
        (format t "Reading Word fixes..~%")
        (setq *word-fixes* (read-word-file *word-fixes-pathname*))
        (make-front-end-fsm)
        (format t "~%Finding Equivalence Classes..~%")
        (find-eqv-classes *lexicon*)
        (format t "Making Codeword Vector..~%")
        (setq *codeword-vector* (make-codeword-vector))
        (setq *word-array* (get-word-array :fix-up t))
        (format t "Making Wordcount Vector..~%")
        (setq *wordcount-vector* (make-wordcount-vector *codeword-vector* *word-array*))
        (let (model)
          (format t "Creating HMM model named: ~a~%" *hmm-new-model-name*)
          (setq model (make-first-order-cos (length *ordered-state-list*)
                                            (length *codeword-vector*)
                                            :reset t :name *hmm-new-model-name*))
          (setq hmm-pathname (if hmm-file
                                 (make-pathname :defaults hmm-file)
                                 (if (pathname-name *hmm-pathname*)
                                     *hmm-pathname*
                                     (merge-pathnames (make-pathname :name
                                                                     *hmm-new-model-name* :type "hmm")
                                                      *tagger-pathname*))))
          (format t "Writing HMM model to file : ~a~%" hmm-pathname)
          (rhmm:write-hmm hmm-pathname *hmm-new-model-name*)
          (if *predict-unknown-words*
              (find-suffix-probs model)
              (format t
                      "WARNING: No Suffix probs being made~%  *predict-unknown-words* is nil~%"
                      )))))
(defun make-uninformed-log-prior (model unrecognized-counts codeword-counts)
      (let* ((nr-states (rhmm::hmm-defn-nr-states model))
             (output-matrix (rhmm::hmm-defn-outputs model))
             (tied-states (rhmm::hmm-defn-tied-states model))
             (total 0.0)
             (ok t)
             (vector nil)
             value open-class-p codeword-count)
;;;
;;; An unrecognized suffix is treated as any other suffix
;;;
;;; prespart (--ing) will be recognized by its suffix. If I put in MOST-NEGATIVE-DOUBLE-FLOAT below
;;; it causes an error -- find out why.... interferes with the alpha matrix calculation that also
;;; uses it.
;;;
;;; Put in check 17 Jan 1992.
;;; The vectors for UNRECOGNIZED-COUNTS and CODEWORD-COUNTS are likely to be matched, as they are
;;; both constructed at the same time by (compute-suffix-probs).
;;;
        (when (/= (length unrecognized-counts)
                  (length (aref (aref output-matrix 0)
                                0)))
          (format t "ERROR: *unrecognized-suffixes* doesn't match HMM output vector~%")
          (set ok nil))
        (when ok
          (setq vector (make-array nr-states :initial-element -100000.0))
          (dotimes (index nr-states)
            (if (< index (length *ordered-state-list*))
                (block basic-state
                  (setq open-class-p (position (nth index *ordered-state-list*)
                                               *open-classes*)))
                (block tied-state
                  (setq open-class-p (position (nth (aref tied-states index)
                                                    *ordered-state-list*)
                                               *open-classes*))))
            (when open-class-p
              (setq total 0.0)
              (dotimes (codeword-index (length unrecognized-counts))
```

```
DSK:<project>markov>thivo>tagger>franz4.1>patent-source>tagger-support.LISP:1    1-Jun-93 11:20:20
Page 21

(setq codeword-count (aref codeword-counts codeword-index))
                          (setq value (if (> codeword-count 0)
                                          (/ (float (aref unrecognized-counts codeword-index))
                                             (float codeword-count))
                                          0.0))
                          (when *debugging*
                            (format t "Codeword ~a : ~a/~a = ~a~%" codeword-index
                                    (aref unrecognized-counts codeword-index)
                                    codeword-count value))
                          (incf total (* value (aref (aref (aref output-matrix 0)
                                                           index)
                                                     codeword-index)))))
                      (when (> total 0.0)
                        (setf (aref vector index)
                              (log total 10))))))
            vector))
(defun make-word-array (files &key (outfile "new-word-array.lisp"))
  (let ((first-time t)
        file-list table)
    (setq file-list (if (listp files)
                        files
                        (list files)))
    (dolist (file file-list)
      (format t "Opening ~a~%" file)
      (with-open-file (stream (make-pathname :defaults file)
                              :direction :input)
        (setq table (compute-n-grams 1 stream :reset-hash-table first-time))
        (setq first-time nil)))
    (write-word-array table :outfile outfile)))
(defun make-wordcount-vector (codeword-vector word-array)
  (let ((wordcount-vector (make-array (length codeword-vector)
                                      :initial-element 0))
        count word ok codeword-index)
    ;;
    ;; Build up word counts for each equivalence class. assuming that words in each class
    ;; function equally likely as any part of speech in the class. This is to set up initial
    ;; output vector probabilities in the HMM. THIS STILL NEEDS TO BE FIXED FOR THE SPECIAL
    ;; CODEWORDS One way of dealing with counts for the special codewords is to make sure
    ;; that representative elements of each class are included in the word-array. --- THIS
    ;; IS THE CHOSEN SOLUTION "." for Sent-boundary ";" for Punctuation "," for comma
    ;; ":" for Number Abbreviations -- "usa" has been invented in the word array as a
    ;; canonical example. with a count 'xerox' is the canonical Proper Noun The word count
    ;; for Unknown is generated by this --- unless indeed all the words in *word-array* are
    ;; covered in dict-fsm which is not the case This procedure currently only works right
    ;; if this has been done The other alternative is to hard code them. but this would then
    ;; need changing for every different corpus.
    (dotimes (index (length word-array))
      ;; Find out the total number of words in each equivalence class
      ;; To stop the transducer complaining in get-tags. filter out words that it wont
      ;; parse...
      ;;
      (setq word (car (aref word-array index)))
      (setq ok t)
      (dotimes (index (length word))
        (let ((the-char (char word index)))
          (when (or (char= #\* the-char)
                    (digit-char-p the-char)
                    (char= #\- the-char))
            (setq ok nil))))
      (when ok
        (setq codeword-index (word-to-codeword word))
        (when codeword-index
          (incf (aref wordcount-vector codeword-index)
                (cdr (aref word-array index))))
        (when (null codeword-index)
          ;; If there is no equivalence class corresponding to the combination found
          ;; for the current word in the word-array inform of the fact. If there are
          ;; many of them it would be wise to insert the words into the dictionary and
          ;; do things over again. so information is not thrown away.
          (format t "INFO: Codeword index does not exist for Word: ~a~%"
                  (car (aref word-array index)))))
      (when (= 0 (rem index 2000))
        (format t "Processed ~a Word Array entries~%" index)))
    ;; For each equivalence class. divide the word count by the number of parts of speech in
```

```
:DSK)<project>markov>trivp>qtagger>franz4.1>patent-source>tagger-support.LISP:1   3-Jun-93 21:20:20
Page 22

:: the equivalence class. This gives the number of words that function as any single
        :: member of  the equivalence class, assuming they are all equally likely.
        (dotimes (index (length wordcount-vector))
            (when (> (setq count (aref wordcount-vector index))
                    0)
              (setf (aref wordcount-vector index)
                    (/ count (float (length (aref codeword-vector index)))))))
        :: If any of the codewords have zero count, then a word in the dictionary fsm
        :: represents an equivalence class that is not represented in the *word-array*
        (dotimes (index (length wordcount-vector))
            :: If there is a zero entry in the wordcount vector set it to a small value, so that
            :: it will have a non-zero (and small) value in the output matrix, and thus will be
            :: considered to occur, rather than being prohibited.
            (when (<= (aref wordcount-vector index)
                     0)
              (format t "Codeword ~a for ~a has zero word count~%" index (aref codeword-vector
                                                                                 index))
              (format t "---and has been forced to 10~%")
              (setf (aref wordcount-vector index)
                    10)))
        (dump-vector wordcount-vector *wordcount-pathname*)
        wordcount-vector))
(defun map-path-to-code (lst)
    (let (codeword word sym-name end-char-is-digit)
:::  10 June 1992 added sym-name, and changed vector-push to vector-push-extend
        (setf (fill-pointer *temp-str1*)
              0)
        (dolist (sym lst)
            (setq sym-name (string sym))
            (dotimes (n (length sym-name))
                (declare (fixnum n))
                (vector-push-extend (char sym-name n)
                                    *temp-str1*)))
        (setq word *temp-str1*)
        (incf *lexicon-index*)
        (if (<= *lexicon-index* 5000)
            (if (= 0 (rem *lexicon-index* 1000))
                (format t "------ ~a words done. Current word: ~a~%" *lexicon-index* *temp-str1*)
            )
          (if (= *lexicon-index* 5001)
              (format t "------ Reporting every 20,000 from now on~%")
              (if (= 0 (rem *lexicon-index* 20000))
                  (format t "------ ~a words done. Current word: ~a~%" *lexicon-index*
                          *temp-str1*))))
:::  NOTE This will chuck out "'s" for :poss  This is treated specially in with the special
:::  codewords in CODE-LEXICON-FST
:::  Only the word "0" is present as a digit starting/ending a word (inserted with the special
:::  codewords) --- others could cause non-determinism which would screw up the fast-lookup
        ::
        (setq end-char-is-digit (or (digit-char-p (char *temp-str1* (1- (length *temp-str1*))))
                                    (digit-char-p (char *temp-str1* 0))))
        (if end-char-is-digit
            (format t "Word: ~a IGNORED -- Starts/Ends in a digit~%" *temp-str1*)
          (when (null (position #\' *temp-str1* :test #'char=))
            (setq codeword (word-to-codeword *temp-str1*))
            (format *temp-stream* "~A~3,'00~%" *temp-str1* codeword)
            (when *debugging*
              (format t "~&=================== ~a~%" *temp-str1*)
              (format t "~a~%" codeword))))))
(defun map-text (word-function stream)
:::  Calls WORD-FUNCTION on every word encountered in STREAM.
    (do ((buffer (make-array 20 :element-type 'string-char :fill-pointer 0 :adjustable t))
         (char (read-char stream nil)
               (read-char stream nil)))
        ((null char)
         (unless (zerop (length buffer))
            (when word-function
              (funcall word-function (copy-seq buffer)))))
      (cond ((alphanumericp char)
             (null (or (eq char #\Space)
                       (eq char #\Newline)
                       (eq char #\Tab)
                       (eq char #\Linefeed)))
             (vector-push-extend char buffer))
```

```
]DSK><project>markov>trivo>dtagger>franz4.1>patent-source>tagger-support.LISP:1    3-Jun-93 21:20:20
Page 23

(t (unless (zerop (length buffer))
                        (when word-function
                          (funcall word-function (copy-seq buffer)))
                        (setf (fill-pointer buffer)
                              0))))))
(defun print-open-class-prob (model-name word &key (do-net nil))
  (let* ((model (rhmm:find-model model-name))
         (output-matrix (aref (rhmm::hmm-defn-outputs model)
                              0))
         (tied-states (rhmm::hmm-defn-tied-states model))
         (nr-states (rhmm::hmm-defn-nr-states model))
         (nr-suffixes (fsm:state-name (fsm:network-start-state *suffix-fsm*)))
         (max-suffix-len (apply 'max (map 'list 'length *suffix-list*)))
         (suffix nil)
         (suffix-index nil)
         (log-of-zero -100000.0)
         (initial-capital (upper-case-p (char word 0)))
         wd-len log-prob prob states the-state net-state-p)
    (setq wd-len (length word))
;;;
;;; 9 oct 91. NR-SUFFIXES should be taken from the fsm size, not the (length *suffix-list*) because
;;; any repeated suffix in the latter will map to the same entry in the fsm..
;;;
;;; Look up the longest matching suffix of this word with the suffix fsm.
    (do ((suffix-len max-suffix-len (1- suffix-len)))
        ((or suffix-index (<= suffix-len 0)))
      (when (>= wd-len suffix-len)
        (setq suffix (subseq word (- wd-len suffix-len)
                             wd-len))
        (setq suffix-index (fsm:word-to-number suffix *suffix-fsm*))
        (when nil (format t "~a ~a ~a ~a~%" word suffix-len suffix suffix-index))))
    (format t "Suffix: ~a~%" (if suffix-index
                                 suffix
                                 "*none*"))
    (if (null (eq *unknown-cat* (car (setq states (word-to-states word)))))
        (progn (format t "~~a~%" states)
               (dotimes (state-index (length *ordered-state-list*))
                 (setq prob (aref (aref output-matrix state-index)
                                  (word-to-codeword word)))
                 (when (> prob 0.0)
                   (format t "Category ~a prob ~a~%" (nth state-index
                                                          *ordered-state-list*)
                                                     prob))))
        (dotimes (state-index (if do-net
                                  nr-states
                                  (length *ordered-state-list*)))
          (setq net-state-p nil)
          (if (< state-index (length *ordered-state-list*))
              (setq the-state state-index)
              (progn (setq the-state (aref tied-states state-index))
                     (setq net-state-p t)))
          (setq log-prob (if initial-capital
                             (aref (aref *suffix-priors* (1- nr-suffixes))
                                   state-index)
                             (if suffix-index
                                 (aref (aref *suffix-priors* suffix-index)
                                       state-index)
                                 (aref (aref *suffix-priors* nr-suffixes)
                                       state-index))))
          (when (> log-prob log-of-zero)
            (format t "Category ~a ~a Log prob ~a, prob ~a~%" (nth the-state
                                                                   *ordered-state-list*
                                                                   )
                    (if net-state-p
                        " Network State: "
                        " ")
                    (if net-state-p
                        state-index
                        " ")
                    log-prob
                    (expt 10 log-prob)))))))
(defun print-pos nil (let (pos)
                       (dotimes (i (length *codeword-vector*))
                         (setq pos (aref *codeword-vector* i))
```

```
[DSK]<project>markov>trivo>qtagger>franz4.1>patent-source>tagger-support.LISP;1    3-Jun-93 21:23:22
Page 24

(when (and (>= i (length *unique-words*))
                                       (/= i (gethash pos *lexical-hash-table*)))
                              (format t "ERROR: Codewords do not match hash table!!!~%"))
                            (format t "~a ~a" i pos)
                            (if (< i (length *unique-words*))
                                (format t " ~a" (fsm:index-to-word (position i front-vector
                                                                             :test #'equal)
                                                                   front-fsm)))
                            (terpri t))
                        nil))
(defun print-suffix-data (&key (fsm *suffix-fsm*)
                               (suffix-array *codeword-suffixes*)
                               (unrecognized *unrecognized-suffixes*)
                               (code-count-vector *codeword-count-vector*))
  (let ((count (was 0)
        non-zero)
    (with-open-file (stream "suffix-data.txt" :direction :output :if-exists :new-version)
      (dotimes (index (length *codeword-vector*))
        (when (> index (length *unique-words*))
          (setq non-zero nil)
          (dotimes (s-index (array-dimension suffix-array 1))
            (when (> (aref suffix-array index s-index)
                     0)
              (setq non-zero t)))
          (when (or non-zero (> (aref unrecognized index)
                                0))
            (format stream
                    "~%~a: Prob (Eqv Class: ~a | Suffix) for suffix: (units = 1/10000) ~%"
                    (aref *codeword-vector* index)
                    (aref *codeword-vector* index))
            (setq was 0)
            (dotimes (s-index (array-dimension suffix-array 1))
              (when (> (setq count (aref suffix-array index s-index))
                       0)
                (format stream "~5a: ~5a " (fsm:number-to-word s-index fsm)
                        (round (* 10000 count)))
                (incf was)
                (when (> was 6)
                  (terpri stream)
                  (setq was 0))))
            (setq count (aref code-count-vector :index))
            (format stream
                    "~%~%Prob (Eqv Class: ~a | No Suffix) = ~a  (units = 1/10000)~%"
                    (aref *codeword-vector* index)
                    (if count
                        (round (* 10000 (/ (aref unrecognized index)
                                           count)))
                        0))
            (format stream "~%");,))))
(defun print-top-n-grams (n table &optional (threshold 15))
  (let ((grams nil))
    (maphash #'(lambda (gram count)
                 (when (= (length gram)
                          n)
                   (push (cons count gram)
                         grams)))
             table)
    (setq grams (sort grams #'> :key #'car))
    (do* ((i 0 (1+ i))
          (tail grams (cdr tail))
          (count (caar tail)
                 (caar tail))
          (gram (cdar tail)
                (cdar tail)))
         ((or (null tail)
              (eql i threshold)))
      (format t "~&~2D~{ ~A~}" count (reverse gram)))))
(defun snow-equiv-class (word &key (limit 10000))
  (let ((count 0)
        code fsm-index state-list)
    (when (null *word-array*)
      (format t "Reading word array~%")
      (setq *word-array* (get-word-array)))
    (when (setq fsm-index (fsm:word-to-number word *front-fsm*))
```

```lisp
                    (setq code (aref *front-vector* sm-index))
                    (setq state-list (aref *codeword-vector* code))
                    (format t "~a ~a~%" state-list (if (< code (length *unique-words*))
                                                        "(Unique)"
                                                        " "))
                (dotimes (i (min limit (length *word-array*)))
                    (when (and (= (word-to-codeword (car (aref *word-array* i)))
                                  code))
                        (format t "~a ~%" (car (aref *word-array* i)))
                        (incf count))))))
(defun stop-word-p (word)
    (gethash word *stop-table*))
(defun suffixes-from-list (n &key (hash-table (make-hash-table :test 'equal))
                                    (threshold 150)
                                    (start 5000))
    ;;
    ;; Not essential for tagger reconstruction/operation
    ;;
    (let (word wd-len key entries-on-line (file-name (merge-pathnames (concatenate 'string
                                                                                    "suffix-"
                                                                                    (format nil "~a" n)
                                                                                    "-grams.lisp")
                                                                      *tagger-pathname*)))
        (when (null *word-array*)
            (setq *word-array* (get-word-array)))
        (when (and nil (null **front-fsm*))
            (setq **front-fsm* (fsm:network-from-file (merge-pathnames "front-end.fsm"
                                                                       *tagger-pathname*)))
            (format t "Indexing Front FSM..~%")
            (fsm:index-network **front-fsm*)
            (format t "Reading Front Vector..~%")
            (setq *front-vector* (read-vector (merge-pathnames "front-vector.lisp"
                                                                *tagger-pathname*))))
        (dotimes (index (length *word-array*))
            (setq word (car (aref *word-array* index)))
            (setq wd-len (length word))
            ;;
            (when (and (> index start)
                       (>= wd-len n))
                (setq key (subseq word (- wd-len n)
                                  wd-len))
                (when (= 0 (rem index 1000))
                    (format t "~a words done~%" index))
                (incf (gethash key hash-table 0)
                      (cdr (aref *word-array* index)))))
        (with-open-file (stream file-name :direction :output :if-exists :new-version)
            (let ((grams nil))
                (maphash #'(lambda (gram count)
                              (when (= (length gram)
                                       n)
                                  (push (cons count gram)
                                        grams)))
                          hash-table)
                (setq grams (sort grams #'> :key #'car))
                (setq entries-on-line 0)
                (terpri stream)
                (do* ((i 0 (1+ i))
                      (tail grams (cdr tail))
                      (count (caar tail)
                             (caar tail))
                      (gram (cdar tail)
                            (cdar tail)))
                     ((or (null tail)
                          (eql i threshold)))
                    ;; (format t "~&~2D~{ ~A~}" count (reverse gram))
                    (format stream "(~s ~a) ~1,5T" gram count)
                    (format t "(~s ~a) ~1,5T" gram count)
                    (incf entries-on-line)
                    (when (>= entries-on-line 5)
                        (terpri stream)
                        (terpri t)
                        (setq entries-on-line 0)))
                nil))))
(defun write-array (array file-name)
```

```
;[DSK]<project>markov>trivp>qtagger>franz4.l>patent-source>tagger-support.LISP:1   3-Jun-93 21:20:20
Page 26

(let nil (with-open-file (stream file-name :direction :output :if-exists :new-version)
                    (print (length array)
                           stream)
                    (dotimes (i (length array))
                        (print (aref array i)
                               stream)))
            nil))
(defun write-word-array (table &key (outfile "new-word-array.lisp"))
    (let ((n 1)
          (grams nil))
        (maphash #'(lambda (gram count)
                       (when (= (length gram)
                                n)
                           (push (cons count gram)
                                 grams)))
                 table)
        (setq grams (sort grams #'> :key #'car))
        (with-open-file (stream outfile :direction :output :if-exists :new-version)
            (format stream "~a~%" (length grams))
            (do* ((i 0 (1+ i))
                  (tail grams (cdr tail))
                  (count (caar tail)
                         (caar tail))
                  (gram (cdar tail)
                        (cdar tail)))
                 ((null tail))
                (format stream "(\"~{~A~}\" . ~a)~%" (reverse gram)
                        count)))))
```

Kupiec

Document name: {DSK}<project>markov>trivp>qtagger>franz4.1 patent—source>text—tagger.LISP;1
Document date: Thu Jun 3 21:22:21 1993
Printing date/time: June 3, 1993 9:28:48 pm PDT Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

```
DSK:<project>markov>trivp>qtagger>franz4.1>patent-source>text-tagger.LISP:1    3-Jun-93 21:15:40
Page 1

;;;-*- Package: USER; Syntax: Common-Lisp; Base: 10 -*-
;;; File converted on 10-Mar-93 19:06:56 from source text-tagger
;;; Original source (dsk)<project>markov>trivp>qtagger>franz4.1>text-tagger.:46 created 10-Mar-93 16:.
;;; Copyright (c) 1989, 1990, 1991, 1992, 1993 by Xerox Corporation
(provide "TEXT-TAGGER")
(in-package 'USER")
;;; Shadow, Export, Require, use-package, and Import forms should follow here
;;; File converted on 28-Sep-90 11:48:37 from source text-tagger Original source
;;; {piglet/n}<piglet>speech>kupiec>hmm>tagger>release>v2>text-tagger.:39 created 25-Apr-90 14:36:58
;;; Copyright (c) 1989, 1990 by Xerox Corporation
(in-package 'USER")
(provide "TEXT-TAGGER")
;;; Shadow, Export, Require, use-package, and Import forms should follow here
(defvar *buffer* (make-array 1000 :element-type 'string-char :fill-pointer 0 :adjustable t))
(defconstant *default-array-size* 1000)
(defparameter *default-string-extension* 500)
(defvar *downcase-buffer* (make-array 1000 :element-type 'string-char :fill-pointer 0 :adjustable t))
(defvar *eqv-class-pathname* (merge-pathnames "eqv-classes.lisp" *tagger-pathname*))
(defvar *proper-noun-cat* :npr)
(defvar *unknown-cat* :unknown)
(defvar *unknown-word-codeword* n-1)
(defvar *non-printing-tags* '(:sent-boundary :comma :apostrophe :lparen :scolon :dqoute :rparen
                              :punct :hyphen))
(defvar *obs-matrix* nil)
(defvar *open-classes* '(:n :npi :adj :adv :v :v3sg :past :prespart :pastpart :npr :abbrev))
(defvar *special-codewords* '(:sent-boundary :comma :punct :number :single-abbr :abbrev :apostrophe
                              :lparen :rparen :scolon :dqoute :hyphen :unknown))
(defvar *fast-lexicon-fsm* nil)
(defvar *fast-lexicon-pathname* (merge-pathnames "fast-lexicon.fsm" *tagger-pathname*))
(defvar *front-fsm* nil)
(defvar *front-vector* nil)
(defvar *fsm-pad-char-length* nil)
(defvar *predict-unknown-words* t)
(defvar *tagger-stable-p* t)
(defvar *tokenizing-fsm* fsm-tokenizer:*tokenizer-fsm*)
(defvar *word-to-states-buffer1* (make-array 1000 :element-type 'string-char :fill-pointer 0
                                  :adjustable t))
(defvar *word-to-states-buffer2* (make-array 1000 :element-type 'string-char :fill-pointer 0
                                  :adjustable t))
(defvar *word-to-states-buffer3* (make-array 1000 :element-type 'string-char :fill-pointer 0
                                  :adjustable t))
(defvar *suffix-fsm-pathname* (merge-pathnames "suffix.fsm" *tagger-pathname*))
(defvar *tag-map* nil)
(defvar *lexical-hash-table* nil)
(defvar *line-length* 90)
(defvar *lexicon* nil)
(defvar *codeword-vector* nil)
(defvar *current-codewords* (make-array *default-array-size* :adjustable t :fill-pointer 0))
(defvar *current-index* nil)
(defvar *current-words* (make-array *default-array-size* :adjustable t :fill-pointer 0))
(defvar *index-to-state-name* nil)
(defvar *ordered-state-list*
  '(:det :n :npl :npr :adj :poss :pnom :pool :prel :prefl :comp :conj :adv :prep :v :v3sg :past
    :modal :has :nave :nad :do :did :does :to-inf :to-prep :by-prep :in-prep :prespart
    :pastpart :number :intj :sent-boundary :comma :punct :hyphen :abbrev :not :is :was :am
    :were :are :be :been :being :apostrophe :lparen :rparen :scolon :dqoute :single-abbr
    :day :month :unknown))
(defvar *suffix-list*
  '("a" "acy" "ae" "age" "al" "an" "ancy" "and" "ant" "ar" "arian" "ary" "at" "ate" "ble" "c"
    "ce" "ch" "ct" "cy" "de" "ds" "dom" "e" "ed" "ee" "eer" "en" "ence" "ency" "end" "ent"
    "er" "ers" "ery" "es" "ess" "et" "ful" "hood" "ght" "gram" "ge" "i" "ia" "ible" "ic"
    "ical" "ices" "icide" "id" "ide" "ides" "ificat" "ies" "ify" "in" "ine" "ing" "ion"
    "ions" "is" "ish" "ism" "ist" "it" "ite" "itude" "ity" "ive" "ize" "ke" "le" "less"
    "let" "ling" "logy" "ls" "y" "ly" "man" "me" "men" "ment" "meter" "metry" "ne" "ness"
    "ns" "o" "oes" "oid" "ol" "on" "ons" "opath" "ophile" "or" "orship" "ory" "os" "ot"
    "ous" "re" "rices" "rix" "rs" "ry" "s" "se" "sed" "sful" "sh" "ship" "st" "some" "te"
    "ted" "th" "ts" "ude" "ue" "um" "und" "ure" "us" "ve" "woman" "women" "y"))
(defvar *suffix-priors-pathname* (merge-pathnames "suffix-priors.lisp" *tagger-pathname*))
(defvar *suffix-fsm* nil)
(defvar *suffix-priors* nil)
(defconstant *null-term-hash-val* -1)
(defmacro do-with-exceptions (((unknown-codeword unknown-states index-matrix output-index nr-states)
                               (iteration-var)
                               &body forms)
```

```
[DSK]<project>markov/trivia>dtagger>franz4.1>patent-source>text-tagger.LISP:1    3-Jun-93 21:15:40
Page 2

'((if (and .index-matrix (/= .unknown-codeword .output-index))
             (let ((%$$vector (svref .index-matrix .output-index)))
                (dotimes (%$$temp (length %$$vector))
                   (declare (fixnum %$$temp))
                   (let ((.iteration-var (svref %$$vector %$$temp)))
                      (declare (fixnum .iteration-var))
                      .@forms)))
             (dotimes (%$$temp .nr-states)
                (declare (fixnum %$$temp))
                (when (null (svref .unknown-states %$$temp))
                   (let ((.iteration-var %$$temp))
                      (declare (fixnum .iteration-var))
                      .@forms)))))
(defun eof-p (stream)
   (eql (file-position stream)
        (file-length stream)))
(defun get-tags (word string-buffer)
   (let (tag-list sym (return-tags nil))
      (setq tag-list (fsm:lookup-tag word :network *lexicon*))
      (dolist (el tag-list)
         (setf (fill-pointer string-buffer)
               0)
         (do ((index 2 (1+ index)))
             ((= index (position #\} el)))
            (vector-push-extend (char-upcase (char el index))
                                string-buffer *default-string-extension*))
         (setq sym (intern string-buffer 'KEYWORD"))
         (pushnew sym return-tags))
      return-tags))
(defun state-to-string (model sent-index non-printing-states state-ids)
   (let ((state-name nil)
         state-index base-index tied-state-matrix non-printing-index (non-printing-p nil))
      (setq tied-state-matrix (rhmm::hmm-defn-tied-states model))
      (setq state-index (aref rhmm:*viterbi-states* sent-index))
      (setq base-index state-index)
      (when (>= state-index (length *ordered-state-list*))
         (setq base-index (aref tied-state-matrix state-index)))
      (setq state-name (aref *index-to-state-name* base-index))
      (do ((tail non-printing-states (cdr tail)))
          ((or (null tail)
               non-printing-p))
         (setq non-printing-index (position (car tail)
                                            *ordered-state-list*))
         (if (null non-printing-index)
             (format t "ERROR: Non-printing tag: ~a is not in the *ordered-state-list*~%"
                     (car tail))
             (when (= non-printing-index base-index)
                (setq non-printing-p t))))
      (if non-printing-p
          (setq state-name "")
          (when (and state-ids (>= state-index (length *ordered-state-list*)))
             (setq state-name (format nil "~a" (- state-index (length *ordered-state-list*))))))
      state-name))
(defun
new-viterbi
(model &optional (unknown-states-supplied nil))
(let
(everything-ok nr-observations transition-matrix log-transition-matrix nr-states output-matrix
   log-output-matrix obs-matrix initial-matrix log-initial-matrix (total rhmm::dzero)
   (max-so-far rhmm::dzero)
   max-so-far-p obs-index (cumulative rhmm::dzero)
   (transition-prob rhmm::dzero)
   obs-exists path-exists final-states index-matrix use-prior-instead unknown-prior
   unknown-states current-word not-sentence-initial-word-initial-cap
   (max-suffix-len (apply 'max (map 'list 'length *suffix-list*)))
   (unknown-codeword (gethash (list *unknown-cat*)
                              *lexical-hash-table*))
   (sent-boundary-codeword (gethash '(:sent-boundary)
                                    *lexical-hash-table*))
   (last-state -1)
   (obs-name "TAGGER-SENTENCE")
   (model-name (rhmm::hmm-defn-name model)))
(declare (fixnum obs-index nr-observations nr-states unknown-codeword sent-boundary-codeword
```

```
:DSK:<project>markov>t-ivo>dtagger>franz4.1:>patent-source>text-tagger.LISP;1   3-Jun-93 21:15:40
Page 3
             last-state)
        (double-float total max-so-far cumulative transition-prob))
;;;
;;; This function returns the log (base 10) of the highest probability path through the given model
;;; which generates the given observation sequence. It also sets the global array *viterbi-states*
;;; to the state sequence involved. NOTE the *alpha-matrix* and *beta-matrix* are used destructively
;;; by this function.. First check that both are big enough (and make them bigger if necessary)
;;;
;;; 24 Sept 92. Use a global *obs-matrix* that is a simple-array so I can use svref...
;;;
  (setq nr-observations (length *current-codewords*))
  (when (or (null *obs-matrix*)
            (< (length *obs-matrix*)
               nr-observations))
    (if (null *obs-matrix*)
        (rhmm:report "INFO: Needed a new OBS matrix~%")
        (rhmm:report "INFO: Needed a bigger OBS matrix for observation: ~a~%" obs-name))
    (setq *obs-matrix* (rhmm:my-make-array nr-observations)))
  (setq obs-matrix *obs-matrix*)
  (dotimes (index nr-observations)
    (setf (svref *obs-matrix* index)
          (aref *current-codewords* index)))
  (when (setq everything-ok (and (rhmm:check-alphas model-name obs-name obs-matrix)
                                 (rhmm:check-betas model-name obs-name obs-matrix)))
    (setq log-transition-matrix (rhmm::hmm-defn-log-transition-matrix model))
    (setq transition-matrix (rhmm::hmm-defn-transitions model))
    (setq log-output-matrix (rhmm::hmm-defn-log-output-matrix model))
    (setq output-matrix (rhmm::hmm-defn-outputs model))
    (setq log-initial-matrix (rhmm::hmm-defn-log-initial-matrix model))
    (setq initial-matrix (rhmm::hmm-defn-initial model))
    (setq final-states (rhmm::hmm-defn-final-states model))
    (setq index-matrix (rhmm::hmm-defn-output-to-state-index model))
    (setq nr-states (rhmm::hmm-defn-nr-states model))
    ;; (setq nr-outputs (rhmm::hmm-defn-nr-outputs model))
    ;; This should be in the inner loop depending on word
    ;; 24 Sept 92 for back compatibility
    (when (null (setq unknown-states unknown-states-supplied))
      (setq unknown-states (find-unknown-states model)))
    ;; Check that the global *VITERBI-STATES* is an array big enough to hold the state sequence
    ;; Make it big enough if necessary (by replacing it with a new array)
    (when (or (null rhmm:*viterbi-states*)
              (< (length rhmm:*viterbi-states*)
                 nr-observations))
      (if (null rhmm:*viterbi-states*)
          (rhmm:report "INFO: Needed a new Viterbi state matrix~%")
          (rhmm:report "INFO: Needed a bigger Viterbi state matrix for observation: ~a~%"
                       obs-name))
      (setq rhmm:*viterbi-states* (rhmm:my-make-array (1st nr-observations))))
    ;; Initialize it to nil
    (dotimes (index (length rhmm:*viterbi-states*))
      (declare (fixnum index))
      (setf (svref rhmm:*viterbi-states* index)
            nil))
;;; Initialise alpha and beta matrices with unique values that cannot be valid forward probs or
;;; states (respectively)
    (dotimes (obs-nr nr-observations)
      (declare (fixnum obs-nr))
      (do-with-exceptions (unknown-codeword unknown-states index-matrix (svref obs-matrix obs-nr)
                                            nr-states)
                          (i-state)
        (setf (rhmm::sdfmatref rhmm:*alpha-matrix* i-state obs-nr)
              most-negative-double-float)
        (setf (rhmm::sdfmatref rhmm:*beta-matrix* i-state obs-nr)
              (double-float -1.0))))
;;; Set up the start of the viterbi search for the first observation. put the log of the initial
;;; probs. in the alpha matrix.   Leave out :unknown states MUST MAKE NEW MACRO INSTEAD OF
;;; HMM:DO-RELEVANT-STATES TO ITERATE OVER ALL STATES (EXCEPT THE :UNKNOWN STATE)  FOR AN UNKNOWN
;;; OBSERVATION... Then can take out the test below. Iterate over the appropriate states for this
;;; observation. If it is the unknown codeword, iterate over all states, excepting :unknown , or
;;; ones tied to :unknown THE OBS-MATRIX always starts with a sentence boundary, so there is no
;;; reason for dealing with unknown words here...
    (do-with-exceptions (unknown-codeword unknown-states index-matrix (svref obs-matrix 0)
                                          nr-states)
                        (i-state)
```

```
{DSK}<project>markov>trivo>qtagger>franz4.1>patent-source>text-tagger.LISP:1    3-Jun-93 21:15:40
Page 4

(when () (rhmm::sdfmatref initial-matrix i-state)
                    rhmm::dzero)
              (when (= (svref obs-matrix 0)
                       unknown-codeword)
                (format t "this shouldn't happen!!!!"))
              (setf (rhmm::sdfmatref rhmm:*alpha-matrix* i-state 0)
                    (+ (rhmm::sdfmatref 'log-initial-matrix i-state)
                       (rhmm::sdfmatref log-output-matrix 0 i-state (svref obs-matrix 0))))))
;;
;; Forward iteration of the viterbi algorithm over each observation
;;
(do ((obs-nr 1 (1+ obs-nr)))
    ((or (null everything-ok)
         (>= obs-nr nr-observations)))
  (declare (fixnum obs-nr))
  ;; NASTY -- the (1- obs-nr) on the next line is because *current-words* does not include the
  ;; sentence initial "." whereas the obs-matrix (*current-codewords*) does....
  (setq current-word (aref *current-words* (1- obs-nr)))
  (setq not-sentence-initial-word-initial-cap (and (> obs-nr 0)
                                                   (/= (svref obs-matrix (1- obs-nr))
                                                       sent-boundary-codeword)
                                                   (upper-case-p (char current-word 0))))
  (when not-sentence-initial-word-initial-cap
    (setq use-prior-instead (= unknown-codeword (svref obs-matrix obs-nr)))
    (when use-prior-instead
      ;; Must remember that there is a final space appended, which must be ignored. 23 Sept 92
      ;; NO LONGER THE CASE. AND HASN'T BEEN FOR A WHILE!!!!
      (setq unknown-prior (log-suffix-prior current-word not-sentence-initial-word-initial-cap
                                            max-suffix-len))))
  ;; For each current state (j-state) look back at all previous states (i-state) for the
  ;; previous observation to see which paths can be extended to the current state and current
  ;; observation
  (setq obs-exists nil)
  (setq path-exists nil)
  (do-with-exceptions
    (unknown-codeword unknown-states index-matrix (svref obs-matrix obs-nr)
                      nr-states)
    (j-state)
    ;; The current state must be capable of generating the current observation to be considered
    ;; as a possible path extension.
    (when everything-ok
      (setq obs-exists t)
      (setq max-so-far-p nil)
      (setq max-so-far rhmm::dzero)
      (do-with-exceptions (unknown-codeword unknown-states index-matrix (svref obs-matrix
                                                                               (1- obs-nr))
                          nr-states)
        (i-state)
        ;;
        (when (or (svref unknown-states i-state)
                  (svref unknown-states j-state))
          (format t "ERROR unknown state used~%"))
        (setq cumulative (rhmm::sdfmatref rhmm:*alpha-matrix* i-state (1- obs-nr)))
        (setq transition-prob (rhmm::sdfmatref transition-matrix i-state j-state))
        ;; The previous state must have a path ending on it, and also a transition into
        ;; the current state, for the path to be extended to the current state
        (when nil (format t "i: ~a j: ~a a(ij) ~a t: ~a~%" i-state j-state
                          transition-prob obs-nr))
        (when (and (> cumulative most-negative-double-float)
                   (> transition-prob rhmm::dzero))
          ;; Update the cost of the best path from the previous node to this node (If
          ;; it is the first one found it is the best one so far) Include the log of
          ;; the transition prob. to the current node
          (setq total (+ cumulative (rhmm::sdfmatref log-transition-matrix i-state
                                                     j-state)))
          (when (or (null max-so-far-p)
                    (> total max-so-far))
            ;; Remember the highest probability path found so far. And remember
            ;; which was the last state through which it went
            (setq max-so-far total)
            (setq max-so-far-p t)
            (when nil
              (format t
                      "new max ~a time ~a from state ~a (~a) to state ~a (~a)adding ~a~%"
```

```
:DSK\<project>markov>trivo>dtagger>fmnz4.1>patent-source>text-tagger.LISP:1   3-Jun-93 21:15:40
Page 6 max-so-far obs-nr (if (< i-state (length *ordered-state-list*)
                                                    )
                                               (nth i-state *ordered-state-list*)
                                               (nth (aref (rhmm::hmm-defn-tied-states
                                                                model)
                                                          i-state)
                                                    *ordered-state-list*))
                            i-state
                            (if (< j-state (length *ordered-state-list*))
                                (nth j-state *ordered-state-list*)
                                (nth (aref (rhmm::hmm-defn-tied-states model)
                                           j-state)
                                     *ordered-state-list*))
                            j-state
                            (if use-prior-instead
                                (- max-so-far (aref unknown-prior j-state))
                                (- max-so-far (rhmm::sdfmatref log-output-matrix 0 j-state
                                                   (svref obs-matrix obs-nr)))))))
                 (setf (rhmm::sdfmatref rhmm:*beta-matrix* j-state obs-nr)
                       (double-float i-state))
                 (setq path-exists t))
           (when max-so-far-p
             ;; Remember the value of the highest prob. path to the current node for the current
             ;; observation Include the log prob. of the observation.
             (setf (rhmm::sdfmatref rhmm:*alpha-matrix* j-state obs-nr)
                   (if use-prior-instead
                       (- max-so-far (svref unknown-prior j-state))
                       (- max-so-far (rhmm::sdfmatref log-output-matrix 0 j-state
                                          (svref obs-matrix obs-nr)))))))))
    ;;
    ;; If there was a failure in lattice continuity, try to be helpful in figuring out why.
    ;;
    (when (null path-exists)
      (setq everything-ok nil)
      (rhmm:report "ERROR: No Path through Viterbi Lattice in model: ~a to Observation: ~a~%"
                   model-name (svref obs-matrix obs-nr))
      (rhmm:report "ERROR: Observation Sequence: ~a at time ~a~%" obs-name obs-nr))
    (when (null obs-exists)
      (setq everything-ok nil)
      (rhmm:report "ERROR: No state in model: ~a could generate observation ~a~%" model-name
                   (svref obs-matrix obs-nr))
      (rhmm:report "ERROR: Obs. Seq: ~a at time ~a~%" obs-name obs-nr)))
  ;; We have now computed the costs of the best paths to all nodes at the last observation time.
  ;; Find out which state (which must be a permitted final state) has the highest log prob. This
  ;; is the best final state and is chosen for the viterbi state sequence.
  (when everything-ok
    (setq max-so-far-p nil)
    (setq max-so-far rhmm::dzero)
    (do-with-exceptions (unknown-codeword unknown-states index-matrix (svref obs-matrix
                                                                             (1-
                                                                              nr-observations)
                                                                             ))
                        nr-states)
        (i-state)
      (setq total (rhmm::sdfmatref rhmm:*alpha-matrix* i-state (1- nr-observations)))
      (when (or (null final-states)
                (position i-state final-states))
        (when (or (null max-so-far-p)
                  (> total max-so-far))
          (setq max-so-far total)
          (setq max-so-far-p t)
          (setq last-state i-state))))
    (setf (svref rhmm:*viterbi-states* (1- nr-observations))
          last-state)
    (if (null max-so-far-p)
        (rhmm:report "INFO: No path to any final state in model: ~a for Observation set: ~a~%"
                     model-name obs-name))
    ;; Go backwards filling in the rest of the best (viterbi) state sequence. At each time,
    ;; we know the best current state, and we know its best predecessor, which we tracked in
    ;; the beta matrix
    (setq obs-index (1- nr-observations))
    (when max-so-far-p
      (do nil
          ((< obs-index 1))
```

000151

```
[DSK]<project>markov>tr!vo>qtagger>franz4.!>patent-source>text-tagger.LISP;!   3-Jun-93 21:15:40
Page 6

(setq last-state (round (rhmm::sdfmatref rhmm:*beta-matrix* last-state obs-index)))
            (setf (svref rhmm:*viterbi-states* (1- obs-index))
                  last-state)
            (decf obs-index))))
;; This function returns the log base 10 of the viterbi sequence if one existed to a final state.
  (if everything-ok max-so-far))
(defun tag (file &key (outfile t)
                      (show t)
                      (from-string nil)
                      (norm nil)
                      (lisp-forms nil)
                      (hmm-file nil)
                      (to-codes nil)
                      (state-ids nil)
                      (code-stats t)
                      (show-ambiguity t)
                      (read-tokenizer nil)
                      (full-init (null *tagger-stable-p*))
                      (name *hmm-default-model-name*))
  (let ((model (rhmm:find-model name))
        (file-stream nil)
        (out-stream nil)
        (ok t)
        (tokenizer-stream nil)
        (the-tokenizer *tokenizing-fsm*)
        (word-count 0)
        (total-ambiguities 0)
        (max-sent-length 0)
        (nr-sents 0)
        (hmm-name name)
        sent-length outfile-pathname hmm-pathname saved-report-level sent-boundary-codeword
        saved-print-array)
    (when (or read-tokenizer (null *tokenizing-fsm*))
      (setq the-tokenizer (fsm-tokenizer::load-fsm-tokenizer :directory *tagger-pathname*
                                                            :quiet (null read-tokenizer)))
      (setq *tokenizing-fsm* the-tokenizer))
    (when to-codes
      (setq saved-print-array *print-array*)
      (setq *print-array* t))
    ;;
    ;; The name keyword takes priority over hmm-file for defining the hmm to use. It must
    ;; be a loaded model, then hmm-name is used. If it is not supplied and there is a
    ;; single model currently loaded, it will be used. Then if *hmm-pathname* defines an
    ;; hmm file it is used. Lastly the file "name".hmm is used for reading. In production
    ;; this is default.hmm
    ;;
    (when (null model)
      (setq hmm-pathname (if hmm-file
                             (make-pathname :defaults hmm-file)
                             (if (pathname-name *hmm-pathname*)
                                 *hmm-pathname*
                                 (merge-pathnames (make-pathname :name hmm-name :type
                                                                 "hmm")
                                                  *tagger-pathname*))))
      (when (null hmm-file)
        (when (= (length rhmm:*models*)
                 1)
          (setq model (car rhmm:*models*))
          (format t "Using model: ~a~%" (rhmm::hmm-defn-name model)))
        (when (> (length rhmm:*models*)
                 1)
          (format t "There are several current models~%")
          (format t "Select one of them using the :name keyword~%")
          (format t "The current models loaded are:~%")
          (dolist (the-hmm rhmm:*models*)
            (format t "~s~%" (rhmm::hmm-defn-name the-hmm)))
          (setq ok nil)))
      (when (and (null model)
                 ok)
        (format t "Reading RHMM: ~a~%" hmm-pathname)
        (setq model (rhmm:read-hmm hmm-pathname))
        (when (null model)
          (format t "Could not read this hmm, check it exists~%")
          (set ok nil))))
```

```
:SK(<project>markov/tr>/o>qtagger>franz4.1>patent-source>text-tagger.LISP:1    3-Jun-93 21:16:40
Page 1

(if mode!
         (setq mmm-name (rhmm::hmm-defn-name model)))
      (when (and ok (check-data model))
        (when (or full-init (null *codeword-vector*))
           (format t "~%Reading Codeword Vector..~%")
           (setq *codeword-vector* (read-vector *cdv-class-pathname*))
           (when (null *codeword-vector*)
               (format t "ERROR: Codeword Vector is null~%")
               (setq ok nil)))
        (setq saved-report-level rhmm:*report-level*)
        (setq rhmm:*report-level* nil)
        (setq sent-boundary-codeword (word-to-codeword "."))
        (when (null sent-boundary-codeword)
            (format t "ERROR: Cannot find :sent-boundary codeword in Codeword Vector~%")
            (setq ok nil))
        (rhmm:make-log-matrices model :always-recompute full-init)
        (when (or full-init (null *index-to-state-name*))
           (setq *index-to-state-name* (make-array (length *ordered-state-list*)))
           (dotimes (index (length *ordered-state-list*))
              (setf (aref *index-to-state-name* index)
                  (string-downcase (symbol-name (nth index *ordered-state-list*))))))
        (when (and (null from-string)
                   (null (probe-file file)))
           (setq ok nil)
           (format t "Cannot find ~a~%" file)))
      (when ok
         (unwind-protect
           (progn (setq file-stream (if from-string
                                        (make-string-input-stream file)
                                        (open file :direction :input)))
              (if (null norm)
                 (setq tokenizer-stream (make-instance
                                          'fsm-tokenizer::symbolic-fsm-tokenizer
                                          :char-stream file-stream :tokenizer-fsm
                                          the-tokenizer :start 0)))
              ;; outfile can be set to n-i for timing tests on tagger.
              (setq out-stream (if (or (null outfile)
                                       (eq outfile t)
                                       (streamp outfile))
                                   outfile
                                   (progn
;;; If an explicit file type was supplied, use it. Othewise assume it is .lisptags
                                       (setq outfile-pathname (merge-pathnames
                                                               (make-pathname
                                                                :defaults
                                                                outfile)
                                                               (make-pathname :type
                                                                              "lisptags")))
                                       (open outfile-pathname :direction :output
                                             :if-exists :new-version))))
              (loop (when (eof-p file-stream)
                        (close file-stream)
                        (return nil))
                   (fst-read-sentence file-stream tokenizer-stream lisp-forms
                        sent-boundary-codeword)
                   (incf nr-sents)
                   (setq sent-length (- (length *current-codewords*)
                                        2))
                   (incf word-count sent-length)
                   (when (> sent-length max-sent-length)
                        (setq max-sent-length sent-length))
                   ;; account for sent boundary codewords...
                   (dotimes (i (1- (length *current-codewords*)))
                       (incf total-ambiguities (length (aref *codeword-vector*
                                                             (aref *current-codewords*
                                                                   (1+ i))))))
                   (if (null to-codes)
                        (do-viterbi model))
                   (when out-stream
                       (tag-sent model out-stream lisp-forms to-codes :state-ids
                            state-ids :show-ambiguity show-ambiguity)
                       (when (and show (null (eq out-stream t)))
                           (tag-sent model t lisp-forms to-codes :state-ids state-ids
                                :show-ambiguity show-ambiguity)))))
```

000153

```
[DSK]<project>markov>trivo>otagger>franz4.1>patent-source>text-tagger.LISP:1   3-Jun-93 21:15:40
Page 8

(close file-stream)
                           (when (and out-stream (null (streamp outfile))
                                     (null (eq out-stream t)))
                               (close out-stream))))
                   (setq rnmm:*report-level* saved-report-level)
                   (when to-codes
                       (setq *print-array* saved-print-array)
                       (when code-stats
                           (format t "~a words were coded.~%" word-count)
                           (when (> nr-sents 0)
                               (format t "~a sentences. Avg. words per sentence: ~a~%" nr-sents
                                       (/ (float word-count)
                                          nr-sents)))
                           (format t "Max. sentence length: ~a~%" max-sent-length)
                           (when (> word-count 0)
                               (format t "Avg. Nr categories per word: ~a~%" (/ (float total-ambiguities)
                                                                                word-count))))))))
(defun
    tag-sent
    (model output-file lisp-forms to-codes &key (state-ids nil)
        (show-ambiguity t))
    ;;
    ;; BUFFER-POINTER must point at BUFFER numbers are temporarily represented as unknown...
    ;;
    (let* ((line-length *line-length*)
           (is-a-cfg (rnmm::nmm-defn-network-matrix model)))
        (terpri output-file)
        ;;
        ;; (format t "~a~%" words) (do-viterbi words sent-boundary-codeword) (format t "model-name --
        ;; ~a~%" model-name) (do-viterbi words sent-boundary-codeword model-name lisp-forms)
        ;;
        (if lisp-forms
            (block lispy-output
                (write-char #\( output-file)
                (dotimes (index (fill-pointer *current-words*))
                    (write-char #\( output-file)
                    (print (aref *current-words* index)
                           output-file)
                    (write-char #\Space output-file)
                    (write-char #\. output-file)
                    (write-char #\Space output-file)
                    (write-string (state-to-string model (1+ index)
                                                  nil state-ids)
                                  output-file)
                    (write-char #\) output-file)
                    (when (< index (1- (fill-pointer *current-words*)))
                        (terpri output-file)))
                (write-char #\) output-file)
                (terpri output-file))
            (if (and to-codes (null (eq output-file t)))
                (print *current-codewords* output-file)
                (do* ((index 0 (1+ index))
                      (from-index 0)
                      (chars 0))
                     ((= index (fill-pointer *current-words*))
                      (flush-line model output-file from-index index to-codes show-ambiguity state-ids
                                  ))
                    (let* ((word (aref *current-words* index))
                           (codeword (format nil "~a " (if (or is-a-cfg to-codes)
                                                           (aref *current-codewords* (1+ index))
                                                           (state-to-string model (1+ index)
                                                                            *non-printing-tags* state-ids))))
                           (states (word-to-states word))
                           (tag-str (if (and (null to-codes)
                                             (> (length states)
                                                1))
                                        (if show-ambiguity
                                            (progn (setf (char codeword (1- (length codeword)))
                                                         #\/)
                                                   (concatenate 'string codeword (format nil "~a "
                                                                                         (length states)
                                                                                         )))
                                            codeword)
                                        codeword))
```

```
;DSK)<project>markov>tr-vo>dtagger>franz4.l>patent-source>text-tagger.LISP.1    3-Jun-93 21:15:40
Page 9

(len (max (1- (length word))
                                  (list-chars tag-str))))
                   (when (> (- chars len)
                            line-length)
                     (flush-line model output-file from-index index to-codes show-ambiguity
                                 state-ids)
                     (setq chars 0)
                     (setq from-index index)
                     (terpri output-file))
                   (princ word output-file)
                   (princ " " output-file)
                   (dotimes (i (- len (length word)))
                     (write-char #\Space output-file))
                   (incf chars len))))))))
(defun viterbi-with-exceptions (model)
    (let (everything-ok nr-observations transition-matrix log-transition-matrix nr-states
          output-matrix log-output-matrix obs-matrix initial-matrix log-initial-matrix
          transition-prob total max-so-far obs-index cumulative obs-exists path-exists
          final-states index-matrix (last-state nil)
          (obs-name "TAGGER-SENTENCE")
          (model-name (rhmm::hmm-defn-name model)))
;;; 14 June 1991 this function still needs speedups and declarations
      ;;
      ;; This function returns the log (base 10) of the highest probability path through the
      ;; given model which generates the given observation sequence. It also sets the global
      ;; array *viterbi-states* to the state sequence involved. NOTE the *alpha-matrix* and
      ;; *beta-matrix* are used destructively by this function.. First check that both are big
      ;; enough (and make them bigger if necessary)
      (setq obs-matrix *current-codewords*)
      (when (setq everything-ok (and (rhmm:check-alphas model-name obs-name obs-matrix)
                                     (rhmm:check-betas model-name obs-name obs-matrix)))
        (setq log-transition-matrix (rhmm::hmm-defn-log-transition-matrix model))
        (setq transition-matrix (rhmm::hmm-defn-transitions model))
        (setq log-output-matrix (rhmm::hmm-defn-log-output-matrix model))
        (setq output-matrix (rhmm::hmm-defn-outputs model))
        (setq log-initial-matrix (rhmm::hmm-defn-log-initial-matrix model))
        (setq initial-matrix (rhmm::hmm-defn-initial model))
        (setq final-states (rhmm::hmm-defn-final-states model))
        (setq index-matrix (rhmm::hmm-defn-output-to-state-index model))
        (setq nr-states (rhmm::hmm-defn-nr-states model))
        ;; (setq nr-outputs (rhmm::hmm-defn-nr-outputs model))
        (setq nr-observations (length obs-matrix))
        ;; Check that the global *VITERBI-STATES* is an array big enough to hold the state
        ;; sequence Make it big enough if necessary (by replacing it with a new array)
        (when (or (null rhmm:*viterbi-states*)
                  (< (length rhmm:*viterbi-states*)
                     nr-observations))
          (if (null rhmm:*viterbi-states*)
              (rhmm:report "INFO: Needed a new Viterbi state matrix~%")
              (rhmm:report
                "INFO: Needed a bigger Viterbi state matrix for observation: ~a~%"
                obs-name))
          (setq rhmm:*viterbi-states* (rhmm:my-make-array (list nr-observations))))
        ;; Initialize it to nil
        (dotimes (index (length rhmm:*viterbi-states*))
          (setf (aref rhmm:*viterbi-states* index)
                nil))
        ;; Initialise alpha and beta matrices with unique values that cannot be valid
        ;; forward probs or states (respectively)
        (dotimes (obs-index nr-observations)
          (rhmm:do-relevant-states (index-matrix (aref obs-matrix obs-index)
                                    nr-states)
                                   (i-state)
            (setf (aref (aref rhmm:*alpha-matrix* i-state)
                        obs-index)
                  most-negative-double-float)
            (setf (aref (aref rhmm:*beta-matrix* i-state)
                        obs-index)
                  (double-float -1.0))))
        ;; Set up the start of the viterbi search for the first observation, put the log of
        ;; the initial probs. in the alpha matrix
        (rhmm:do-relevant-states (index-matrix (aref obs-matrix 0)
                                  nr-states)
                                 (i-state)
```

```
DSK:<project>markov>two>qtagger>franz4.1>patent-source>text-tagger.LISP.1    1-Jun-93 21:15:40
Page 13

(when (> (aref initial-matrix i-state)
                         (double-float 0.0))
                  (setf (aref (aref rhmm:*alpha-matrix* i-state)
                              0)
                        (+ (aref log-initial-matrix i-state)
                           (aref (aref log-output-matrix 0)
                                 i-state)
                           (aref obs-matrix 0))))))
       ;; Forward iteration of the viterbi algorithm over each observation
       (do ((obs-nr 1 (1+ obs-nr)))
           ((or (null everything-ok)
                (>= obs-nr nr-observations)))
         ;; For each current state (j-state) look back at  all previous states (i-state)
         ;; for the previous observation to see which paths can be extended to the current
         ;; state and current observation
         (setq obs-exists nil)
         (setq path-exists nil)
         (rhmm:do-relevant-states (index-matrix (aref obs-matrix obs-nr)
                                                nr-states)
                                   (j-state)
             (aref (aref (aref output-matrix 0)
                         j-state)
                   (aref obs-matrix obs-nr))
           ;; The current state must be capable of generating the current observation
           ;; to be considered as a possible path extension.
           (when everything-ok
             (setq obs-exists t)
             (setq max-so-far nil)
             (rhmm:do-relevant-states (index-matrix (aref obs-matrix (1- obs-nr))
                                                    nr-states)
                                       (i-state)
               (setq cumulative (aref (aref rhmm:*alpha-matrix* i-state)
                                      (1- obs-nr)))
               (setq transition-prob (aref (aref transition-matrix i-state)
                                           j-state))
               ;; The previous state must have a path ending on it, and also a
               ;; transition into the current state, for the path to be extended
               ;; to the current state
               (when (and (> cumulative most-negative-double-float)
                          (> transition-prob (double-float 0.0)))
                 ;; Update the cost of the best path from the previous node to this
                 ;; node (If it is the first one found it is the best one so far
                 ;; Include the log of the transition prob. to the current node
                 (setq total (+ cumulative (aref (aref log-transition-mat
                                                       i-state)
                                                 j-state)))
                 (when (or (null max-so-far)
                           (> total max-so-far))
                   ;; Remember the highest probability path found so far.
                   ;; And remember which was the last state through which it
                   ;; went
                   (setq max-so-far total)
                   (setf (aref (aref rhmm:*beta-matrix* j-state)
                               obs-nr)
                         (double-float i-state))
                   (setq path-exists t))))
             (when max-so-far
               ;; Remember the value of the highest prob. path to the current node
               ;; for the current observation Include the log prob. of the
               ;; observation.
               (setf (aref (aref rhmm:*alpha-matrix* j-state)
                           obs-nr)
                     (+ max-so-far (aref (aref (aref log-output-matrix 0)
                                               j-state)
                                         (aref obs-matrix obs-nr)))))))
         ;; If there was a failure in lattice continuity, try to be helpful in figuring out
         ;; why.
         (when (null path-exists)
           (setq everything-ok nil)
           (rhmm:report
             "ERROR: No Path through Viterbi Lattice in model: ~a to Observation: ~a~%"
             model-name (aref obs-matrix obs-nr))
           (rhmm:report "ERROR: Observation Sequence: ~a at time ~a~%" obs-name obs-nr))
         (when (null obs-exists)
```

```
;;;DSK:<project>markov>thvo/qtagger>franz4.1>patent-source>text-tagger.LISP.1    3-Jun-93 21:15:40
Page 11

(setq everything-ok nil)
                    (rhmm:report "ERROR: No state in model: ~a could generate observation ~a~%"
                            model-name (aref obs-matrix obs-nr))
                    (rhmm:report "ERROR: Obs. Seq: ~a at time ~a~%" obs-name obs-nr)))
        ;; We have now computed the costs of the best paths to all nodes at the last
        ;; observation time. Find out which state (which must be a permitted final state)
        ;; has the highest log prob. This is the best final state and is chosen for the
        ;; viterbi state sequence.
        (when everything-ok
            (setq max-so-far nil)
            (rhmm:do-relevant-states (index-matrix (aref obs-matrix (1- nr-observations))
                                    nr-states)
                    (i-state)
                (setq total (aref (aref rhmm:*alpha-matrix* i-state)
                                (1- nr-observations)))
                (when (or (null final-states)
                        (member i-state final-states))
                    (when (or (null max-so-far)
                            (> total max-so-far))
                        (setq max-so-far total)
                        (setq last-state i-state))))
            (setf (aref rhmm:*viterbi-states* (1- nr-observations))
                    last-state)
            (if (null max-so-far)
                (rhmm:report
                    "INFO: No path to any final state in model: ~a for Observation set: ~a~%"
                    model-name obs-name))
            ;; Go backwards filling in the rest of the best (viterbi) state sequence. At
            ;; each time, we know the best current state, and we know its best predecessor,
            ;; which we tracked in the beta matrix
            (setq obs-index (1- nr-observations))
            (when max-so-far
                (do nil
                    ((< obs-index 1))
                    (setq last-state (round (aref (aref rhmm:*beta-matrix* last-state)
                                        obs-index)))
                    (setf (aref rhmm:*viterbi-states* (1- obs-index))
                        last-state)
                    (decf obs-index)))))
        ;; This function returns the log base 10 of the viterbi sequence if one existed to a
        ;; final state.
        (if everything-ok max-so-far)))
(defun demo (&key (sleep-time 15)
            (sents 4)
            (demo-wait 10)
            (title-wait 6))
    (let ni1 (setq *line-length* 190)
        (loop (dotimes (i 40)
            (format t "~%"))
        (format t "~%~%A DEMO OF THE TAGGER FOLLOWS IN ~a SECONDS...~%~%" demo-wait)
        (sleep demo-wait)
        (format t "Tagging refers to the annotation of words in a document~%")
        (format t "with their Part-of-Speech categories (e.g. noun, verb, adverb etc.)~%~%"
                )
        (sleep title-wait)
        (format t "The Tagger will run through part of a scientific magazine~%")
        (format t "article, totally unrelated in content to the material on which~%")
        (format t "it was trained.~%")
        (format t "~%(The Tagger was trained using 19,000 sentences taken from~%")
        (format t "electronic mail messages concerning the LISP~%")
        (format t "programming language).~%")
        (sleep (* 2 title-wait))
        (format t "~%Its overall accuracy on this article exceeds 95%~%")
        (format t "correct tagging. It will be running in real-time.")
        (format t "~%with ~a second pauses added.~%" sleep-time)
        (format t "~%Words are shown with their assigned Part-of-Speech below them.~%")
        (format t "(Refer to the key if you need help figuring them out).~%")
        (sleep (* 2 title-wait))
        (format t "~%In the article, can you guess why the word 'well' -s~%")
        (format t "sometimes tagged incorrectly?~%~%")
        (sleep title-wait)
        (dotimes (i 5)
            (format t "~%"))
        (tag "/net/piglet/piglet/speech/kupiec/hmm/tagger/wells-demo.txt" :sleep-time
```

```
<DSK><project>markov>t-;vp>qtagger>franz4.1>patent-source>text-tagger.LISP;1    3-Jun-93 21:15:40
Page 12
                            sleep-time :sents sents)
                    (sleep sleep-time))))
(defun do-viterbi (model &optional (unknown-states-supplied nil))
        (let nil (when (and (fill-pointer *current-codewords*)
                            (> (fill-pointer *current-codewords*)
                               0))
                    ;; (viterbi-with-exceptions model-name obs-name)
                    (if *predict-unknown-words*
                        (new-viterbi model unknown-states-supplied)
                        (viterbi-with-exceptions model)))))
(defun fast-codeword-procedure (word)
    (let ((codeword nil)
          (word-len (length word))
          ok the-char first-char)
;;;
;;;
         (when (> word-len 0)
            (setq first-char (char word 0))
;;;
;;; Convert a word into its corresponding states..
;;;
;;; Is it a number?? I.e. an actual number, or anything starting with digits, or "." followed by a
;;; digit string.
;;;
          (if (or (parse-integer word :junk-allowed t)
                  (and (char= #\. first-char)
                        (parse-integer word :start 1 :junk-allowed t)))
              (setq codeword (fast-word-to-codeword "0"))
              ;;
              ;; we only continue if we could make a string out of the thing Is it punctuation
              ;; or sentence-boundary or comma char ??
              ;;
              (if (and (= 1 word-len)
                       (null (alphanumericp first-char)))
                  (setq codeword (fast-word-to-codeword "*"))
                  (if (and (= 2 word-len)
                           (char= #\. (char word 1))
                           (alphanumericp first-char))
                      (setq codeword (fast-word-to-codeword "A.")))))
;;; See if it is an abbrev
              (when (and (null codeword)
                         word)
                (setq ok 0)
                (do ((index 0 (+ 2 index)))
                    ((or (null ok)
                         (>= (1+ index)
                             word-len)))
                  (if (and (upper-case-p (char word index))
                           (char-equal #\. (char word (1+ index))))
                      (incf ok)
                      (setq ok nil)))
                (when (and ok (> ok 1))
                  (setq codeword (fast-word-to-codeword "U.S.A"))))
;;;
;;; Finally check to see if the string is "......." or "---------" as these are now recognized by
;;; the tagger normalization rules Nov 14 90.
;;;
              (when (and (null codeword)
                         word)
                (setq ok t)
                (do ((index 0 (1+ index)))
                    ((or (null ok)
                         (>= index word-len)))
                  (setq the-char (char word index))
                  (when (and (null (char-equal #\. the-char))
                             (null (char-equal #\- the-char)))
                    (setq ok nil)))
                (when ok
                  (setq codeword (fast-word-to-codeword "*")))))
;;;
;;; If states is still null, then we do not recognize the word...
;;;
          (when (null codeword)
              (when (null *unknown-word-codeword*)
```

```
[DSK]<project>markov>trivo>qtagger>franz4.1>patent-source>text-tagger.LISP:1    1-Jun-93 21:15:40
Page 13

(setq *unknown-word-codeword* (gethash '(:unknown)
                                                         *lexical-hash-table*)))
                (setq codeword *unknown-word-codeword*)))
        codeword))
(defun fast-word-to-codeword (word)
    (let (word-len codeword)
        (when (null **fsm-pad-char-length*)
            (setq **fsm-pad-char-length* (length (format nil "~D" (length *codeword-vector*)))))
        (setq codeword (fsm::fast-codeword-lookup word *fast-lexicon-fsm* **fsm-pad-char-length*))
        (when (null codeword)
            (setf (fill-pointer *word-to-states-buffer1*)
                  0)
            (setf (fill-pointer *word-to-states-buffer2*)
                  0)
            (setq word-len (length word))
            (dotimes (index word-len)
                (vector-push-extend (char-downcase (char word index))
                    *word-to-states-buffer1* *default-string-extension*)
                (vector-push-extend (char-upcase (char word index))
                    *word-to-states-buffer2* *default-string-extension*))
            (setq codeword (fsm::fast-codeword-lookup *word-to-states-buffer1* *fast-lexicon-fsm*
                             **fsm-pad-char-length*))
            (when (null codeword)
                (setq codeword (fsm::fast-codeword-lookup *word-to-states-buffer2*
                                 *fast-lexicon-fsm* **fsm-pad-char-length*))))
            (when (null codeword)
                (setq codeword (fast-codeword-procedure word)))
        codeword))
(defun find-log-prior-for-word (word model)
    (let* ((nr-states (rhmm::hmm-defn-nr-states model))
           (nr-outputs (rhmm::hmm-defn-nr-outputs model))
           (tied-states (rhmm::hmm-defn-tied-states model))
           (open-classes *open-classes*)
           (closed-classes (set-difference *ordered-state-list* open-classes))
           vector)
        ;; Because values are zeroed, they are not correct probabilities at present... STILL
        ;; NEEDS TO BE NORMALIZED ????
        (setq vector (make-vector nr-states :initial-element (log (/ 1.0 nr-outputs)
                                                                  10)))
        (dotimes (index nr-states)
            (when (if (< index (length *ordered-state-list*))
                      (member (nth index *ordered-state-list*)
                              closed-classes)
                      (member (nth (aref tied-states index)
                                   *ordered-state-list*)
                              closed-classes))
                ;;
                ;; If I put in MOST-NEGATIVE-DOUBLE-FLOAT below it causes an error -- find out
                ;; why..
                (setf (aref vector index)
                      -100000.0)))
        vector))
(defun find-unknown-states (model)
    (let* ((nr-states (rhmm::hmm-defn-nr-states model))
           (tied-states (rhmm::hmm-defn-tied-states model))
           (base-unknown-state (position *unknown-cat* *ordered-state-list*))
           (state-vector (make-array nr-states :initial-element nil))
           tied-to)
        ;; Find a list of states that represent :unknown in a model
        (if (null base-unknown-state)
            (format t "ERROR: No ~a state found...~%" *unknown-cat*)
            (block is-ok
                (setf (aref state-vector base-unknown-state)
                      t)
                (when tied-states
                    (dotimes (i-state nr-states)
                        (setq tied-to (aref tied-states i-state))
                        (when (and tied-to (= tied-to base-unknown-state))
                            (setf (aref state-vector i-state)
                                  t))))))
        state-vector))
(defun make-suffix-priors (model uninformed-prior suffix-fsm codeword-suffix-array)
    (let ((nr-states (rhmm::hmm-defn-nr-states model))
          (output-matrix (rhmm::hmm-defn-outputs model)))
```

```
[DSK]<project>markov>trive>qtagger>franz4.1>patent-source>text-tagger.LISP:1    3-Jun-93 21:15:40
Page 14

(tied-states (rnhmm::hmm-defn-tied-states model))
             (nr-codewords (length *codeword-vector*))
             (log-of-zero -100000.0)
             (nr-suffixes (fsm:state-name (fsm:network-start-state suffix-fsm)))
             (ok t)
             tied-to total found proper-noun-posn at-npr-state)
:::
::: The nr-suffixes index of *SUFFIX-PRIORS* is for the uniformed prior. The (1+ nr-suffixes index
::: is for a proper name prior, i.e. not sentence initial, unknown word, starting with a capital
::: letter
:::
::: Find the conditional probability of the suffix given the state (STATE-INDEX). This is the
::: summation over all codewords of the codeword probability given the state, times the suffix
::: probability given the codeword
:::
         (format t "Computing log suffix probs conditioned on states...~%")
         (setq *suffix-priors* (make-array (list (+ 2 nr-suffixes))))
:::
::: 17 Jan 1992, put in checking.. cause failure if it mismatches
:::
         (when (/= (array-dimension codeword-suffix-array 0)
                   nr-codewords)
            (format t "ERROR: NR-CODEWORDS / CODEWORD-SUFFIX-ARRAY mismatch~%")
            (setq ok nil))
         (when (/= (array-dimension codeword-suffix-array 1)
                   nr-suffixes)
            (format t "ERROR: NR-SUFFIXES / CODEWORD-SUFFIX-ARRAY mismatch~%")
            (setq ok nil))
         (when (/= (length (aref (aref output-matrix 0)
                                 0))
                   nr-codewords)
            (format t "ERROR: NR-CODEWORDS / HMM Output matrix mismatch~%")
            (setq ok nil))
         (when (null ok)
            (setq *suffix-priors* nil))
         (dotimes (index (length *suffix-priors*))
            (setf (aref *suffix-priors* index)
                  (make-array (list nr-states)
                         :initial-element 0.0)))

(dotimes (state-index nr-states)
            (dotimes (suffix-index nr-suffixes)
               (setq total 0.0)
               (dotimes (output-index nr-codewords)
                  (incf total (* (float (aref codeword-suffix-array output-index suffix-index))
                                 (aref (aref (aref output-matrix 0)
                                             state-index)
                                       output-index))))
:::
::: NOTE that in the following I didn't put MOST-NEGATIVE-DOUBLE-FLOAT in because it will screw up
::: the viterbi algorithm, which uses it to mean unreachable states....
:::
               (setf (aref (aref *suffix-priors* suffix-index)
                           state-index)
                     (if (> total 0.0)
                         (log total 10)
                         log-of-zero))))
:::
::: check to see if there are any suffixes that were never seen. If so they should be filled with
::: the contents of the uninformed prior, as otherwise all eqv classes are equally badly favoured
:::
         (format t "Inserting uninformed prior for suffixes with no instances~%")
         (dotimes (suffix-index nr-suffixes)
            (setq found nil)
            (dotimes (state-index nr-states)
               (when (> (abs (- (aref (aref *suffix-priors* suffix-index)
                                      state-index)
                                log-of-zero))
                        1.0E-6)
                  (setq found t)))
            (when (null found)
               (format t "Suffix : ~a had zero instances~%" (fsm:number-to-word suffix-index
                                                                                 suffix-fsm))
               (dotimes (state-index nr-states)
```

```
:DSK)<project>markov>trivo>tagger>franz4.1>patent-source>text-tagger.LISP.1    3-Jun-93 21:16:40
Page 15

(setf (aref (aref *suffix-priors* suffix-index)
                                        state-index)
                                  (aref uninformed-prior state-index))))
:::
::: The next to last entry in the suffix vector (aref log-suffix-vector state-index NR-SUFFIXES) is
::: for the log prior if no suffix matched the word
:::
                   (dotimes (state-index nr-states)
                     (setf (aref (aref *suffix-priors* nr-suffixes)
                                 state-index)
                           (aref uninformed-prior state-index)))
:::
::: The last entry in the suffix vector (aref log-suffix-vector state-index (1+ NR-SUFFIXES)) is for
::: the log prior for a proper name prior. i.e. not sentence initial, unknown word, starting with a
::: capital letter
:::
                   (setq proper-noun-posn (position *proper-noun-cat* *ordered-state-list*))
                   (when (null proper-noun-posn)
                     (format t "ERROR: The Proper noun category: ~a is not in *ordered-state-list*~%"
                             *proper-noun-cat*)
                     (format t "ERROR: in COMPUTE-SUFFIX-PROBS~%"))
                   (dotimes (state-index nr-states)
                     (setf (aref (aref *suffix-priors* (1+ nr-suffixes))
                                 state-index)
                           (aref uninformed-prior state-index))
:::
::: increment the proper name likelihood by orders of magnitude. The transition probs into and out
::: of the state are likely to be small, so must give the probability a big boost.
::: Note that this is still heuristic
:::
                       (setq at-npr-state nil)
                       (if (and (< state-index (length *ordered-state-list*))
                                (= state-index proper-noun-posn))
                           (setq at-npr-state t))
                       (if (and (>= state-index (length *ordered-state-list*))
                                (setq tied-to (aref tied-states state-index))
                                (= tied-to proper-noun-posn))
                           (setq at-npr-state t))
:::
:::: 24 sept fixed bug STATE-INDEX was wrongly PROPER-NOUN-POSN
::::
::: 17 Oct 91 Upped 12.0 to 16.0 to overcome lack of training that kept :nompr --> :nompr transition
::: at rhm::*epsilon* = d-15, therefore causing :nmsg :nompr assignments instead of a pair of
::: :nompr's
:::
                       (when at-npr-state
                         (incf (aref (aref *suffix-priors* (1+ nr-suffixes))
                                     state-index)
                               (+ 1 (* 2 (- (log rhmm::*epsilon* 10))))))))
            *suffix-priors*))
(defun make-tag-map nil (let nil (setq *tag-map* (make-hash-table))
                             (setf (gethash :nsg *tag-map*)
                                   :n)
                             (setf (gethash :pl *tag-map*)
                                   :npl)
                             (setf (gethash :vb *tag-map*)
                                   :v)
                             (setf (gethash :adjc *tag-map*)
                                   :adj)
                             (setf (gethash :adjs *tag-map*)
                                   :adj)
                             (setf (gethash :nn *tag-map*)
                                   :n)
                             (setf (gethash :nm *tag-map*)
                                   :npr)
                             (setf (gethash :vpastt *tag-map*)
                                   :past)
                             (setf (gethash :vpastp *tag-map*)
                                   :pastpart)
                             (setf (gethash :vpast *tag-map*)
                                   '(:pastpart :past))
                             (setf (gethash :vprog *tag-map*)
                                   '(:adj :prespart))
                             (setf (gethash :vpres *tag-map*)
```

```
[DSK]<project>markov>trivo>otagger>franz4.1>patent-source>text-tagger.LISP;1    3-Jun-93 21:15:40
Page 16
                                        :modal)
                              (setf (gethash :vo1 *tag-map*)
                                    :v)
                              (setf (gethash :sg *tag-map*)
                                    :v3sg)
                              (setf (gethash :vsg1 *tag-map*)
                                    :v)
                              (setf (gethash :vsg2 *tag-map*)
                                    :v)
                              (setf (gethash :vsg3 *tag-map*)
                                    :v3sg)
                              (setf (gethash :abbr *tag-map*)
                                    :abbrev)
                              (setf (gethash :advwh *tag-map*)
                                    :adv)
                              (setf (gethash :dn *tag-map*)
                                    '(:det))
                              (setf (gethash :dsg *tag-map*)
                                    :det)
                              (setf (gethash :dpl *tag-map*)
                                    :det)
                              (setf (gethash :dwh *tag-map*)
                                    :det)
                              (setf (gethash :dposs *tag-map*)
                                    :det)
                              (setf (gethash :dposswh *tag-map*)
                                    :det)
                              (setf (gethash :psg *tag-map*)
                                    '(:pnom :pobj))
                              (setf (gethash :ppl *tag-map*)
                                    '(:pnom :pobj))
                              (setf (gethash :pwh *tag-map*)
                                    '(:pnom :pobj))
                              (setf (gethash :pnom *tag-map*)
                                    :pnom)
                              (setf (gethash :pnomwh *tag-map*)
                                    :pnom)
                              (setf (gethash :pobj *tag-map*)
                                    :pobj)
                              (setf (gethash :pobjwh *tag-map*)
                                    :pobj)
                              (setf (gethash :pn *tag-map*)
                                    '(:pnom :pobj)))))
(defun list-chars (lst)
    (let nil (if (null lst)
                 3
                 (if (numberp lst)
                     (length (format nil "~a" lst))
                     (if (stringp lst)
                         (length lst)
                         (length (symbol-name lst)))))))
(defun check-data (model)
    (let ((ok t)
          (remake-hash-table nil))
        (when (null *codeword-vector*)
            (format t "Reading Codeword vector...~%")
            (setq *codeword-vector* (read-vector *eqv-class-pathname*))
            (setq remake-hash-table t)
            (when (null *codeword-vector*)
                (format t "ERROR: Codeword Vector is nil~%")
                (setq ok nil)))
        (when (null *unique-words*)
            (format t "Reading Unique Words...~%")
            (setq *unique-words* (read-word-file *unique-words-pathname*))
            (setq remake-hash-table t))
        (when (null *unique-words*)
            (format t "ERROR: Unique Words are nil~%")
            (setq ok nil))
        (when (and *unique-words* *codeword-vector* remake-hash-table)
            (format t "Remaking Lexical Hash Table...~%")
            (setq *lexical-hash-table* (make-hash-table :test 'equal))
            (do ((index (length *unique-words*)
                        (1+ index)))
                ((= index (length *codeword-vector*)))
```

```
DSK:<project>markov>th-vo>qtagger>franz4.1>patent-source>text-tagger.LISP:1    1-Jun-93 21:15:40
Page 1:

(setf (gethash (aref *codeword-vector* index)
                          *lexical-hash-table*)
                  index)))
    (when (null *front-fsm*)
       (when (probe-file (merge-pathnames "front-end.fsm" *tagger-pathname*))
           (setq *front-fsm* (fsm:network-from-file (merge-pathnames "front-end.fsm"
                                                                     *tagger-pathname*))))
       (if (null *front-fsm*)
           (progn (format t "ERROR: Front FSM is nil~%")
                  (setq ok nil))
           (fsm:index-network *front-fsm*)))
    (when (null *front-vector*)
        (format t "~%Reading Front Vector..~%")
        (setq *front-vector* (read-vector (merge-pathnames "front-vector.lisp"
                                                           *tagger-pathname*)))
        (when (null *front-vector*)
           (format t "ERROR: Front Vector is nil~%")
           (setq ok nil)))
    (when (and *predict-unknown-words* model (or (null *suffix-fsm*)
                                                  (null *suffix-priors*)))
       (read-suffix-priors model))
    (when (and *predict-unknown-words* (null model))
       (format t "ERROR: Cannot Read suffix priors -- no model available~%"))
    (when (and *predict-unknown-words* (null *suffix-fsm*))
       (format t "ERROR: Suffix FSM is nil (predict-unknown-words* is set to t)~%")
       (setq ok nil))
    (when (and *predict-unknown-words* (null *suffix-priors*))
       (format t "ERROR: Suffix Priors are nil (predict-unknown-words* is set to t)~%")
       (setq ok nil))
    ok))
(defun convert-tags (lexicon-tags)
   (let (new-tags (mapped-list nil))
     ;; Should have looked in fsm before calling this function
     (if (null lexicon-tags)
         (setq mapped-list (list *unknown-cat*))
         (block do-mapping
            (dolist (old-tag lexicon-tags)
              ::
              :: Use any replacement in the tag map. otherwise use the tag directly (here
              :: we assume it is a member of *ordered-state-list* as it is expensive to
              :: check things here)
              ::
              (setq new-tags (gethash old-tag *tag-map*))
              (if new-tags
                  (if (listp new-tags)
                      (dolist (tag new-tags)
                         (pushnew tag mapped-list))
                      (pushnew new-tags mapped-list))
                  (pushnew old-tag mapped-list))))
         (setq mapped-list (sort mapped-list #'string<))))
     mapped-list))
(defun flush-line (model output-file from-index to-index to-codes show-ambiguity state-ids)
   (let ((is-a-cfg (rhmm::hmm-defn-network-matrix model)))
      (terpri output-file)
      (do* ((index from-index (1+ index)))
           ((= index to-index))
        (let nil
         :: word -- (aref *current-words* index) p-of-s (aref *current-codewords* index)
         (let* ((word (aref *current-words* index))
                (codeword (format nil "~a " (if (or is-a-cfg to-codes)
                                                (aref *current-codewords* (1+ index))
                                                (state-to-string model (1+ index)
                                                                 *non-printing-tags* state-ids))))
                (states (word-to-states word))
                len tag-str)
           (setq tag-str (if (and (null to-codes)
                                  (> (length states)
                                     1))
                             (if show-ambiguity
                                 (progn (setf (char codeword (1- (length codeword)))
                                              #\/)
                                        (concatenate 'string codeword
                                                     (format nil "~a " (length states))))
                                 codeword)
```

```
{CSK}<project>markov>trivp>dtagger>franz4.1>patent-source>text-tagger.LISP;1    3-Jun-93 21:15:40
Page 13
                                                     codeword))
                                     (setq len (max (1- (length word))
                                                    (list-chars tag-str)))
                               (if (null codeword)
                                   (block no-part-of-speech (write-string "NIL" output-file))
                                   (progn (princ tag-str output-file)
                                          (princ " " output-file)))
                               (dotimes (i (- len (length tag-str)))
                                     (write-char #\Space output-file)))))
                         (terpri output-file)))
(defun log-suffix-prior (word not-sentence-initial-word-initial-cap max-suffix-len)
      (let ((nr-suffixes (fsm:state-name (fsm:network-start-state *suffix-fsm*)))
            suffix-index wd-len suffix)
:::
::: 9 Oct 91. NR-SUFFIXES should be taken from the fsm size, not the (length *suffix-list*) because
::: any repeated suffix in the latter will map to the same entry in the fsm..
::: 24 Sept 92 Use *buffer* . do not use subseq. THUS NO OTHER FUNCTION THAT USES *BUFFER* SHOULD
::: CALL THIS ONE: THESE INCLUDE fst-read-sentence, word-to-states
:::
           (setq suffix-index nil)
           (setq wd-len (length word))
           ;; Look up the longest matching suffix of this word with the suffix fsm.
           (do ((suffix-len max-suffix-len (1- suffix-len)))
               ((or suffix-index (<= suffix-len 0)))
               (when (>= wd-len suffix-len)
                  (setf (fill-pointer *buffer*)
                        0)
                  (do ((index (- wd-len suffix-len)
                              (1+ index)))
                      ((>= index wd-len))
                      (vector-push-extend (char word index)
                         *buffer* *default-string-extension*))
                  (when nil
                     (setq suffix (subseq word (- wd-len suffix-len)
                                          wd-len))
                     (setq suffix-index (fsm:word-to-number suffix *suffix-fsm*)))
                  (setq suffix-index (fsm:word-to-number *buffer* *suffix-fsm*))
                  (when *debugging* (format t "LOG-SUFFIX-PRIOR: ~s ~a ~s ~a~%" word suffix-len
                                            *buffer* suffix-index))))
           (if not-sentence-initial-word-initial-cap
               (aref *suffix-priors* (1+ nr-suffixes))
               (if suffix-index
                   (aref *suffix-priors* suffix-index)
                   (aref *suffix-priors* nr-suffixes)))))
(defun read-suffix-priors (model &key (full-read (null *tagger-stable-p*)))
    (let ((suffix-array nil)
          (ok t)
          nr-suffixes uninformed-prior codeword-counts unrecognized-counts)
        (when (probe-file *suffix-priors-pathname*)
           (with-open-file (stream *suffix-priors-pathname* :direction :input :if-does-not-exist
                                    nil)
              (setq *suffix-priors* (read stream nil nil))
              (when (null *suffix-priors*)
                 (setq ok nil)
                 (format t "ERROR: *suffix-priors* are nil upon reading~%"))
              (setq suffix-array (if full-read
                                     (read stream nil nil)
                                     nil))
              (setq codeword-counts (if full-read
                                        (read stream nil nil)
                                        nil))
              (setq unrecognized-counts (if full-read
                                            (read stream nil nil)
                                            nil))))
        (format t "Reading Suffix FSM...~%")
        (setq *suffix-fsm* nil)
        (when (probe-file *suffix-fsm-pathname*)
           (setq *suffix-fsm* (fsm:network-from-file *suffix-fsm-pathname*)))
        (if (null *suffix-fsm*)
            (format t "ERROR: Suffix FSM is NIL~%"))
        (when *suffix-fsm*
           (format t "~%Indexing Suffix FSM...~%")
           (fsm:index-network *suffix-fsm*)
           (setq nr-suffixes (fsm:state-name (fsm:network-start-state *suffix-fsm*)))
```

000164

```
[DSK]<project>markov>trivo>atagger>franz4.1>patent-source>text-tagger.LISP.1    1-Jun-93 21:15:40
Page 19

(when (/= nr-suffixes (length *suffix-list*))
                      (format t "WARNING: Suffix FSM is different length to *suffix-list*~%"))
                 ;; put in stuff to check that it is consistent with model perhaps should also store the
                 ;; model name...
                    (when (arrayp suffix-array)
                      (if (and (= (length *codeword-vector*)
                                  (array-dimension suffix-array 0))
                               (= nr-suffixes (array-dimension suffix-array 1)))
                          (progn (setq uninformed-prior (make-uninformed-log-prior model
                                                         unrecognized-counts codeword-counts))
                                 (make-suffix-priors model uninformed-prior *suffix-fsm* suffix-array)
                 ;;; This is so that MAKE-UNINFORMED-LOG-PRIOR can be called from TRAIN-TAGGER, after new training
                 ;;; has been done.
                                 (setq *unrecognized-suffixes* unrecognized-counts)
                                 (setq *codeword-count-vector* codeword-counts)
                                 (setq *codeword-suffixes* suffix-array))
                          (progn (setq ok nil)
                                 (format t "ERROR: Suffix array does not match correctly~%")
                                 (format t "ERROR: Either *suffix-list* modified, or contains duplicates~%"
                                 ))))
                    (when (arrayp *suffix-priors*)
                      (when (/= (length *suffix-priors*)
                                (- 2 nr-suffixes))
                        (setq ok nil)
                        (format t "*suffix-priors* has mismatch in expected suffixes(+2) ~a:~a~%"
                                (length *suffix-priors*)
                                (- 2 nr-suffixes)))
                      (when (/= (length (aref *suffix-priors* 0))
                                (rhmm::hmm-defn-nr-states model))
                        (setq ok nil)
                        (format t "*suffix-priors* has mismatch in expected states ~a:~a~%"
                                (length (aref *suffix-priors* 0))
                                (rhmm::hmm-defn-nr-states model))))
                    (when (null ok)
                      (format t "ERROR: Proceeding, but will not tag unknown words~%")
                      (setq *predict-unknown-words* nil)))))
(defun read-vector (file-name)
    (let ((vector nil)
          length)
      (when (probe-file file-name)
        (with-open-file (stream file-name :direction :input :if-does-not-exist nil)
          (setq length (read stream))
          (setq vector (make-array (list length)))
          (dotimes (i length)
            (setf (aref vector i)
                  (read stream)))))
      vector))
(defun word-to-codeword (word &optional (downcase-supplied nil))
    (let ((index tags wd-downcase (codeword nil))
      (if **fast-lexicon-fsm*
          (setq codeword (fast-word-to-codeword word))
          (progn
 ;;;
 ;;; First see if the word is contained in the front end fsm. If so use its code directly
 ;;; 24 Sept 92 Back compatible word downcase supplied
 ;;;
                (setq wd-downcase (or downcase-supplied (string-downcase word)))
                (if (and *front-fsm* (or (setq index (fsm:word-to-number word *front-fsm*))
                                         (setq index (fsm:word-to-number wd-downcase
                                                                         *front-fsm*))))
                    (setq codeword (aref *front-vector* index))
                    (setq codeword (gethash (setq tags (word-to-states word))
                                            *lexical-hash-table*)))
                (when (null codeword)
                  (format t "~%WARNING: word ~a tags ~a are new~%" word tags)
                  (setq codeword (gethash '(:unknown)
                                          *lexical-hash-table*)))))
 ;;
 ;;  If the word was not found directly, (e.g. sentence - initial "Is" see if a lower
 ;;  case version of it is...This is not exactly correct management, as upper case may
 ;;  mean abbreviations. (although this does handle the situation of an all-uppercase
 ;;  document not being thought of as being totally composed of abbreviations!... If the
 ;;  word was not in the front end fsm, try the main lexicon. WORD-TO-STATES returns
 ;;  :unknown, so failure is covered If the word was in the top NR-UNIQUE-WORDS it would
```

```
{DSK}<project>markov>trivp>dtagger>franz4.i>patent-source>text-tagger.LISP:1   3-Jun-93 21:15:40
Page 20

;; have been found  previously, so start the search after them. This is true as long as
         ;; only lowercase strings are used. (Currently all words in the *DICT-FSM* are
         ;; lowercase so this is appropriate) Otherwise calling this function with "Is'... would
         ;; cause a not immediately detectable  error.
         ;;
         codeword))
(defun word-to-states (word)
     (let ((states nil)
           (word-len (length word))
           index lexicon-tags ok (wd-downcase nil)
           first-char the-char)
;;;
;;; 6 jan 1992 copied from french version
;;; 9 dec 91 include global string buffers to eliminate repeated use of storage
;;;
         (setf (fill-pointer *word-to-states-buffer1*)
               0)
         (setf (fill-pointer *word-to-states-buffer2*)
               0)
         (dotimes (index word-len)
             (setq the-char (char word index))
             (vector-push-extend (char-downcase the-char)
                 *word-to-states-buffer1* *default-string-extension*)
             (vector-push-extend the-char *word-to-states-buffer2* *default-string-extension*))
         (when () word-len 0)
             (setq first-char (char word 0))
             (nstring-capitalize *word-to-states-buffer2*)
             (setq wd-downcase *word-to-states-buffer1*)
;;;
;;; Convert a word into its corresponding states..
;;;
;;; Is it a number?? I.e. an actual number. or anything starting with digits. or ".' followed by a
;;; digit string.
;;;
           (if (or (parse-integer wd-downcase :junk-allowed t)
                   (and (char= #\. first-char)
                        (parse-integer wd-downcase :start 1 :junk-allowed t)))
               (push :number states)
               ;;
               ;; We only continue if we could make a string out of the thing Is it punctuation
               ;; or sentence-boundary or comma char ??
               ;;
               (if (and (= 1 (length wd-downcase))
                        (null (alphanumericp first-char)))
                   (block is-not-alphanumeric
;;; put in case statement 28 sept 92
                       (push (case first-char
                               ((#\. #\? #\!) :sent-boundary)
                               (#\, :comma)
                               (#\' :apostrophe)
                               (#\( :lparen)
                               (#\) :rparen)
                               (#\: :scolon)
                               (#\- :hyphen)
                               (#\" :dqoute)
                               (otherwise :punct))
                             states))
                   (if (and (= 2 (length wd-downcase))
                            (char= #\. (char wd-downcase 1))
                            (alphanumericp first-char))
                       (push :single-abbr states)
                       (block not-a-special-string
                           ;; Go get the basic entry first look in the front-fsm WHAT ABOUT
                           ;; MAPPING FIRST LETTER to UPPERCASE  IF EVERYHTING FAILS SO that
                           ;; "africa" would be recognized.
                           (if (and *front-fsm* (or (setq index (fsm:word-to-number word
                                                                                    *front-fsm*))
                                                    (setq index (fsm:word-to-number wd-downcase
                                                                                    *front-fsm*))))
                               (setq states (aref *codeword-vector* (aref *front-vector* index)))
                               )
                           (block look-in-lexicon
;;;
;;; 24 Sept 92 Changed the order so initial uppercase goes before downcase. Thus AMERICAN fails, but
```

```
[GSK]<project>markov>trivo>qtagger>franz4.1>patent-source>text-tagger.LISP:1    3-Jun-93 21:15:40
Page 21

;;; American gets Noun or Adjective whereas american only gets adjective
                              (when (setq lexicon-tags (or (get-tags word
                                                                     *word-to-states-buffer3*)
                                                           (get-tags
                                                                     *word-to-states-buffer2*
                                                                     *word-to-states-buffer3*)
                                                           (get-tags wd-downcase
                                                                     *word-to-states-buffer3*)
                                                           ))
                                    (setq states (convert-tags lexicon-tags)))))))))
;;; See if it is an abbrev
                (when (and (null states)
                           word)
                  (setq ok 0)
                  (do ((index 0 (+ 2 index)))
                      ((or (null ok)
                           (>= (1- index)
                               word-len)))
                    (if (and (upper-case-p (char word index))
                             (char-equal #\. (char word (1+ index))))
                        (incf ok)
                        (setq ok nil)))
                  (when (and ok (> ok 1))
                    (setq states '(:abbrev))))
;;;
;;; Finally check to see if the string is "......." or "---------" as these are now recognized by
;;; the tagger normalization rules Nov 14 90.
;;;
                (when (and (null states)
                           word)
                  (setq ok t)
                  (do ((index 0 (1+ index)))
                      ((or (null ok)
                           (>= index word-len)))
                    (setq the-char (char word index))
                    (when (and (null (char-equal #\. the-char))
                               (null (char-equal #\- the-char)))
                      (setq ok nil)))
                  (when ok
                    (setq states '(:punct)))))
;;;
;;; If states is still null, then we do not recognize the word...
;;;
                (when (null states)
                  (setq states '(:unknown)))
                states))
(defun fst-read-sentence (file-stream tokenizer-stream lisp-forms sent-boundary-codeword &key
                          (tokenize-only nil))
  (let ((token-string "")
        char word-str (word-count 0)
        (codeword -1))
;;;
;;; The tokenize-only keyword was added 28 Oct 92 for question answering.
;;;
;;; The ERROR-OVERRIDE is for when fst-read gets stucck, as it occassionally does for reasons I
;;; don't understand, and keeps returning the same word.
;;;
    (setf (fill-pointer *current-codewords*)
          0)
    (setf (fill-pointer *current-words*)
          0)
    (vector-push-extend sent-boundary-codeword *current-codewords*)
;;;
;;; 6 Dec 1991 If :norm t , then a sentence-boundary marker should be on its own "." otherwise it
;;; is embedded in a string.
;;;
;;; 21 April major cleanup....NEED TO FIX THE TOKENIZER RULES
;;;
    (loop (when (or (= 0 (length token-string))
                    (= codeword sent-boundary-codeword)
                    (eof-p file-stream))
            (return nil))
          (setf (fill-pointer *buffer*)
                0)
```

```
{DSK}<project>markov>trivp>qtagger>franz4.1>patent-source>text-tagger.LISP;1    3-Jun-93 21:15:40
Page 22

(if (null tokenizer-stream)
                        (block from-file
                            (setq token-string nil)
                            (do nil
                                ((or (null (setq char (read-char file-stream nil nil)))
                                     (char= char #\Space)
                                     (char= char #\Tab)
                                     (char= char #\Newline)))
                                (vector-push-extend char *buffer* *default-string-extension*))
;;;
;;; 4dec 91 copied from "read-aligned-sentence in NP-translate. (see personal notes 24 Nov 91) Bug
;;; Fix reading spaces when :norm t
;;;  Consume  any extra spaces or Newlines (Or Tabs)
;;;
                            (setq char (peek-char nil file-stream nil nil))
                            (do nil
                                ((and (char/= char #\Space)
                                      (char/= char #\Tab)
                                      (char/= char #\Newline)))
                                (read-char file-stream nil nil)
                                (setq char (peek-char nil file-stream nil nil)))
                            (setq token-string *buffer*))
                        (progn
;;;
;;; 7 April. For fsm-tokenizer characteristics, also skip over any following spaces
;;; Eliminate the trailing spaces from the string...
;;;
;;; 24 Sept 92 Take out old subseq s...TOKENIZER DOESN'T INCLUDE TRAILING SPACES ANY MORE ??
                            (setq token-string (tdb::next-token tokenizer-stream))
                            (do* ((index 0 (1+ index)))
                                 ((or (= index (length token-string))
                                      (or (char= #\Space (setq char (char token-string index)))
                                          (char= #\Newline char)
                                          (char= #\Tab char))))
                                 (vector-push-extend char *buffer* *default-string-extension*))
                            (when nil
                                (do ((next-space (1- (length token-string))
                                                 (1- next-space)))
                                    ((or (= next-space -1)
                                         (null (or (char= #\Space (char token-string next-space))
                                                   (char= #\Newline (char token-string next-space))
                                                   (char= #\Tab (char token-string next-space)))))
                                     (when (< next-space (1- (length token-string)))
                                         (setq token-string (subseq token-string 0 (1+ next-space)))
                                     )))))
                    ;; (setq word-str (copy-seq token-string))
                    (setq word-str (copy-seq *buffer*))
                    (setf (fill-pointer *downcase-buffer*)
                          0)
                    (dotimes (index (length word-str))
                        (vector-push-extend (char-downcase (char word-str index))
                                            *downcase-buffer* *default-string-extension*))
                    (when (> (length word-str)
                             0)
                        (setq codeword (if tokenize-only
                                           -1
                                           (word-to-codeword word-str *downcase-buffer*)))
                        (incf word-count)
                        (when *debugging* (format t "~s  codeword ~a Word Count: ~a~%" word-str
                                                     codeword word-count))
                        (vector-push-extend word-str *current-words* 100)
                        (vector-push-extend codeword *current-codewords* 100)))
;;;
;;; If the sentence already ends with a sentence boundary, don't add another
;;; 24 jan 1992 bug fix. If the sentence ends with a ? or ! and a sentence boundary gets added,
;;; also add "." to *current-words* othewise new-viterbi will fail, because there aren't enough
;;; entries.
;;;
                    (when (/= sent-boundary-codeword (aref *current-codewords* (1- (fill-pointer
                                                                                    *current-codewords*
                                                                                    ))))
                        (vector-push-extend sent-boundary-codeword *current-codewords* 100)
                        (vector-push-extend "." *current-words* 100))))
```

What is claimed is:

1. A method of operating a processor-based computer system including at least one processor to organize information retrieval based on the content of a set of documents, the method comprising the steps of:

using a processor to accept an input string comprising an ordered set of words;

using a processor to accept the set of documents;

using a processor to analyze the content of at least one document of the set;

using a processor to generate automatically an answer hypothesis likely to be relevant to said input string, said answer hypothesis being generated responsively to said document content thus analyzed, said answer hypothesis comprising a phrase;

using a processor to verify the answer hypothesis by gathering evidence for a plurality of answer hypotheses; and using a processor to determine a best answer hypothesis from among said plurality of answer hypotheses according to the evidence thus gathered.

2. The method of claim 1 in which the documents comprise natural-language text.

3. The method of claim 1 wherein said input string comprises a user question, and wherein said phrase represents an answer to said user question.

4. The method of claim 1 in which at least one word of the answer hypothesis is not present in the input string.

5. The method of claim 1 in which the input string comprises natural-language text.

6. The method of claim 5 additionally comprising the step of using a processor to analyze the input string.

7. The method of claim 6 in which the step of using a processor to analyze the input string comprises using a processor to determine a linguistic relation implied by the input string.

8. The method of claim 7 wherein the step of using a processor to verify the answer hypothesis comprises using a processor to take into account the linguistic relations thus determined.

9. The method of claim 7 in which said phrase is generated by determining a match phrase, said match phrase being a phrase common to at least two documents of said set, said match phrase satisfying said linguistic relation implied by said input string.

10. The method of claim 9 in which said match phrase is a noun phrase.

11. The method of claim 9 in which said linguistic relation is selected from the group consisting of a lexical relation, a syntactic relation, a lexico-syntactic relation, a semantic relation, a grammatical relation, and a parsed relation.

12. The method of claim 7 further comprising the step of:

using a processor in conjunction with an output device to output said answer hypothesis in the context of said linguistic relation.

13. The method of claim 1 in which the step of using a processor to generate automatically an answer hypothesis comprises using a processor to generate the plurality of answer hypotheses from among which the best answer hypothesis is to be determined.

14. The method of claim 1 in which a text corpus is used to provide verification evidence.

15. The method of claim 14 in which the text corpus comprises the documents of the set of documents.

16. The method of claim 14 in which the text corpus comprises documents not in the set of documents.

17. The method of claim 14 in which the text corpus comprises the documents of the set and additional documents not in the set.

18. The method of claim 1 in which the step of using a processor to generate automatically an answer hypothesis comprises using a processor to generate automatically at least two answer hypotheses and further comprising the step of using the processor to link at least two equivalent answer hypotheses.

19. The method of claim 1 in which the step of using a processor to verify the answer hypothesis comprises using the processor to perform lexico-syntactic analysis automatically.

20. The method of claim 19 which the lexico-syntactic analysis comprises lexico-syntactic pattern matching.

21. The method of claim 20 in which the lexico-syntactic pattern matching comprises generating, instantiating, and matching templates.

22. The method of claim 1 further comprising the step of using the processor to consult at least one reference document.

23. The method of claim 1 in which said phrase contains a single word.

24. The method of claim 1 in which said phrase contains a plurality of words.

25. The method of claim 1 in which said phrase is present in said document content thus analyzed.

26. The method of claim 1 in which said phrase is present in each of a plurality of documents of said set of documents.

27. The method of claim 1 further comprising the step of:

using a processor in conjunction with an output device to output a set of results, said set of results being organized according to said answer hypothesis.

28. In the operation of a processor-based system comprising a processor, a memory coupled to the processor, a user interface, an answer extraction subsystem, a computerized information retrieval (IR) subsystem coupled to a text corpus, and channels connecting the answer extraction subsystem and the information retrieval subsystem, a method of operating the processor-based computer system to retrieve documents from the text corpus in response to a user-supplied natural language input string comprising words and a set of primary documents, the method comprising the steps of:

using the user interface to accept the input string into the answer extraction subsystem;

using the processor to analyze the input string to detect phrases therein;

using the processor to accept the primary documents into the answer extraction subsystem;

using the answer extraction subsystem to analyze the primary documents to detect additional phrases therein, the additional phrases not being present in the input string; and using the answer extraction subsystem to verify the additional phrases as answer hypotheses.

29. The method of claim 28 in which the step of using the answer extraction subsystem to verify the additional phrases as answer hypotheses further comprises the step of using the answer extraction subsystem to generate secondary queries to retrieve secondary documents.

30. The method of claim 29 in which the step of using the answer extraction subsystem to verify the additional phrases as answer hypotheses further comprises the step of analyzing the secondary documents to detect phrases therein.

31. The method of claim 28 additionally comprising the step of using the answer extraction subsystem to score the additional phrases thus verified as answer hypotheses.

32. The method of claim 31 additionally comprising the step of using the answer extraction subsystem to rank the additional phrases thus verified as answer hypotheses according to their scores.

33. The method of claim 32 additionally comprising the step of organizing the additional phrases thus ranked for output.

34. The method of claim 28 further comprising the step of using the answer extraction subsystem to output at least one of the additional phrases.

35. The method of claim 28 in which the step of using the answer extraction subsystem to verify the additional phrases as answer hypotheses includes using the answer extraction subsystem to determine linguistic relations based on the phrases detected in the input string.

36. The method of claim 35 in which the linguistic relations thus determined are used as a basis for verifying the additional phrases as answer hypotheses.

37. A method of operating a processor-based computer system for computerized information retrieval to respond to an input string, the method comprising the steps of:
   using a subsystem of said system to accept the input string;
   using a subsystem of said system to accept a set of primary documents;
   using a subsystem of said system to detect phrases in the primary documents;
   using a subsystem of said system to generate preliminary hypotheses based on phrases so detected;
   using a subsystem of said system to select preliminary hypotheses as answer hypotheses for verification, each of said answer hypotheses comprising a phrase detected in a document of said primary documents;
   using a subsystem of said system to determine linguistic relations implied by the input string;
   using a subsystem of said system to gather verification evidence for answer hypotheses; and
   using a subsystem of said system to rank answer hypotheses.

38. The method of claim 37 in which at least one of the phrases detected in the primary documents and selected as an answer hypothesis is a phrase not present in the input string.

39. The method of claim 37 further comprising the step of using a subsystem of said system to link sets of equivalent answer hypotheses.

40. The method of claim 37 in which the verification evidence comprises evidence that supports the linguistic relations implied by the input string with respect to at least one of the answer hypotheses.

41. The method of claim 37 in which the step of using a subsystem of said system to rank hypotheses comprises the steps of:
   using a subsystem of said system to assign scores to hypotheses; and
   using a subsystem of said system to order hypotheses according to the scores thus assigned.

42. The method of claim 37 in which the step of using a subsystem of said system to rank answer hypotheses comprises using a subsystem of said system to take into account at least some of the verification evidence gathered for answer hypotheses.

43. The method of claim 37 in which the step of using a subsystem of said system to rank hypotheses comprises using a subsystem of said system to take into account co-occurrence of hypotheses with input string phrases in primary documents.

44. The method of claim 37 further comprising the step of using a subsystem of said system to generate preliminary scores for preliminary hypotheses and in which the step of using a subsystem of said system to rank hypotheses comprises using a subsystem of said system to take into account said preliminary scores.

45. The method of claim 37 further comprising the step of using a subsystem of said system to generate at least one query.

46. The method of claim 45 in which the evidence gathered during the step of using a subsystem of said system to gather verification evidence comprises the content of at least one document retrieved in response to the query.

47. A method of operating a computerized information retrieval system comprising the steps of:
   using a processor to accept an input string and a set of primary documents;
   using the processor to determine phrases in the input string;
   using the processor to generate hypotheses not present in the input string based on text in the primary documents, each of said hypotheses comprising a phrase;
   using the processor to verify the hypotheses using the primary documents by performing lexico-syntactic analysis automatically; and
   using the processor to score the hypotheses.

48. The method of claim 47 further comprising the steps of:
   using the processor to construct and execute queries based on the hypotheses to retrieve a set of secondary documents; and
   using the processor to verify the hypotheses using the secondary documents thus retrieved.

49. The method of claim 47 further comprising the step of using the processor to link equivalent hypotheses.

50. The method of claim 47 further comprising the step of using the processor to output the scored hypotheses.

51. A method of operating a computer system for computerized information retrieval to process an input string supplied by a user, the method comprising the steps of:
   in a first phase, using the system to construct and execute a series of primary queries based on shallow linguistic analysis of the input string in order to retrieve primary documents; and
   in a second phase, using the system to perform answer extraction, the answer extraction comprising hypothesis generation and secondary query construction and execution, the hypothesis generation comprising the extraction of phrases from said primary documents, the secondary query construction and execution comprising the construction and execution of queries in order to retrieve secondary documents and to verify the phrases in a context provided by the secondary documents.

52. In the operation of a computer system comprising a processor, a memory coupled to the processor, a user interface, a primary query construction subsystem, an answer extraction subsystem, a computerized information retrieval (IR) subsystem coupled to a text corpus, and channels connecting the primary query construction subsystem and the information retrieval subsystem, a method of operating the computer system to retrieve documents from the text corpus in response to a user-supplied natural language input string comprising words, the method comprising the steps of:

using the user interface to accept the input string into the primary query construction subsystem;

using the primary query construction subsystem to analyze the input string to detect phrases therein;

using the primary query construction subsystem to construct a series of queries based on the detected phrases, the queries of the series being constructed automatically by the primary query construction subsystem through a sequence of operations that comprises successive broadening and narrowing operations;

using the primary query construction subsystem, the information retrieval subsystem, the text corpus, and the channels to execute the queries of the series;

using the primary query construction subsystem to rank documents retrieved from the text corpus in response to one or more queries thus executed to produce a set of primary documents;

using a channel to send the primary documents, the input string, and the phrases detected in the input string from the primary query construction subsystem to the answer extraction subsystem;

using the answer extraction subsystem to generate hypotheses not present in the input string based on text in the primary documents;

using the answer extraction subsystem to verify the hypotheses using the primary documents by performing lexico-syntactic analysis automatically; and using the answer extraction subsystem to score the hypotheses.

* * * * *